(12) United States Patent
Yousefi et al.

(10) Patent No.: US 9,414,070 B2
(45) Date of Patent: *Aug. 9, 2016

(54) BRIDGE ROUTING MODULE

(71) Applicant: BROADCOM CORPORATION, Irvine, CA (US)

(72) Inventors: Nariman Yousefi, Monarch Beach, CA (US); Yongbum Kim, Los Altos Hills, CA (US); John Walley, Ladera Ranch, CA (US); Sherman (Xuemin) Chen, Rancho Santa Fe, CA (US); Wael W. Diab, San Francisco, CA (US); Nicholas Ilyadis, Merrimack, NH (US)

(73) Assignee: BROADCOM CORPORATION, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/228,598

(22) Filed: Mar. 28, 2014

(65) Prior Publication Data

US 2014/0211803 A1 Jul. 31, 2014

Related U.S. Application Data

(63) Continuation of application No. 13/171,636, filed on Jun. 29, 2011, now Pat. No. 8,718,054.

(60) Provisional application No. 61/409,904, filed on Nov. 3, 2010.

(51) Int. Cl.
*H04L 12/28* (2006.01)
*H04N 19/102* (2014.01)
(Continued)

(52) U.S. Cl.
CPC ............ *H04N 19/102* (2014.11); *B60R 16/023* (2013.01); *B60R 16/03* (2013.01); *B60R 16/0315* (2013.01); *G06F 1/26* (2013.01); *G06F 1/266* (2013.01); *G07C 5/0866* (2013.01);
(Continued)

(58) Field of Classification Search
CPC ... H04L 12/56; H04L 2012/56; H04L 49/254; H04L 49/10; H04L 49/15; H04L 29/0653; H04L 29/06095; H04L 49/3009; H04L 49/309; H04L 45/74; H04Q 11/0407; H04Q 2213/13003
USPC ............. 370/389, 360, 386, 392, 396, 395.42
See application file for complete search history.

(56) References Cited

U.S. PATENT DOCUMENTS 6,222,841 B1 * 4/2001 Taniguchi ............... H04L 47/10 370/230
6,535,513 B1 * 3/2003 Kao ..................... H04L 12/5601 370/395.1

(Continued)

*Primary Examiner* — Brenda H Pham
(74) *Attorney, Agent, or Firm* — Garlick & Markison; Bruce E. Garlick

(57) ABSTRACT

A bridge routing module can be incorporated into a closed network fabric, such as a vehicular network. The bridge routing module includes an interface circuit to be coupled to other elements of the closed network fabric, for example other bridge routing modules or switch modules. The bridge routing module includes memory to store information associating packet content types with packet routing parameters, among other things. A processing module included in the bridge routing module analyzes packets to identify the type of content carried by the packets, and determines packet routing parameters based on the packet's content type. Ingress and egress of the packet are controlled in accordance with the packet routing parameters determined by the processing module.

20 Claims, 108 Drawing Sheets

(51) Int. Cl.

| | | |
|---|---|---|
| *H04N 7/18* | (2006.01) | |
| *G07C 5/08* | (2006.01) | |
| *H04W 4/04* | (2009.01) | |
| *H04L 12/947* | (2013.01) | |
| *H04L 12/865* | (2013.01) | |
| *B60R 16/03* | (2006.01) | |
| *H04L 12/917* | (2013.01) | |
| *H04L 12/911* | (2013.01) | |
| *H04L 12/741* | (2013.01) | |
| *H04L 12/54* | (2013.01) | |
| *H04L 29/06* | (2006.01) | |
| *G06F 1/26* | (2006.01) | |
| *H04L 29/08* | (2006.01) | |
| *H04W 72/08* | (2009.01) | |
| *H04W 72/10* | (2009.01) | |
| *G08G 1/16* | (2006.01) | |
| *H04L 12/851* | (2013.01) | |
| *H04W 24/08* | (2009.01) | |
| *H04W 28/08* | (2009.01) | |
| *B60R 16/023* | (2006.01) | |
| *H04W 88/02* | (2009.01) | |
| *G06F 7/76* | (2006.01) | |
| *H04L 12/46* | (2006.01) | |
| *H04L 12/10* | (2006.01) | |

(52) U.S. Cl.
CPC ........ *G08G1/16* (2013.01); *H04L 12/46* (2013.01); *H04L 12/56* (2013.01); *H04L 29/0653* (2013.01); *H04L 45/74* (2013.01); *H04L 47/2433* (2013.01); *H04L 47/6275* (2013.01); *H04L 47/76* (2013.01); *H04L 47/821* (2013.01); *H04L 49/25* (2013.01); *H04L 67/12* (2013.01); *H04N 7/181* (2013.01); *H04N 7/183* (2013.01); *H04W 4/046* (2013.01); *H04W 24/08* (2013.01); *H04W 28/08* (2013.01); *H04W 72/082* (2013.01); *H04W 72/10* (2013.01); *G06F 7/76* (2013.01); *H04L 12/10* (2013.01); *H04L 12/4625* (2013.01); *H04W 88/02* (2013.01); *Y02B 60/50* (2013.01)

(56) References Cited

U.S. PATENT DOCUMENTS

| | | | | |
|---|---|---|---|---|
| 7,139,271 | B1 * | 11/2006 | Parruck | H04L 12/5601 370/392 |
| 7,324,892 | B2 * | 1/2008 | Fehr | F02D 41/2409 370/241 |
| 7,948,976 | B2 * | 5/2011 | Arad | H04L 47/10 370/389 |
| 8,718,054 | B2 * | 5/2014 | Yousefi et al. | 370/389 |

* cited by examiner

Unified Automotive Environment (AE)
N/W Structure network fabric 384 network fabric
spanning tree config. #1

FIG. 24 network fabric spanning tree config. #2

FIG. 25 network fabric spanning tree config. #n

FIG. 26 network fabric spanning tree config. #x

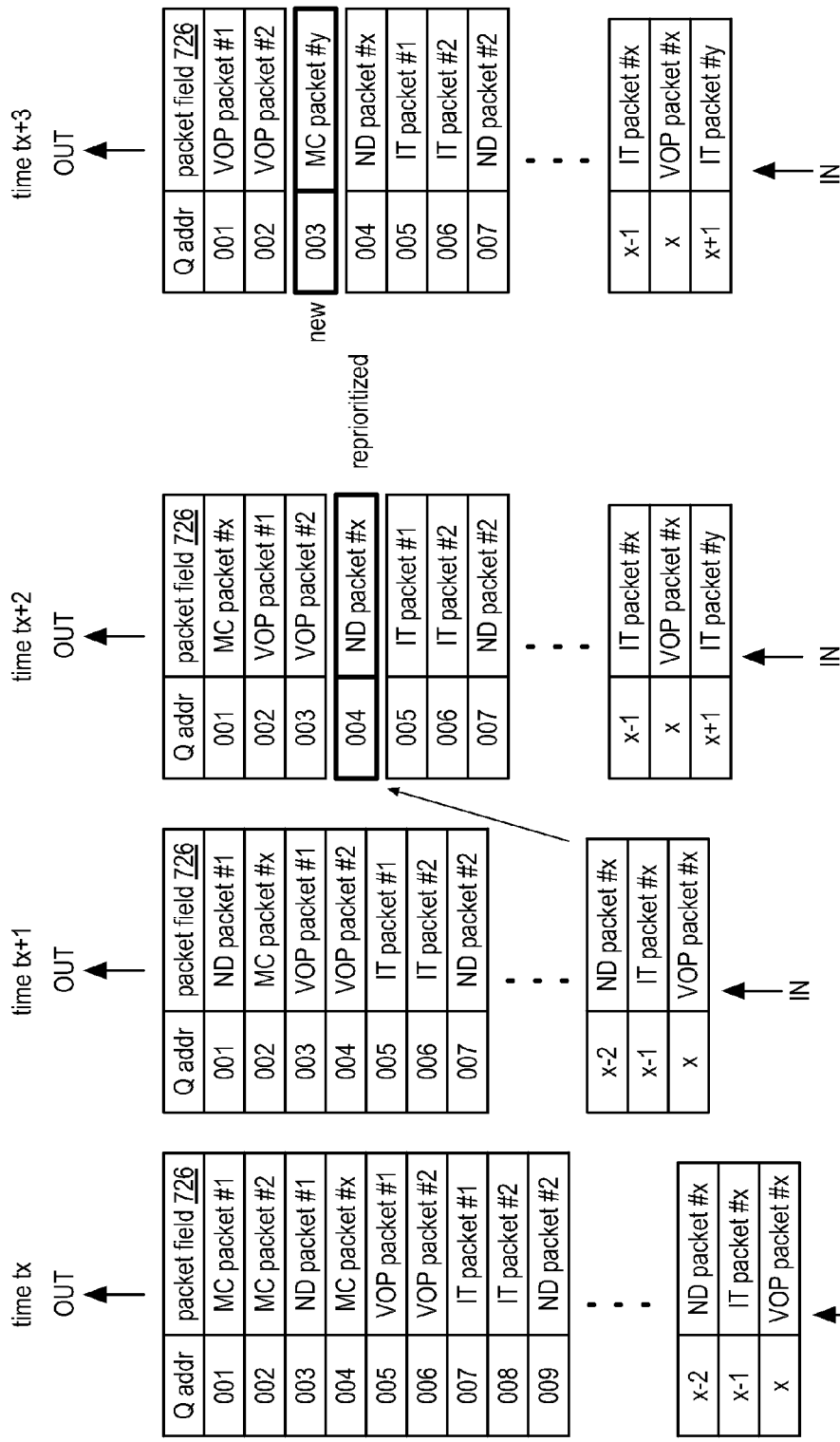

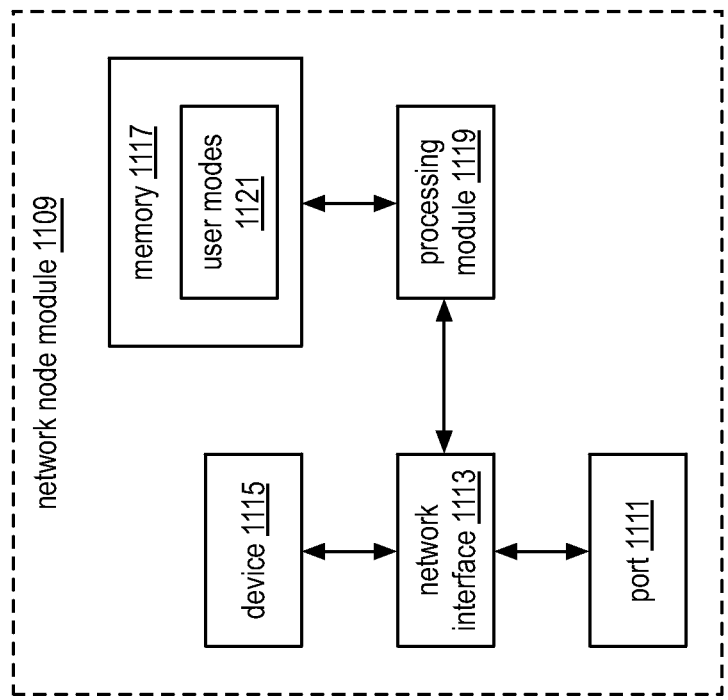
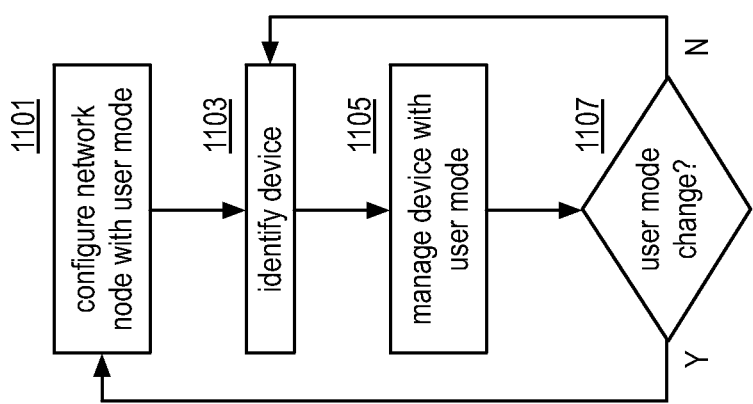
FIG. 68B
FIG. 68A

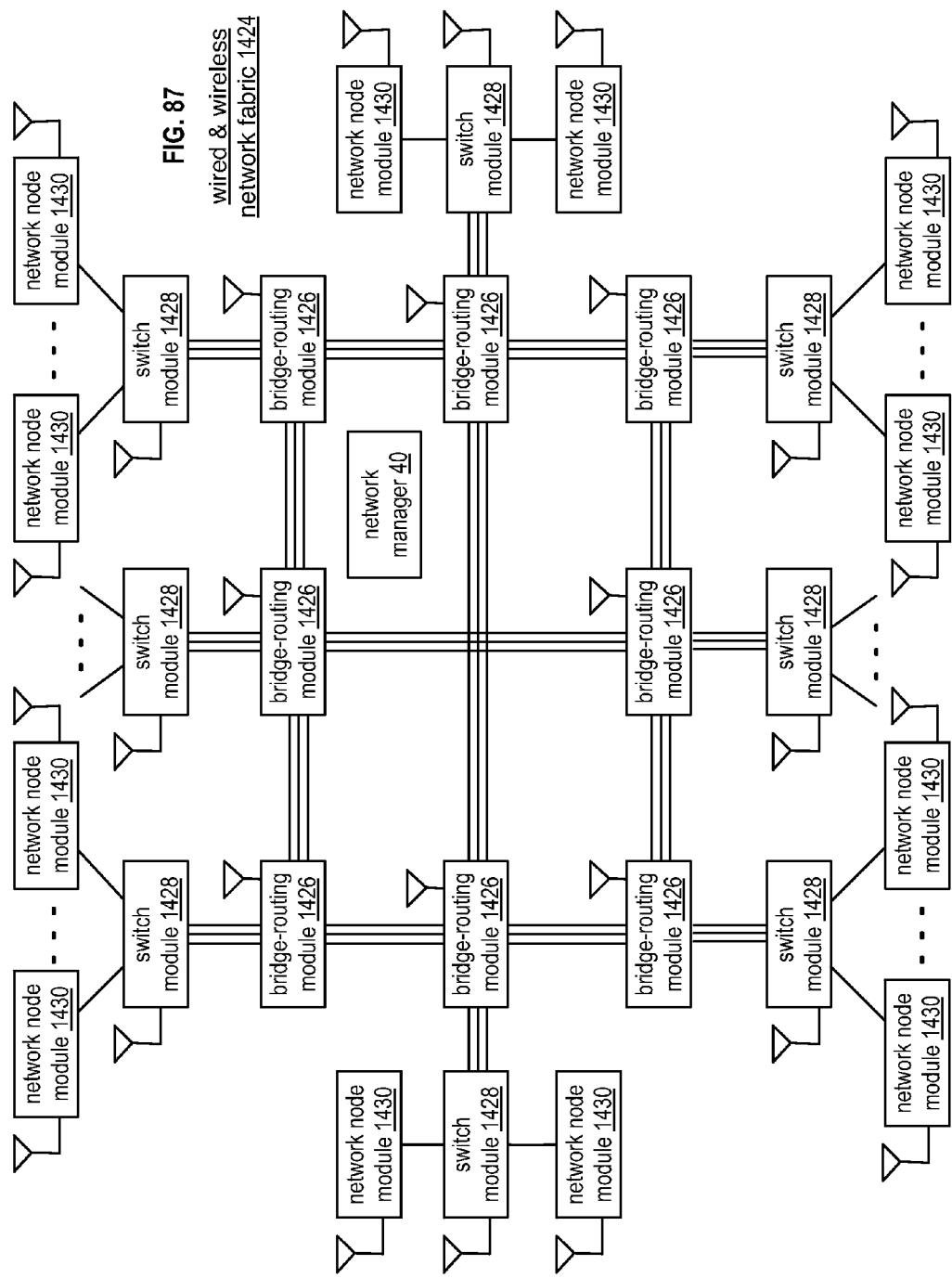

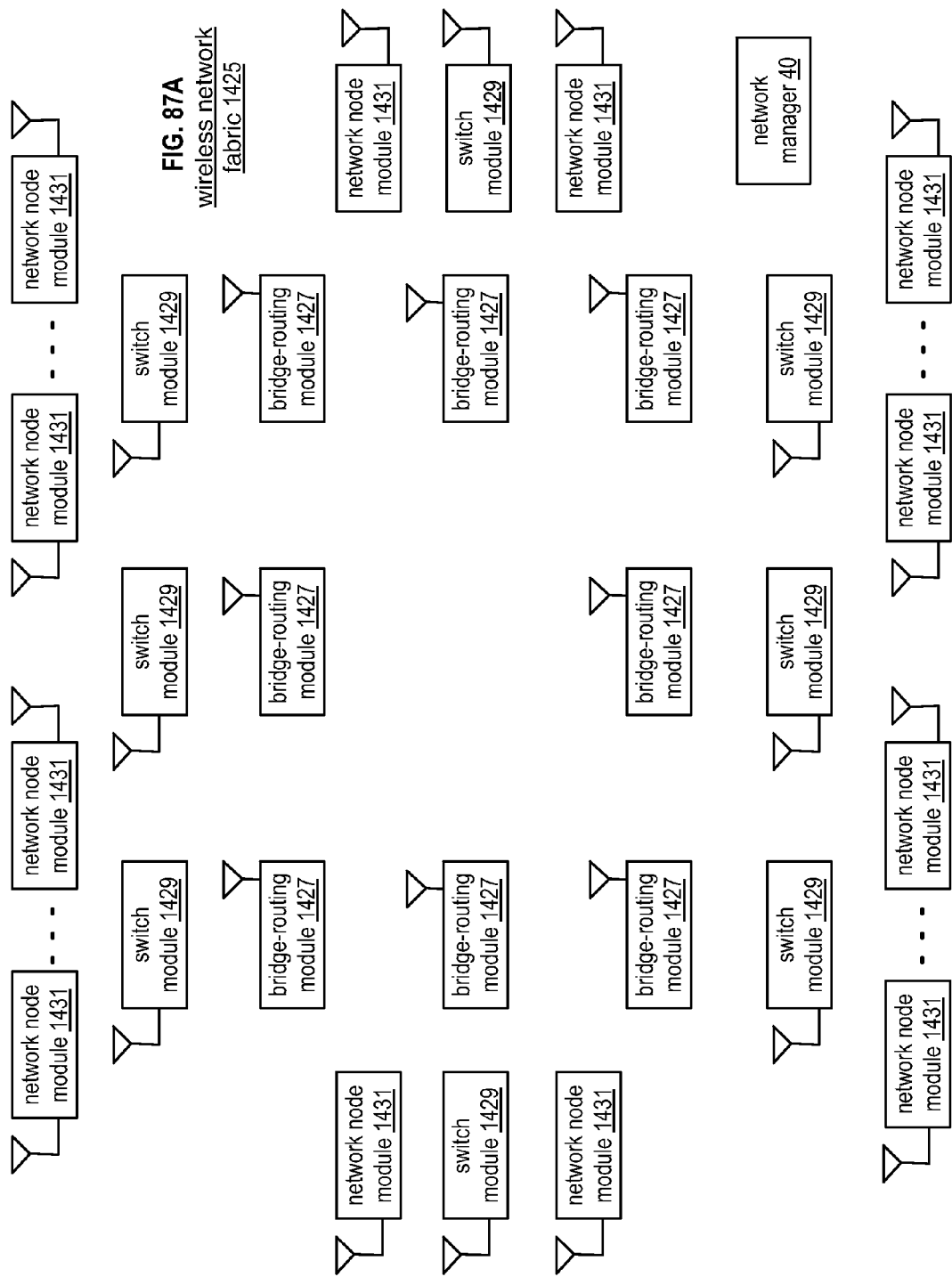

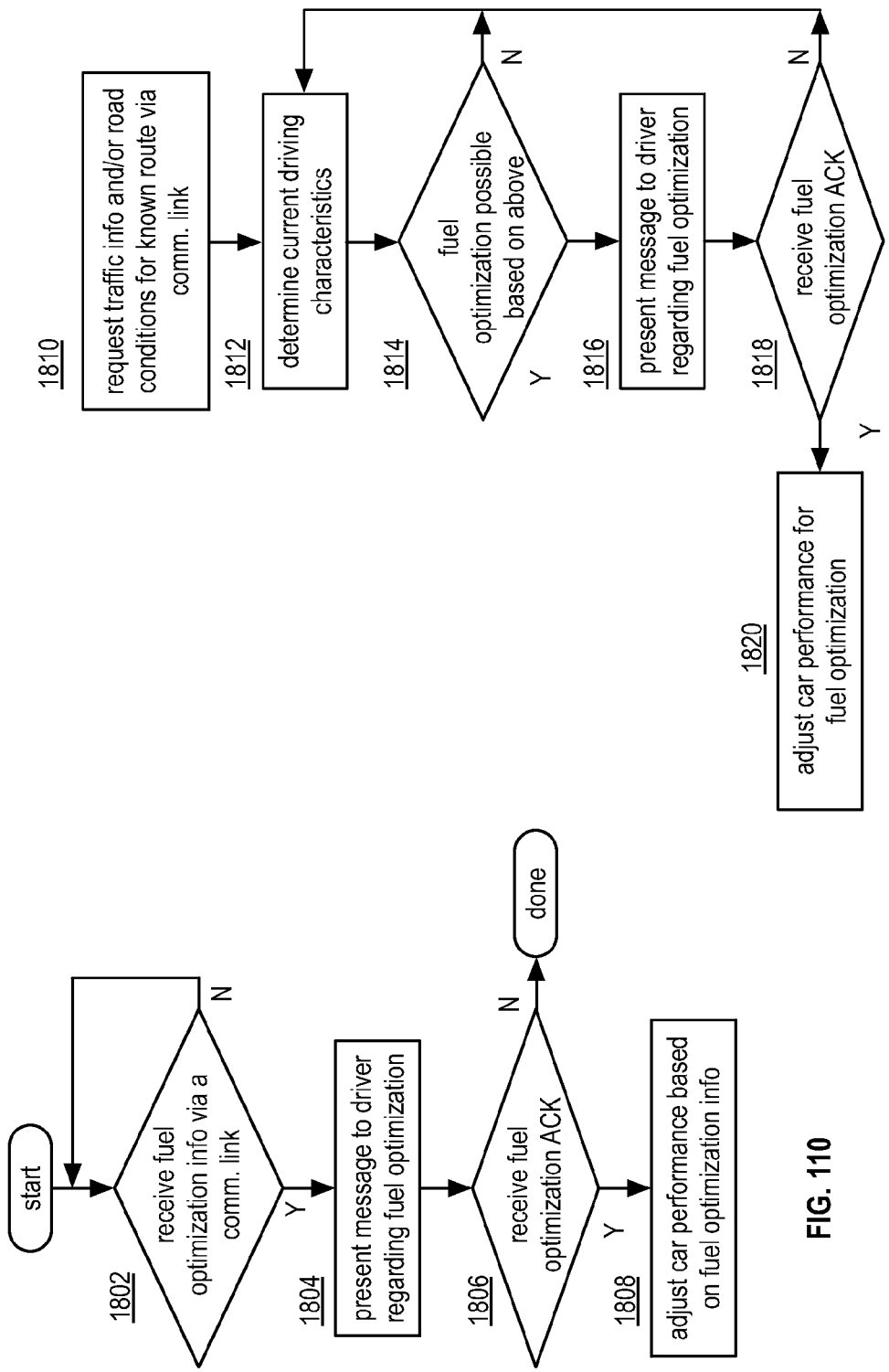

BRIDGE ROUTING MODULE

CROSS REFERENCE TO RELATED PATENTS

The present U.S. Utility Patent Application claims priority pursuant to 35 U.S.C. §120 as a continuation of U.S. Utility application Ser. No. 13/171,636, entitled "Bridge Routing Module," filed Jun. 29, 2011, which claims priority pursuant to 35 U.S.C. §119(e) to U.S. Provisional Application No. 61/409,904, entitled "Vehicle Communication Network," filed Nov. 3, 2010, both of which are hereby incorporated herein by reference in their entirety and made part of the present U.S. Utility Patent Application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to communication and more particularly to data and multimedia communication within a vehicle.

2. Description of Related Art

As is known, a vehicle (e.g., automobile, truck, bus, an agricultural vehicle, ship, and/or aircraft) includes a vehicle communication network. The complexity of the vehicle communication network varies depending on the amount of electronic devices within the vehicle. For example, many more advanced vehicles include electronic modules for engine control, transmission control, antilock braking, body control, emissions control, etc. To support the various electronic devices within the vehicle, the automotive industry has generated numerous communication protocols.

FIG. 1 is a schematic block diagram of a prior art vehicular communication network that illustrates the various bus protocols and the electronic devices that utilize such protocols. The bus protocols include: (1) J1850 and/or OBDII, which are typically used for vehicle diagnostic electronic components; (2) Intellibus, which is typically used for electronic engine control, transmission control other vehicle systems such as climate control, and it may also be used for drive-by-wire electronic control units (ECU); (3) high-speed controller area network (CAN), which is typically used for braking systems and engine management systems; (4) distributed system interface (DSI) and/or Bosch-Siemens-Temic (BST), which is typically used for safety related electronic devices; (5) byteflight, which is typically used for safety critical electronic device applications; (6) local interconnect network (LIN), which is typically used for intelligent actuators and/or intelligent sensors; (7) low-speed controller area network (CAN) and/or Motorola® interconnect (MI), which are typically used for low-speed electronic devices such as Windows, mirrors, seats and/or climate control; (8) mobile media link (MML), domestic digital data (D2B), smartwireX, interequipment bus (IEBus), and/or media oriented systems transport (MOST), which are typically used to support multimedia electronic devices within a vehicle such as a audio head unit and amplifiers, CD player, a DVD player, a cellular connection, a Bluetooth connection, peripheral computer connections, rear seat entertainment (RSE) units, a radio, digital storage, and/or a GPS navigation system; (9) Low-Voltage Differential Signaling (LVDS), which are typically used to support, heads up display, instrument panel displays, other digital displays, driver assist digital video cameras, and (10) FlexRay, which may be used for safety critical features and/or by-wire applications.

To enable electronic components using different bus protocols to communicate with each other, one or more bus gateways may be included in the vehicle network. For example, in a safety related issue, a safety ECU may need to communicate with a braking ECU, and engine control ECU, and/or a transmission control ECU. In this example, the bus gateway performs some degree of protocol conversion to facilitate the communication between the ECUs of differing communication protocols.

In addition to providing multiple vehicle network protocols to support a variety of electronic devices within a vehicle, most vehicle manufacturers are striving for improved fuel efficiency. In this regard, a reduction in weight of 400 pounds is approximately equivalent to reducing continuous power consumption by 100 Watts. As such, by removing weight from a vehicle, fuel efficiency may be improved. As is known, a typical vehicle includes 400 to 600 pounds of wiring, which is the second heaviest component in a vehicle; the engine is the heaviest.

BRIEF DESCRIPTION OF THE SEVERAL VIEWS OF THE DRAWING(S)

FIGS. 37-40 are example diagrams of packet queue processing within a vehicle communication network in accordance with the present invention;

FIG. 68A is a logic diagram of an embodiment of a method for managing devices coupled to a vehicular communication network in accordance with the present invention;

FIG. 68B is a schematic diagram of a network node module for managing devices coupled to a vehicular communication network in accordance with the present invention;

FIG. 87 is a schematic diagram of an embodiment of a wired and wireless network fabric of a vehicular communication network in accordance with the present invention;

FIG. 87A is a schematic diagram of an embodiment of a wireless network fabric of a vehicular communication network in accordance with the present invention;

FIG. 110 is a logic diagram of an embodiment of a method for fuel consumption optimization in accordance with the present invention;

FIG. 111 is a logic diagram of an embodiment of a method for fuel consumption optimization in accordance with the present invention;

DETAILED DESCRIPTION OF THE INVENTION

Figure 2:
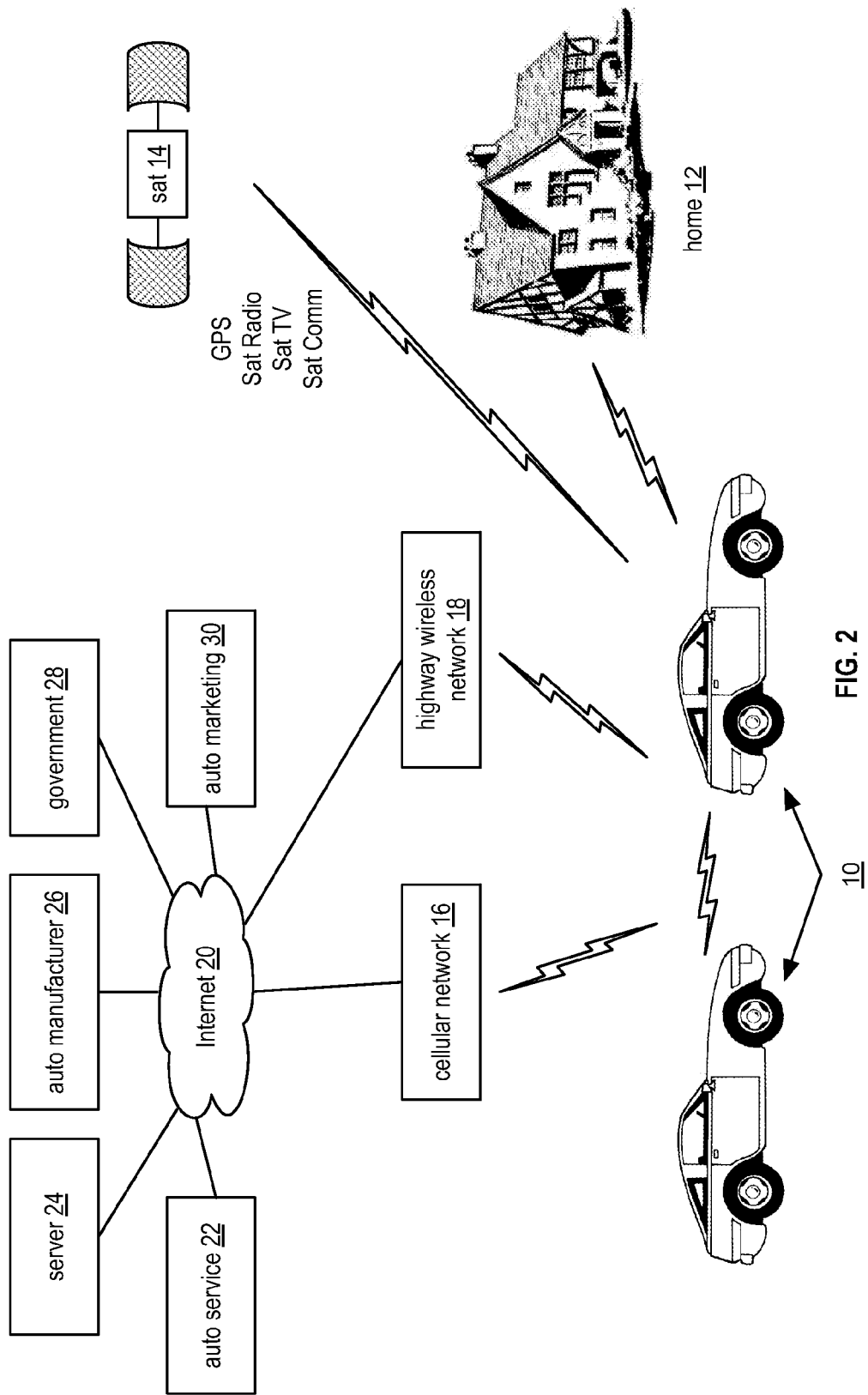
FIG. 2 is a schematic block diagram of an embodiment of a communication infrastructure in accordance with the present invention.

FIG. 2 is a schematic block diagram of an embodiment of a communication system that includes vehicles 10, a home network 12, a satellite transceiver 14, a cellular network 16, a highway wireless network 18, the Internet 20, an automobile service provider 22, a server 24, an automobile manufacturer 26, government 28, and/or automobile marketing 30. In this system, each vehicle 10 includes a packet/frame-based communication network that enables it to communicate with other vehicles, with its home network 12, with the satellite transceiver 14 (GPS, satellite radio, satellite TV, satellite communication, etc.), with the cellular network 16, and/or with the highway wireless network 18. Note that the highway wireless network 18 may include a plurality of wireless transceivers located proximal to highways, roads, rest areas, etc.

In an example of operation, a vehicle 10 may communicate with an automobile service provider 22 (e.g., engine tune-up, brake system, a transmission system, etc.) via the cellular network 16, the highway wireless network 18, and/or its home network 12. Such a communication includes the vehicle 10 transmitting data regarding its operational status (e.g., number of hours since last engine tune-up, wear & tear on the break system, brake fluid level, oil level, transmission fluid level, etc.). The automobile service provider 22 interprets the operational status data to determine if the vehicle 10 is in need of service and/or if a component failure is likely to occur in the near future. Based on this interpretation, the automobile service provider 22 sends data to the vehicle 10 indicating whether service is needed and may further include data to schedule an appointment for such service.

In another example of operation, a vehicle 10 collects data regarding its performance (e.g., fuel efficiency, component wear & tear, real-time engine control, real-time braking system control, real-time transmission control, etc.), which it transmits to the auto manufacturer 26. The auto manufacturer 26 utilizes the data for a variety of purposes, such as improving future designs, determining need for recalls, etc.

In yet another example of operation, a vehicle 10 may communicate with a server to upload data and/or download data. As a more specific example, the server may provide streaming video of television shows, movies, etc. For a subscription fee, the vehicle 10 downloads the streaming video for display on rear seat entertainment systems and/or other displays within the vehicle. As another specific example, the vehicle 10 may upload data (e.g., video taken by cameras of the car, user data contained on a laptop computer, video game inputs and/or controls, etc.) to the server.

In a further example of operation, the vehicle 10 may communicate with a government agency 28 (e.g., driver motor vehicle) to update registration information, insurance information, etc. As another example, the vehicle 10 may communicate specific performance information (e.g., general vehicle operation, emissions test, etc.) with the government agency 28 for compliance with different government programs (e.g., emissions control, safety check, etc.).

In a still further example of operation, the vehicle 10 may receive marketing information from an auto-marketing provider 30. For instance, the vehicle 10 may receive commercial information based on the vehicle's location, driver's interests, recent communications to and/or from the vehicle, etc.

Figure 3:
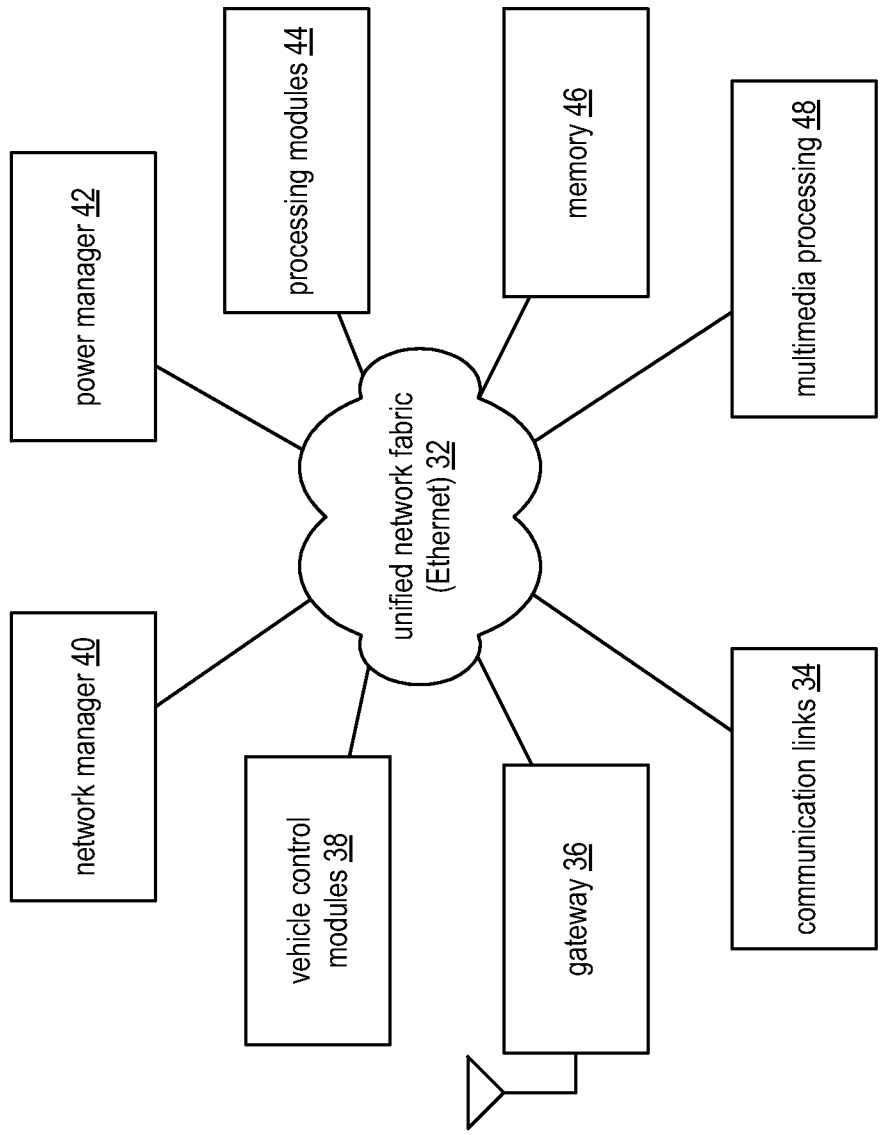
FIG. 3 is a schematic block diagram of an embodiment of a vehicular communication network in accordance with the present invention.

FIG. 3 is a schematic block diagram of an embodiment of a vehicular communication network that includes a unified network fabric 32 (e.g., Ethernet-based), one or more communication links 34, a gateway 36, a plurality of vehicle control modules 38, a network manager 40, a power manager 42, one or more processing modules 44, memory 46, and/or one or more multimedia processing modules 48. The communication links 34 may include wired and/or wireless interfaces to support connectivity with cellular devices, Bluetooth devices, infrared devices, and/or computer peripheral devices. For example, a Bluetooth transceiver may be coupled to the unified network fabric 32 to support Bluetooth communications with a portable audio/video unit, with a headset, etc.

Figure 4:
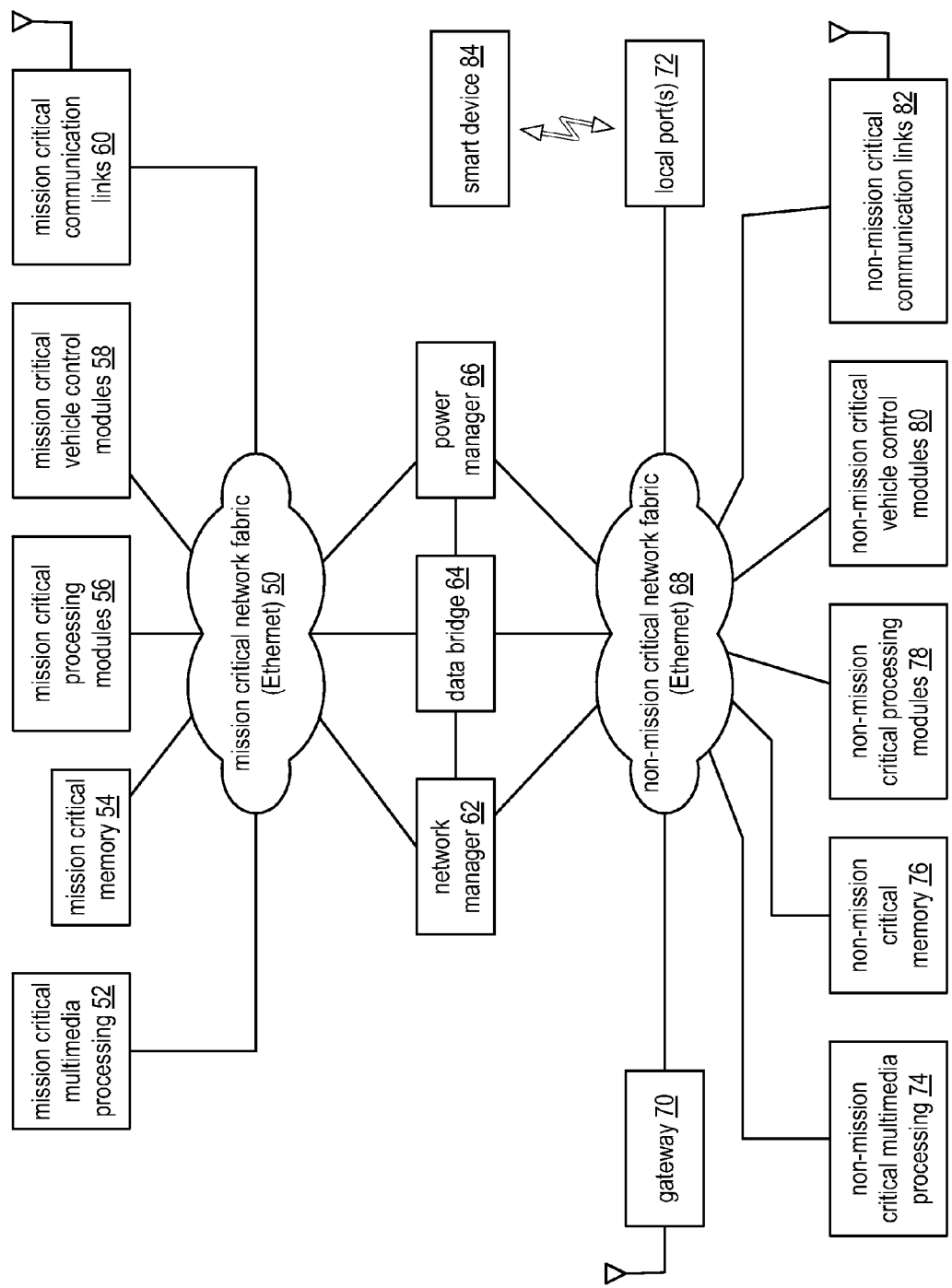
FIG. 4 is a schematic block diagram of another embodiment of a vehicular communication network in accordance with the present invention.
Figure 5:
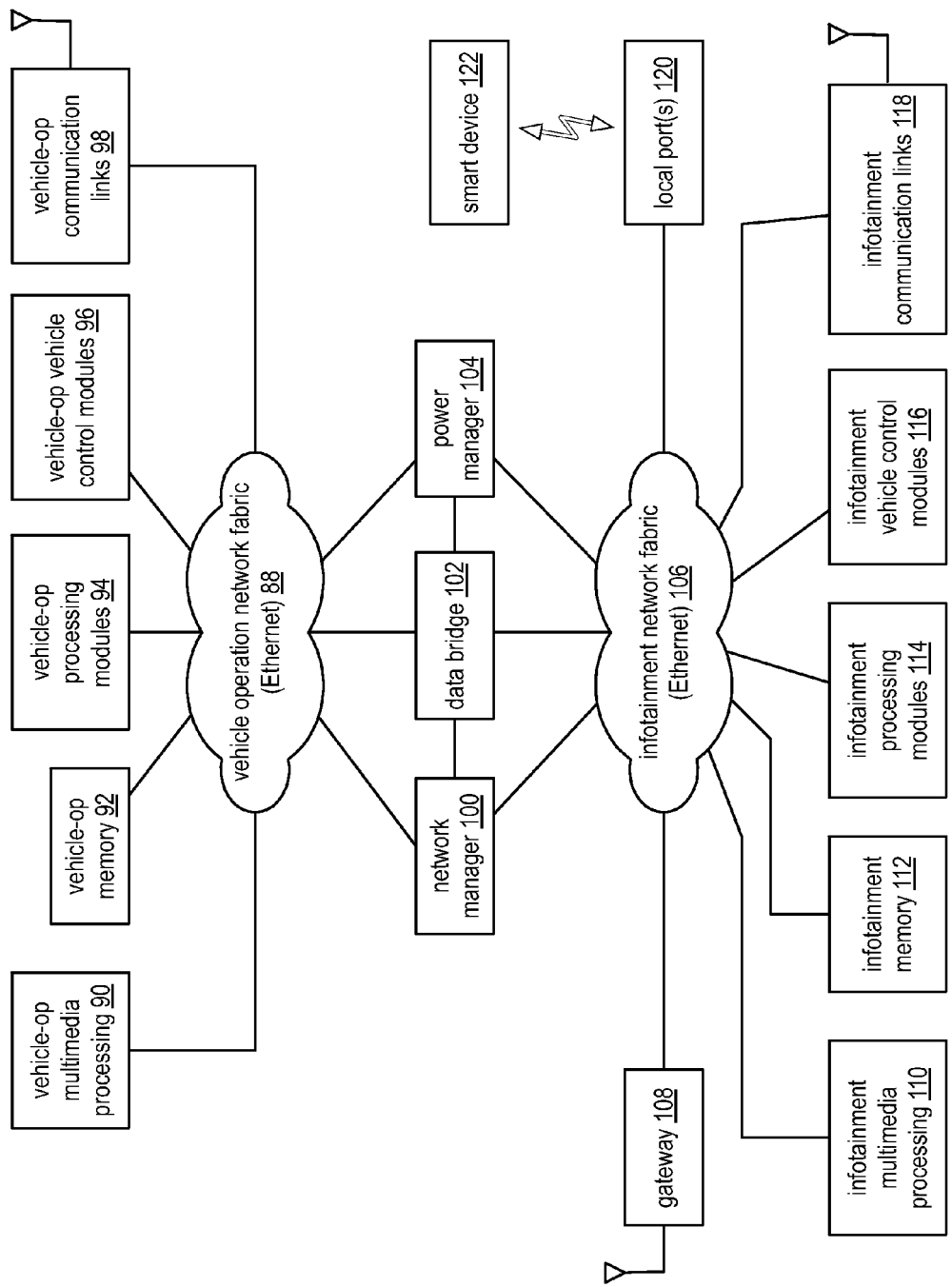
FIG. 5 is a schematic block diagram of another embodiment of a vehicular communication network in accordance with the present invention.
Figure 13:
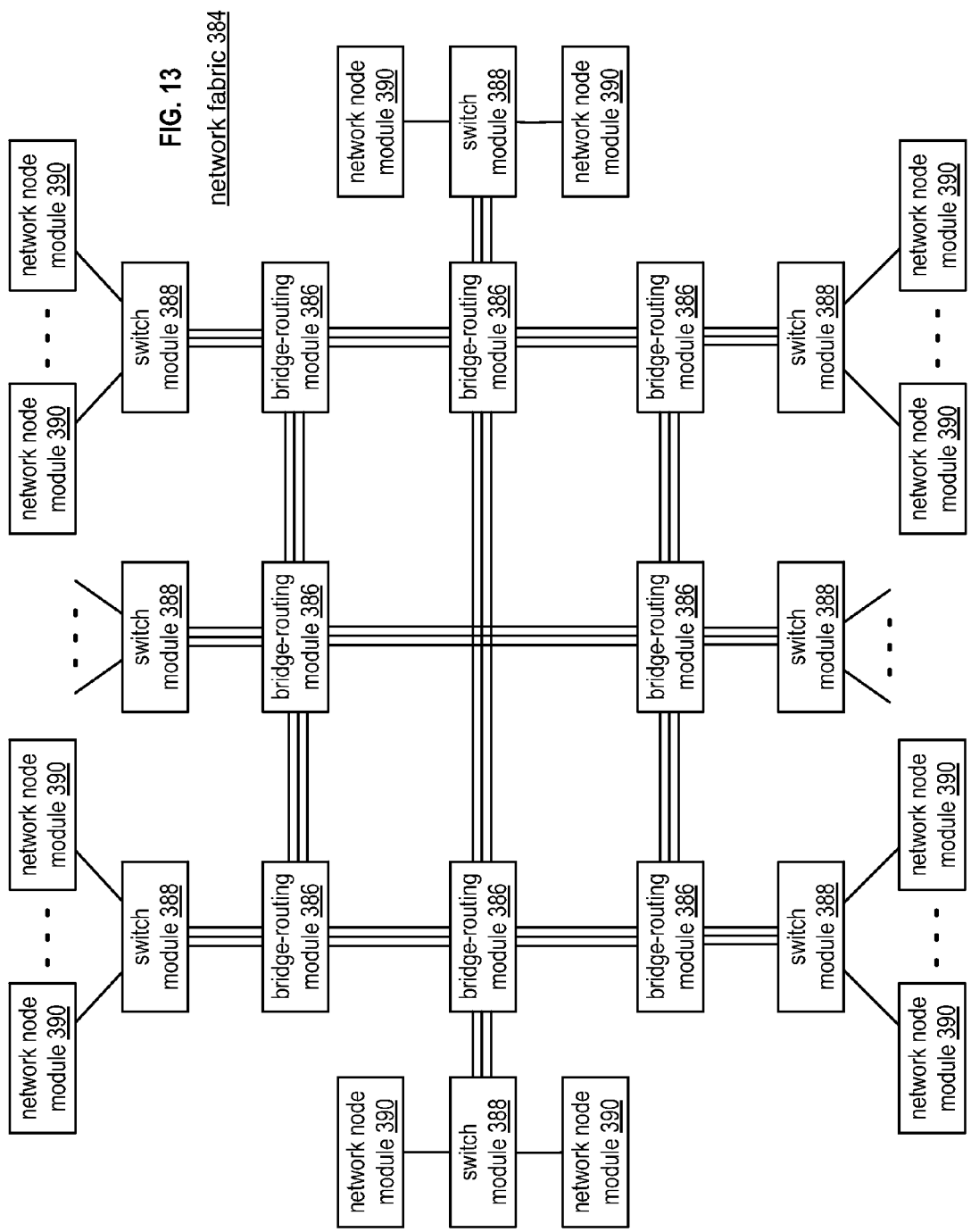
FIG. 13 is a schematic block diagram of an embodiment of a network fabric in accordance with the present invention.

The network fabric 32 includes a plurality of bridge-routing modules and a plurality of switch modules (examples of which are shown in FIGS. 13 and 87). Within the network fabric 32, a bridge-routing module is redundantly coupled to one or more adjacent bridge-routing modules and a switch module is redundantly coupled to one or more bridge-routing modules. The network fabric 32 may be divided into sub-network fabrics that are coupled together via a data bridge. As an example, the network fabric includes a data bridge, a first sub-network fabric operably coupled to first sub-set of the vehicle control modules, and a second sub-network fabric operably coupled to second sub-set of the vehicle control modules. The data bridge facilitates (e.g., initiates, issues an instruction, performs, etc.) communication of a sub-set of the packets between the first and second sub-network fabrics. Further examples of the network fabric being partitioned into sub-network fabrics are shown in FIGS. 4, 5, and one or more of the remaining subsequent figures.

The gateway 36 may include one or more wireless transceivers to support communication with the highway network, with a home network, and/or to support diagnostic ports for communication with the automobile service providers, the automobile manufacturers, etc. Such a wireless transceiver includes a network interface, which enables it to connect to the unified network fabric 32.

A vehicle control module 38 may be one or more processing modules, a network node module, an electronic control unit, and/or a vehicle assembly. As an example, a vehicle control module 38 (which may also be referred to as a network node module) includes a network interface and at least one device. If the device is an analog device, the vehicle control module 38 further includes an analog to digital converter and/or a digital to analog converter. Such devices may include a sensor, an actuator, an intelligent sensor, an intelligent actuator, an electronic control unit (ECU), and/or a control device. As another example, a vehicle assembly includes a switching circuit module, a plurality of network interfaces operably coupled to the switch circuit module, and a plurality of devices operably coupled to the plurality of network interfaces. Various examples of vehicle control modules will be discussed in greater detail with reference to FIGS. 41-57.

Figure 26:
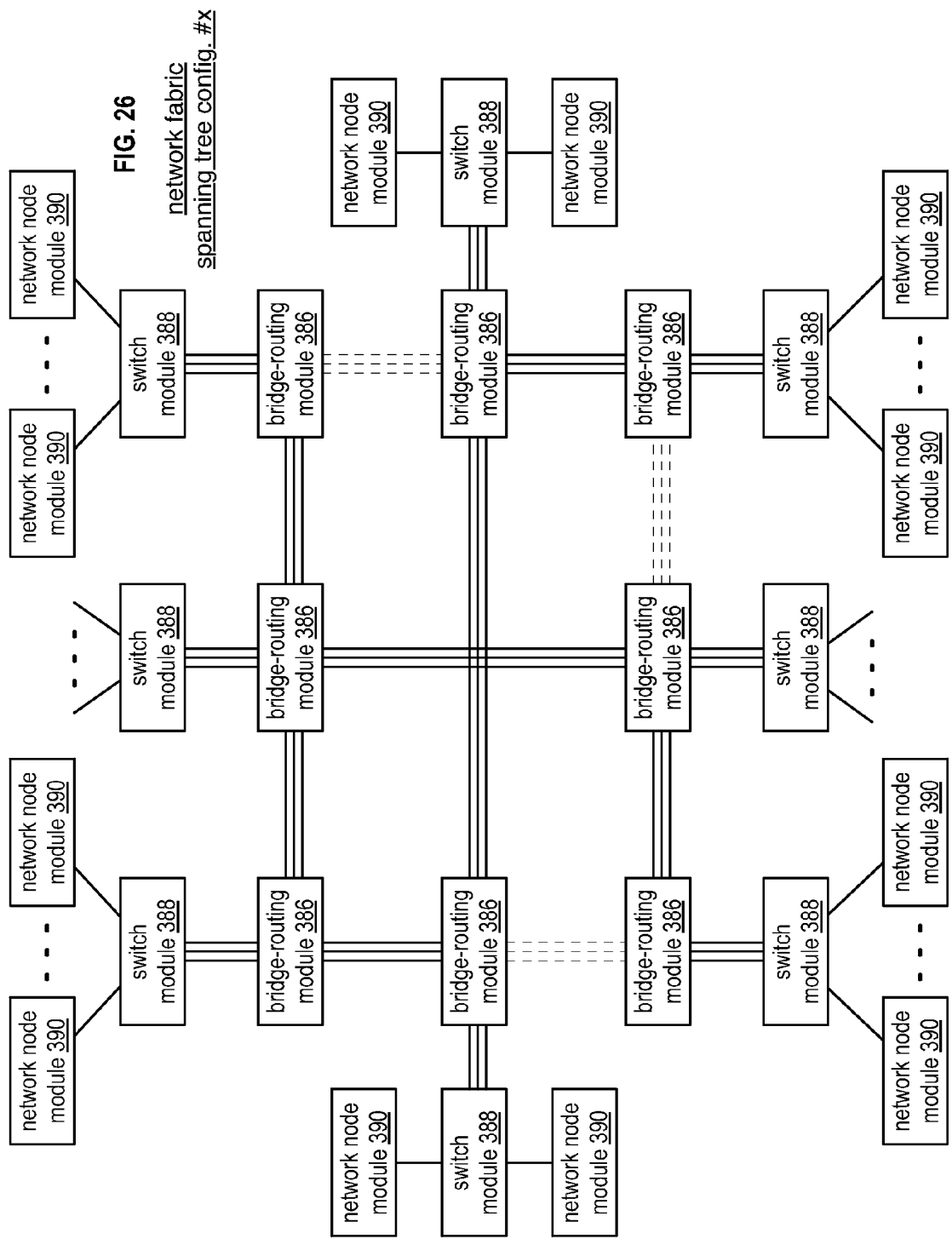

The network manager 40 performs a variety of functions to coordinate packet communication within the vehicle communication network and to facilitate network resource management. For example, the network manager 40 coordinate communication of packets, via the network fabric 32, among the vehicle control modules 38, the memory 46, and the multi-media processing module(s) 48 based on individual content of the packets and in accordance with a global vehicle network communication protocol. The global vehicle network communication protocol includes information regarding a network fabric formatting of the packets, (e.g., packet format as shown in FIG. 26), information regarding packet transmission prioritization schemes (e.g., mission critical packets having a higher priority, infotainment (information and/or entertainment) packets having a lower priority, etc.), information regarding network management processing (e.g., network fabric resources and devices coupled to the network fabric), and information regarding vehicle network operation parameters (e.g., network configuration management). FIGS. 28-32 illustrate one or more examples of packet communication in accordance with the global network communication protocol.

As another example, the network manager 40 facilitates (e.g., initiates, issues an instruction, performs, etc.) network resource management to support the communication of packets via the network fabric in accordance with the global vehicle network communication protocol. For instance, the network manager 40 performs access prioritization management, bandwidth allocation management, packet redundancy management, link redundancy management, data transmission latency management, link diagnostics, network security, virtual local area network setup, legacy packet/frame management, adding and/or deleting devices from access to the network, etc.

The power manager 42 functions in concert with the network manager 40 to optimize power consumption of the unified network fabric 32 and/or the devices coupled thereto. For instance, the power manager 42 may manage the devices individually, may manage and island of devices, and/or may manage power to network interfaces. Such power management includes a sleep-wake mode, an on-off power mode, in-use power consumption reduction techniques (e.g., reduce power supply voltage, reduced clock rate, current limit, etc.), and/or utilizing low power communication links at the physical layer.

The processing modules 44 may implement one or more electronic control units (ECU), one or more control units, one or more steer by wire controllers, one or more drive by wire controllers, one or more central processing units, one or more co-processing units, and/or one or more other controllers. The processing module 44 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 44 may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the processing module 44 includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module 44 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module 44 executes, hard coded and/or operational instructions corresponding to at least some of the steps and/or functions illustrated in one or more of the Figures.

The memory 46 may be a variety of memory devices such as nonvolatile memory, volatile memory, disk drive, memory, solid-state memory, and/or any other type of memory. The memory 46 may be used for storing multi-media files (e.g., video files, audio files, etc.), electronic control unit applications, multimedia applications, diagnostic data, performance data, and/or any other data associated with the use and/or performance of the vehicle.

The multimedia processing module 48 provides audio, video, text, and/or graphics processing for the vehicle. For instance, the multimedia processing module 48 supports a GPS navigation system, provides rendered video and/or graphic images to displays, processes digital images received by cameras, and/or provides images to other audio/video equipment within the vehicle. The multimedia processing module 48 may be a single processing device or a plurality of processing devices. Such a processing device may be a microprocessor, micro-controller, digital signal processor, microcomputer, central processing unit, field programmable gate array, programmable logic device, state machine, and/or any device that manipulates signals (analog and/or digital) based on hard coding of the circuitry and/or operational instructions. The multimedia processing module 48 may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the multimedia processing module 48 includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the multimedia processing module 48 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the multimedia processing module 48 executes, hard coded and/or operational instructions corresponding to at least some of the steps and/or functions illustrated in one or more of the Figures.

In an example of operation, a vehicle control module (e.g., a sensor) generates a packet in accordance with the global vehicle network communication protocol (e.g., formats the packet in accordance with the information regarding a network fabric formatting of the packets, (e.g., packet format as shown in FIG. 26)). The vehicle control module then transmits the packet via the network fabric in accordance with the global vehicle network communication protocol. For instance, the network fabric routes the packet based on content type of the packet (and the destination address) to another vehicle control module and/or to the multimedia processing module.

The multimedia processing module may also generate a packet in accordance with the global vehicle network communication protocol and subsequently transmits it via the network fabric in accordance with the global vehicle network communication protocol. The network fabric routes the packet based on content type of the packet (and the destination address) to the vehicle control module, the other vehicle control module, and/or to the multimedia processing module.

In such a vehicle communication network, the unified network fabric 32 has an Ethernet bus structure (or other packet/frame structure) that enables packet/frame-based communication among the plurality of electronic devices within a vehicle. In addition, the vehicle communication network is a semi-static network thereby allowing preconfigured spanning trees to be utilized for fast reconfiguration of the network; has configured dedicated bandwidth allocation for at least some of the devices to ensure a particular level of data throughput for mission critical and some non-mission critical applications; supports virtualized local area networks; supports a centralized and/or distributed bus monitoring system; utilizes a new class of packets for car control; supports security and authentication of device replacement and or new device installment; supports lossless Ethernet transmissions through redundant paths; supports a low latency protocol for mission-critical packets; and/or supports fast link fail-over.

FIG. 4 is a schematic block diagram of another embodiment of a vehicular communication network that is divided into two sub-networks coupled together via a data bridge 64. The first sub-network supports mission-critical devices and mission-critical functions (e.g., safety related devices and/or functions, engine control devices and/or functions, braking devices and/or functions, video imaging devices and or functions related to safety and/or critical operation of the vehicle, etc.). In this example, the mission-critical network fabric 50 is coupled to a mission-critical multimedia processing module 52, mission-critical memory 54, one or more mission-critical processing modules 56, one or more mission-critical vehicle control modules 58, one or more mission-critical communication links 60, the network manager 62, the data bridge 64, and the power manager 66.

The second sub-network supports non-mission critical devices and/or functions (e.g., video game, GPS navigation, audio/video playback, window operation, seat operation, climate control, etc.). In this example, the non-mission critical network fabric 68 is coupled to a gateway 70, one or more local ports 72, non-critical process multimedia processing module 74, non-mission-critical memory 76, one or more non-mission-critical processing modules 78, one or more non-mission-critical vehicle control modules 80, one or more non-mission-critical communication links 82, the network manager 62, the data bridge 64, and the power manager 66. Note that the local port 72 provides wireless and/or wired connectivity to one or more smart devices 84 (e.g., a cell phone, a laptop computer, a tablet computer, etc.).

The data bridge 64 (which will be described in greater detail with reference to FIGS. 76-86) provides coupling between the two network fabrics. For instance, if a mission-critical packet is to be broadcast throughout the network (e.g., both the mission-critical network fabric 50 and the non-mission-critical fabric 68), the data bridge 64 receives the packet from the mission-critical network fabric 50, interprets it to determine that is a broadcast packet and is of a mission-critical nature. Based on this interpretation, the data bridge 64 forwards the mission-critical packet to the non-mission critical network fabric 68 for transmission therein. The data bridge 64 also processes packets from the non-mission critical network fabric 68 for transmission within the mission-critical network fabric 50. In this instance, the data bridge 64 interprets the non-mission critical packet to determine whether it should be provided to the mission-critical network fabric 50. If so, the data bridge 64 forwards the packet to the mission-critical network fabric 50.

The network manager 62 and power manager 66 generally function as described with reference to FIG. 3 and as subsequently described in one or more of the following figures. Note that the data bridge 64, network manager 62, and power manager 66 may be separate devices, may be within a common device, or a combination thereof. Further note that while the vehicle communication network is divided into two network fabrics, it may be divided into three or more network fabrics based on functional relationships.

FIG. 5 is a schematic block diagram of another embodiment of a vehicular communication network that is divided into two sub-networks coupled together via a data bridge 102. The first sub-network supports vehicle operation devices and functions and the second sub-network supports info-tainment devices and functions. For instance, the vehicle operation network fabric 88 is coupled to one or more vehicle operation multimedia processing modules 90 (e.g., GPS, collision detection/avoidance, etc.), one or more vehicle operation memory devices 92, one or more vehicle operation processing modules 94, one more vehicle operation control modules 94, one of more vehicle operation communication links 98, the network manager 100, the data bridge 102, and the power manager 104.

The second sub-network fabric is coupled to a gateway 108, then information/entertainment multimedia processing module 110, and information/entertainment memory 112, and information/entertainment processing module 114, one or more information/entertainment control modules 116, one or more information/entertainment communication links 118, the network manager 100, the data bridge 102, and the power manager 104. The information/entertainment may include audio and/or video playback of audio/video files, recording images captured by the vehicle's cameras, video games, etc.

Figure 6:
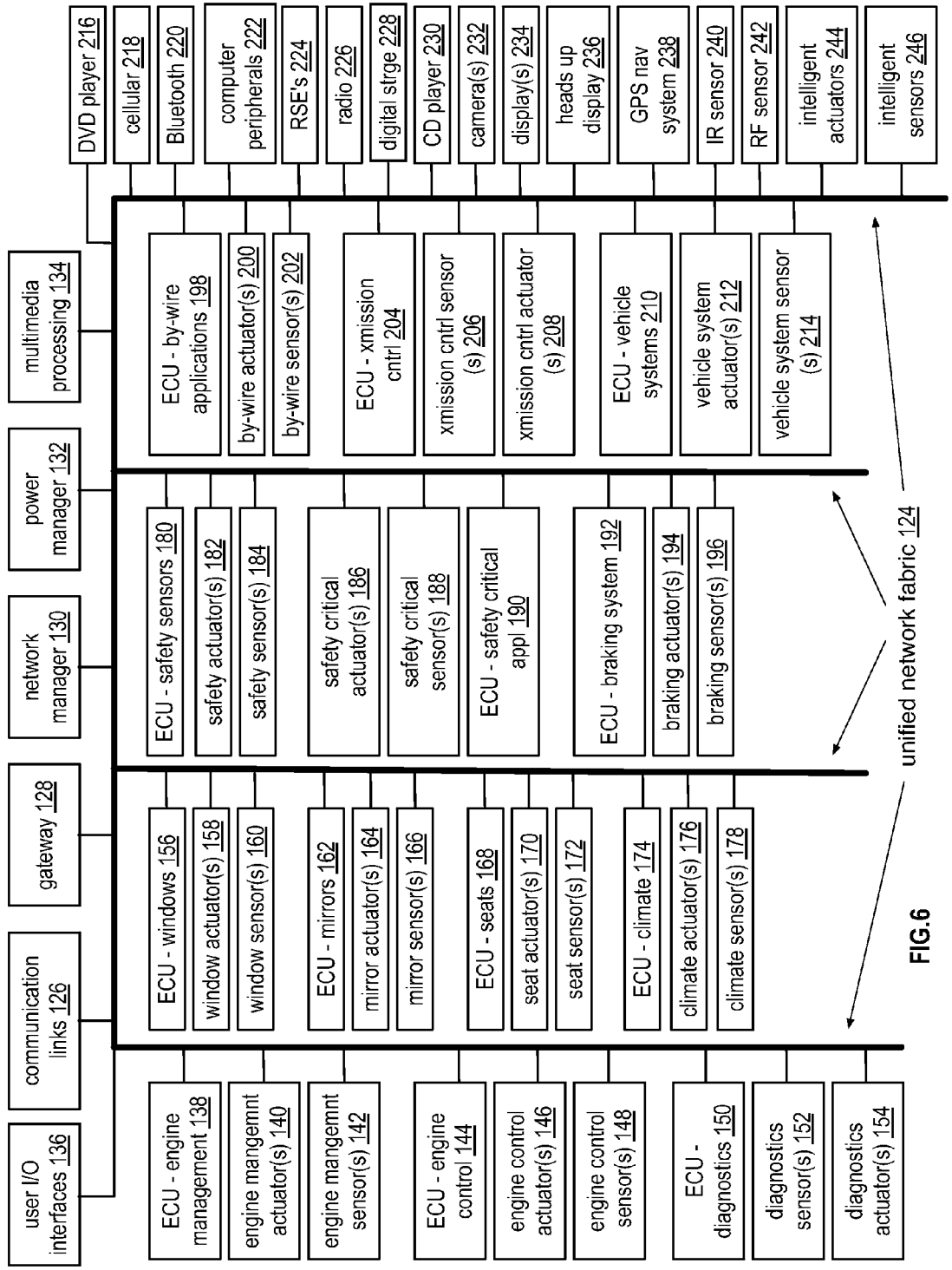
FIG. 6 is a schematic block diagram of another embodiment of a vehicular communication network in accordance with the present invention.

FIG. 6 is a schematic block diagram of another embodiment of a vehicular communication network that includes a unified network fabric 124, one or more communication links 126, a gateway 128, the network manager 130, the power manager 132, one of more multimedia processing modules 134, a plurality of user input and/or output interfaces 136 (e.g., seat adjust, windowed control, radio control, mirror control, GPS control, cruise control, etc.), and a plurality of network node modules. Each of the network node modules includes a network interface for coupling to the unified network fabric and at least one device.

The devices may include one or more of each of an engine management electronic control unit 138, an engine management actuator 140, an engine management sensor 142, an engine control electronic control unit 144, an engine control actuator 146, an engine control sensor 148, a diagnostic electronic control unit 150, a diagnostic sensor 152, a diagnostic actuator 154, a window electronic control unit 156, a window actuator 158, a window sensor 160, a mirror electronic control unit 162, a mirror actuator 164, a mirror sensor 166, a seat electronic control unit 168, a seat actuator 170, a seat sensor 172, a climate electronic control unit 174, a climate actuator 176, a climate sensor 178, a safety sensor electronic control unit 180, a safety actuator 182, a safety sensor 184, a safety critical application electronic control unit 186, a safety critical actuator 188, a safety critical sensor 190, a braking system electronic control unit 192, a breaking actuator 194, a breaking sensor 196, a by-wire application electronic control unit 198, a by-wire actuator 200, a by-wire sensor 202, a transmission control electronic control unit 204, a transmission sensor 206, a transmission actuator 208, a vehicle system electronic control unit 210, a vehicle system actuator 212, a vehicle system Sensor 214, a DVD player 216, a cellular telephone interface 218, a Bluetooth interface 220, a computer peripheral interface 222, a rear seat entertainment interface and/or unit 224, a radio 226, digital storage 228, a CD player 230, a camera 232, a display 234, a heads-up display 236, a GPS navigation system 238, an infrared sensor 240, a radio frequency sensor 242, an intelligent actuator 244, and/or an intelligent sensor 246.

Figure 7:
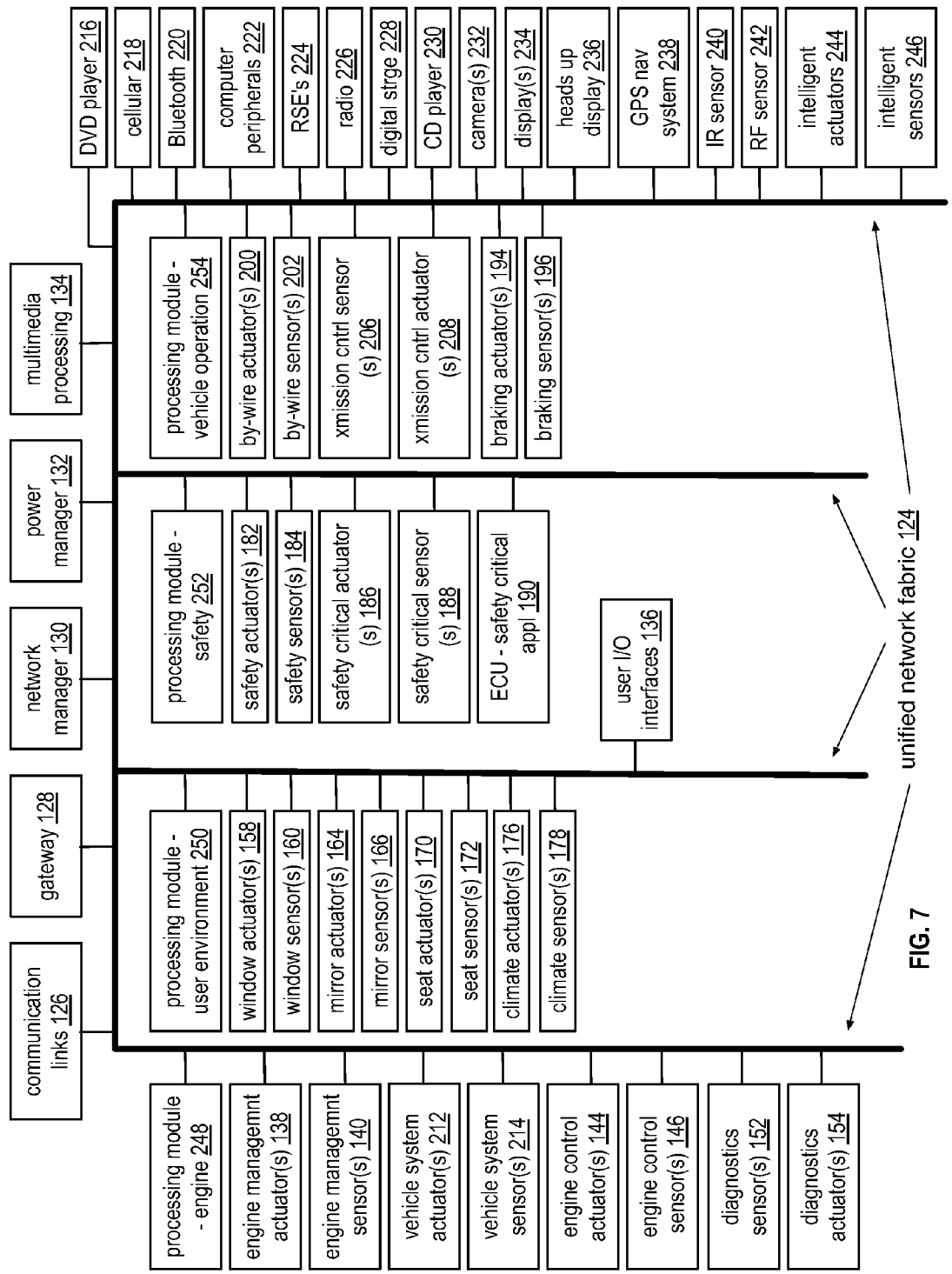
FIG. 7 is a schematic block diagram of another embodiment of a vehicular communication network in accordance with the present invention.

FIG. 7 is a schematic block diagram of another embodiment of a vehicular communication network that includes a unified network fabric 124, one or more communication links 126, a gateway 128, the network manager 130, the power manager 132, one of more multimedia processing modules 134, a plurality of processing modules 248-254, and a plurality of network node modules. Each of the processing modules and each of the network node modules include a network interface for coupling to the unified network fabric 124 and at least one device. The network node modules may be similar to the modules of FIG. 6.

Each of the processing modules performs one or more functions. For instance, one of the processing modules may perform the electronic control functions for the engine, which include, but are not limited to, engine management, vehicle system operations, engine control, and engine diagnostics. Another processing module may perform user environment electronic control functions, which include, but are not limited to, window operation, seat operation, mirror operation, and climate control. Yet another processing module may perform safety related electronic control functions, which include, but are not limited to, critical safety issues (e.g., air bags) and general safety issues (e.g., turn signal, brake lights, etc.). Still another processing module may perform vehicle operation electronic control functions, which include, but are not limited to, by-wire operations, transmission control, braking control, etc.

Figure 8:
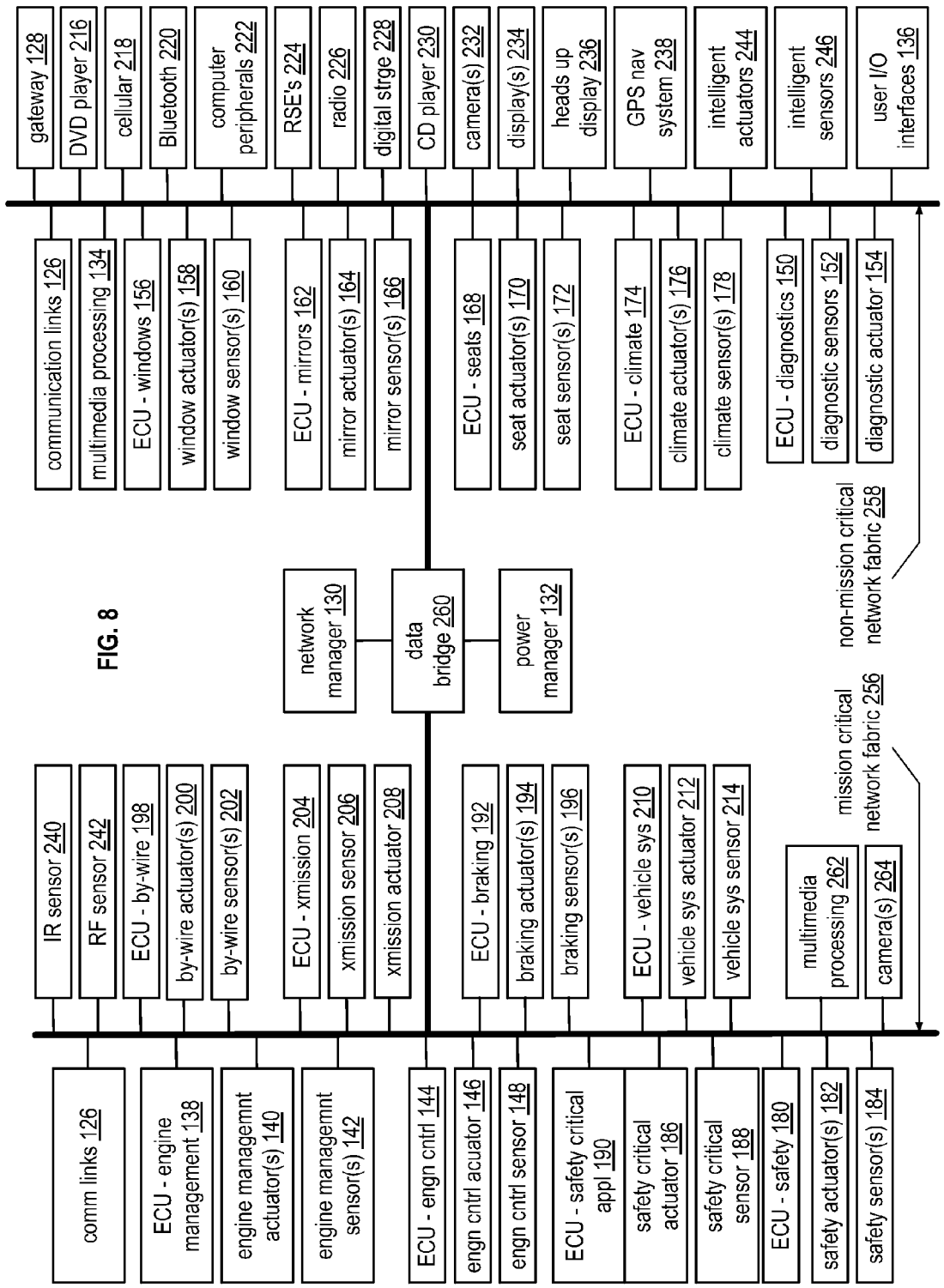
FIG. 8 is a schematic block diagram of another embodiment of a vehicular communication network in accordance with the present invention.

FIG. 8 is a schematic block diagram of another embodiment of a vehicular communication network that includes a mission critical network fabric 256, a non-mission critical network fabric 258, the data bridge 260, the network manager 130, and the power manager 132. The mission-critical network fabric 256 is coupled to a plurality of mission-critical network node modules, which include one or more communication links 126, an engine management electronic control unit 138, one or more engine management actuators 140, one or more engine management sensors 142, an engine control electronic control unit 144, one or more engine control actuators 146, one or more engine control sensors 148, a safety critical applications electronic control unit 190, one or more safety critical actuators 186, one or more safety critical sensors 188, a safety electronic control unit 180, one or more safety actuators 182, one or more safety sensors 184, one or more infrared sensors 240, one more RF sensors 242, a by-wire or electronic control unit 198, one or more by-wire actuators 200, one or more by-wire sensors 202, a transmission electronic control unit 204, one or more transmission sensors 206, one or more transition actuators 208, a braking system electronic control unit 192, one or more breaking actuators 194, one more breaking sensors 196, a vehicle system electronic control unit 210, one or more vehicle system actuators 212, one or more vehicle system sensors 214, a mission-critical multi-media processing module 262, and/or one more mission-critical cameras 264.

The non-mission critical network fabric 258 is coupled to a plurality of non-mission critical network node modules, which include one or more communication links 126, one or more multimedia processing modules 134, a window electronic control unit 156, one or more window actuators 158, one or more window sensors 160, a mirror electronic control units 162, one or more mirror actuators 164, one or more mirror sensors 166, a seat electronic control unit 168, one or more seat actuators 170, one or more seat sensors 172, a climate electronic control unit 174, one or more climate actuators 176, one or more climate sensors 178, a diagnostic electronic control unit 150, one or more diagnostic sensors 152, one or more diagnostic actuators 154, a gateway 128, a DVD player 216, a cellular telephone interface 218, a Bluetooth interface 220, one or more computer peripheral interfaces 222, a rear seat entertainment unit and/or interface 224, a radio 226, digital storage 228, a CD player 230, one or more cameras 232, one or more displays 234, a heads-up display 236, a GPS navigation system 238, one or more intelligent actuators 244, one or more intelligent sensors 246, and/or one or more user input and/or output interfaces 136.

Figure 9:
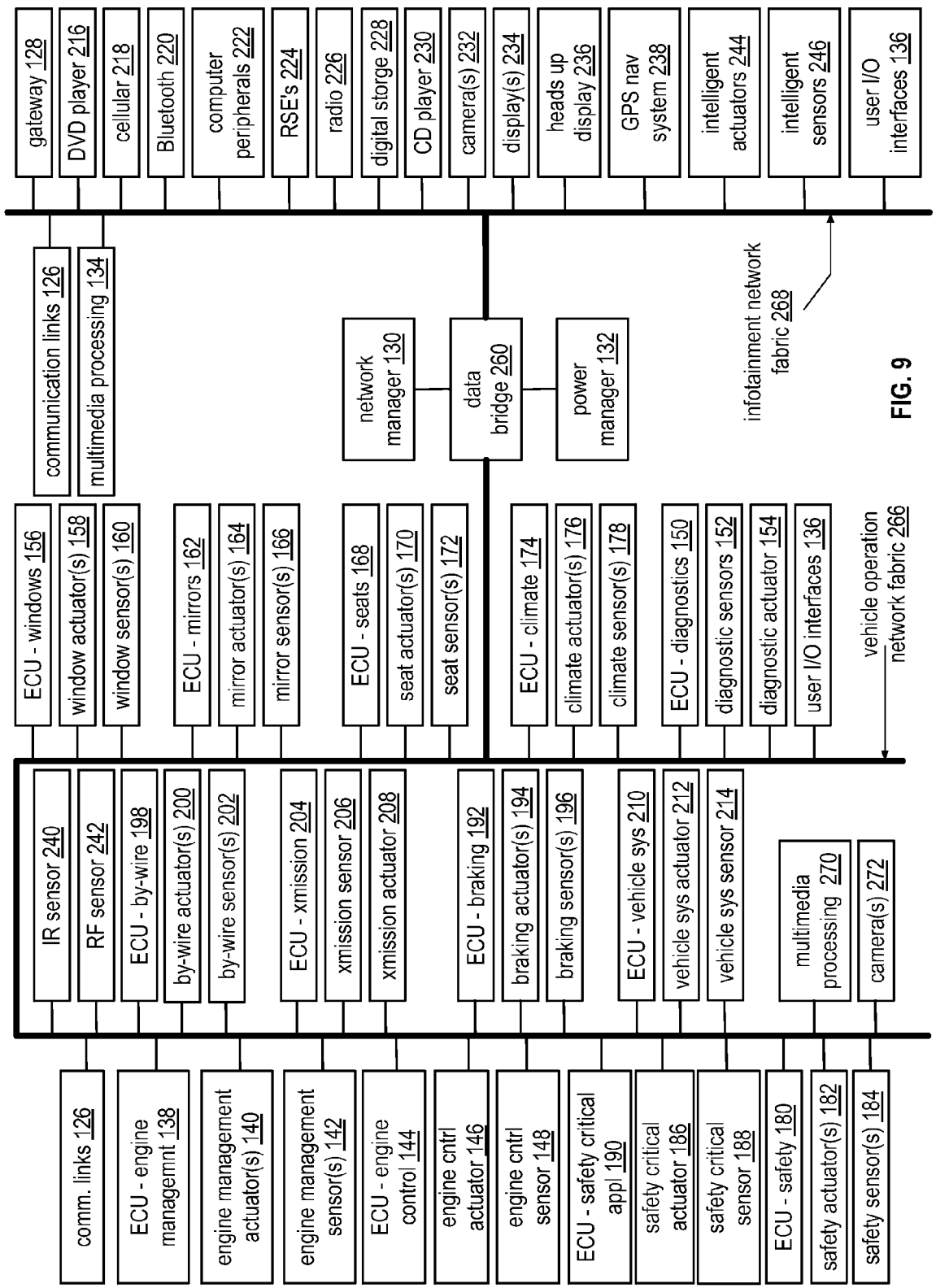
FIG. 9 is a schematic block diagram of another embodiment of a vehicular communication network in accordance with the present invention.

FIG. 9 is a schematic block diagram of another embodiment of a vehicular communication network that includes a vehicle operation network fabric 266, an information/entertainment (infotainment) network fabric 268, the data bridge 260, the network manager 130, and the power manager 132. The vehicle operation network fabric 266 is coupled to a plurality of vehicle operation network node modules, which include one or more communication links 126, an engine management electronic control unit 138, one or more engine management actuators 140, one or more engine management sensors 142, an engine control electronic control unit 144, one or more engine control actuators 146, one or more engine control sensors 148, a safety critical applications electronic control unit 190, one or more safety critical actuators 186, one or more safety critical sensors 188, a safety electronic control unit 180, one or more safety actuators 182, one or more safety sensors 184, one or more infrared sensors 240, one more RF sensors 242, a by-wire or electronic control unit 198, one or more by-wire actuators 200, one or more by-wire sensors 202, a transmission electronic control unit 204, one or more transmission sensors 206, one or more transition actuators 208, a braking system electronic control unit 192, one or more breaking actuators 194, one more breaking sensors 196, a vehicle system electronic control unit 210, one or more vehicle system actuators 212, one or more vehicle system sensors 214, a vehicle operation multi-media processing module 270, one more vehicle operation cameras 272, a window electronic control unit 156, one or more window actuators 158, or more window sensors 160, a mirror electronic control units 162, one or more mirror actuators 164, one or more mirror sensors 166, a seat electronic control unit 168, one or more seat actuators 170, one or more seat sensors 172, a climate electronic control unit 174, one or more climate actuators 176, one or more climate sensors 178, a diagnostic electronic control unit 150, one or more diagnostic sensors 152, one or more diagnostic actuators 154.

The infotainment critical network fabric 268 is coupled to a plurality of infotainment network node modules, which include one or more communication links 126, one or more multimedia processing modules 134, a gateway 128, a DVD player 216, a cellular telephone interface 218, a Bluetooth interface 220, one or more computer peripheral interfaces 222, a rear seat entertainment unit and/or interface 224, a radio, digital storage 226, a CD player 230, one or more cameras 232, one or more displays 234, a heads-up display 236, a GPS navigation system 238, one or more intelligent actuators 244, one or more intelligent sensors 246, and/or one or more user input and/or output interfaces 136.

Figure 10:
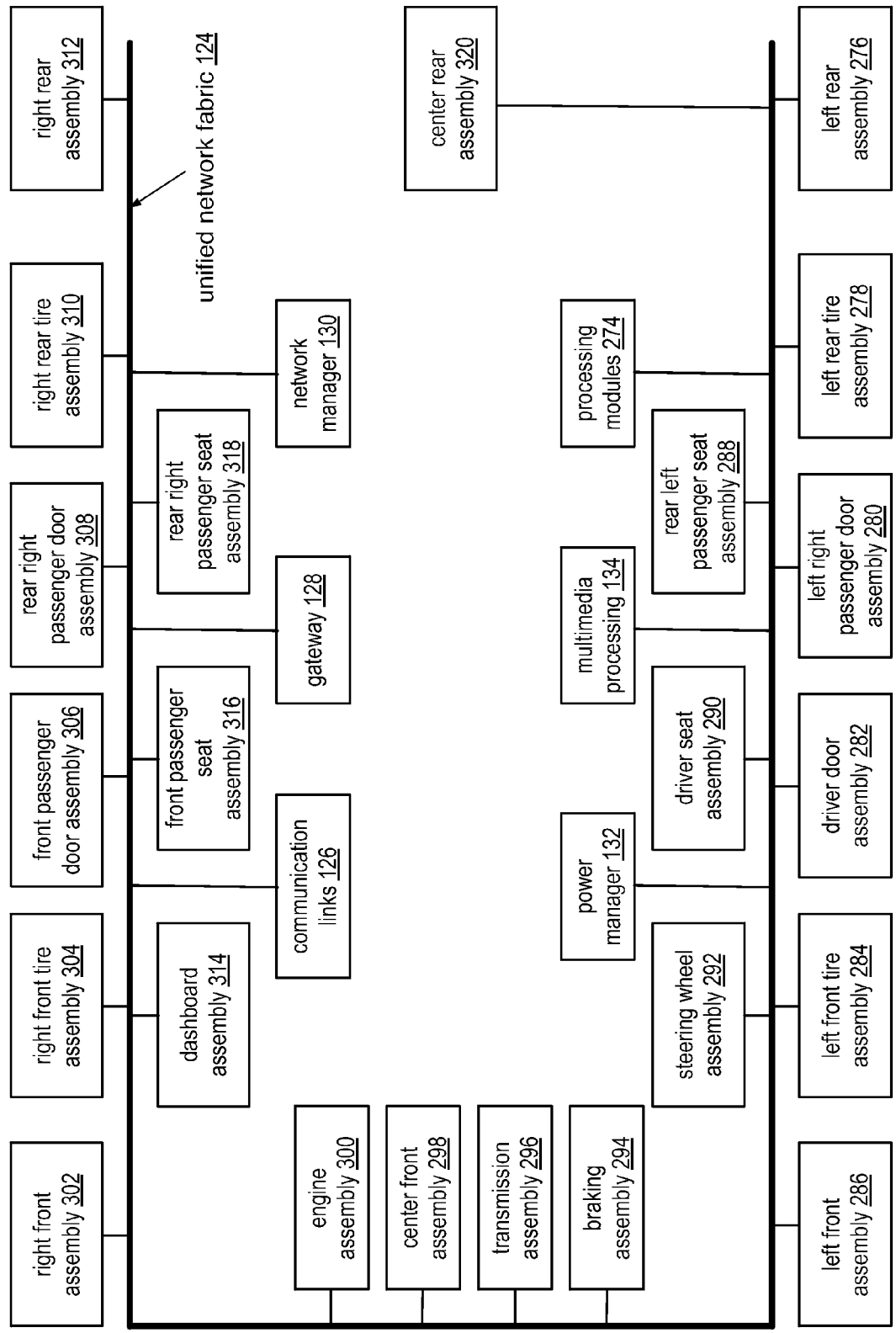
FIG. 10 is a schematic block diagram of another embodiment of a vehicular communication network in accordance with the present invention.

FIG. 10 is a schematic block diagram of another embodiment of a vehicular communication network that includes a unified network fabric 124, a plurality of assemblies, one or more communication links 126, a gateway 128, a network manager 130, one or more processing modules 274, one or more of multimedia processing modules 134, and a power manager 132. The plurality of assemblies include a left rear assembly 276, a left rear tire assembly 278, a left right passenger door assembly 280, a driver door assembly 282, a left front tire assembly 284, a left front assembly 286, a rear left passenger seat assembly 288, a driver's seat assembly 290, a steering wheel assembly 292, a braking assembly 294, a transmission assembly 296, a center front assembly 298, an engine assembly 300, a right front assembly 302, a right front tire assembly 304, a front passenger door assembly 306, a rear right passenger door assembly 308, a right rear tire assembly 310, a right rear assembly 312, a dashboard assembly 314, a front passenger seat assembly 316, a right rear passenger seat assembly 318, and a rear center assembly 320.

An assembly includes a switching circuit, a plurality of network interfaces, and a plurality of devices. For example, the left front, right front, left rear and right rear assemblies each may include a switching circuit, a plurality of network interfaces, a plurality of digital to analog converters, a plurality of analog to digital converters, one or more headlamp actuators, one or more taillight actuators, one or more cameras, were more like sensors, were more RF sensors, one or more IR sensors, and or one or more environmental sensors. The various assemblies will be described in greater detail with reference to FIGS. 48-57. Note that more or less assemblies may be coupled to the unified network fabric 124.

Figure 11:
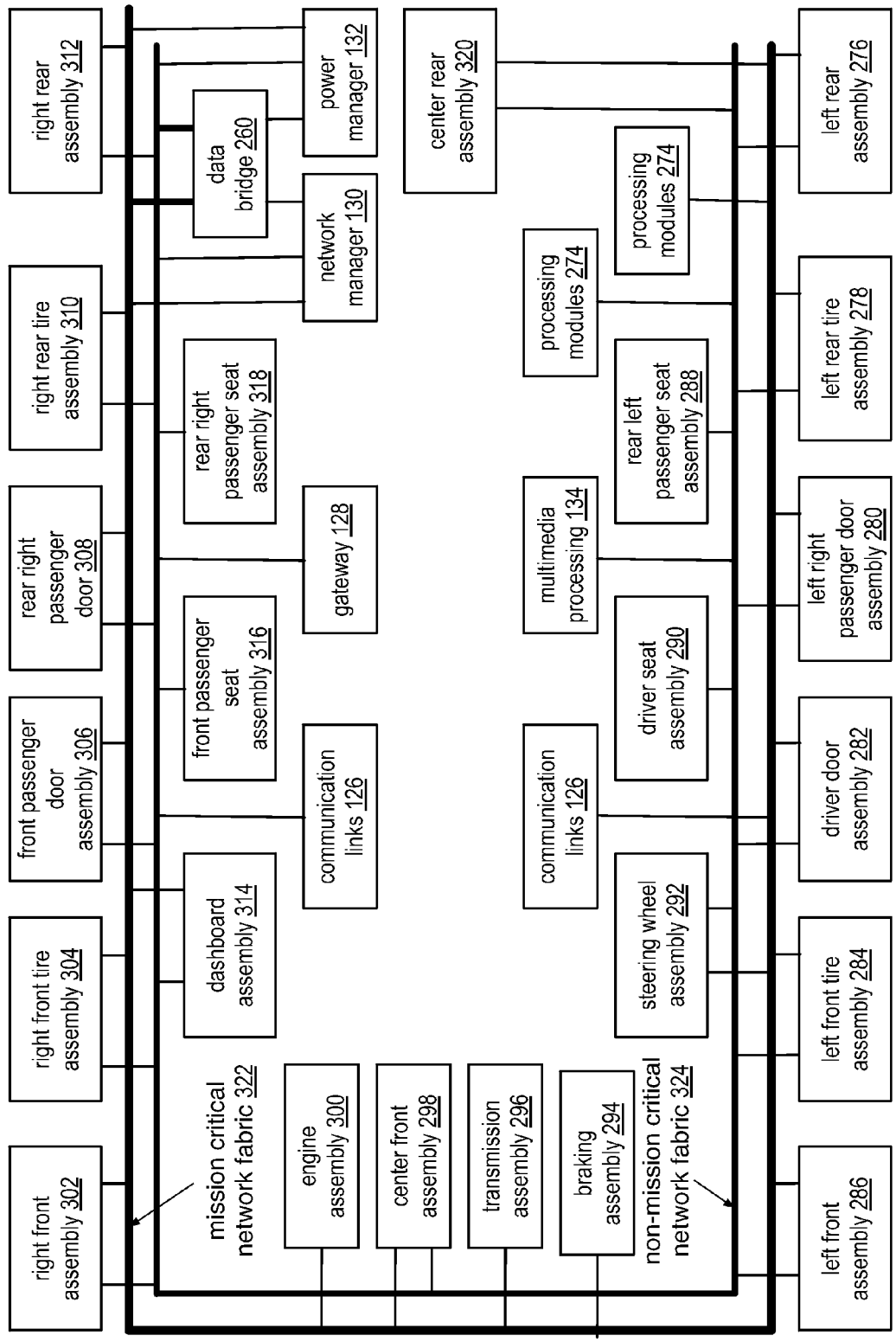
FIG. 11 is a schematic block diagram of another embodiment of a vehicular communication network in accordance with the present invention.

FIG. 11 is a schematic block diagram of another embodiment of a vehicular communication network that includes a mission-critical network fabric 322, a non-mission critical network fabric 324, the network manager 130, the power manager 132, and the data bridge 260. The mission-critical network fabric 322 is coupled to one of more communication links 126, one or more processing modules 274, and a plurality of assemblies. The non-mission critical network fabric 322 is coupled to the gateway 128, one or more communication links 126, one or more multimedia processing modules 134, one or more processing modules 274, and a plurality of assemblies.

Of the plurality of assemblies, some are coupled to the mission-critical network fabric 322, some are coupled to the non-mission critical network fabric 324, and some are coupled to both network fabrics. For instance, the left rear assembly 276, the left rear tire assembly 278, the left right passenger door assembly 280, the driver door assembly 282, the left front tire assembly 284, the left front assembly 286, the dashboard assembly 314, the steering wheel assembly 392, the center front assembly 298, the right front assembly 302, the right front tire assembly 304, the front passenger door assembly 306, the right rear passenger door assembly 308, the right rear tire assembly 310, and the right rear assembly 312, and the center rear assembly 320 are each coupled to both network fabrics. In this embodiment, each of these assemblies includes one or more mission-critical devices (e.g., airbag sensor, airbag actuator, collision indication, collision avoidance, etc.) and one or more non-mission critical devices (e.g., tire pressure sensor, window user interface, etc.).

The engine assembly 300, transmission assembly 296, and braking assembly 294 are coupled to the mission-critical network fabric 322. The rear left passenger seat assembly 288, the driver seat assembly 290, the front passenger seat assembly 316, and the right rear passenger seat assembly 318 are coupled to the non-mission critical network fabric 324.

Figure 12:
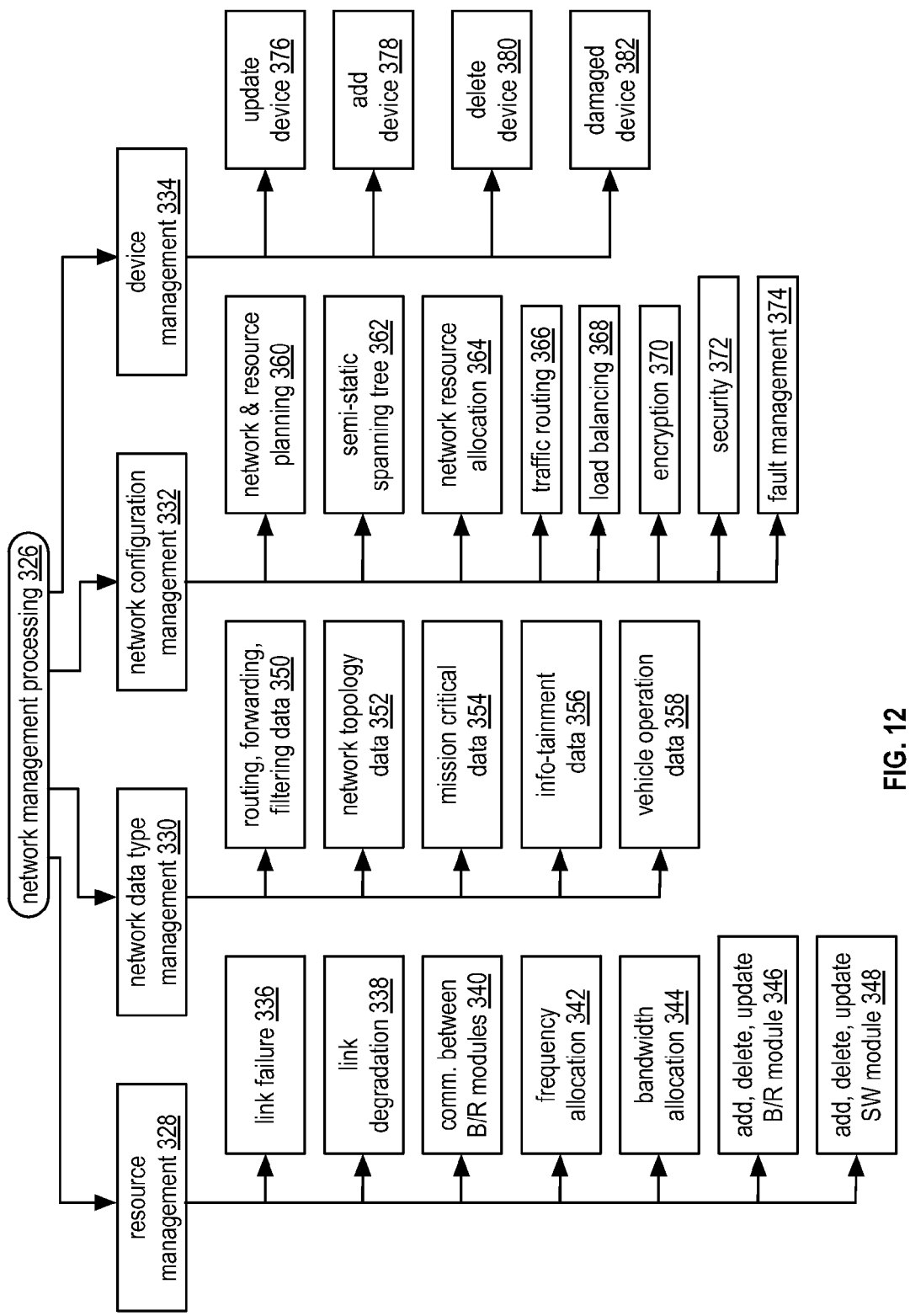
FIG. 12 is a logical diagram of network managing processes for a vehicular communication network in accordance with the present invention.

FIG. 12 is a diagram of network managing processes 326 for a vehicular communication network that includes four high-level management functions: resource management 328, network data type management 330, network configuration management 332, and device management 334. Resource management 328 includes, but is not limited to, link failure management 336, link degeneration management 338, management of communication between bridge/routing modules 340, management of communication between bridge/routing modules and switching modules, management of communication switching modules and network node modules, frequency allocation 342, bandwidth allocation 344, adding deleting or updating a bridge/routing module 346, adding deleting or updating a network node module, and/or adding deleting or updating a switch module 348. The resource management 328 tasks will be discussed in greater detail with reference to one or more of the subsequent figures.

The network data type management 330 includes, but is not limited to, managing classification, routing, forwarding, and/or filtering of a packets between modules of the network fabric 350, managing the network topology and packet transmissions thereof 352, managing transmission of mission-critical packets 354, managing transmission of information/entertainment packets 356, and managing transmission of vehicle operation packets 358. The networking data type management tasks will be discussed in greater detail with reference to one or more of the subsequent figures.

The network configuration management 332 includes, but is not limited to, network and resource planning 360, managing semi-static spanning tree configurations 362, network resource allocation 364, managing traffic routing 366, managing load-balancing 368, managing encryption 370, managing security 372, and fault tolerance management 374. The network configuration management tasks will be discussed in greater detail with reference to one or more of the subsequent figures.

The device management 334 includes, but is not limited to, updating devices 376, adding devices to the network 378, deleting devices from the network 380, and managing the damage devices coupled to the network 382. The device management tasks will be discussed in greater detail with reference to one or more of the subsequent figures.

FIG. 13 is a schematic block diagram of an embodiment of a network fabric 384 that includes a plurality of bridge-routing modules 386 and a plurality of switch modules 388. The switch modules 388 are coupled to one or more network node modules 390 and to at least one bridge-routing module 386. Each of the bridge-routing modules 386 are coupled to at least one switching module 388 and at least one other bridge-routing module 386. The coupling between bridge-routing modules 386 and between bridge-routing modules 386 and switch modules 388 includes multiple cables (e.g., unshielded twisted pair, shielded twisted pair, coaxial cable, category 5 or 6 cables, fiber optics, etc.).

The network fabric 384 may be used within the unified network fabric 384 or the multiple network fabric communication networks of the preceding figures. Note that more or less switching modules 388 and bridge-routing modules 386 may be included in the network fabric 384. Further note that the multiple connections between switching modules 388 and bridge-routing modules 386 may include two or more cables where one of the cables is active and the other is used for fail over or redundancy. Still further note that a network node module 390 may be directly connected to a bridge-routing module 386.

Figure 14:
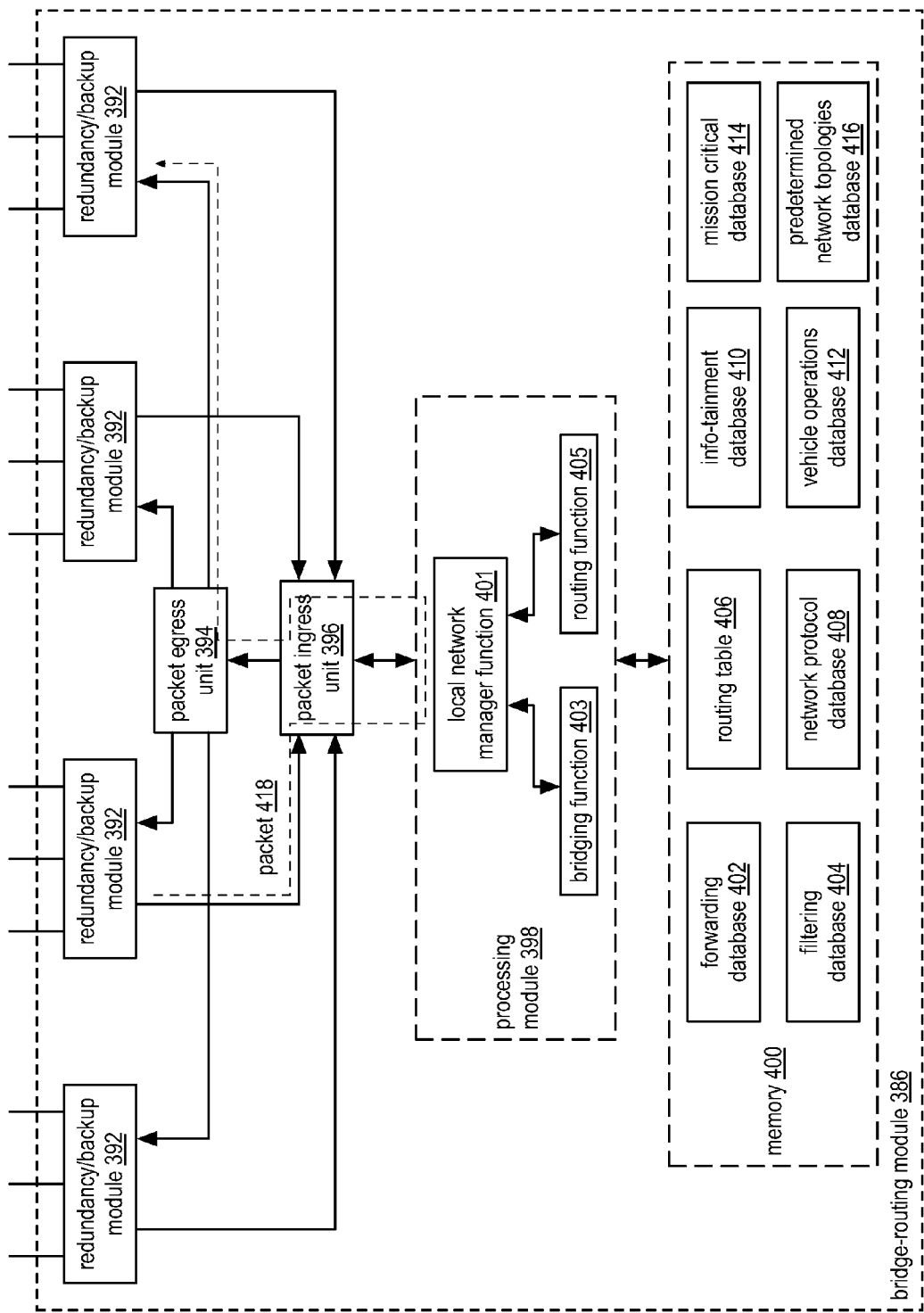
FIG. 14 is a schematic block diagram of an embodiment of a bridge-routing module in accordance with the present invention.

FIG. 14 is a schematic block diagram of an embodiment of a bridge-routing module 386 that includes a plurality of interface circuits, e.g. redundancy/backup modules 392, a packet egress unit 394, a packet ingress unit 396, a processing module 398, and memory 400. The processing module 398 is configured to implement a local network management function 401, a bridging function 403, and or a routing function 405. The memory 400 stores network information in one or more tables and/or databases. For instance, the memory 400 may store a forwarding database 402, a filtering database 404, a routing table 406, a network protocol database 408, and information/entertainment database 410, a vehicle operations database 412, a mission-critical database 414, and a predetermined network topology database 416.

In an example of operation, one of the redundancy/backup modules 392 receives a packet 418. The packet 418 is routed to the packet ingress unit 396, where the local network management function 401 interprets the packet 418. Such an interpretation includes determining the type of packet (e.g., mission critical, network data, info-entertainment, vehicle operation, etc.). Determining the type of packet can include determining the type of content carried by the packet, i.e. the packet content type. Having identified the packet 418, and the packet content type, the local network management function 401 determines the processing for the packet 418 and then processes the packet 418 accordingly. Determining the processing for the packet 418 includes, in some embodiments, determining packet routing parameters based on the packet content type.

As a specific example, when the local network management function 401 determines that the packet 418 is related to a vehicle operation, it accesses the vehicle operation database 412 to determine if any specific processing is to be performed and/or priority of the packet 418, source, and/or destination. If no specific processing is to be performed, the processing module 398 evokes the bridging function 403 and/or the routing function 405 to forward or route the packet 418 to another bridge-routing module, to a switch module, or locally via one of the redundancy/backup modules 392 in accordance with its priority level. Note that the bridging, which uses the forwarding database 402, is done at a data link layer using MAC addresses of physical devices and the routing, which uses the routing table 406, is done at the network layer and uses IP addresses, which may not be tied to a physical device. Further note that the bridging and/or routing function may use the filtering database 404 to preclude forwarding of a packet to a particular device or IP address identified in the filtering database 404.

If the local network management function 401 determines that the packet 418 does have specific performance requirements (e.g., store the data in memory 400, forward to the gateway for transmission to an external device, etc.), the local network management function 401 processes the packet 418 accordingly. Depending on the nature of the specific performance requirements, the processing module 398 may also evoke the bridging function 403 and/or routing function 405 to route the packet 418 to another bridge-routing module 386, to a switch module, and/or locally to another redundant/backup module 392.

Prior to forwarding the packet 418 to another bridge-routing module 386, or switch module, the local network management function 401 may access the network protocol database 408 to determine if a particular type of communication with the other bridge-routing module 386 or switching module is used. For example, most communications within the network fabric will use a default communication protocol (e.g., 100 Mbps or 1 Gbps Ethernet), however, some communications within the network fabric may deviate from the default communication protocol. For instance, between two bridge-routing modules, 10 Gb Ethernet may be used or non-standard speeds such as 200 Mbps, or 2.5 Gbps Ethernet may be used between a particular bridge-routing module 386 and a particular switch module.

As another specific example, the packet 418 may relate to a mission-critical function. In this instance, the processing module 398 accesses the mission-critical database 414 to determine its mission-critical priority level and other routing and/or forwarding aspects and parameters. Based on this information, the local network management function 401 processes the packet 418.

If the packet 418 relates to network data, the processing module 398 accesses the predetermined network topology database 416, which may include a listing of preconfigured spanning tree network topologies. In this instance, the network packet is sent due to a link failure, which requires reconfiguration of the network. By accessing the network topology database 416, the bridge-routing module 386 quickly reconfigures based on the spanning tree network topology selected.

After the processing module 398 has processed the packet 418, the packet egress unit 394 receives the processed packet. Based on information received from the processing module 398, the packet ingress unit 396 places the packet 418 in a queue for subsequent transmission via one of the redundancy-backup modules 392.

Figure 15:
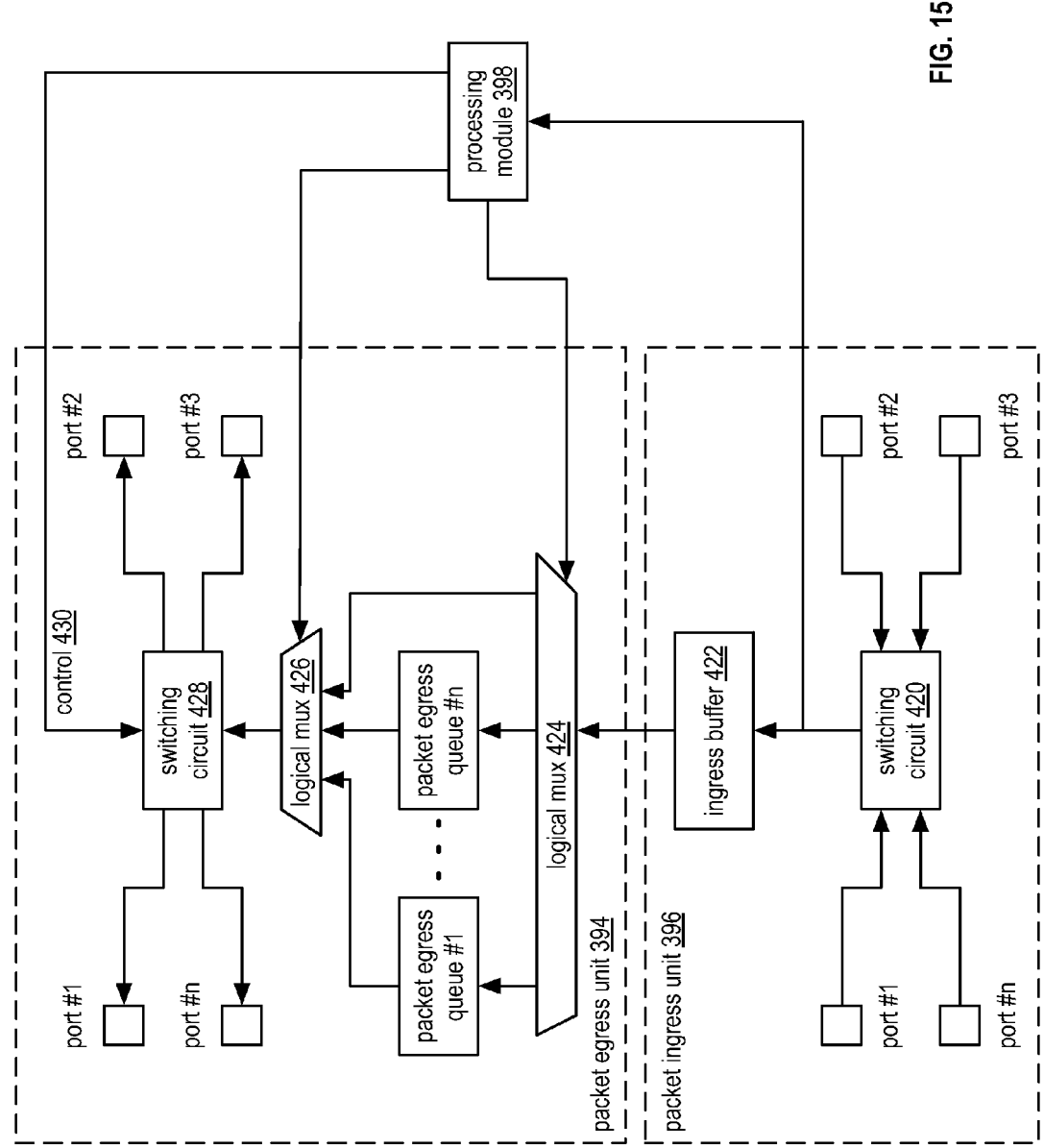
FIG. 15 is a schematic block diagram of an embodiment of a packet egress unit and a packet ingress unit in accordance with the present invention.

FIG. 15 is a schematic block diagram of an embodiment of a packet egress unit 394 and a packet ingress unit 396, which are coupled to the processing module 398. The packet ingress unit 396 includes a plurality of ports, a switching circuit 420, and an ingress buffer 422. The packet egress unit 394 includes a first logical multiplexer 424, one or more packet egress queues, a second logical multiplexer 246, a switching circuit 428, and a plurality of ports.

In an example of operation, the packet ingress unit 396 receives a packet via one of the ports, which are coupled to the redundancy/backup modules. The switching circuit 420, which may include a plurality of switches and a control unit to couple one of the ports to be switching circuit output, outputs the packet to the ingress buffer 422 and to the processing module 398. The processing module 398 interprets the packet to determine its priority within the ingress buffer 422 and to determine its priority within the packet egress unit 394. For example, if the packet is determined to be a high priority packet, the processing module 398 will place the packet at the front of the ingress buffer 422 such that it is the next packet to be provided to the packet egress unit 394.

The first logical multiplexer 424 of the packet egress unit 394 receives a packet from the packet ingress unit 396. Based on a control signal 430 from the processing module 398, the first logical multiplexer 424 routes the packets to one of a plurality of packet egress queues. Each of the packet egress queues may be used for a specific type of packets, or packets having a specific type of content. For example, a first packet egress queue may be used for mission-critical packets, a second packet egress queue may use for vehicle operation packets, a third packet egress queue may be used for entertainment packets, etc. In the alternative, the packet egress unit may omit the first logical multiplexer 424 by using a single packet egress queue.

The processing module 398 controls the packet's prioritization placement in the selected queue based on the priority level of the packet. For example, if the packet is a safety related mission-critical packet, it may be placed at the front of the mission critical packet egress queue such that it is the next packet to be outputted by the packet egress unit 394.

With multiple packets in the packet egress queues, the processing module 398 selects one of the packets to be outputted via the second logical multiplexer 426 to the switching circuit 428. For example, the processing module 398 may access one or more of the databases to determine a prioritization scheme to determine the packet having the current highest priority. The packet with the current highest priority is outputted via the second logical multiplexer 428 to the switching circuit 428, which outputs the packet to one of the egress ports.

Figure 16:
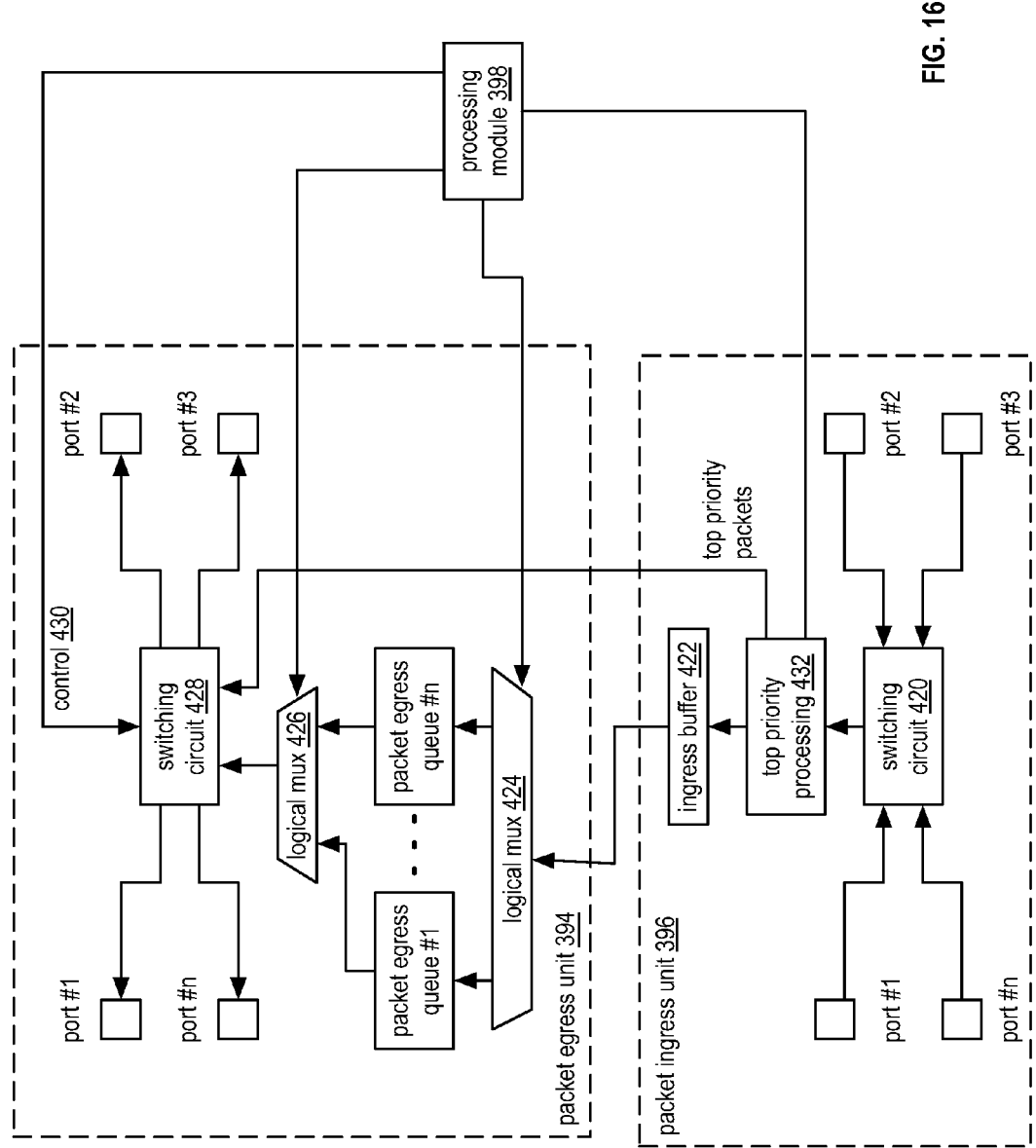
FIG. 16 is a schematic block diagram of another embodiment of a packet egress unit and a packet ingress unit in accordance with the present invention.

FIG. 16 is a schematic block diagram of another embodiment of a packet egress unit 394 and a packet ingress unit 396, which are coupled to the processing module 398. The packet ingress unit 396 includes a plurality of ports, a switching circuit 420, a top priority processing unit 432, and an ingress buffer 422. The packet egress unit 394 includes a first logical multiplexer 424, one or more packet egress queues, a second logical multiplexer 426, a switching circuit 428, and a plurality of ports.

In an example of operation, the packet ingress unit 396 receives a packet via one of the ports, which are coupled to the redundancy/backup modules. The switching circuit 420 outputs the packet to the top priority processing unit 432. The top priority processing unit 432 interprets the packet to determine its priority. If the packet is a top priority packet (e.g., a packet of the highest priority), the top priority processing unit 432 forwards the packet directly to the switching circuit 428 of the packet egress unit 394 for immediate transmission via one of the ports. In this instance, if the switching circuit 428 is currently outputting a packet, the top priority packet may interrupt the packet.

In addition, the top priority processing units 432 provides its interpretation of the packets to the processing module 398. For top priority packets, the processing module 398 takes a snapshot of the current ingress buffer 422 and the packet egress queues such that if the top priority interrupts a current packet transmission, the packet transmission may be resumed once the top priority packet has been transmitted. If the current packet is not a top priority packet, the processing module 398 processes it as previously discussed with reference to FIG. 15.

Figure 17:
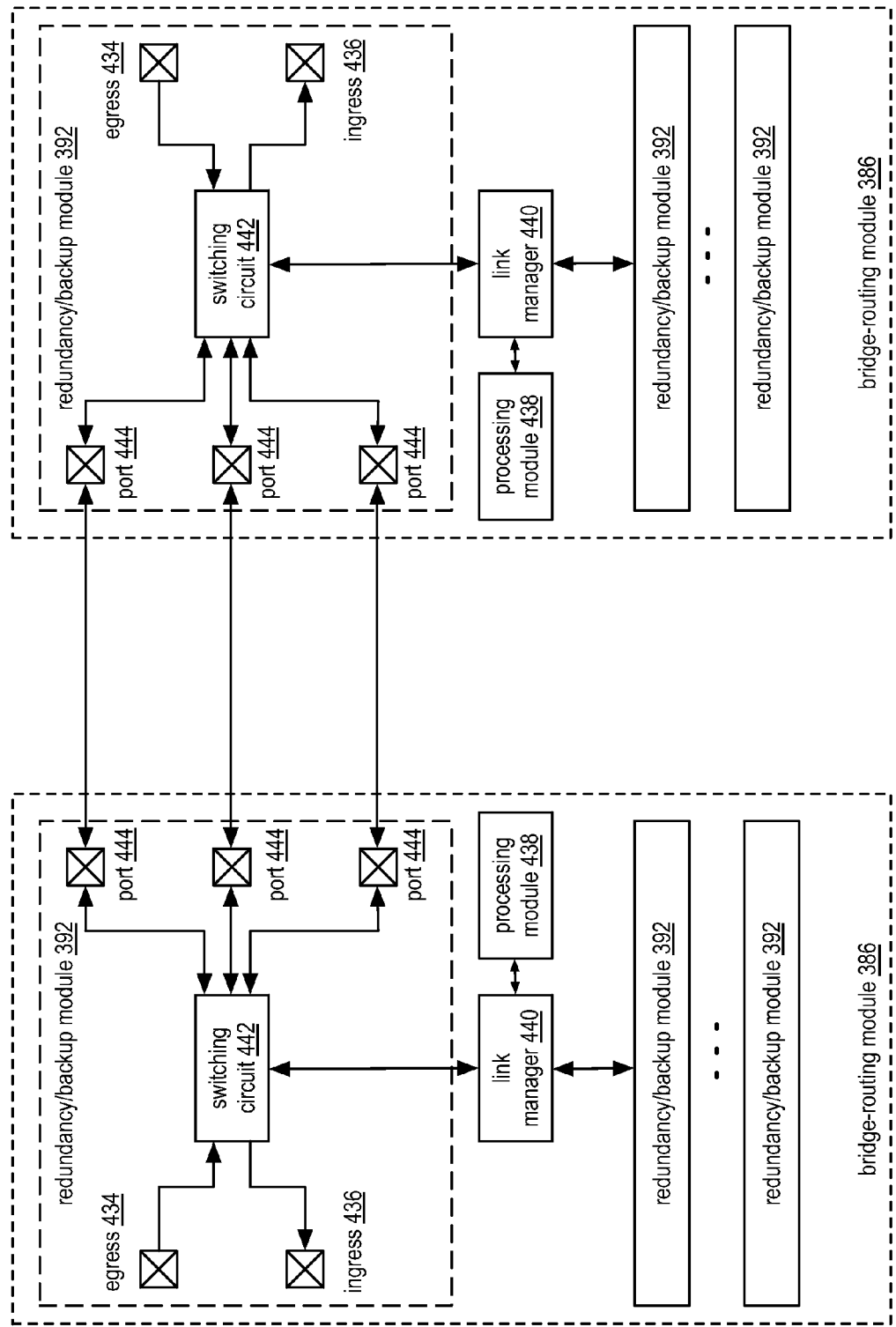
FIG. 17 is a schematic block diagram of an embodiment of a redundancy/backup module in accordance with the present invention.

FIG. 17 is a schematic block diagram of an embodiment of a vehicle network link module within a bridge-routing module 396 (and/or it could be within a switching module). The vehicle network link module includes a plurality of network fabric ports 444, a module port (e.g., ingress port 436 and/or egress port 434), a switching circuit 442, and a link manager processing module (e.g., link manager 440 and/or a processing module 438). Each of the interconnecting network fabric ports 444 are coupled via a cable with interconnecting ports 444 of a redundancy/back up module 392 of another bridge-routing module 386 or of a switch module. The ingress port 436 is coupled to the packet ingress unit of the bridge-routing module 386 (or of a switch module) and the egress port 434 is coupled to the packet egress unit of the bridge-routing module 386 (or of a switch module).

In an example of operation, one of the interconnecting ports 444 is active to receive or transmit a packet to/from the other bridge-routing module 386 or to/from a switch module. For inbound packets, the active port provides the packet to the switching circuit 442, which provides the inbound packet to the ingress port 436 for forwarding to the packet ingress unit. For outbound packets, the egress port 434 provides a packet from the packet egress unit to the switching circuit 442, which couples the egress port 434 to the active interconnecting port. The active interconnecting port 444 then outputs the outbound packet.

The link manager 440, alone or in combination with the processing module 438, monitors the "health" of the transmissions and receptions of packets via the active interconnecting port 444. For example, if the data rate of transmissions via the active interconnecting port 444 is lower than a desired threshold due to errors, other factors, or the cable is broken, then the link may be flagged as being in a degenerative state. If the degenerative state compares unfavorably to a threshold, the link manager 440 may deactivate the current active interconnecting port and activate another interconnecting port 444.

In addition to monitoring the health of a link, the link manager 440 also determines a use mode such as backup transmissions and/or backup receptions of packets via a second interconnecting port 444. In this instance, the link manager 440 communicates with the switching circuit 442 to enable multiple interconnecting ports 444 to be coupled to the egress port 434 or to the ingress port 436 such that parallel transmissions of a packet or parallel receptions of the packets may occur. The link manager 440 also indicates which of the links is the primary link and which is the backup link. Typically, packets will be processed via the primary link. If, however, the primary link has a failure (e.g., an unacceptable degenerative state or is broken), the packet can be processed from the backup link without loss of data.

The link manager 440 is further operable to support various network protocols as established by the processing module 438. For example, if the processing module 438 issues a control signal to change the coupling to a difference bridge-routing module 386, the link manager 440 of the current redundancy/backup module 382 deactivates the interconnecting port 444, or ports, and a link manager 440 of another redundancy/backup module 382 activates one or more interconnecting ports 444 to connect to the new bridge-routing module 386. Note that the redundancies/backup modules 392 of a bridge-routing module 386 may each have its own link manager 440, may share a common link manager 440, or a link manager 440 may support a subset of the redundancy/backup modules 392.

In another example of operation, the link manager processing module determines that the packet conveyance via a network link has degenerated below the threshold due to data bandwidth of a communication medium coupling the active network fabric port to a corresponding active network fabric port of the other vehicle network fabric link module being below a desired data bandwidth level. In other words, the link cannot support the data rate that is currently being requested to transmit. In this instance, the link manager processing module changes the use mode to an aggregation mode such that the active network fabric port and the new active network port are coupled to the port via the switching circuit for aggregate packet transmissions. In this manner, two or more connections are used in parallel to convey packets between the bridge routing modules and/or switch modules.

The link manager processing module may determine whether vehicle network packet conveyance has degenerated below the threshold in a variety of ways. For example, the manager processing module determines that a communication medium coupling the active network fabric port to a corresponding active network fabric port of the other vehicle network fabric link module is broken (e.g., cable broke, HW failure, SW failure of port). As another example, the link manager processing module determines that the communication medium coupling the active network fabric port to the corresponding active network fabric port of the other vehicle network fabric link module has an undesired bit error rate. In yet another example, the link manager processing module determines that the communication medium coupling the active network fabric port to the corresponding active network fabric port of the other vehicle network fabric link module has a data bandwidth below a desired data bandwidth level.

The link manager 440 may also keep a history of the performance of each link to further aid in network reconfiguration decisions, fast failover decisions, etc. To facilitate tracking the performance of each link, the link manager 440 may periodically test a link during idle times. The link manager 440 may employ a variety of testing techniques to test the performance of the links and may use the performance history of each link and/or port to select the active network port.

While the present illustration of a redundancy/backup module 392 includes one egress port 434, one ingress port 436, and three interconnecting ports 444, each redundancy/backup module 392 may include multiple ingress ports 436, multiple egress ports 434, and/or more or less than three interconnecting ports 444. For example, the redundancy/backup module 392 may include two egress ports 434 and two ingress ports 436 to support concurrent transmission of packets. In this instance, the switching circuit 442 couples two of the interconnecting ports 444 to the two egress ports 434 or to the two ingress ports 436 as directed by the link manager 440.

Figure 18:
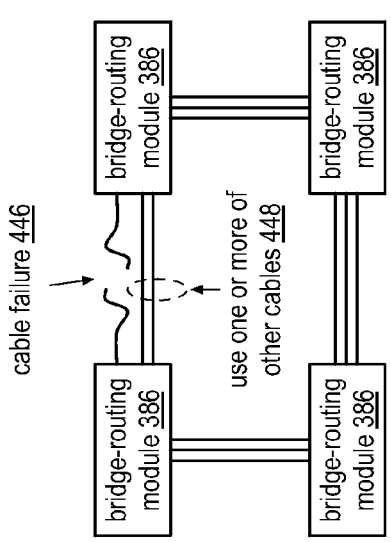
FIG. 18 is a schematic block diagram of an example of a cable failure within a network fabric in accordance with the present invention.

FIG. 18 is a schematic block diagram of an example of a cable failure 446 within a network fabric. The cable failure 446 may result from a physical break of the cable, from significant degeneration of performance of the cable (i.e., an unacceptable degenerative state), a hardware failure within one or both of the bridge-routing modules 386 and/or a software failure within one or both of the bridge-routing modules 386. When a cable failure 446 occurs, the bridge-routing modules 386 select one or more of the other cables 448 to function as the active link.

Figure 19:
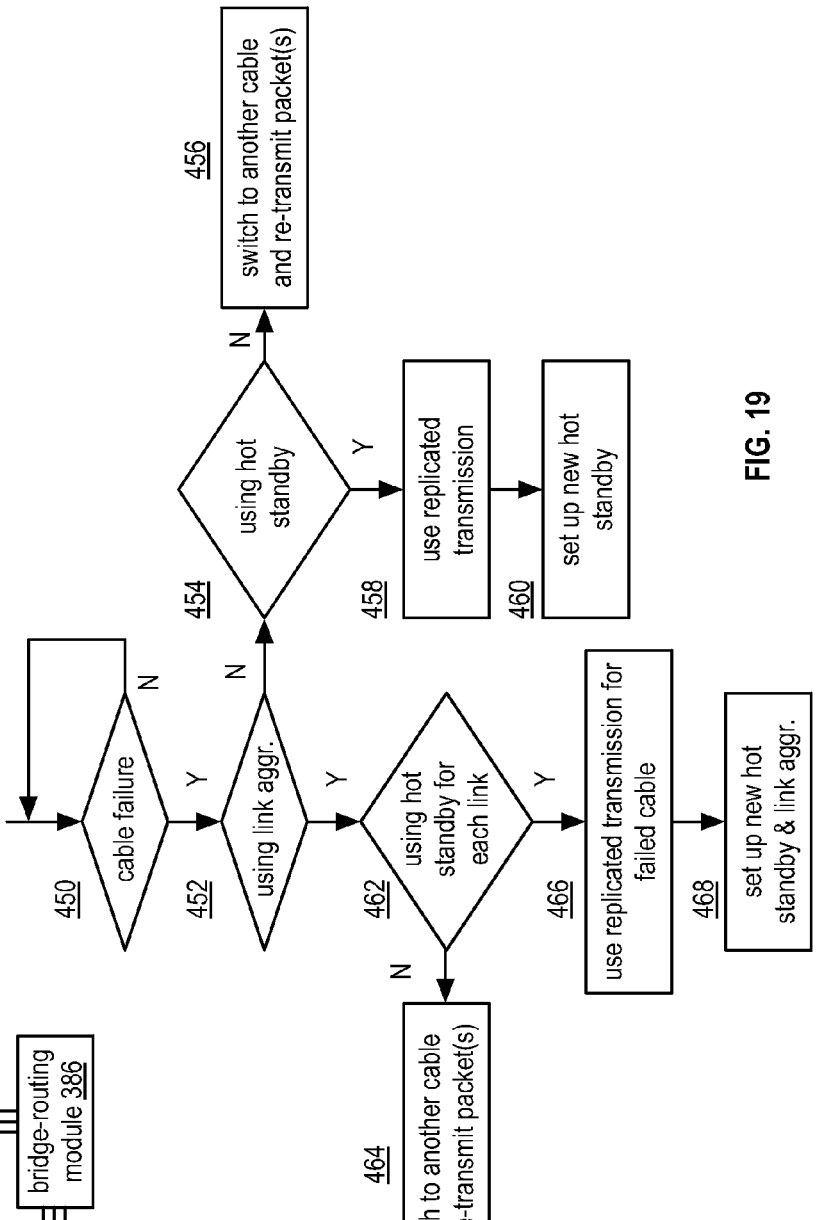
FIG. 19 is a logic diagram of an embodiment of a method for processing a cable failure within a network fabric in accordance with the present invention.

FIG. 19 is a logic diagram of an embodiment of a method for processing a cable failure within a network fabric by a vehicle network link module. The method begins with the processing module and/or a link manager determining whether a cable failure has occurred 450. When a cable failure is detected, the method continues by determining whether link aggregation 452 (e.g., a use mode in which multiple ports to achieve higher data rates) is currently in use. If not, the method continues by determining whether hot standby 454 (e.g., another use mode in which a backup link is used to convey the same packets as the active link) is active. If hot standby is not active, the processing module and/or link manager activates another port and retransmits any packets that may have been lost due to the link failure 456.

If hot standby is active, the method continues by using the replicated transmission 458 (i.e., the backup transmission). The method continues by setting up a new hot standby link for a newly activated link 460.

If link aggregation is active, the method continues by determining whether each link has an active hot standby 462. When the hot-standby port is not enabled, the link manager processing module determines whether conveyance of a vehicle network packet was corrupted when the vehicle network packet conveyance has degenerated below the threshold. When the conveyance of the vehicle network packet was corrupted, the link manager processing module determines content type of the vehicle network packet (e.g., mission critical, network data, vehicle operation, and/or infotainment). The link manager processing module then determines network traffic conditions (e.g., how congested the network is). The link manager processing module then determines whether to initiate reconveyance the vehicle network packet based on the content type and network traffic conditions. For example, retransmit the packet or request retransmission packet by the other vehicle network fabric link module based on a sliding scale of content type and traffic conditions (e.g., retransmit everything but entertainment under normal traffic conditions, only mission critical packets when network is very busy, etc.). During the retransmission of lost packets of the failed cable, the other link aggregation cable may be in active to allow synchronization to be reestablished.

If hot standby is active for the link aggregation, the method continues by using the replicated transmission for the failed cable 466 (i.e., the backup transmission on the hot standby link). The method continues by setting up a new hot standby for a newly activated link 468.

Figure 20:
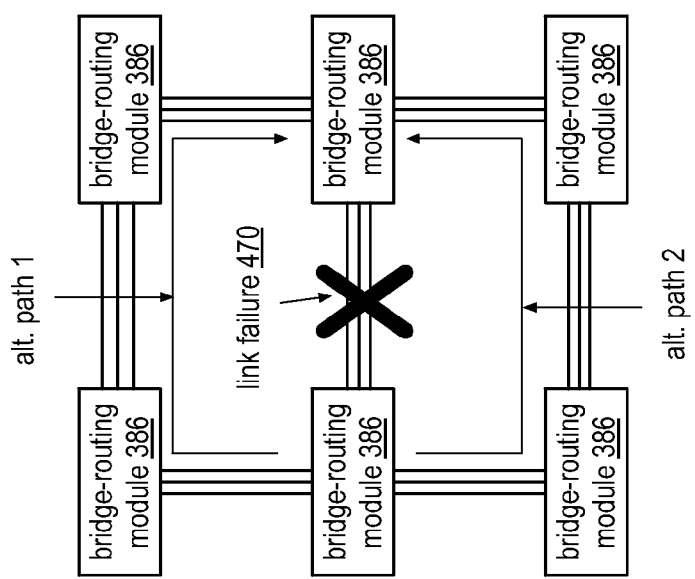
FIG. 20 is a schematic block diagram of another example of a cable failure within a network fabric in accordance with the present invention.
Figure 23:
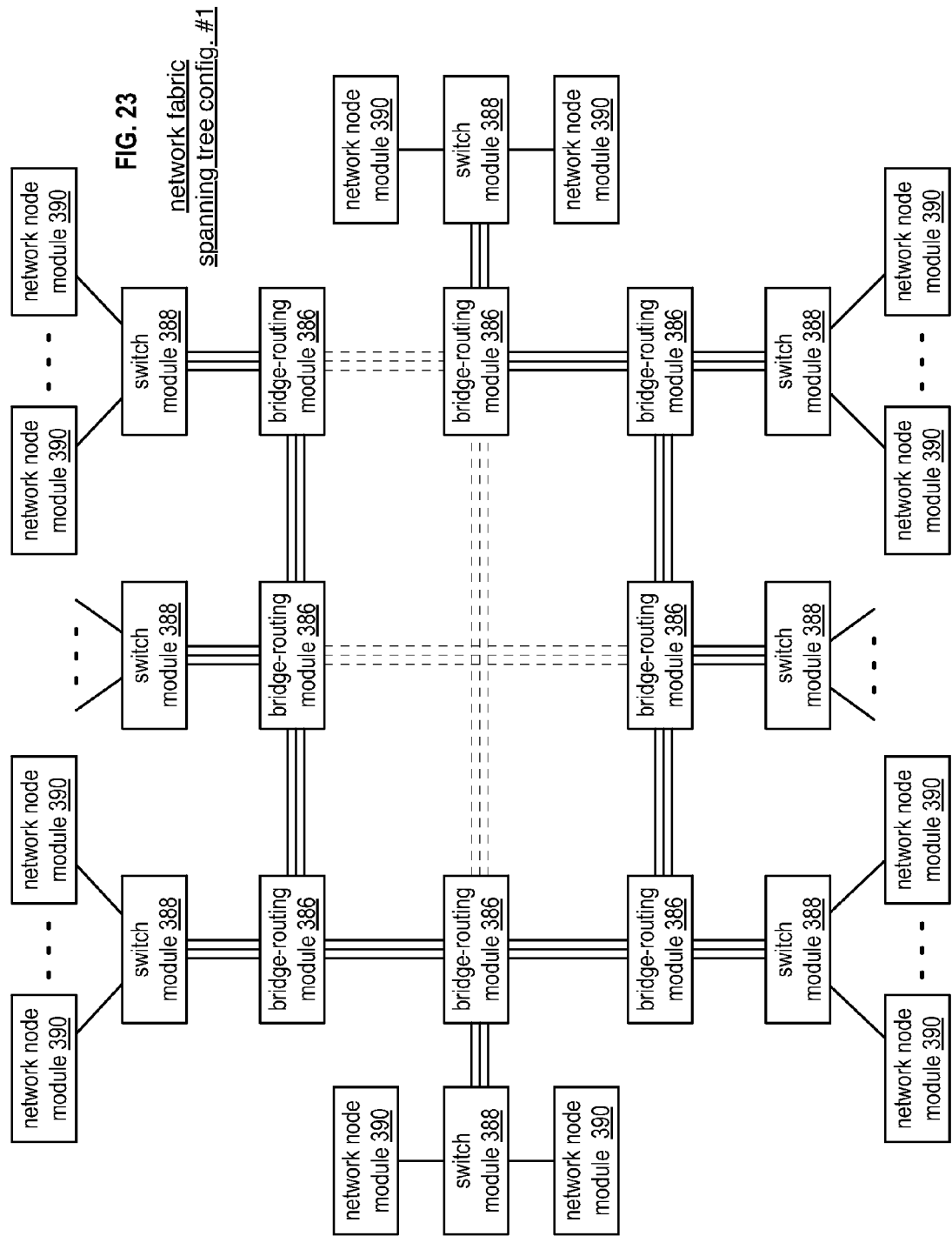
FIGS. 23-26 are examples of network fabric spanning tree configurations in accordance with the present invention.
Figure 24:
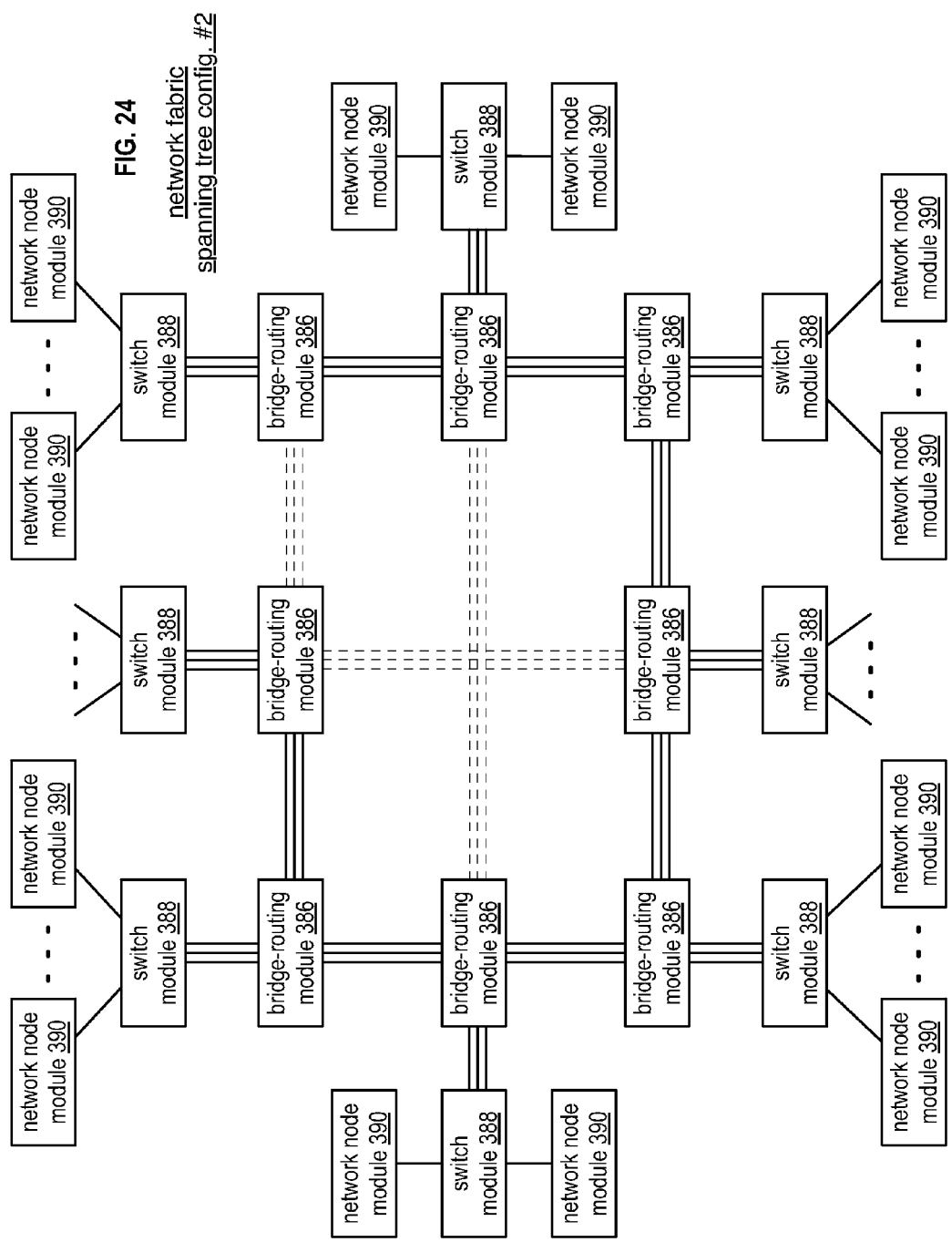
Figure 25:
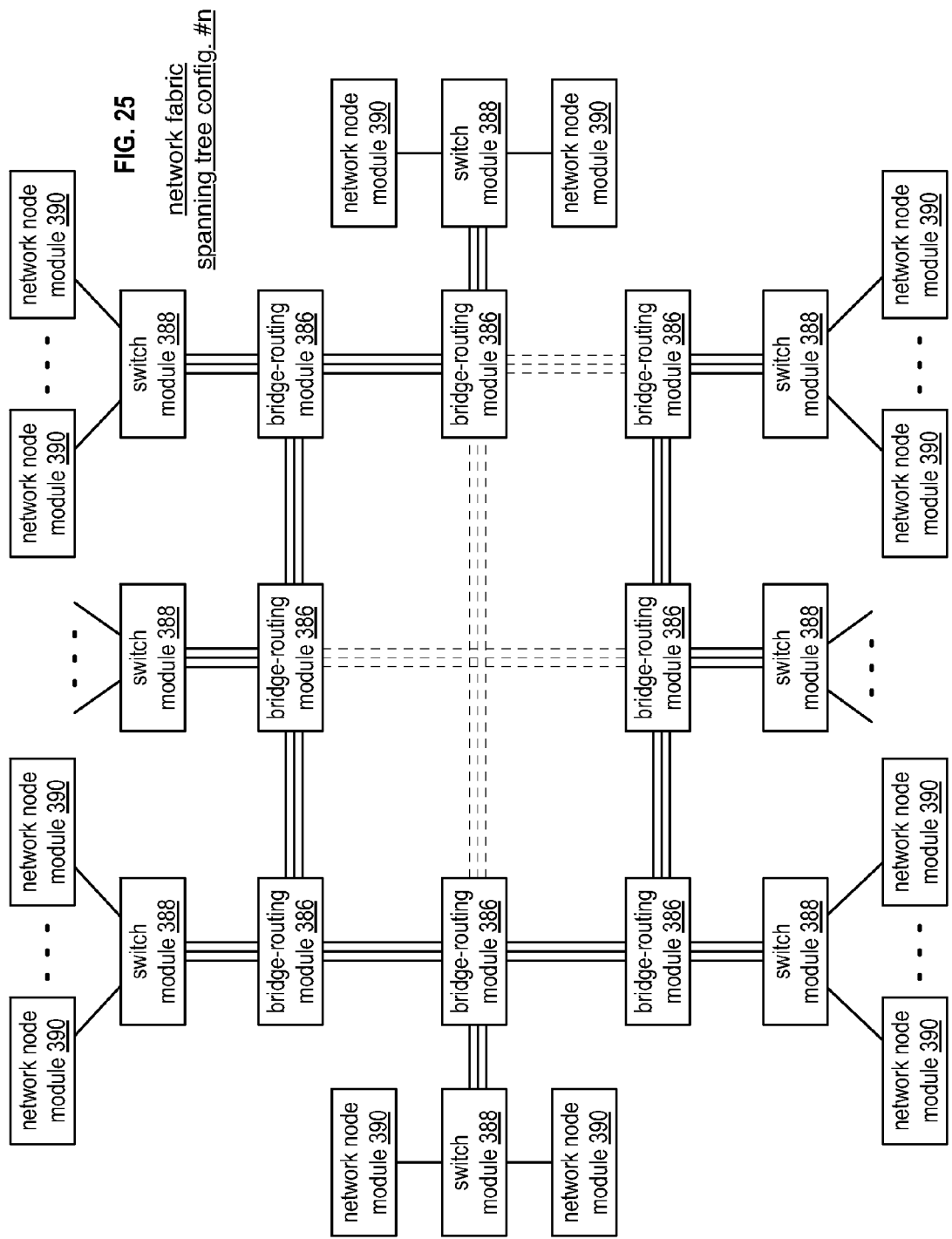

FIG. 20 is a schematic block diagram of another example of a link failure 470 (e.g., all cables between modules are in failure) within a network fabric. The link failure 470 may result from a physical break of the cables, from significant degeneration of performance of the cables (i.e., an unacceptable degenerative state), a hardware failure within one or both of the bridge-routing modules 386 and/or a software failure within one or both of the bridge-routing modules 386. When a link failure 470 occurs, the bridge-routing modules 386 select an alternate path in accordance with a pre-determined network topology.

Figure 21:
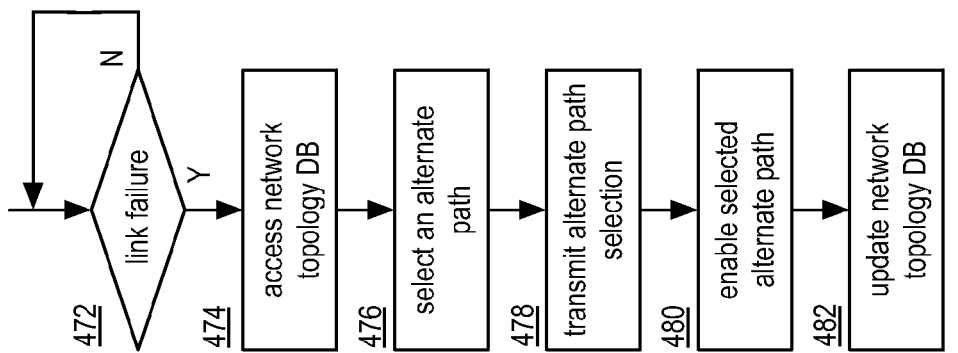
FIG. 21 is a logic diagram of another embodiment of a method for processing a cable failure within a network fabric in accordance with the present invention.

FIG. 21 is a logic diagram of another embodiment of a method for processing a link failure within a network fabric as may be performed by a processing module and/or link manager of a bridge-routing module. The method begins by determining whether a link failure has occurred 472. If yes, the process continues by accessing a network topology database as may be instructed by a network manager 474. In this network, since the network fabric is a semi-static architecture, it allows for a variety of pre-determined configurations to be identified and stored. As such, when a link failure occurs and to avoid loops, a preconfigured network topology may be identified and readily implemented in a very short period of time (e.g., less than a few tens of milliseconds). The network topology database will be described in greater detail with reference to FIGS. 22-26.

The method continues by selecting an alternate path between the bridge routing modules having the link failure 476. The selection of an alternative path may be based on a variety of decision points. For instance, the network topology database may be organized in a first in first out manner where the configuration in the first entry of the database is used. Alternatively, the decision may be based on which link failed, which bridge-routing modules are involved, network traffic, load balancing, etc. As an example and with reference to FIG. 20, alternative path one may be selected due to one or more of the decision points.

Returning to the discussion of FIG. 21, the method continues by transmitting the alternative path selection to other modules within the network fabric 478. This may be done by the network manager, the processing module of one or more of the bridge-routing modules, or the link manager of one or more of the bridge-routing modules. The method continues by enabling the selected alternative path 480. The method continues by updating the network topology database 482. For example, the selected network topology is now the active network topology and the previous topology is flagged as inactive.

Figure 22:
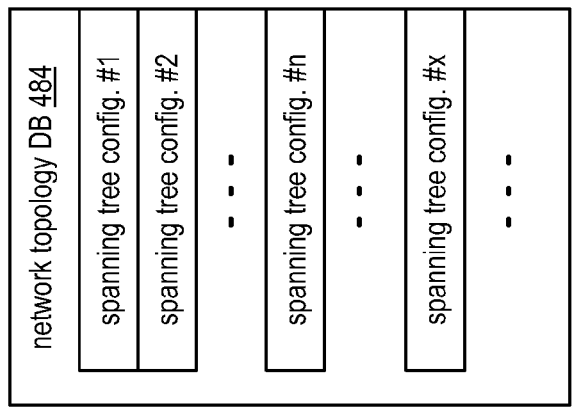
FIG. 22 is an example diagram of a network topology database in accordance with the present invention.

FIG. 22 is an example diagram of a network topology database 484 that includes a plurality of spanning tree configuration entries. A spanning tree configuration entry includes a mapping of interconnections between network nodes, switching modules, and bridge-routing modules of the vehicle communication network. Each configuration is predetermined to avoid loops, and it may be further predetermine to balance loading, reduce packet traffic, and/or allow for more concurrent (e.g., link aggregation, plural virtual LAN with plural spanning tree configurations) packet transmissions.

FIGS. 23-26 are examples of network fabric spanning tree configurations that may be stored in the network topology database. In each of the figures, the solid triple lines represent active links between the modules and the light dashed lines represent inactive links between the modules. In each of these configurations, loops are avoided. Note that the network fabric may include more or less switch modules 388, network node modules 390 and/or bridge-routing modules 386 than illustrated in the figures. Regardless of the number of modules within the network fabric, the network topologies can be predetermined to avoid loops and may further be predetermined for load balancing, reducing packet traffic, and/or for allowing more concurrent packet transmission.

Figure 27:
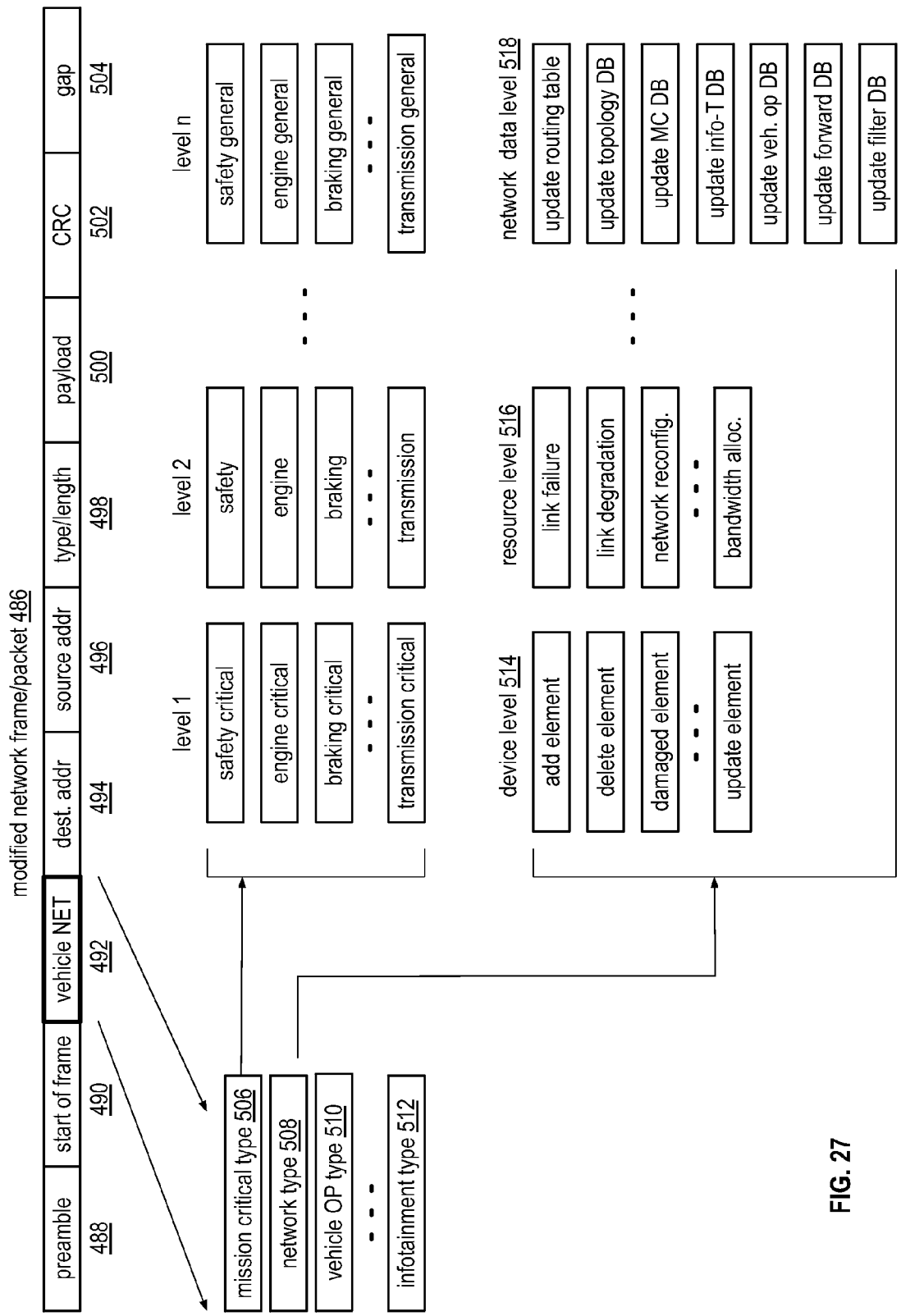
FIG. 27 is a diagram of an embodiment of a modified network frame/packet in accordance with the present invention.

FIG. 27 is a diagram of an embodiment of a modified network frame/packet 486 that includes a preamble field 488, a start of frame field 490, a vehicle network field 492, a destination address field 494, a source address field 496, a type/length field 498, a payload field 500, a cyclic redundancy check (CRC) field 502 (or frame check field), and it may further include a gap field 504. The preamble 488, start a frame 490, destination address 494, source address 496, type/length 498, payload 500, CRC 502, and gap fields 504 may be similarly formatted to one or more Ethernet protocols.

The vehicle network field 492 may include a variety of information to identify the content type of packet, priority level of the packet, and/or other network related matters. For instance, the vehicle network 492 field may include coding to identify a mission-critical type packet 506, a network type packet 508, a vehicle operation type packet 510, an information/entertainment type packet 512, and/or any other type of packet. The vehicle network field 492 may further include coding to identify sub-type information. For example, the mission-critical type packet 506 may include multiple levels of mission-critical sub-types. For instance, a first level of mission-critical packets are of the most important, a second level of mission-critical packets are of a next level of importance, etc.

As another example, a network type packet 508 may include sub types of device level packets 514, resource level packets 516, network data level packets 518, and/or any other type of network control and/or information packets. As a more specific example, the device level packets 514 may pertain to adding an element (e.g., module, component, device, etc.) to the network, deleting an element from the network, processing a damaged element of the network, updating an element of the network, etc.

A network node module and/or an associated switch module typically generate the content of the vehicle network field 492. For example, when a network node module has a packet to transmit, it may access one or more databases to determine its priority level, the type of network packet, etc. to generate the coding for the vehicle network field 492. Alternatively, the network node module may have the vehicle network field 492 information locally stored for insertion into the packets it produces. As another alternative, the network node module may generate a packet with the vehicle network field 492 blank (e.g., including null information) and the switching module determines the appropriate coding for the vehicle network field 492. The network node modules will be described in greater detail with reference to FIGS. 41-57 and the switching module will be described in greater detail with reference to FIGS. 33-40.

In an example of operation, a network node module (which includes a processing module and memory) communicates via the unified vehicle communication network in accordance with a global vehicle network communication protocol. For instance, the global vehicle network communication protocol (or global vehicle network protocol) prescribes the formatting of frames (or packets), prescribes frame transmission prioritization schemes (e.g., locally managed prioritization schemes, globally managed prioritization schemes), prescribes network management processing (e.g., resource management, network data type management, network configuration management, and/or device management); and/or other vehicle network operation parameters.

To communicate via the unified vehicle communication network (e.g., as discussed with reference to FIGS. 2-13), the processing module of the network node generates a header section of a frame to include a preamble, a vehicle network field, and routing information. The header section may further include a frame length field and a start of frame field.

The routing information includes a source address field and/or a destination address field. In one instance, the source and/or destination field include an Internet protocol (IP) address for the source and/or destination, respectively. For example, each device (e.g., as shown in or more of FIGS. 2-13) may have one or more IP addresses allocated to it. In another instance, the source and/or destination field include a physical device address of the source and/or destination, respectively. For example, each device of the vehicle system has a physical address assigned to it.

The vehicle network field includes information that identifies a type of the frame. For example, the vehicle network filed may include a content type of the frame (e.g., a mission-critical data type, a network data type, a vehicle operation data type, and/or an information/entertainment data type) and/or a priority level of the frame (e.g., top priority or subordinate levels of priority). Note that the processing module may generate the vehicle network field by retrieving frame information (e.g., type, priority, etc.) from the memory, which may store one or more of databases regarding priority level of the frame, type of the frame, coding of the frame.

The vehicle network field may further include one or more levels of sub-type information. For example, there may be several levels for safety (e.g., critical, general, etc.). Other examples are discussed above.

The processing module may alternatively generate the vehicle network field to include null information. In this instance, a module of the vehicle network fabric recognizes the null information and determines, on behalf of the device, the appropriate information for the vehicle network field and populates it accordingly.

The processing module continues generating the frame by generating a payload section. The payload section includes data payload and an integrity check field (e.g., CRC). Once the frame is generated, the processing module transmits it, via a vehicle network interface, to the unified vehicle communication network in accordance with a global vehicle network communication protocol.

Figure 28:
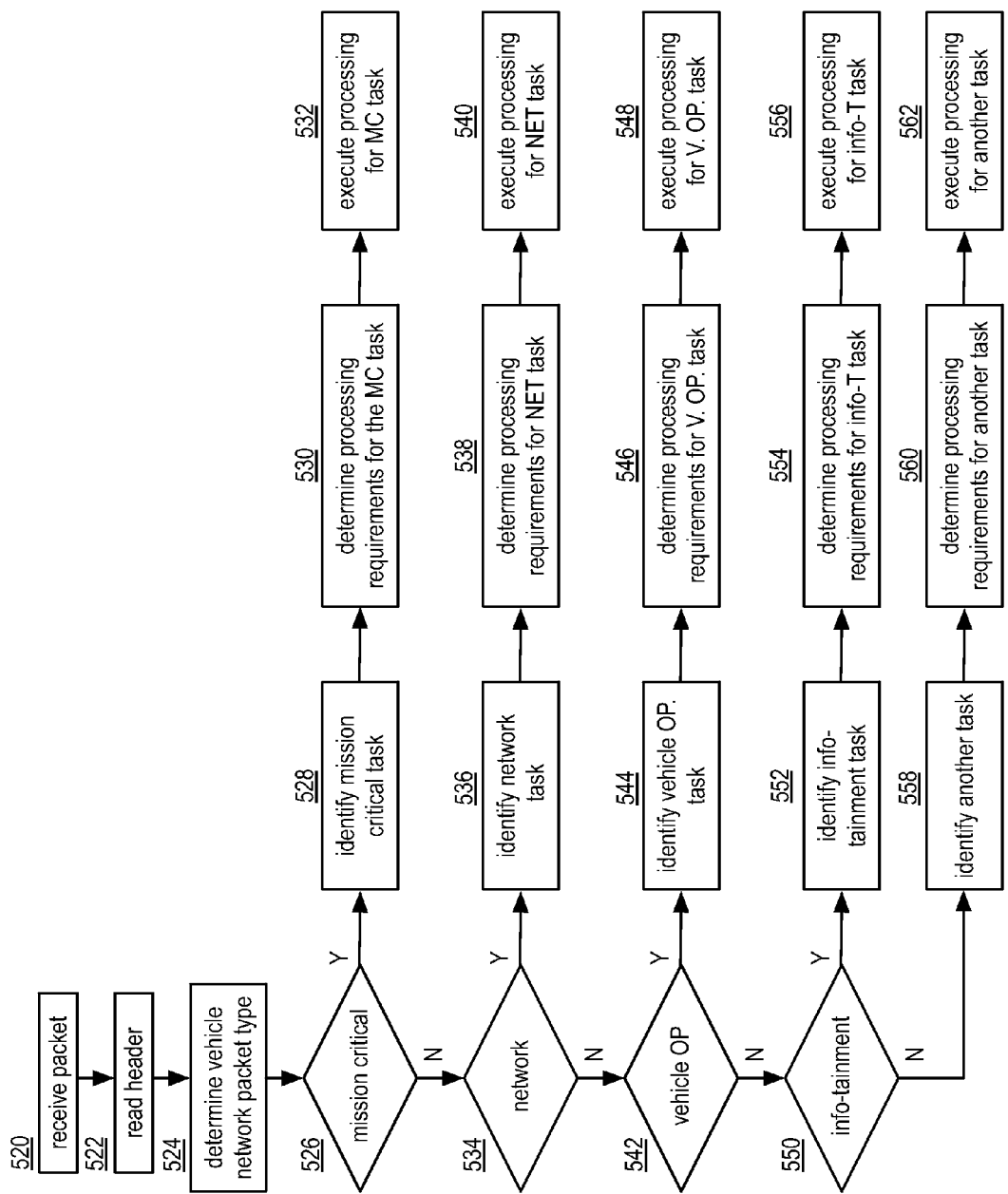
FIG. 28 is a logic diagram of an embodiment of a method for processing a packet in the vehicular communication network in accordance with the present invention.

FIG. 28 is a logic diagram of an embodiment of a method for processing a packet in the vehicular communication network by a bridge-routing module, a switch module, and/or other module of the network fabric in accordance with a global vehicle network communication protocol. A network management module of the vehicle communication network, which includes a network interface, memory, and a processing module, manages the global vehicle network communication protocol. For example, managing the global vehicle network communication protocol includes instituting a content-based network packet processing protocol and managing the vehicle communication network to support the network packet processing protocol. The content-based network packet processing protocol includes determining and classifying content type of a packet (e.g., mission critical content, network data content, vehicle operation content, and/or infotainment content), determining a processing requirement of the packet, and prioritizing execution of the processing requirement based on the content type.

As another example, the network management module manages packet routing within the vehicle communication network based on a content-based priority scheme and a configuration of the network fabric. Further, the network management module selects the configuration of the network fabric from one of a plurality of predetermined configurations of the network fabric based on vehicle communication network information and manages the vehicle communication network information.

The method begins by receiving a packet 520 and reading the header information of the packet 522. In particular, reading the vehicle network field to determine the type of vehicle network packet 524. The method continues by determining whether the type of packet is a mission critical packet 526. If yes, the method continues by identifying a mission-critical task (e.g., braking, engine control, safety actuation (airbag deployment), transmission control, etc.) 528. The method continues by determining processing requirements for the mission-critical task 530, which will be discussed in greater detail with reference to FIGS. 29-31. The method continues by executing the processing requirements for the mission-critical task 532.

If the vehicle network packet type is not mission-critical, the method continues by determining whether the packet type is network related 534. If yes, the method continues by identifying the particular network task 536 (e.g., update one or more databases, change network configuration, change prioritization, change mutation protocol, etc.). The method continues by determining processing requirements for the particular network task 538, which we describe in greater detail with reference to FIG. 32. The method continues by executing the processing requirements for the network task 540.

If the vehicle network packet type is not network related, the method continues by determining whether the packet type is vehicle operation 542. If yes, the method continues by identifying the particular vehicle operation task 544 (e.g., adjust climates, adjust seat, headlight operation, engine diagnostics, etc.). The method continues by determining processing requirements for the vehicle operation task, which may include forward in the packet, routing the packet, and/or updating tables and/or databases regarding the packet 546. The method continues by executing the processing requirements for the vehicle operation task 548.

If the vehicle network packet type is not vehicle operation, the method continues by determining whether the packet is an information/entertainment packet 550. If yes, the method continues by identifying the particular information/entertainment task 552 (e.g., display audio/video data, store audio/video data, process graphics, etc.). The method continues by determining processing requirements for the particular information/entertainment task, which may include forwarding the packet, routing the packet, and/or updating tables and/or databases regarding the packet 554. The method continues by executing the processing requirements for the information/entertainment task 556.

If the vehicle network packet type is not information/entertainment, the method continues by identifying another task 558. The processing continues by determining processing requirements for the other task 560. The method the method continues by executing the processing requirements for the other task 562.

Figure 29:
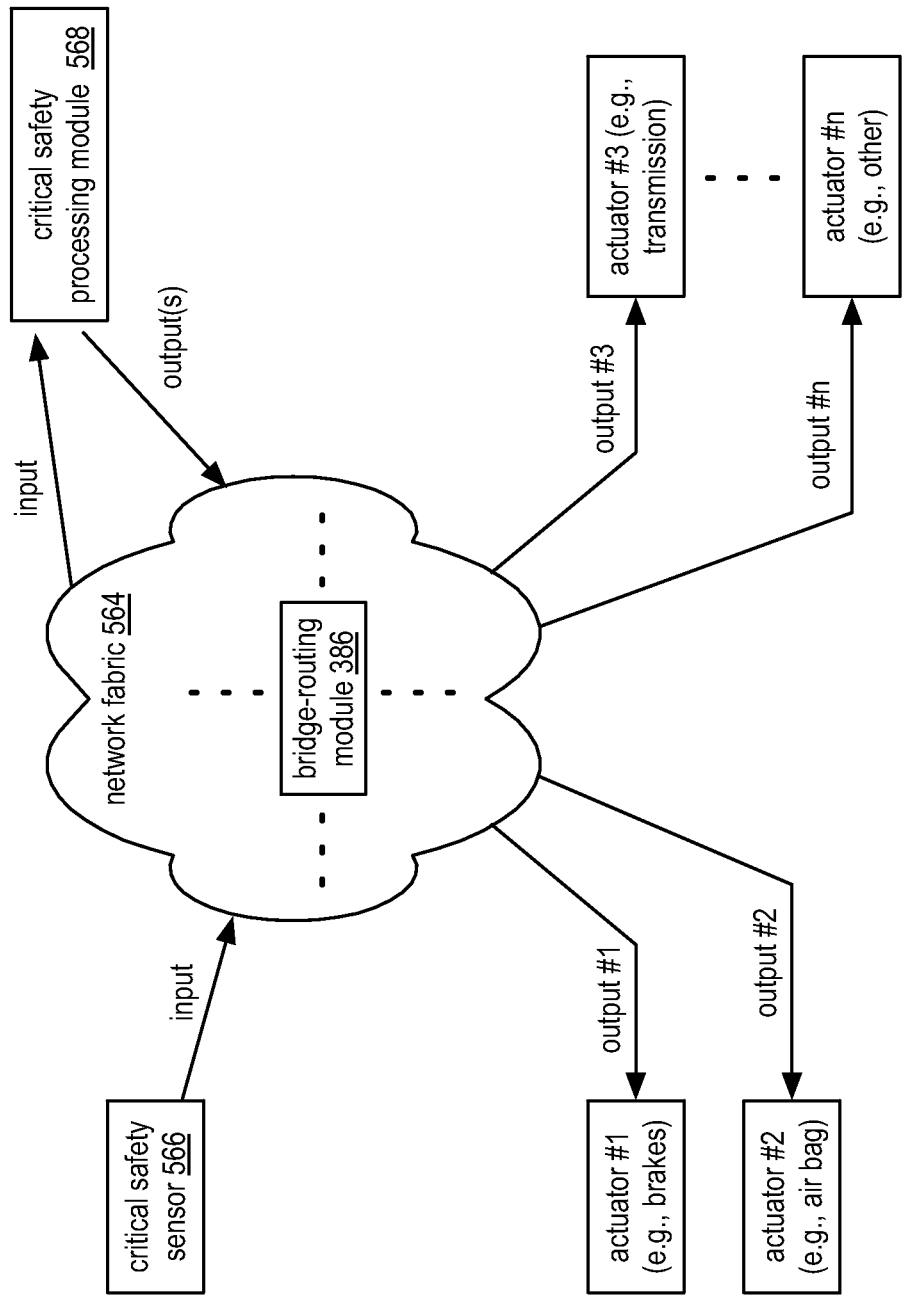
FIG. 29 is an example diagram of processing a mission critical packet within a vehicle communication network in accordance with the present invention.

FIG. 29 is an example diagram of processing a mission critical packet within a vehicle communication network. In this example, a critical safety sensor 566 (e.g., collision detection, driver sensor, etc.) is coupled to the network fabric 564 and provides and input packet to the network fabric 564. A bridge-routing module 386 within the network fabric 564 receives the input packet and performs the methods of FIGS. 28 and 30 to determine that the input packet is a mission-critical packet. In addition, the bridge-routing module 386 determines the destination of the mission-critical packet and routes it thereto.

In this example, the destination of the mission-critical packet is a critical safety processing module 568. Upon receiving the mission-critical packet, the critical safety processing module 568 performs a function to generate one or more output packets. In this example, the critical safety processing module 568 is generating multiple output packets, which are provided to the network fabric 564.

Figure 31:
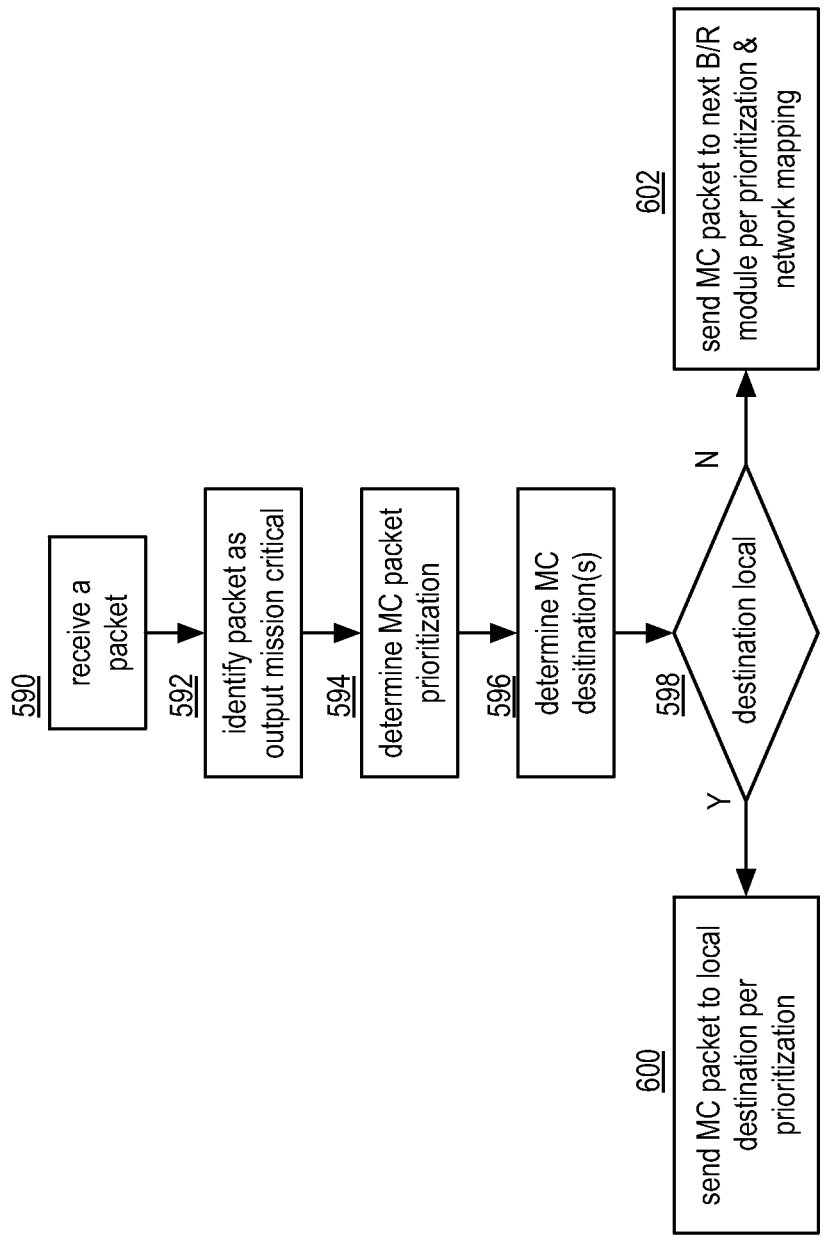
FIG. 31 is a logic diagram of another embodiment of a method for processing a mission critical packet in the vehicular communication network in accordance with the present invention.

The bridge-routing module 386 within the network fabric 564 receives the output packets and processes them in accordance with the methods of FIGS. 28 and 31 to determine their destinations. Based on this processing, the bridge-routing module 386 routes the packets to the corresponding destinations. The destinations may be a plurality of actuators such as a brake actuator, an airbag actuator, a transmission adjust actuator, and/or any other actuator that performs a safety function.

Figure 30:
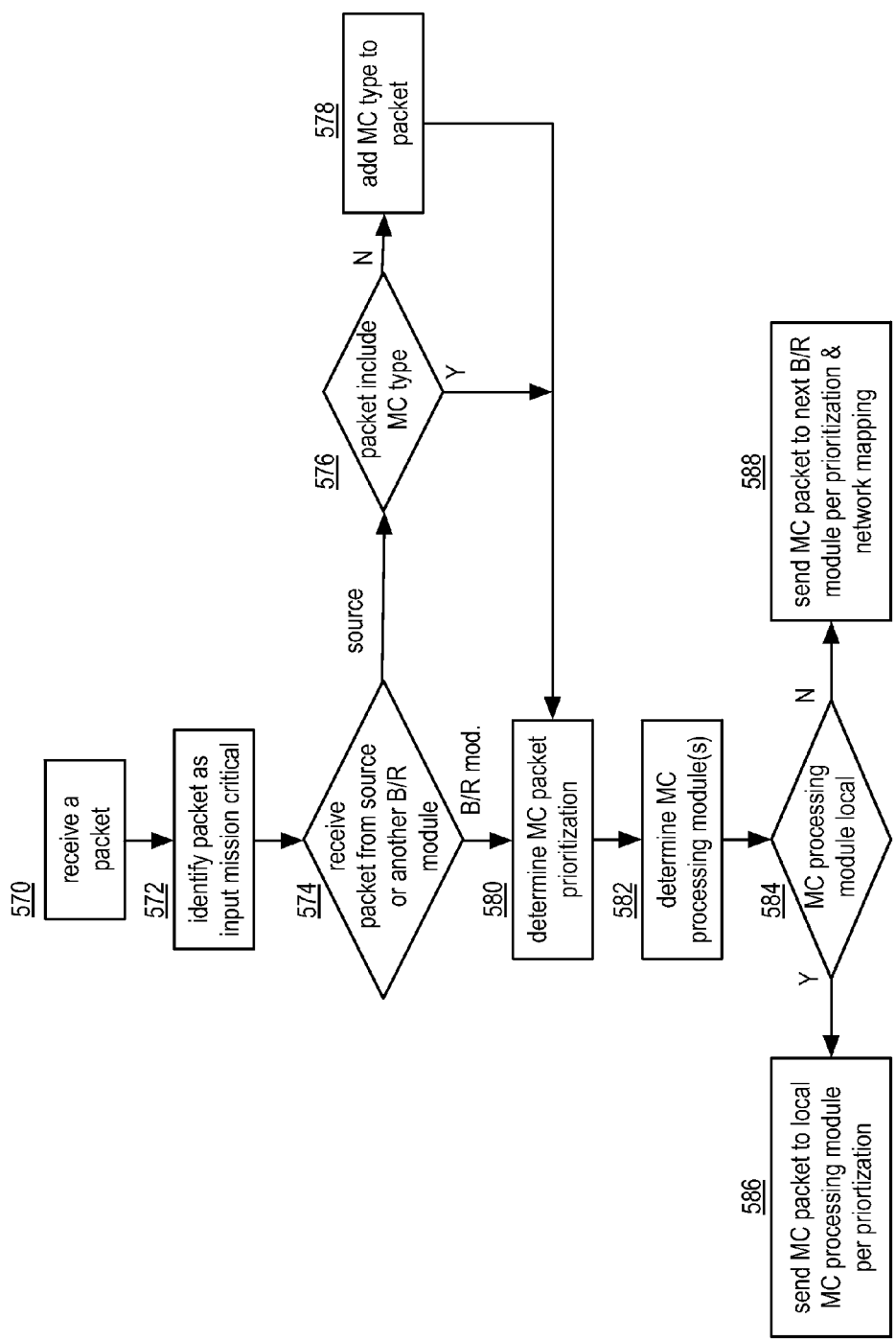
FIG. 30 is a logic diagram of an embodiment of a method for processing a mission critical packet in the vehicular communication network in accordance with the present invention.

FIG. 30 is a logic diagram of an embodiment of a method for processing a mission critical packet in the vehicular communication network. The method begins by receiving a packet 570 and identifying it as an input mission-critical packet 572. This may be done by interpreting the identity of the source, the identity of the destination, and/or interpreting the vehicle network field. For example, if the source is a collision detection sensor, packets that it generates are, by default, determined to be mission-critical.

The method continues by determining whether the received packet is from the source of the packet or from another bridge-routing module 574. If the packet is from the source, the method continues by determining whether the packet includes the mission critical type identifier in the vehicle network field of the packet 576. If not, the bridge-routing module adds the mission-critical type identifier to the packet, which may be done by a database lookup process 578.

With the mission-critical type identifier in the packet, the method continues by determining the mission-critical packet prioritization 580. This can be done by accessing a prioritization database based on the source, destination the type of mission-critical task, or a combination thereof. The level of prioritization for the mission-critical packet may be an interrupt level (i.e., interrupt the transmission of the current packet for the mission-critical packet), placing the mission-critical packet at the front of a first in first out queue, transmitting the packets via dedicated bandwidth to another bridge-routing module and/or to a switch module, or broadcasting the packet over the network, which may be done in an override manner or when the network is available.

The method continues by determining the mission-critical processing module destination, or destinations 582. The method continues by determining whether one or more of the mission-critical processing modules are local 584 (i.e., couple to the bridge-routing module or to the switch module executing this function). If yes, the mission-critical packets are sent to the local mission-critical processing module(s) in accordance with the determined prioritization 586. If the mission-critical processing modules are not local, the mission-critical packets are sent to the next bridge-routing module or switch module in accordance with the determine prioritization and known network mapping 588.

FIG. 31 is a logic diagram of another embodiment of a method for processing a mission critical packet in the vehicular communication network. The method begins by receiving a packet 590 and identifying it as an output mission-critical packet 592. This may be done by interpreting the vehicle network field of the packet, accessing a database based on the source and/or destination of the packet, and/or other factors.

The method continues by determining the mission-critical packet prioritization 594. Such prioritization may include interrupting transmission of a current packet, placing the packet at the top of an ingress queue and/or egress queue, using dedicated bandwidth of the vehicle communication network, and/or transmitting the packet via network broadcast that overrides a current transmission or when the network becomes available.

The method continues by determining whether one or more of the destinations are local 598. For each local destination, the bridge-routing module sends the mission-critical packet to the local destination per the prioritization 600. For each non-local destination, the bridge-routing module sends the mission-critical packet to the next bridge-routing module per the prioritization and the network mapping, which may be a current version of the network or a prioritization mapping of the network 602. For instance, the network mapping may have one network topology configuration and the prioritization mapping may have a different network topology that optimizes communication between mission-critical devices.

Figure 32:
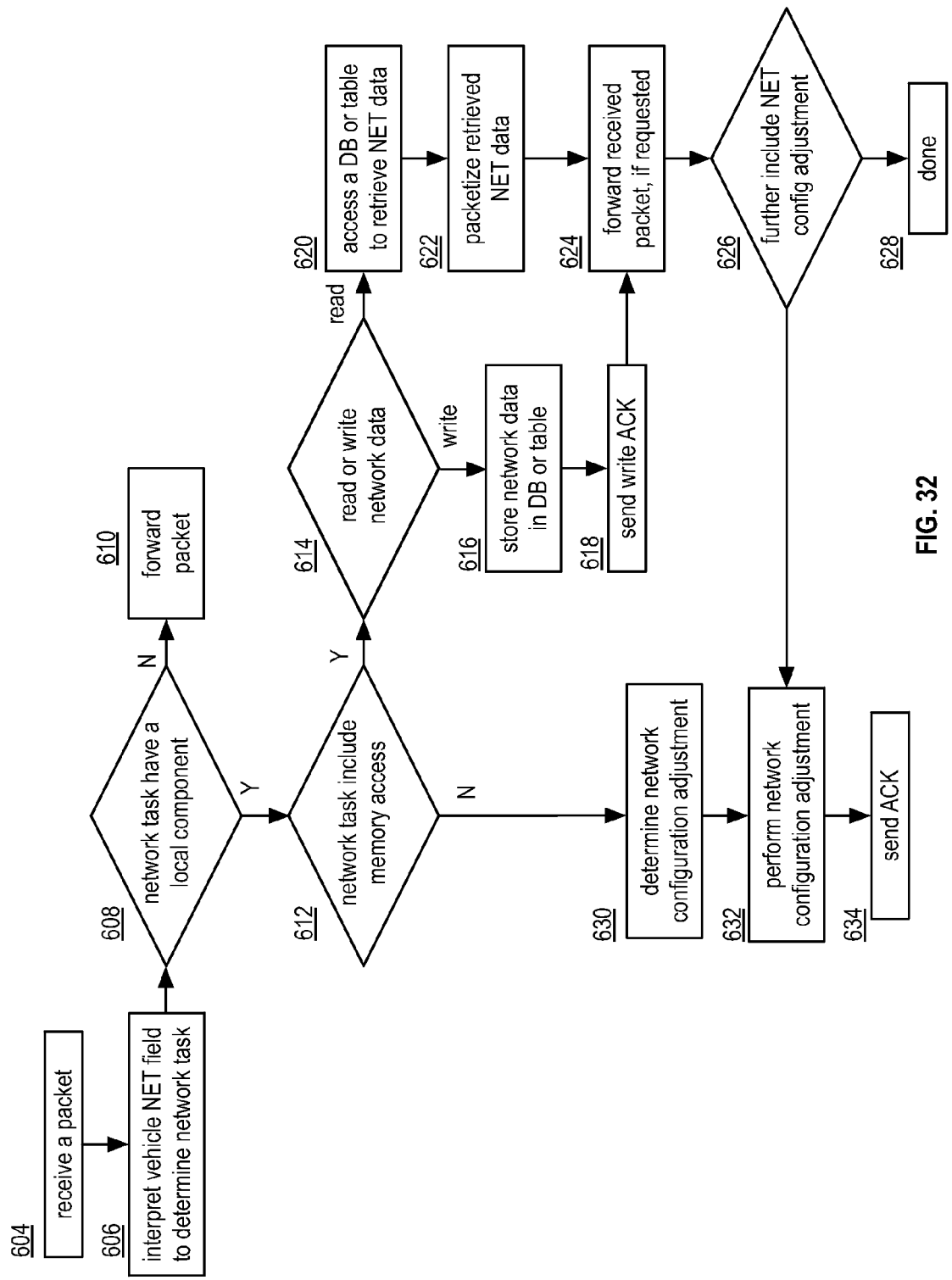
FIG. 32 is a logic diagram of another embodiment of a method for processing a packet in the vehicular communication network in accordance with the present invention.

FIG. 32 is a logic diagram of another embodiment of a method for processing a packet in the vehicular communication network. The method begins by receiving a packet 604 and interpreting it to determine that it is a network data type packet 606. For instance, the bridge-routing module (or switch module) interprets the vehicle network field of the packet to identify the nature of the packet. The method continues by determining whether the network task has a local component 608. In other words, does the packet contain a task to be performed by the current bridge-routing module (or switch module). If not, the bridge-routing module forwards packet to the next bridge-routing module or to a switch module 610.

If the network task has a local component, the method continues by determining whether the network task includes a memory access request 612. If yes, the method continues by determining whether the network task is a read request or a write request 614. For a write request, the method continues by storing network data in a database or table 616. For example, the network packet may include network data for updating a network topology database, a forwarding database, a routing table, a filtering table, a mission-critical database, etc. Having stored the data, the method continues by sending a write acknowledgment 618.

If the network task is a read network data request, the method continues by accessing a database or table to retrieve the requested network data 620. The method continues by packetizing the retrieved network data 622 and forwarding the packet per the request 624. The method continues by determining whether the network task further includes a network configuration adjustment 626. If not, the method is finished for this packet 628.

If the network task does not include a memory access request, the method continues by determining a network configuration adjustment 630. The network configuration adjustment may be to add a device to the network, delete a device from the network, process a damaged device, update a device, respond to a link failure, respond to degeneration of a link, to establish or change a communication protocol between bridge-routing modules, to adjust frequency allocation, to adjust bandwidth allocation, to change network configuration, change resource allocation, adjust traffic routing, adjust load-balancing, activate redundant link or path upon any failures, etc. The method continues by performing the network configuration adjustment 632 and sending an acknowledgement of its completion 634.

Figure 33:
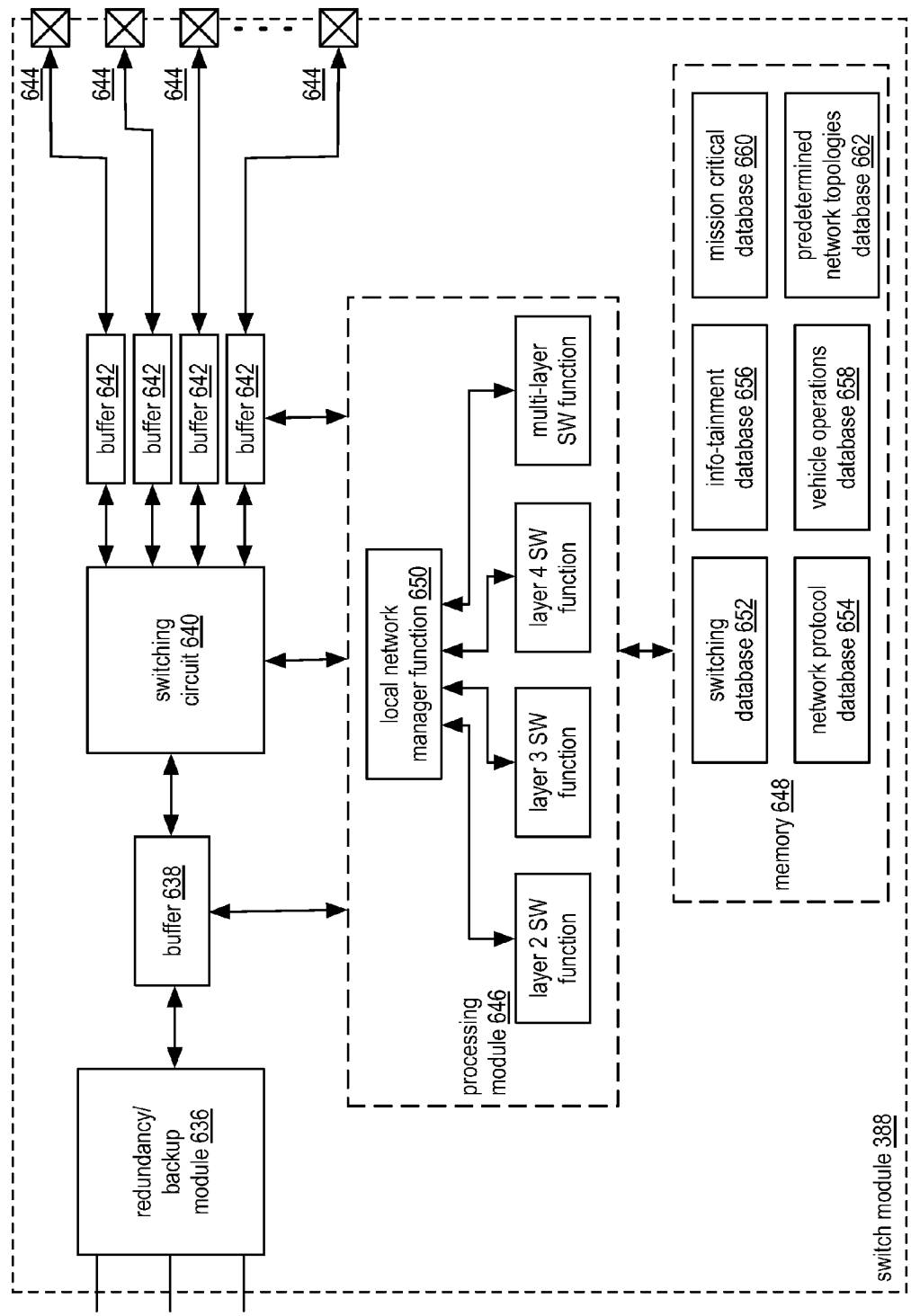
FIG. 33 is a schematic block diagram of an embodiment of a switch module in accordance with the present invention.

FIG. 33 is a schematic block diagram of an embodiment of a switch module that includes a redundancy/backup module 636, a network buffer 638, a switching circuit 640, a plurality of port buffers 642, a plurality of ports 644, a processing module 646, and memory. The processing module 648 may be configured to implement a local network management function 650, a layer 2 switching function, a layer 3 switching function, a layer 4 switching function, and/or a multilayer switching function. The memory 648 stores one or more of a switching database 653, a network protocol database 654, an information/entertainment database 656, a vehicle operations database 658, a mission-critical database 660, and a predetermined network topology database 662.

Each of the ports 644 is coupled to a network node module and the redundancy/backup module 636 is coupled to a bridge-routing module. The switch module 388 may include more than one redundancy/backup module 636 for connectivity to more than one bridge-routing modules and/or to another switch module.

In an example of operation, one of the ports 644 receives a packet including a particular type of content, from its corresponding network node module. The packet is buffered via the corresponding port buffer 642 and is interpreted, e.g. to determine the packet content type, by the local network manager function 650 as will be discussed in greater detail with reference to figure is 35. The processing module 646 evokes one of the switching functions (e.g., layer 2, layer 3, layer 4, or multi-layer) to control the switching and processing of the packet. The selection of the particular switching function is dependent on the current network topology and/or the current network protocol. For instance, if packets are routed using MAC addresses, the processing module 646 may implement a layer 2 switching function.

The network buffer 638 may include one or more queues to temporarily store the packet. The processing module 646 controls the organization and management of the queues based on data contained in one or more of the databases stored in memory 648. The queues will be described in greater detail with reference to FIGS. 36-40. In accordance with the organization and management of the queues, packets are outputted to be redundancy/backup module 636 for transmission to a bridge-routing module or to another switch module. The redundancy/backup module 636 functions similarly to the redundancy/backup module of a bridge-routing module.

In another example of operation, the redundancy/backup module 636 receives a packet from a bridge-routing module or another switch module. Under the control of the processing module 646, the packet is placed in one of the network buffer's queues. When the packet reaches the top of its queue, it is provided to one of the port buffers 642 via the switching circuit 388 and subsequently provided to the corresponding port for transmission to a network node module.

Figure 34:
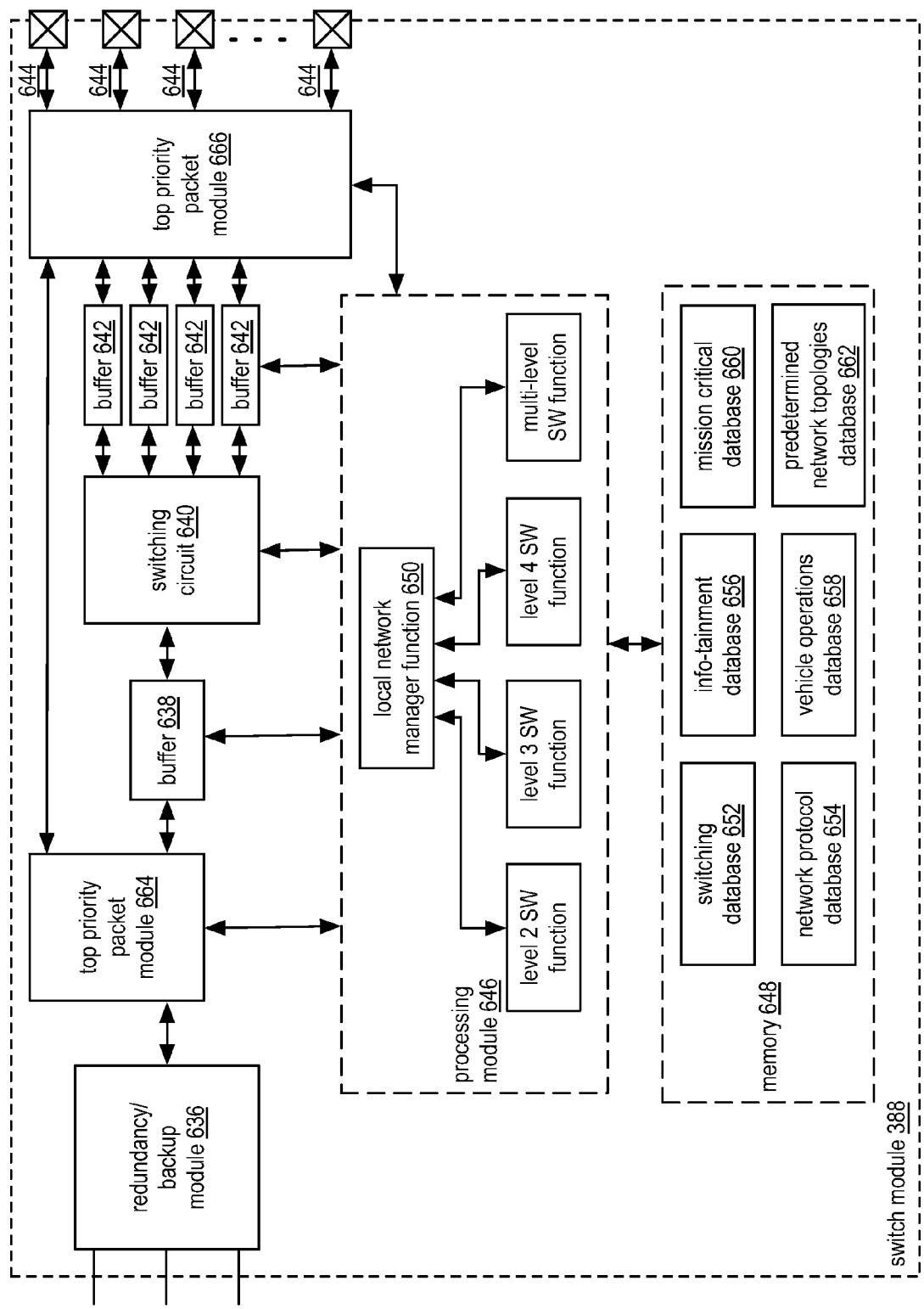
FIG. 34 is a schematic block diagram of another embodiment of a switch module in accordance with the present invention.

FIG. 34 is a schematic block diagram of another embodiment of a switch module 388 that includes a redundancy/backup module 636, a first top priority packet module 664, a network buffer 638, a switching circuit 640, a plurality of port buffers 642, a second top priority packet module 666, a plurality of ports 644, a processing module 646, and memory 648. The processing module 646 may be configured to implement a local network management function 650, a layer 2 switching function, a layer 3 switching function, a layer 4 switching function, and/or a multilayer switching function. The memory 648 stores one or more of a switching database 652, a network protocol database 654, an information/entertainment database 656, a vehicle operations database 658, a mission-critical database 660, and a predetermined network topology database 662.

Each of the ports 644 is coupled to a network node module and the redundancy/backup module 636 is coupled to a bridge-routing module. The switch module 388 may include more than one redundancy/backup module 636 for connectivity to more than one bridge-routing module and/or to another switch module.

In an example of operation, when the redundancy/backup module 636 receives a packet, the top priority packet module 664 interprets the packet content type to determine whether it is a top priority packet. Such an interpretation may be based on the content of the vehicle network field of the packet, the identity of the source, etc. If the packet is a top priority packet, it is routed to the other top priority packet module 666, which provides the top priority packet to the appropriate port for transmission to the corresponding network node module.

Similarly, when a port 644 provides a packet to the second top priority packet module 666, it interprets the packet, including the packet content type, to determine whether it is a top priority packet. If so, it forwards the packet to the other top priority packet module 664, which provides it to the redundancy/backup module 636 for immediate (e.g., interrupt) or near-immediate transmission (e.g., next available transmission slot) into the network fabric. If a packet is not a top priority packet, the switch module 388 processes it as previously discussed with reference to FIG. 33.

Figure 35:
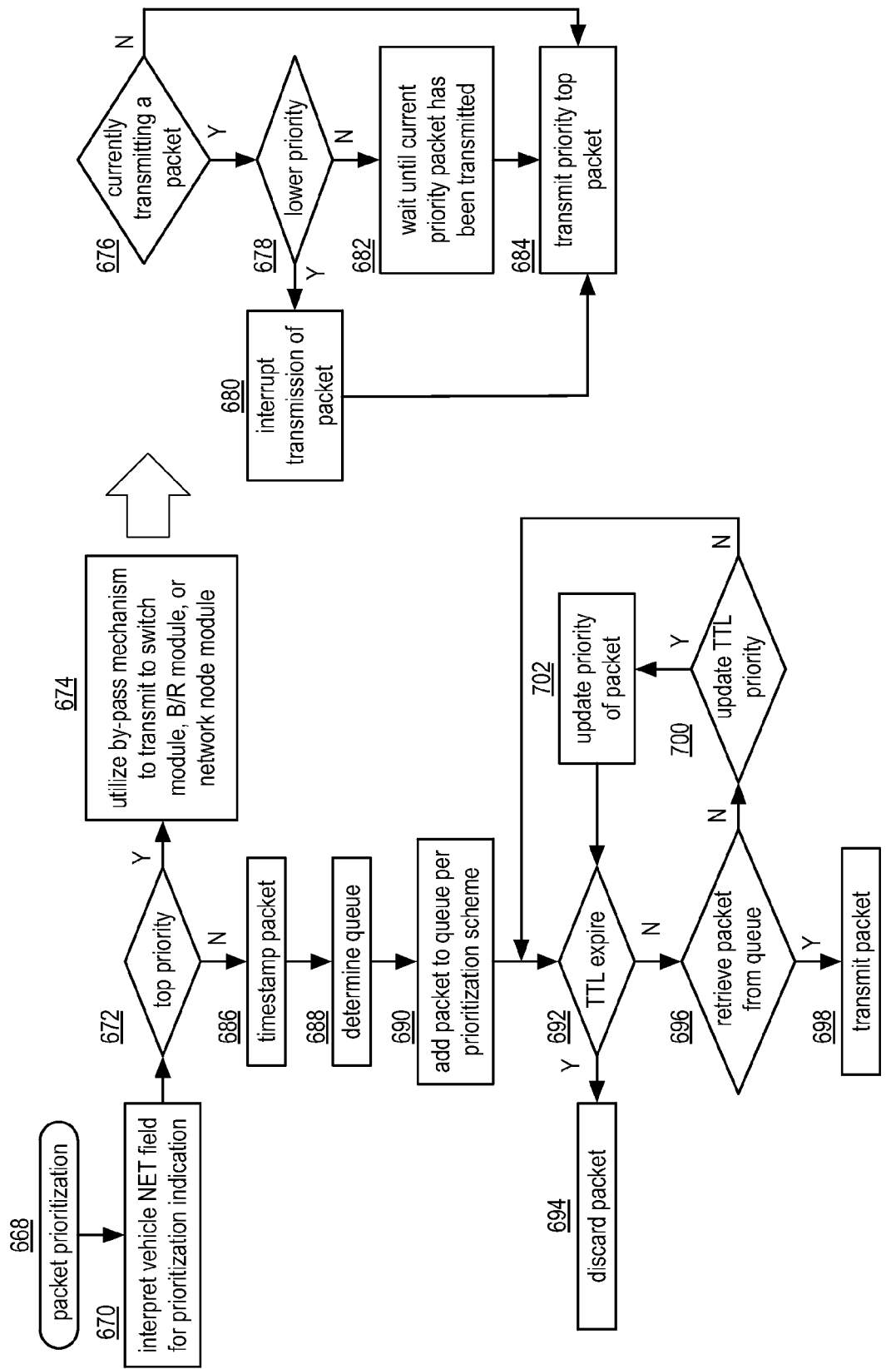
FIG. 35 is a logic diagram of an embodiment of a method for processing a packet in the vehicular communication network in accordance with the present invention.

FIG. 35 is a logic diagram of an embodiment of a method for processing a prioritized packet in the vehicular communication network (i.e., a local network manager function) that may be executed by a network node module, a switching module, and/or a bridge-routing module. The method begins by determining packet prioritization 668 of a packet by interpreting the vehicle network field of the packet 670. The method continues by determining whether the packet is a top priority packet 672 (e.g., to/from a critical safety device, etc.). If yes, the method continues by using the top priority by-pass mechanism within the switch module and/or bridge-routing module to transmit the top priority packet to a switch module, a bridge-routing module, or a network node module 674.

The top priority by-pass mechanism includes determining whether the switch or bridge-routing module is currently transmitted another packet or whether the network fabric is currently transmitted a packet. If not, the top priority is transmitted. If there is a packet currently being transmitted 676, the method continues by determining whether the current packet is of a lower priority 678. If yes (i.e., the top priority packet is of a higher priority), the transmission of the current packet is interrupted for transmission of the top priority packet 680. If not (i.e., the current packet is of equal or higher priority), the method continues by waiting until the current packet has been transmitted 682 and then transmitting the top priority packet 684.

If the packet is not a top priority packet, the method continues by time stamping the packet, which may be done by the network node module, a switch module, and/or a bridge-module 686. The method continues by determining where in a queue (e.g., a single ingress or egress queue or one of a plurality ingress or egress queues) to place the packet 688. The method continues by adding the packet to the queue based on its prioritization and time stamp 690.

The method continues by determining whether the time-to-live (TTL) (e.g., a time duration from the time stamp) for the packet has expired 692. If yes, the packet is discarded 694. If not, the method continues by determining whether the packet is to be retrieved from the queue 696. If the packet is to be retrieved from the queue (e.g., it is in a first position of a first-in-first-out queue), it is retrieved and transmitted (e.g., within the switch or bridge-routing module or to another switch or bridge-routing module) 698.

If the packet is not yet being retrieved, the method continues by determining whether to update the TTL priority of the packet (e.g., the expiration time of the packet is getting close) 700. If not, the method repeats by determining if the TTL has expired. If the TTL priority is to be updated, it is updated 702 (e.g., given a higher priority) and the method continues as shown.

Figure 36:
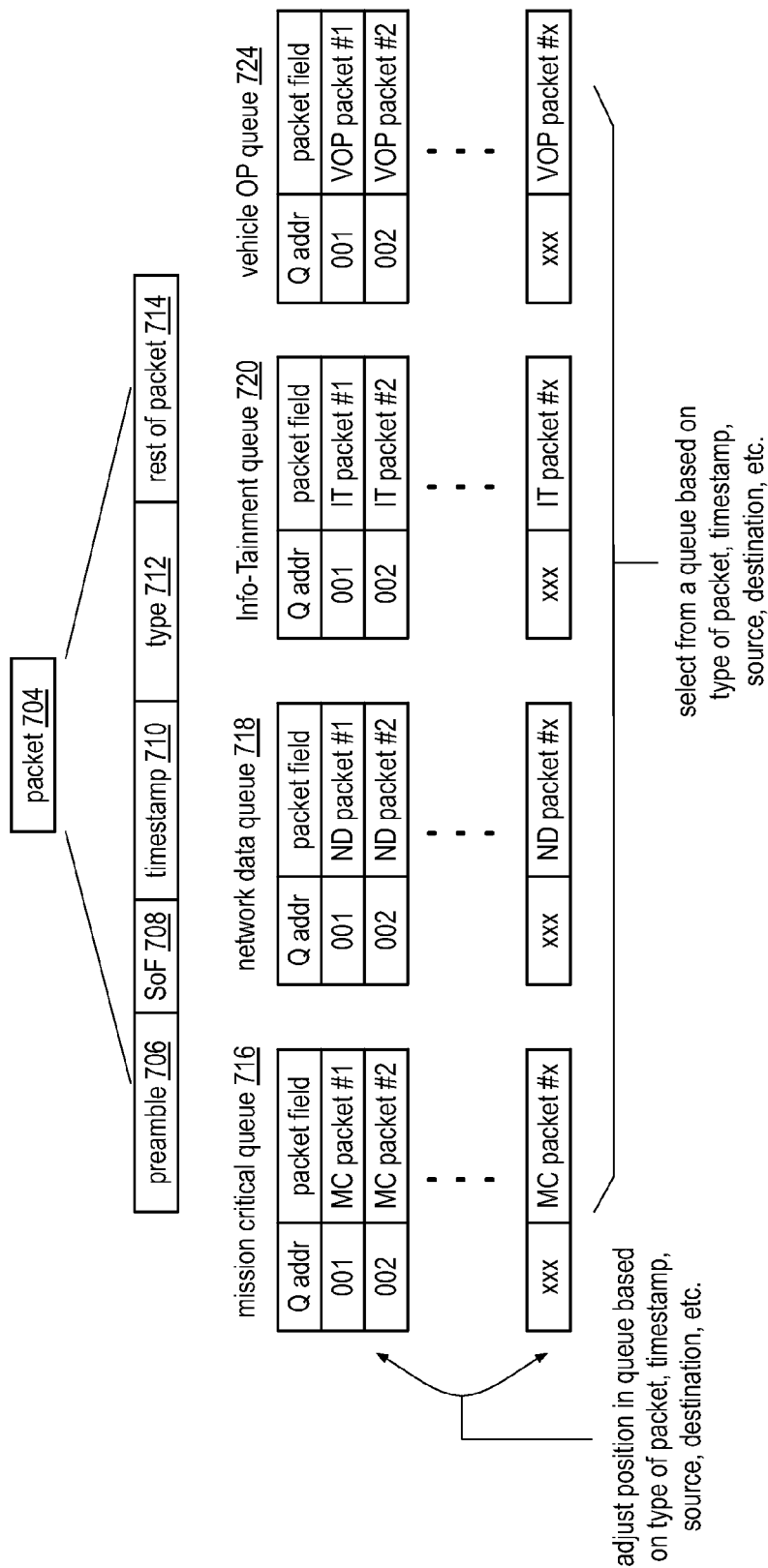
FIG. 36 is an example diagram of packet queues within a vehicle communication network in accordance with the present invention.

FIG. 36 is an example diagram of a packet 704 and packet queues within a vehicle communication network. The packet 704 includes the preamble 706, start of frame 708, timestamp 710, packet type 712, and of the remainder of the packet 714. Note that the timestamp 710 and packet type 712 are contained within the vehicle network field of the packet 704. The queues may be separate based on the packet type, or other factor. For example, the queues may include a mission-critical queue 716, a network data queue 718, and information/entertainment queue 720, and a vehicle operation queue 714.

As a packet 704 is received, its type is determined, which then determines the queue it will be placed in. Having identified the queue, the packet's position within the queue is determined based on its prioritization. The prioritization of a packet 704 may be based on the source of the packet, the destination of the packet, the timestamp 710, the nature of the packet, etc. For example, if the packet is a mission-critical packet, it will be placed within the mission critical queue 716. Within the mission-critical queue 716, the packet prioritization level will be compared with the mission-critical packets already in the mission-critical queue 716. Based on this comparison, the new mission-critical packet will be placed in the queue above lower priority packets and below higher parity packets.

When a packet 704 is to be transmitted to another location within the module or to the network fabric, the packet 704 may be selected from any one of the queues based on a prioritization scheme. The prioritization scheme takes into account the type of packet, the source of the packet, the destination of the packet, its timestamp 710, etc. For example, mission-critical packets may take priority over any other type of packet 704. Thus, other packets will not be transmitted unless the mission-critical queue 716 is empty. As another example, the timestamp 710 of the packet 704 may drive the prioritization scheme (other than for top priority packets) such that any type of packet may have priority for transmission. As yet another example, each type of packet 704 may be allocated a certain amount of bandwidth within the network fabric such that each type of packet will be transmitted within the network fabric based on individual priority schemes for the packet type. In this latter scheme, bandwidth may be dynamically allocated based on queue size, packet type, etc.

FIGS. 37-40 are example diagrams of packet queue processing within a vehicle communication network. FIG. 37 illustrates a single packet queue that may be contained within a switch module and/or a bridge-routing module. The packet queue includes a queue address and a packet field identifier 726. The queue address indicates the packets prioritization within the queue. For example, for a first in first out queue, the packet at address 001 is of the highest priority (e.g., the next packet to be transmitted) and the packet at the bottom of the queue has the lowest priority.

FIG. 38 illustrates the packet queue of FIG. 37 at time tx+1. At this time, the first two packets have been transmitted (e.g., MC packets #1 and 2). In the time frame from tx to tx+1, no new packets were added to the queue.

FIG. 39 illustrates the packet queue at time tx+2. At this time, the next first packet (e.g., ND packet #1) has been transmitted and a new packet (e.g., IT packet #y) has been added to the bottom of the queue. In addition, the prioritization of the packet at queue address x−2 (e.g., ND packet #x) is reprioritized within the queue to queue address #004.

FIG. 40 illustrates the packet queue at time tx+3. At this time, the next first packet (e.g., MC packet #x) has been transmitted and a new packet (e.g., MC packet #y) has been added to the middle of the queue based on its prioritization with respect to the other packets in the queue.

Figure 41:
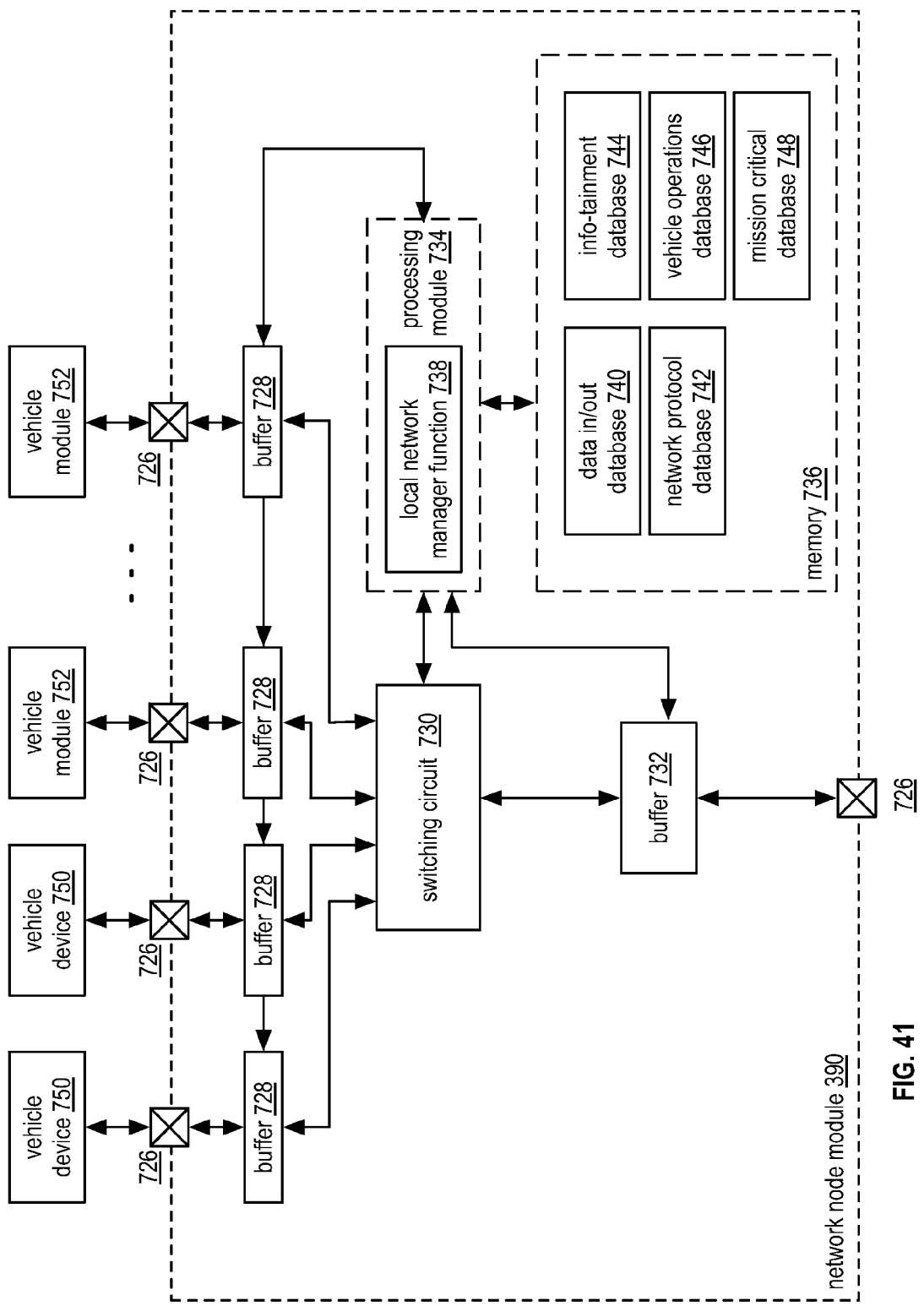
FIG. 41 is a schematic block diagram of an embodiment of a network node module in accordance with the present invention.

FIG. 41 is a schematic block diagram of an embodiment of a network node module 390 that includes a plurality of ports 726, a plurality of device buffers 728, a switching circuit 730, a network buffer 732, a processing module 734, and memory 736. The processing module 734 implements a local management function 738 (which includes a locally managed prioritization scheme). The memory 736 includes one or more databases for data input/output 740, network protocol 742, information-entertainment 744, vehicle operations 746, and/or mission-critical data 748.

Each of the ports 726 is coupled to a vehicle device 750 or vehicle module 752 and a corresponding device buffer 728. A vehicle device 750 may be any one of the modules or components illustrated in FIGS. 6-11. For example, a vehicle device 750 may be a sensor, and actuator, electronic control unit, the user input, a user output, a communication device, etc. A vehicle module 752 includes one or more vehicle devices 750.

In an example of operation, a vehicle device 750 or vehicle module 752 generates an outgoing device packet (or frame) for transmission via the network fabric. In this instance, the vehicle device 750 provides the packet via a port 726 to its corresponding device buffer 728. The buffer 728 may include an egress queue for temporarily storing the outgoing device packets and an ingress queue for temporarily storing incoming network packets. The local network management function 738 manages the inputting and outputting of packets in the buffer (e.g., a queue) based on a prioritization scheme as previously discussed (i.e., performs the local portion of the global vehicle network communication protocol). In particular, the processing module interprets the outgoing device packets and/or the incoming network packets to determine types of packets and then determines the locally managed prioritization scheme based on the types of packets (e.g., mission critical packets, network protocol packets, vehicle operation packets, and/or information-entertainment packets).

For example, the processing module may interpret a packet by interpreting a vehicle network field of the packet to identify the type of packet. As another example, the processing module may interpret a packet by identifying a source of the outgoing device packets, and, based on the source, determine the type of packet. As yet another example, the processing module may interpret a packet by identifying a destination of the outgoing device packet and, based on the destination, determine the type of packet. As a further example, the processing module may interpret a packet by identifying a source of the incoming network packet and, based on the source, determine the type of packet. As a still further example, the processing module may interpret a packet by identifying a destination of the incoming network packet and, based on the destination, determine the type of the packet.

The processing module may further determine the locally managed prioritization scheme by accessing one or more databases based on the types of packets. The databases include a data input/output database, a network protocol database, an information-entertainment database, a vehicle operations database, and/or a mission critical database.

Based on the prioritization scheme, the local network management function 738 enables the switching circuit 730 to transfer an outgoing device packet from one of the plurality of device buffers 728 to the network buffer 732 by selectively coupling the device buffer to the network buffer. The network buffer 732 may also include an ingress queue and an egress queue. In this example, the outgoing packet would be placed in the egress queue. The local network management function 738 manages the queues of the network buffer 732 based on the prioritization scheme. As such, the packet generated by the vehicle device 750 in this example will be outputted to the network fabric in accordance with the prioritization scheme.

For an incoming packet, the network buffer 732 temporarily stores it in an ingress queue under the control of the local network management function. When the incoming packet reaches the top of the ingress queue of the network buffer 732, the local network management function 738 enables the switching circuit 730 to provide it to the corresponding device buffer 728 of the destination vehicle device 750. The corresponding buffer 728 stores it in its egress queue and subsequently provides it to the vehicle device 750 in accordance with the prioritization scheme.

In another example of operation, a vehicle device 750 may utilize a particular communication protocol (e.g., CAN, Flex Ray, etc.), which the local network manager function 738 translates into the network protocol. For example, the local network manager function may convert the packet of the vehicle device protocol into a network protocol packet. Alternatively, the local network management function 738 may encapsulate the packet of the vehicle device 750 into a global vehicle network protocol packet.

Figure 42:
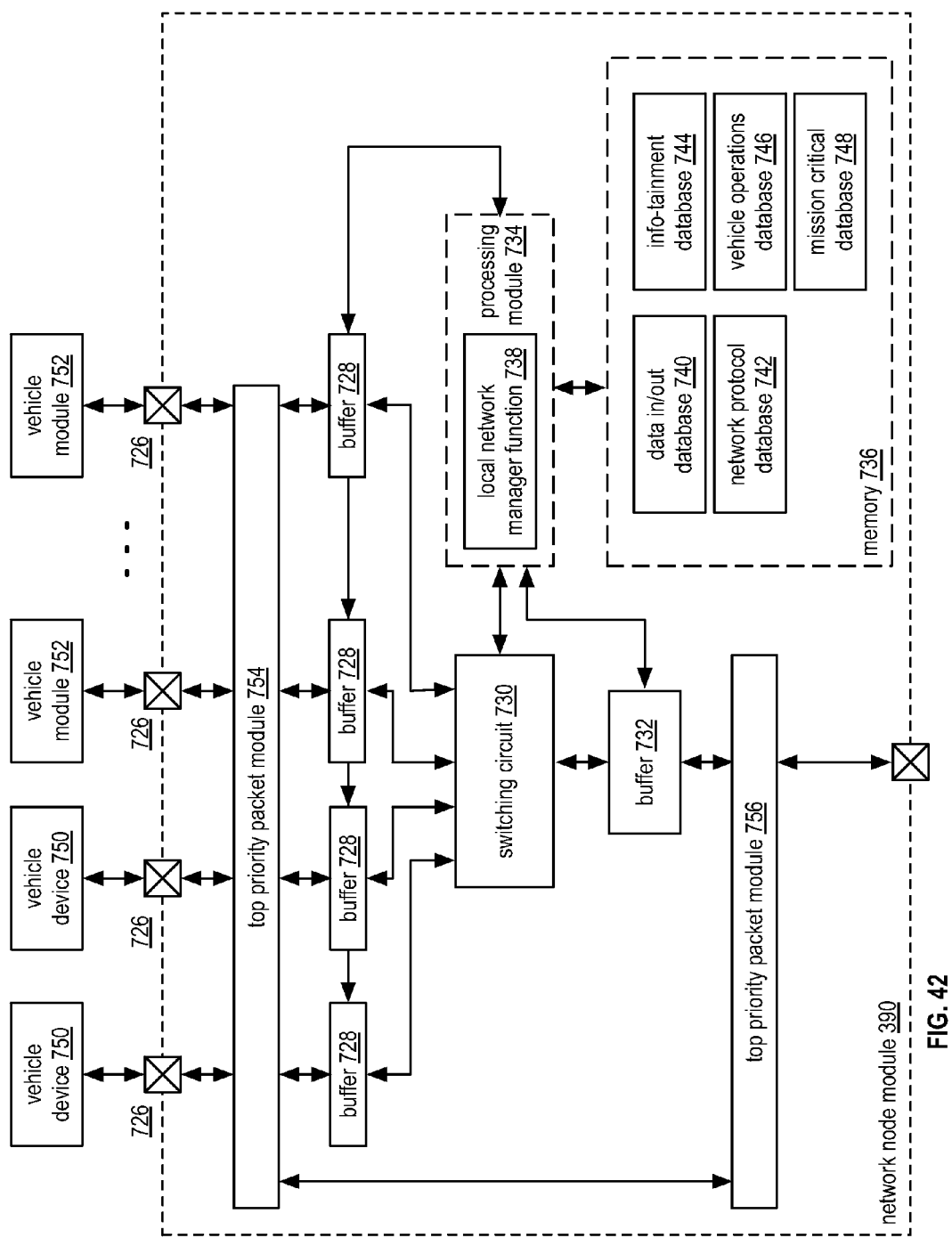
FIG. 42 is a schematic block diagram of another embodiment of a network node module in accordance with the present invention.

FIG. 42 is a schematic block diagram of another embodiment of a network node module 390 that includes a plurality of ports 726, a device (or first) top priority packet module 754, a plurality of buffers 728, a switching circuit 730, a processing module 734, a network buffer 732, a network (or second) priority packet module 756, and memory 736. The processing module 734 implements a local network manager function 738 and the memory 736 includes one or more of a data input output database 740, a network protocol database 742, and information-entertainment database 744, a vehicle operations database 746, and or a mission critical database 748.

In an example of operation, a vehicle device 750 outputs a packet to its corresponding port 726, which is received by the first top priority packet module 754. The first top priority packet module interprets the packet to determine whether it is a top priority packet (e.g., is of the utmost importance such as a safety related mission critical function). If the packet is a top primary packet, the first top priority packet module 754 provides the packet to the second top priority packet module 756. The second top priority packet module 756 outputs the top priority packet to the network fabric in an immediate fashion (i.e., interrupt a current transmission on the network fabric or by the network node module 390) or in a near-intermediate fashion (i.e., as soon as the current packet is transmitted, the top priority packet is transmitted onto the network fabric). If the packet is not a top priority packet, the first top priority packet module 754 provides the packet to the corresponding buffer 728 and it is process as previously discussed with reference to FIG. 41.

For an incoming packet, the second top priority packet module 756 interprets the packet to determine whether it is a top priority packet. If so, the second top priority packet module 756 provide the packet to the first top priority packet module 754, which may be done in an immediate fashion or a near immediate faction within the network node module 390. The first is top priority packet module 754 provides the top priority packet to the appropriate vehicle device 750. If the incoming packet is not a top priority packet, the second top priority module 756 provides the packet to the network buffer 732 and the packet is process as previously discussed with reference to FIG. 41.

For both incoming and outgoing top priority packets, the local network manager function 738 monitors the activity of the top priority packet modules 754-756 and adjusts the queues within the buffers accordingly such that packets are not lost. For example, if a packet is being outputted via the network buffer 732 when an incoming top priority packet is received, the local network manager function 738 records the interruption of the outputting of the packet and facilitates retransmission of the packet after the incoming top priority packet has been received and provided to the appropriate vehicle device 750.

Figure 43:
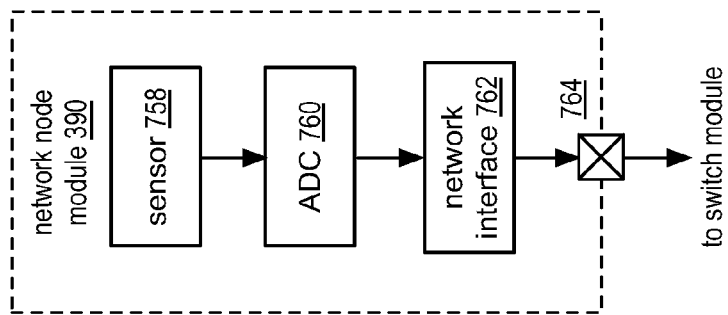
FIG. 43 is a schematic block diagram of another embodiment of a network node module in accordance with the present invention.

FIG. 43 is a schematic block diagram of another embodiment of a network node module 390 that includes a vehicle device (e.g., a sensor 758), an analog to digital converter (ADC) 760, a network interface 762, and a port 764. The sensor 758 may be any one of the sensors illustrated in FIGS. 6-11 and/or another type of vehicle application sensor. Note that if the sensor 758 is a digital device, the analog to digital converter 760 may be omitted.

The network interface 762 facilitates communication regarding a vehicle function of the vehicle device between the vehicle device and a vehicle network fabric in accordance with a global vehicle network communication protocol and includes circuitry for converting digital sensed data into network protocol packets. For example, if the sensor 758 is a thermometer, it provides an analog temperature reading to the ADC 760. The ADC 760 converts the analog temperature reading into a digital value. The network interface 762 generates a packet in accordance with the network protocol, placing the digital value of the temperature in the payload field of the packet.

Figure 44:
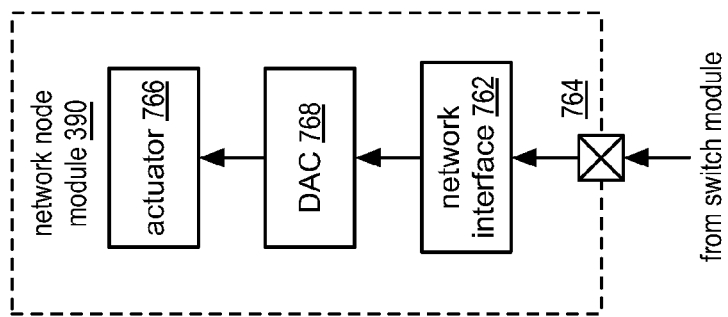
FIG. 44 is a schematic block diagram of another embodiment of a network node module in accordance with the present invention.

FIG. 44 is a schematic block diagram of another embodiment of a network node module 390 that includes a vehicle device (e.g., an actuator 766), a digital to analog converter (DAC) 768, a network interface 762, and a port 764. The actuator 766 may be any one of the actuators illustrated in FIGS. 6-11 and/or another type of vehicle application actuator. Note that if the actuator 766 is a digital device, the digital to analog converter 768 may be omitted.

The network interface 762 provides circuitry for extracting digital data from a network protocol packet. For example, if the network interface 762 receives a packet regarding rolling up a window, it extracts the digital data from the payload field of the packet. The DAC 768 converts the digital data into an analog control signal, which it provides to the actuator 766. In this example the actuator 766 may be a window motor actuator.

Figure 45:
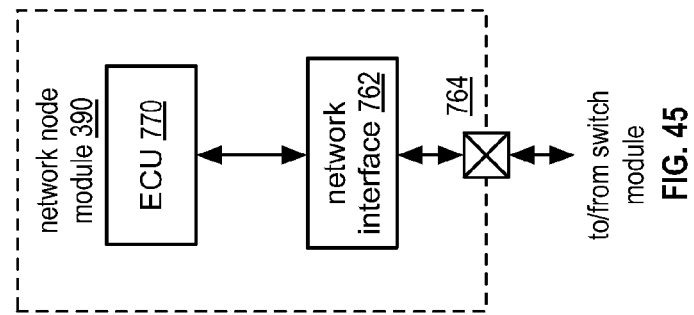
FIG. 45 is a schematic block diagram of another embodiment of a network node module in accordance with the present invention.

FIG. 45 is a schematic block diagram of another embodiment of a network node module 390 that includes a vehicle device (e.g., an electronic control unit (ECU) 770), a network interface 762, and a port 764. The ECU 770 maybe anyone of the ECUs illustrated in FIGS. 6-11 and/or any other type of vehicle application electronic control unit. The network interface 762 functions to packet size outbound data in accordance with the network protocol and to be packetized inbound data in accordance with the network protocol.

The network node modules 390 of FIGS. 43-45 may be implemented using one or more integrated circuits. For example, the network interface 762, the circuitry to support the physical port, and an analog to digital converter may be on one integrated circuit and the sensor 758 may be on a separate integrated circuit or it may be a stand alone component. As another example, the network interface 762, the circuitry to support the physical port, and a digital to analog converter 768 may be on one integrated circuit and an actuator 766 may be on a separate integrated circuit or it may be a standalone component. As yet another example, the network interface 762 and the circuitry to support the physical port may be on one integrated circuit and an electronic control unit 770 may be on a separate integrated circuit. As a further example, the network interface 762, the circuitry to support the physical port, and the electronic control unit 770 maybe on a single integrated circuit.

While the network node modules of FIGS. 43-45 illustrate specific vehicle devices, the vehicle device in each example may be any one of a mission critical vehicle operation device, a non-mission critical vehicle operation device, a mission critical safety device, a non-mission critical safety device, a mission critical electronic driving device, a non-mission critical electronic driving device, an electronic control unit, and an entertainment device.

Figure 46:
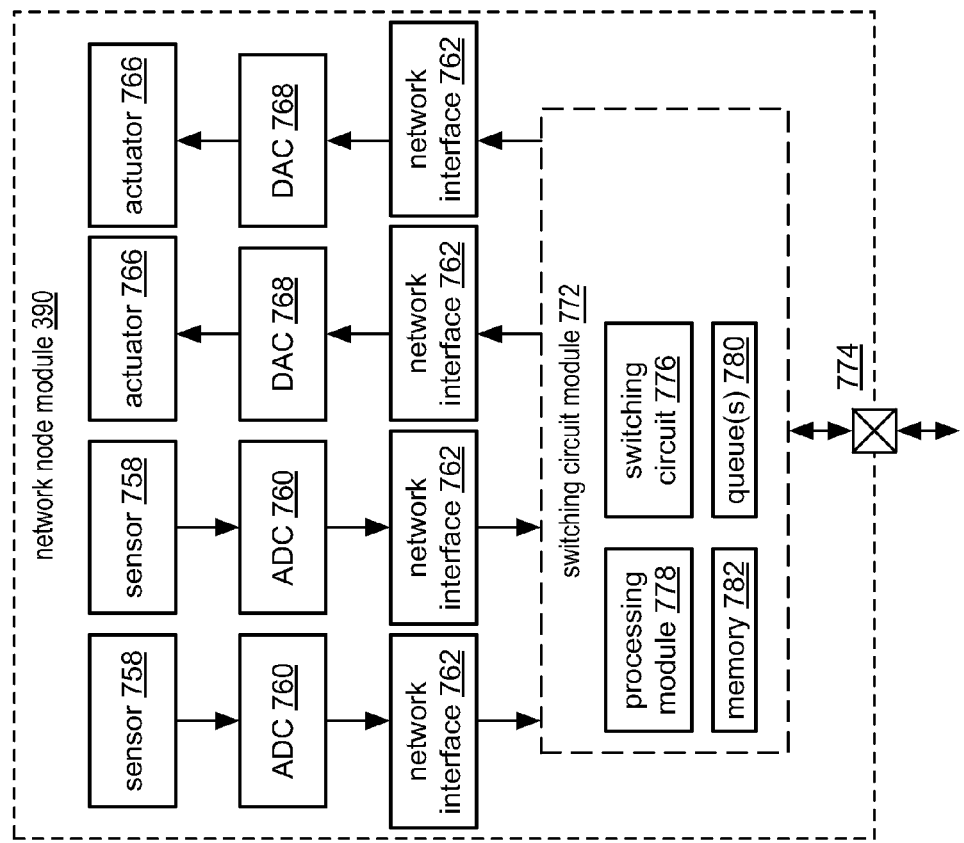
FIG. 46 is a schematic block diagram of another embodiment of a network node module in accordance with the present invention.

FIG. 46 is a schematic block diagram of another embodiment of a network node module 390 that includes a plurality of sensors 758, a plurality of actuators 766, a plurality of analog to digital converters 760, a plurality of digital to analog converters 768, an assembly network node module (which includes a plurality of network interfaces 762 and a switching circuit module 772), and a port 774. The switching circuit module 772 includes a switching circuit 776, a processing module 778, one or more queues 780, and memory 782. The processing module 778 implements a local management function. The memory 782 includes one or more databases for data input/output, network protocol, information-entertainment, vehicle operations, and/or mission-critical data. The one or more queues 780 may include an ingress queue and/or an egress queue for temporarily storing packets to/from the network interfaces and an ingress queue and/or an egress queue for storing packets to/from the switch module 772 (network node module or bridge-routing module). As another example, the switching module 772 includes a queue 780 for each of the vehicle devices of the network node module 390 and a network queue 780 coupled to the port 774. As a further example, the switching module 772 may include a single queue for packets to/from the network interfaces 762 and a single queue 780 coupled to the port 774.

In an example of operation, a sensor 758 generates data, which is converted into a packet by the network interface 762 as previously discussed. The network interface 762 provides the packet to one of the queues 780 of the switching circuit module 772. The local network management function manages the inputting of packets in the queue based on a prioritization scheme as previously discussed. For example, if the sensor 758 is a mission critical sensor, packets it generates may be given a higher priority than packets of non-mission critical sensors.

Based on the prioritization scheme, the local network management function enables the switching circuit 776 to transfer an outgoing packet from the queue to the network queue (e.g., the network egress queue). The local network management function manages the queues of the network buffer based on the prioritization scheme. As such, the packet generated by the sensor 758 in this example will be outputted to the switch module 772, the network node module 390, or the bridge-routing module in accordance with the prioritization scheme.

For an incoming packet, the network queue (e.g., an ingress queue) temporarily stores it under the control of the local network management function. When the incoming packet reaches the top of the network ingress queue, the local network manager function enables the switching circuit 776 to provide it to the queue of the destination actuator. The actuators 766 queue stores the packet until it is in a priority position for transmission to the DAC 768 and actuator 766.

Note that the network node module 390 may include more or less sensors and/or actuators than shown. Further note that the network node module 390 may be implemented as one or more integrated circuits. For example, the circuitry of the port, the switching circuit module 776, the network interfaces 762, the ADCs 760, and the DACs 768 may be implemented on one IC, while the sensors 758 and actuators 766 may be implemented on one or more separate ICs or as stand alone components. As another example, the circuitry of the port, the network interfaces 762, the ADCs 760, and the DACs 768 may be implemented on one IC, the switching circuit module 772 one a separate IC, and the sensors 758 and actuators 766 may be implemented on one or more other ICs or as stand alone components.

Figure 47:
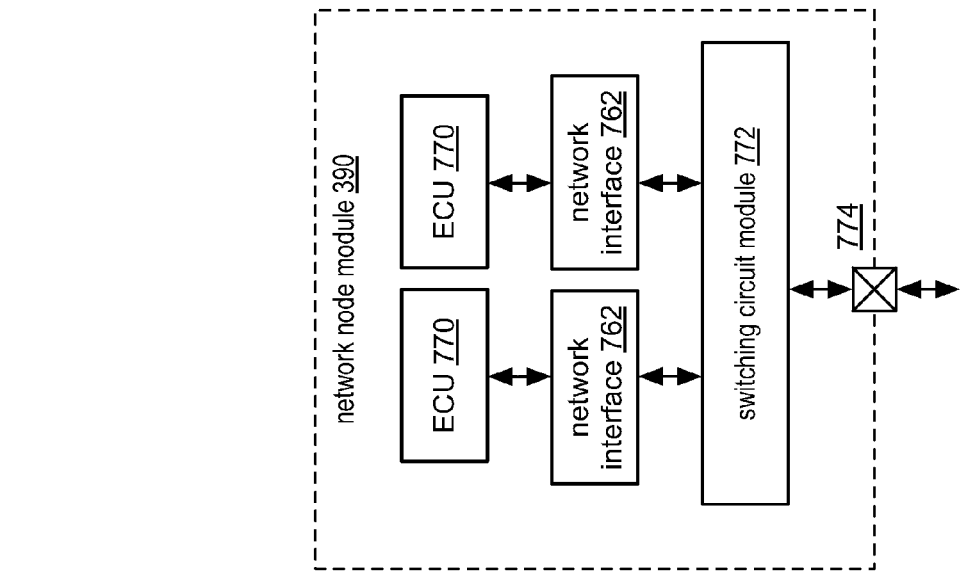
FIG. 47 is a schematic block diagram of another embodiment of a network node module in accordance with the present invention.

FIG. 47 is a schematic block diagram of another embodiment of a network node module 390 that includes the switching circuit module 772, a plurality of network interfaces 762 and a plurality of electronic control units (ECU) 770. The switching circuit module functions as previously discussed. Similarly, the network interfaces 762 and the ECUs function as previously discussed.

Figure 48:
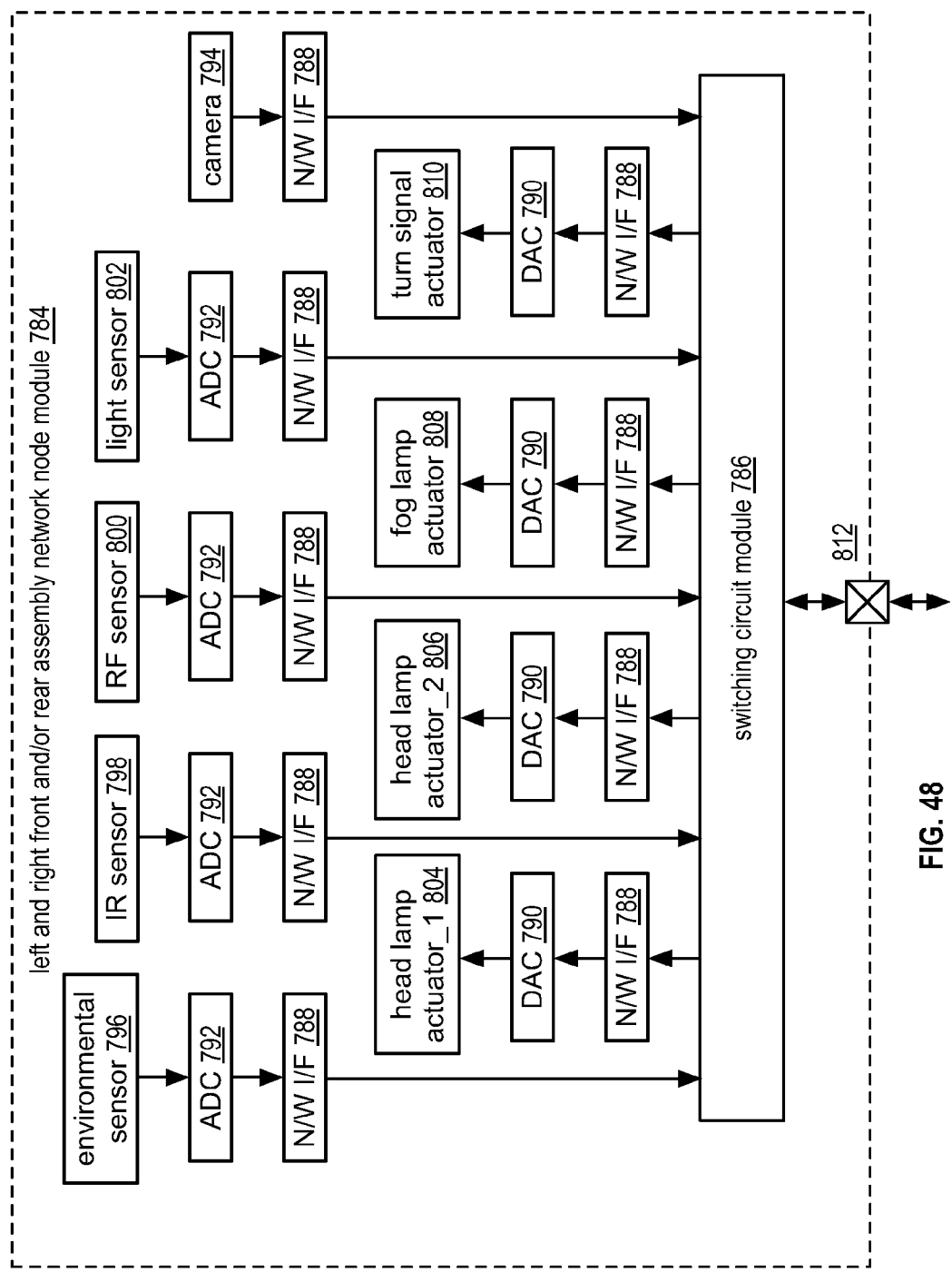
FIG. 48 is a schematic block diagram of another embodiment of a network node module in accordance with the present invention.

FIG. 48 is a schematic block diagram of another embodiment of a network node module 784 that may be used as an assembly (or portion thereof) for the left front, right front, left rear, and/or right rear of a vehicle communication network. The network node module 784 includes the switching circuit module 786, a plurality of network interfaces (N/W I/F) 788, a plurality of ADCs 792, a plurality of DACs 790, one or more cameras 794, a plurality of sensors 796-802, and a plurality of actuators 804-810.

The plurality of sensors 796-802 may include environmental sensors 796, infrared sensors 798, RF sensors 800, light sensors 802, and/or any other sensor for detecting driving conditions, road conditions, proximity of other vehicles and/or obstacles. For example, an environmental sensor 796 may be used to sense weather conditions, road conditions (e.g., wetness, icy conditions, snow, etc.), or other environmental conditions that may affect driving. As another example, the infrared 798 and/or radio frequency sensors 800 may be used to detect proximity of other vehicles, obstacles, barriers, and/or other physical objects that may affect driving conditions. As such, the infrared 798 and/or radio frequency sensors 800 may be used as a localized radar system for the vehicle. As yet a further example, the light sensor 802 may be used to detect ambient light conditions for automatic enablement of headlamps and/or to detect headlamps of oncoming vehicles to automatically adjust high beam to low beam settings.

The plurality of actuators 804-810 may include headlamp actuators 804-806, fog lamp actuators 808, turn signal actuators 810, and/or any other actuator that may be employed in the front left, front right, rear left, or rear right portions of a vehicle. For example, a first headlights actuator 804 may be used to enable the headlights at low beam and a second headlights actuator 806 may be used to enable the headlights at high beam. As another example, the fog lamp actuator 808 could be used to enable fog lamps. As yet another example, the turn signal actuator 810 may be used to actuate a turn signal lamp.

The camera, or cameras, 794 may be used to obtain real-time digital images of the surrounding environments of the vehicle, images of operation within the vehicle, and/or other images that may assist in the performance of the vehicle and/or in driving the vehicle. For example, the cameras 794 may capture images that are displayed on a headset that's display to assist in parking, backing up, etc. As yet another example, the camera 794 may be used to capture images of objects in a proximity to the vehicle that is subsequently processed for automatic collision avoidance applications.

The network node module 784 may be implemented as one or more integrated circuits, may include more or less components than shown, and/or may be implemented as one or more network node modules. For example, the network node module 784 may be implemented using one integrated circuit to support the circuitry of the port 812, the switching circuit module 786, and the network interfaces 788, the digital to analog converters 790, and the analog digital converters 792. The other components are implemented on a common integrated circuit, separate integrated circuits, and/or as standalone components.

Figure 49:
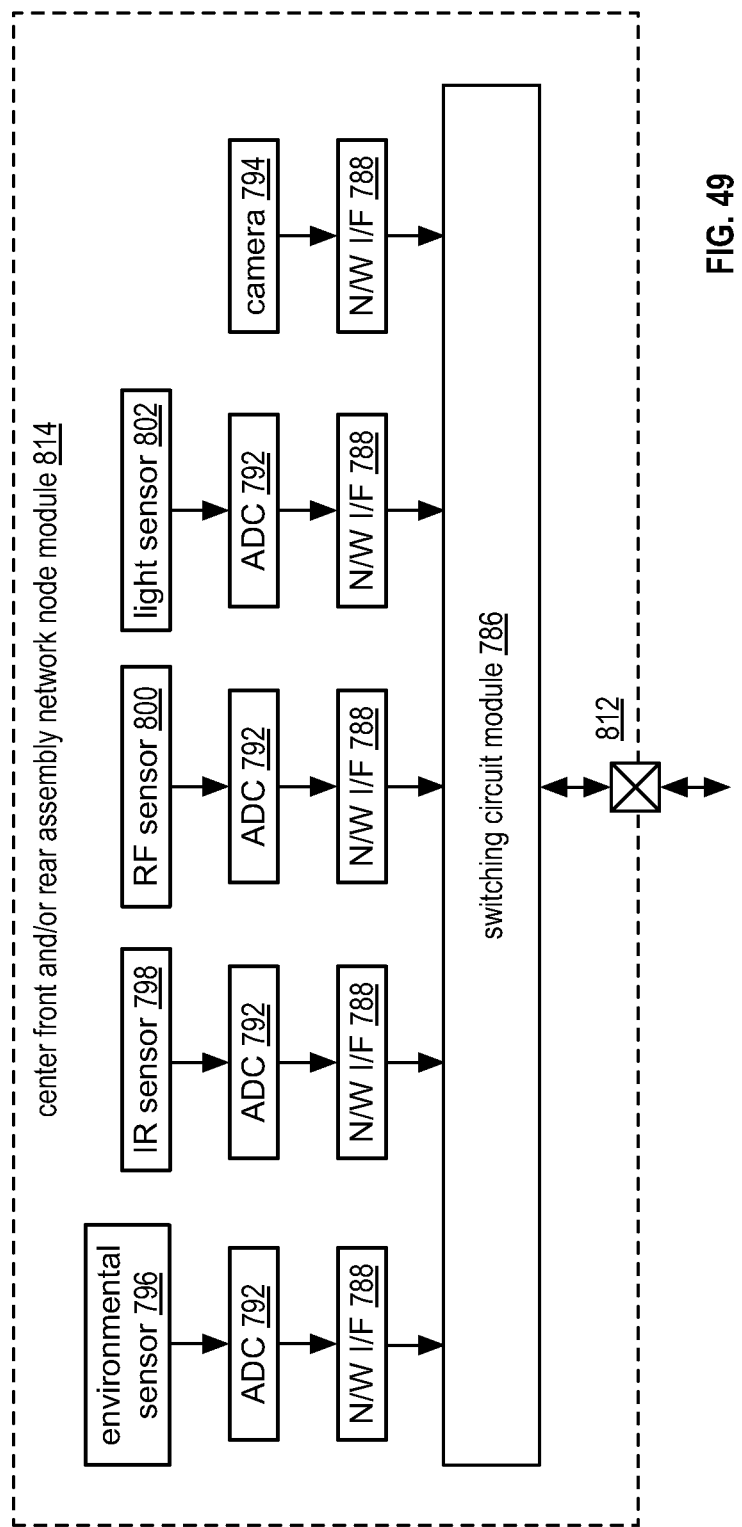
FIG. 49 is a schematic block diagram of another embodiment of a network node module in accordance with the present invention.

FIG. 49 is a schematic block diagram of another embodiment of a network node module that may be used as an assembly (or portion thereof) for the center front and/or center rear of a vehicle communication network 814. The network node module 814 includes the switching circuit module 786, a plurality of network interfaces (N/W I/F) 788, a plurality of ADCs 792, a plurality of DACs, one or more cameras 794, a plurality of sensors 796-802, and may further include one or more actuators (none shown).

The plurality of sensors 796-802 may include environmental sensors 796, infrared sensors 798, RF sensors 800, light sensors 802, and/or any other sensor for detecting driving conditions, road conditions, proximity of other vehicles and/or obstacles. The plurality of actuators may include headlamp actuators, fog lamp actuators, turn signal actuators, and/or any other actuator that may be employed in the front left, front right, rear left, or rear right portions of a vehicle. The camera, or cameras 794, may be used to obtain real-time digital images of the surrounding environments of the vehicle, images of operation within the vehicle, and/or other images that may assist in the performance of the vehicle and/or in driving the vehicle.

The sensors 796-802 of the center front and or center rear assembly 814 may work in concert with the sensors 796-802 and or actuators of the left front, right front, left rear and right rear assemblies of FIG. 48 to provide a three-dimensional and 360° perspective of the vehicles environment. With such data, the safety and overall performance of the vehicle may be enhanced.

The center front and/or center rear network node module 814 may be implemented as one or more integrated circuits, may include more or less components than shown, and/or may be implemented as one or more network node modules. For example, the network node module 814 may be implemented using one integrated circuit to support the circuitry of the port 812, the switching circuit module 786, and the network interfaces 788, the digital to analog converters, and the analog digital converters 792. The other components are implemented on a common integrated circuit, separate integrated circuits, and/or as standalone components.

Figure 50:
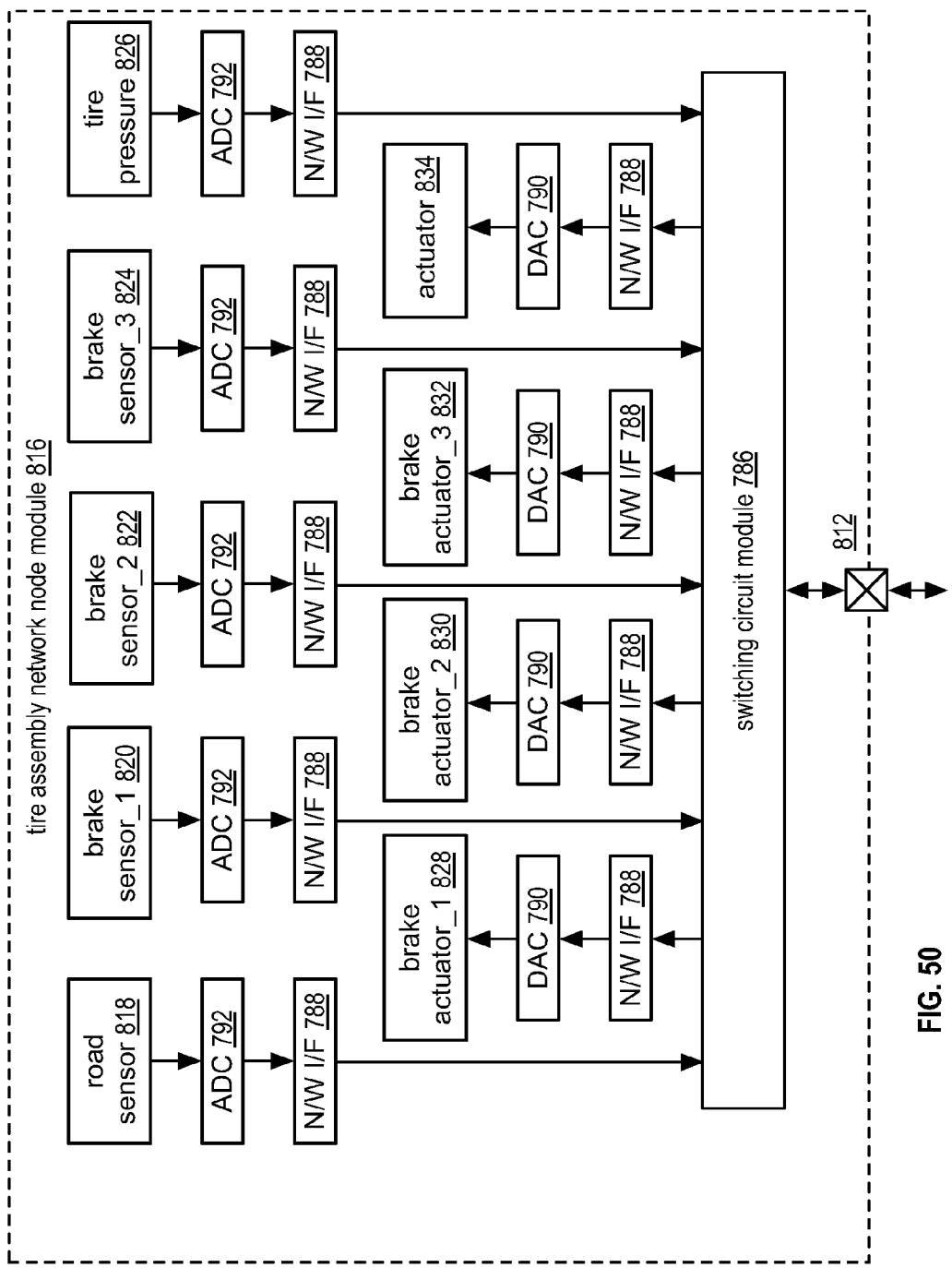
FIG. 50 is a schematic block diagram of another embodiment of a network node module in accordance with the present invention.

FIG. 50 is a schematic block diagram of another embodiment of a network node module 816 that may be used as an assembly (or portion thereof) for the left front tire, right front tire, left rear tire, and/or right rear tire of a vehicle communication network. Each network node module 816 includes the switching circuit module 786, a plurality of network interfaces (N/W I/F) 788, a plurality of ADCs 792, a plurality of DACs 790, one or more cameras (not shown), a plurality of sensors 818-826, and a plurality of actuators 828-834.

The plurality of sensors 828-834 may include a road sensor 818, a plurality of brake sensors 820-824, a tire pressure sensor 826, and/or any sensor related to the tire and the performance and/or safety of the vehicle. For example, the brake sensors 820-824 may sense brake pad wear, temperatures, antilock brake performance, etc. As another example, the road sensor 818 may sense texture of the road, slickness of the road, and/or any other characteristic of the road that may affect driving conditions. As yet another example, the tire pressure sensor 826 senses the air pressure of the tire.

The plurality of actuators 828-834 may include a plurality of braking actuators 828-832, and/or any actuator 834 related to the tire and the performance and/or safety of the vehicle. For example, the brake actuators 828-832 may perform antilock braking, application of electronic brake force, etc.

Each of the tire network node modules 816 may be implemented as one or more integrated circuits, may include more or less components than shown, and/or may be implemented as one or more network node modules. For example, the network node module may be implemented using one integrated circuit to support the circuitry of the port 812, the switching circuit module 786, and the network interfaces 788, the digital to analog converters 790, and the analog digital converters 792. The other components are implemented on a common integrated circuit, separate integrated circuits, and/or as standalone components.

Figure 51:
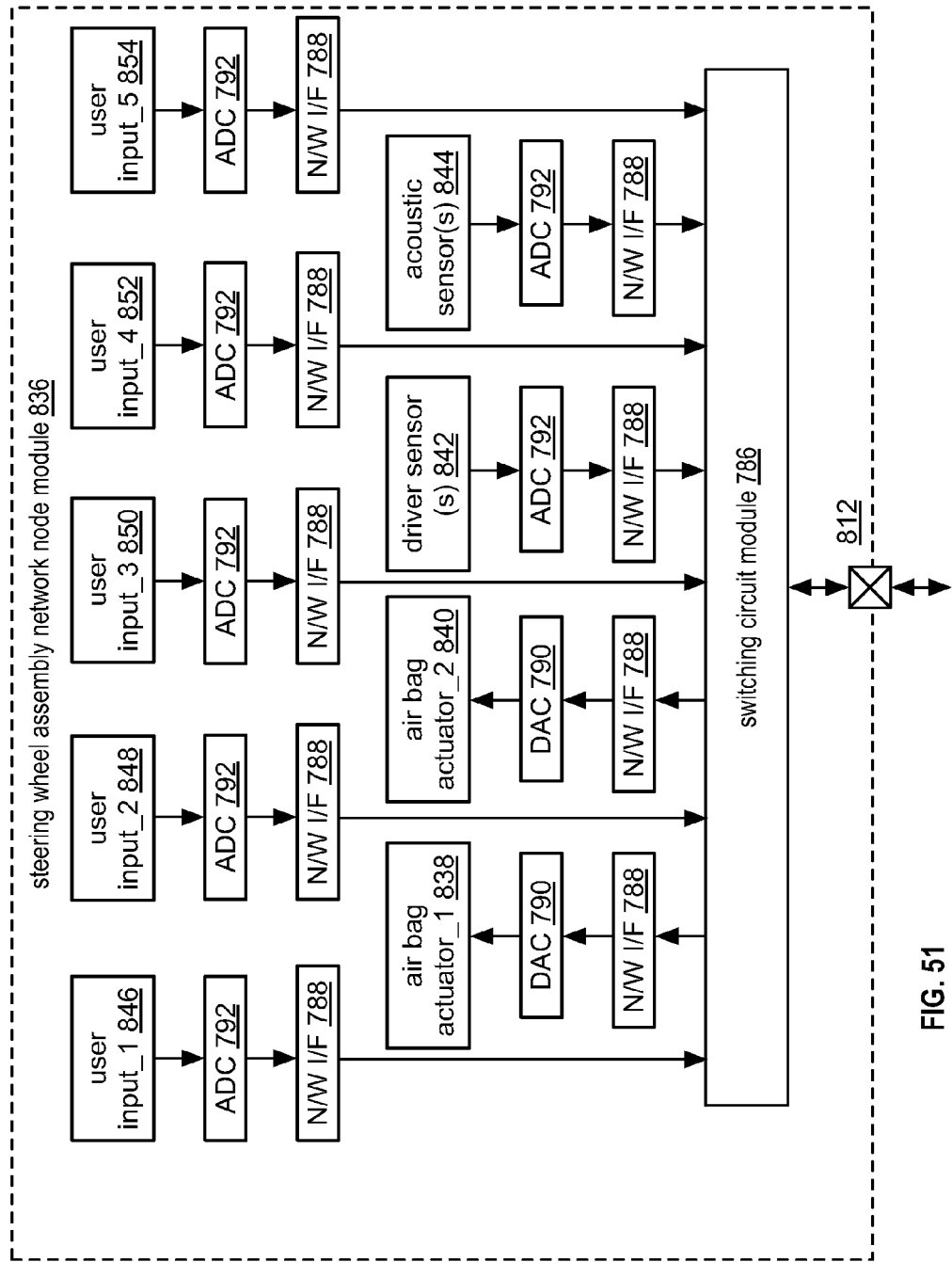
FIG. 51 is a schematic block diagram of another embodiment of a network node module in accordance with the present invention.

FIG. 51 is a schematic block diagram of another embodiment of a network node module that may be used as an assembly (or portion thereof) for the steering wheel of a vehicle communication network. The network node module 836 includes the switching circuit module 786, a plurality of network interfaces (N/W I/F) 788, a plurality of ADCs 792, a plurality of DACs 790, a plurality of sensors 842-844, a plurality of user inputs 846-854, and a plurality of actuators 838-840.

The user inputs 846-854 used for radio control, cruise control wiper control turn signal control, and/or other vehicle system controls. For example, a user input may be a switch to turn on or off the radio, adjust the station of the radio, and another user input may be used to increase or decrease the volume of the radio. As an alternative embodiment, a single user input they be used to turn on or off the radio, adjusted station, and adjust its volume settings.

The plurality of sensors 842-844 may include driver sensors 842, acoustic sensors 844, temperature sensors, and/or any other sensors that sense in-cabin conditions that may affect the vehicle's performance and/or the driver's ability to drive the vehicle. For example, one or more sensors may be used to sense the driver's attentiveness to driving. As a more specific example, one of more sensors can be used to monitor the driver's eye position to determine whether the driver is primarily focused on the road or is distracted. As another example, the driver sensors may be used to sense the driver's gestures, which may be processed into a particular command. As a more specific example, the driver may wave his/her hand to indicate increase or decrease the value of the radio. As yet another example, the acoustic sensors may be used to sense ambient noise, which may be used in a noise canceling scheme.

A plurality of actuators 838-840 may be used for airbag deployment, driver stimulus, and/or any other actuator that may be used to enhance performance of the vehicle and or the driver's ability to drive the vehicle. For example, if the data produced by the driver sensors indicate that the driver is not paying attention, a driver or stimulator within the steering wheel may be actuated to alert the driver to his/her inattentiveness.

The steering wheel network node module 836 may be implemented as one or more integrated circuits, may include more or less components than shown, and/or may be implemented as one or more network node modules. For example, the network node module may be implemented using one integrated circuit to support the circuitry of the port 812, the switching circuit module 786, and the network interfaces 788, the digital to analog converters 790, and the analog digital converters 792. The other components are implemented on a common integrated circuit, separate integrated circuits, and/or as standalone components.

Figure 52:
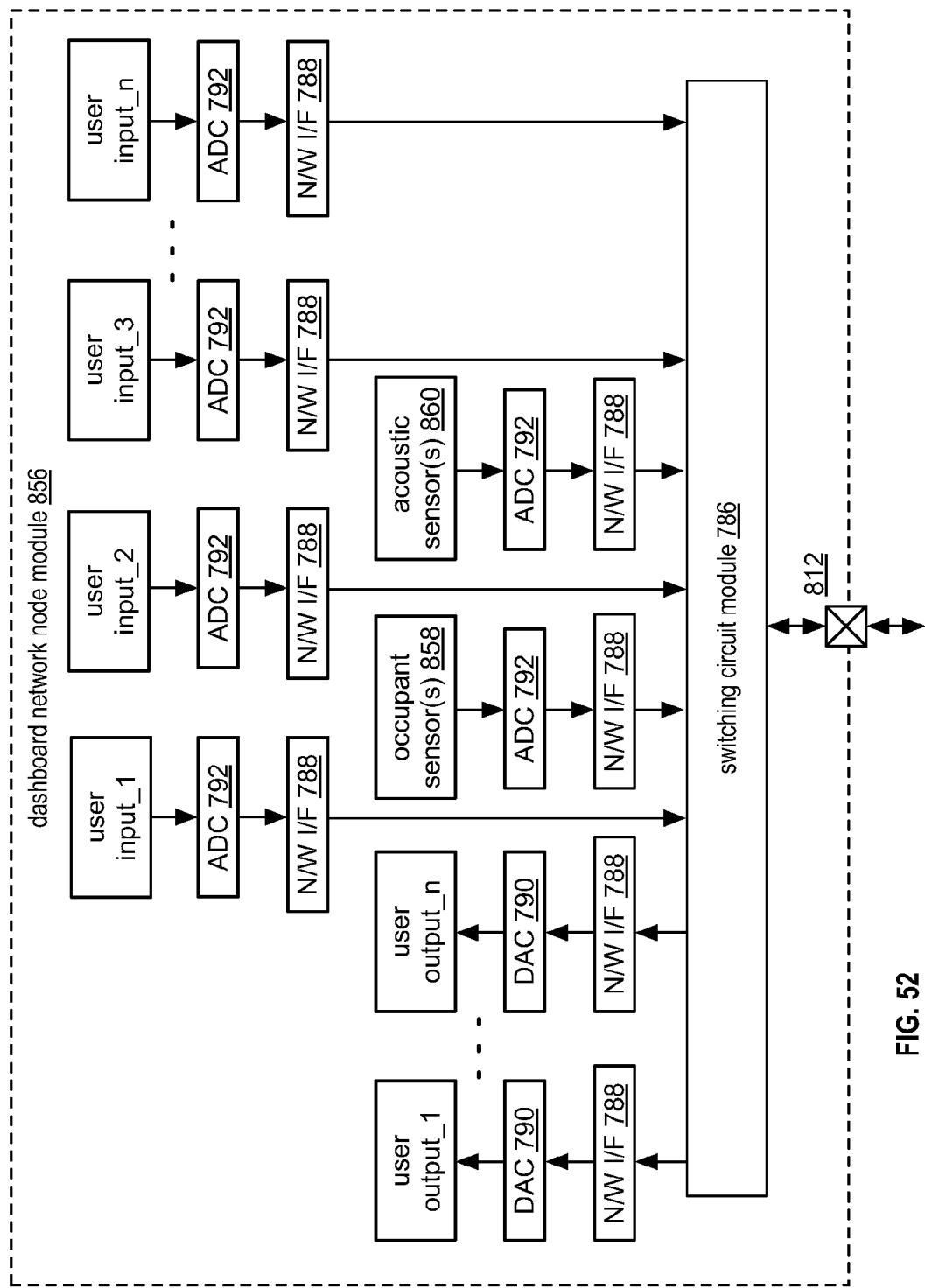
FIG. 52 is a schematic block diagram of another embodiment of a network node module in accordance with the present invention.

FIG. 52 is a schematic block diagram of another embodiment of a network node module 856 that may be used as an assembly (or portion thereof) for the dashboard of a vehicle communication network. The network node module 856 includes the switching circuit module 786, a plurality of network interfaces (N/W I/F) 788, a plurality of ADCs 792, a plurality of DACs 790, a plurality of sensors 858-860, a plurality of user inputs, a plurality of user outputs, and may further include one or more actuators (none shown).

The user inputs are used for radio control, environment control (e.g., air conditioning, heater, fan speed, etc.), GPS control, and/or other vehicle system controls. For example, a user input may used to change the temperature and or fan speed within the vehicle.

The user outputs are used to inform the driver of various vehicle conditions. For example, the user outputs may include one or more displays, one or more gauges, a GPS display, a heads-up display, audible alarms, visual alarms, etc. As a more specific example, one gauge may be used for fuel level, a second gauge for battery level, a third gauge for RPMs, etc.

The plurality of sensors 858-860 may include occupant sensors 858, acoustic sensors 860, temperature sensors, and/or any other sensors that sense in-cabin conditions that may affect the vehicle's performance and/or the occupant's comfort and/or safety within the vehicle. For example, the acoustic sensors 860 may be used to sense ambient noise, which may be used in a noise canceling scheme. As another example, the accident sensors may detect the presence of other occupants in the vehicle, which may be used for air bag enablement/disablement, audio performance optimization (e.g., noise cancellation, surround sound, etc.), climate optimization, etc.

A plurality of actuators may be used for airbag deployment and/or any other actuator that may be used to enhance performance of the vehicle and or the occupants' comfort and/or safety within the vehicle.

The dashboard network node module 856 may be implemented as one or more integrated circuits, may include more or less components than shown, and/or may be implemented as one or more network node modules. For example, the network node module 856 may be implemented using one integrated circuit to support the circuitry of the port 812, the switching circuit module 786, and the network interfaces 788, the digital to analog converters 790, and the analog digital converters 792. The other components are implemented on a common integrated circuit, separate integrated circuits, and/or as standalone components.

Figure 53:
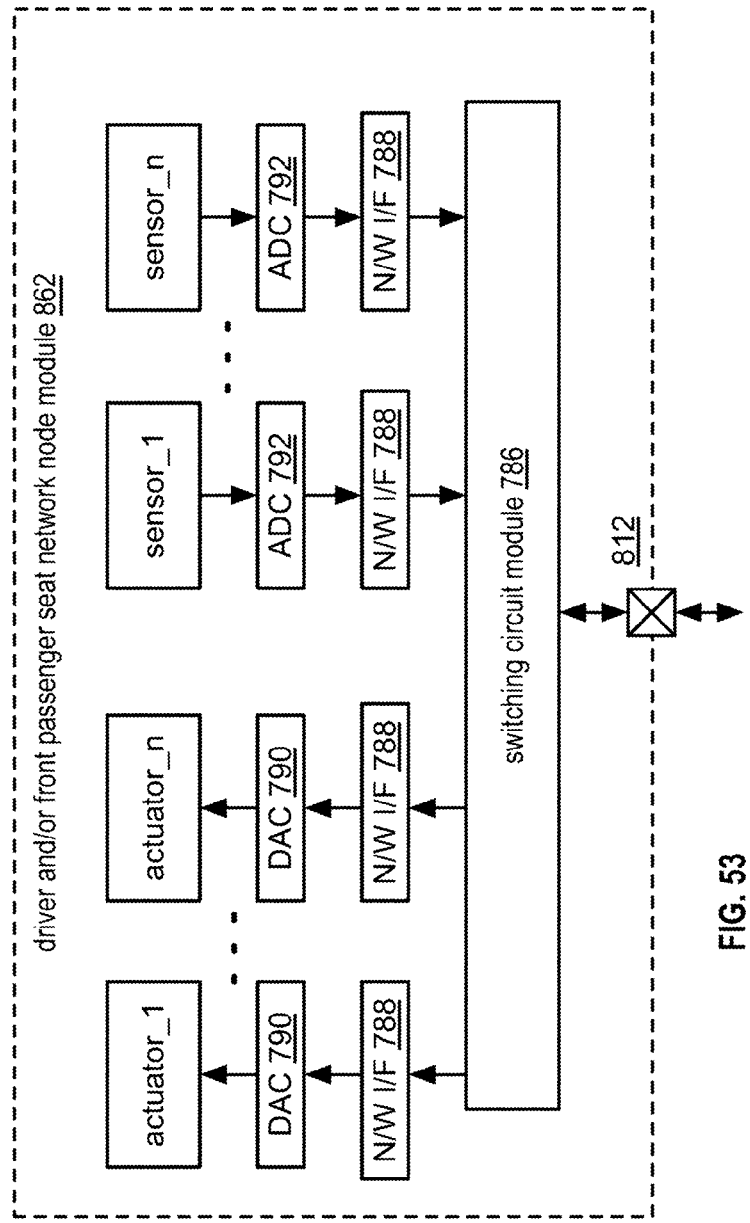
FIG. 53 is a schematic block diagram of another embodiment of a network node module in accordance with the present invention.

FIG. 53 is a schematic block diagram of another embodiment of a network node module that may be used as an assembly (or portion thereof) for a front seat of a vehicle communication network. The network node module 862 includes the switching circuit module 786, a plurality of network interfaces (N/W I/F) 788, a plurality of ADCs 792, a plurality of DACs 790, a plurality of sensors, and a plurality of actuators.

The plurality of sensors may be used to sense occupants' movement, position, posture etc. The plurality of actuators may be used to adjust the seat position, heating the seat, cooling the seat, providing a massage function, etc. For example, the sensors may provide information to a seat electronic control unit the other network fabric, where the seat electronic control unit interprets the data to determine an occupant's movement posture, position etc. In this instance, the seat electronic control unit generates control signals that are transmitted via the network fabric to the seat network note module 862, which the actuators receive and adjust the seats position accordingly.

The seat network node module 862 may be implemented as one or more integrated circuits, may include more or less components than shown, and/or may be implemented as one or more network node modules. For example, the network node module 862 may be implemented using one integrated circuit to support the circuitry of the port 812, the switching circuit module 786, and the network interfaces 788, the digital to analog converters 790, and the analog digital converters 792. The other components are implemented on a common integrated circuit, separate integrated circuits, and/or as standalone components.

Figure 54:
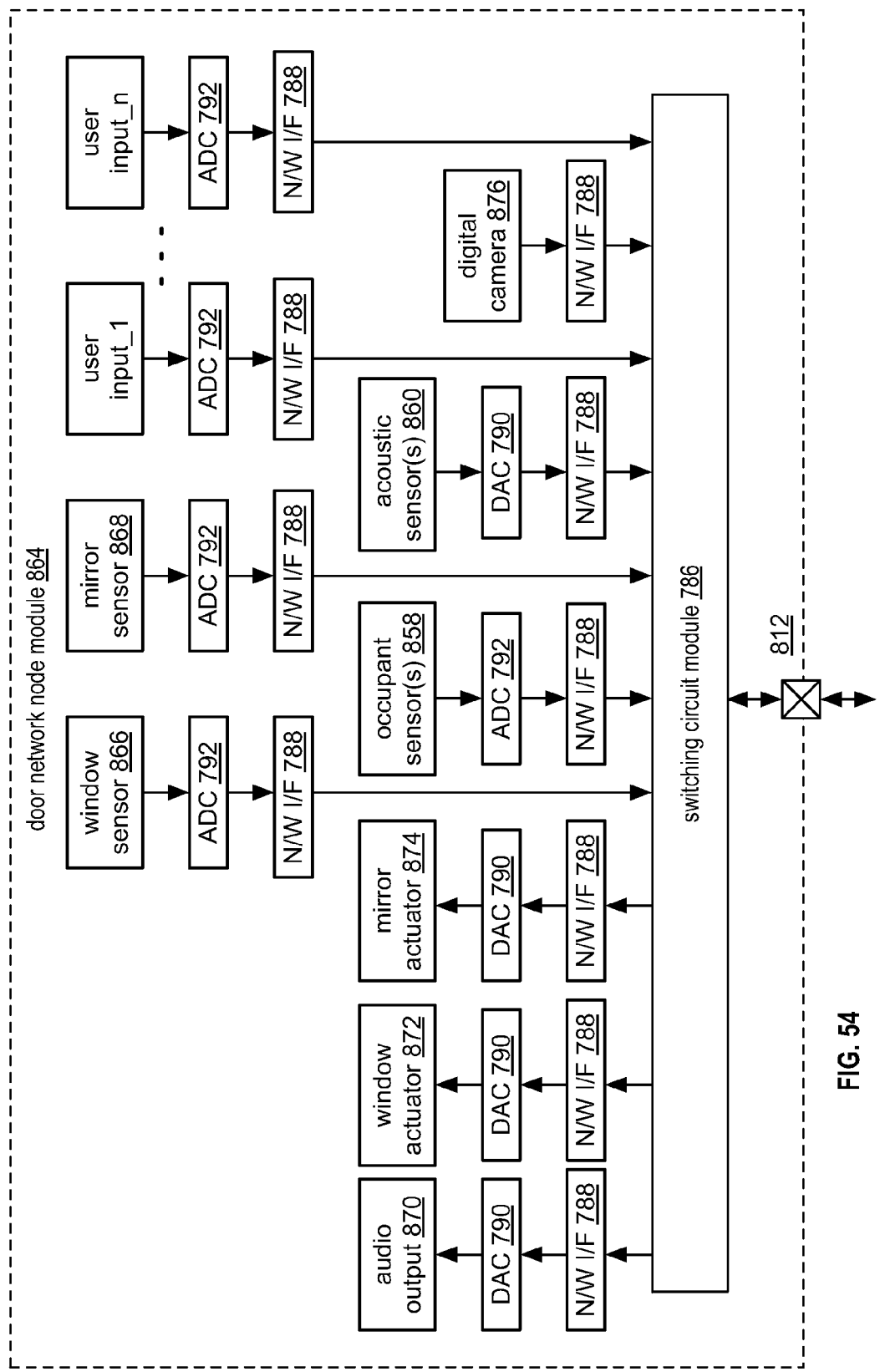
FIG. 54 is a schematic block diagram of another embodiment of a network node module in accordance with the present invention.

FIG. 54 is a schematic block diagram of another embodiment of a network node module that may be used as an assembly (or portion thereof) for a door of a vehicle communication network. Each of the network node modules 864 includes the switching circuit module 786, a plurality of network interfaces (N/W I/F) 788, a plurality of ADCs 792, a plurality of DACs 790, a plurality of sensors 858-860 and 866-868, a plurality of user inputs, one or more cameras 876, one or more user outputs, and a plurality of actuators 872-874.

The user inputs may include window control (e.g., up, down, lock, etc.), mirror control (for the driver door), seat control, etc. The user outputs may include one or more audio outputs (e.g., speaker or speaker driver), alarms, etc.

The plurality of sensors 858-860 and 866-868 may include window sensors 866 for sensing motion, interfering objects (e.g., hand, arm, etc.) and/or other window sensory functions. The sensors may also include mirror sensors 868, activate sensors, acoustic sensors 860, and or any other sensors that may be implemented in the door that enhance performance of the vehicle, occupants and/or driver comfort, and/or safety of the vehicle.

The plurality of actuators 872-874 may include window actuators 872, mirror actuators 874, and/or any other actuator that may enhance the performance of the vehicle, enhance occupant and/or driver comfort, and/or enhanced safety of the vehicle. In addition, the actuators may include airbag actuators for side airbags and/or other safety related actuators.

The camera 876 may be used to record in cabin video of the driver, occupants, etc. For example, the video may be used to detect driver distractions, which may be interpreted by an electronic control unit to generate a corresponding response to minimize the driver's distraction.

The door network node module 864 may be implemented as one or more integrated circuits, may include more or less components than shown, and/or may be implemented as one or more network node modules. For example, the network node module 864 may be implemented using one integrated circuit to support the circuitry of the port 812, the switching circuit module 786, and the network interfaces 788, the digital to analog converters 790, and the analog digital converters 792. The other components are implemented on a common integrated circuit, separate integrated circuits, and/or as standalone components.

Figure 55:
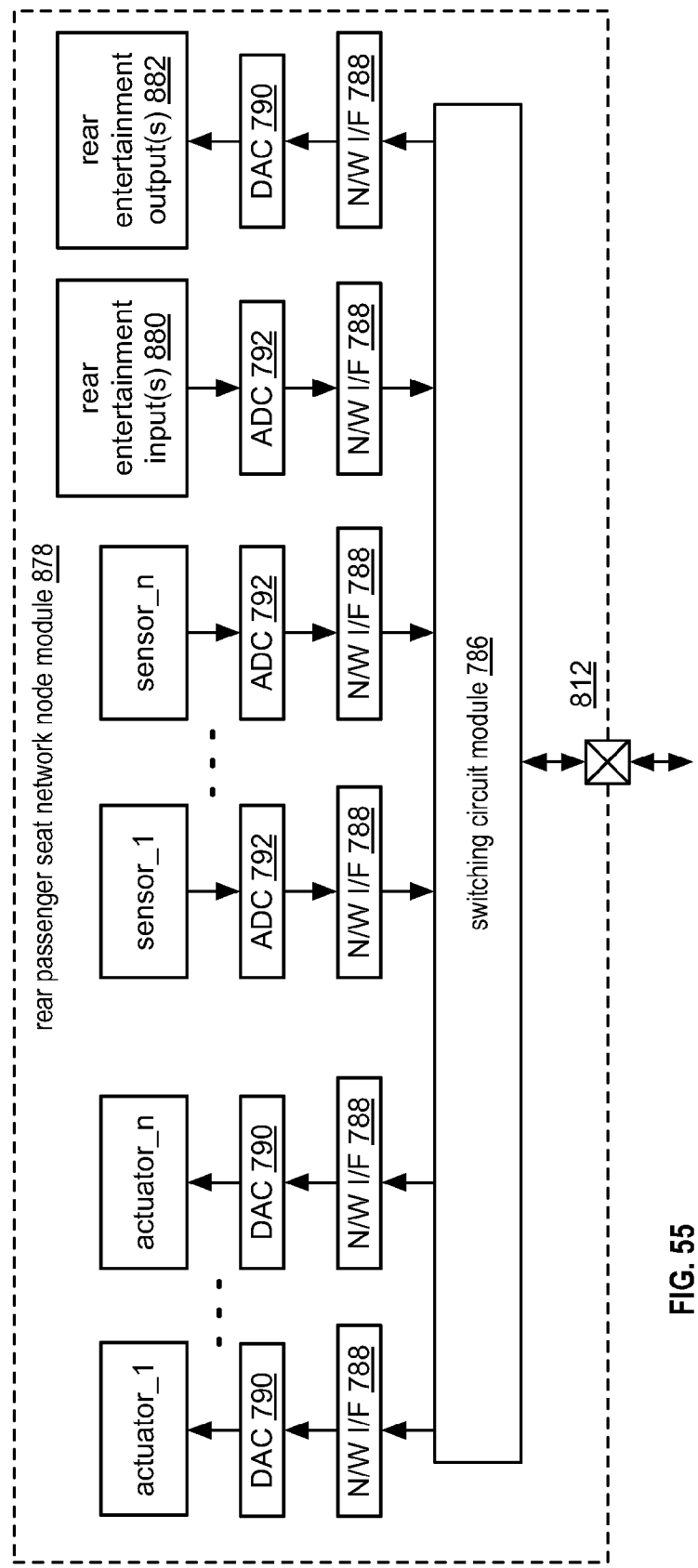
FIG. 55 is a schematic block diagram of another embodiment of a network node module in accordance with the present invention.

FIG. 55 is a schematic block diagram of another embodiment of a network node module that may be used as an assembly (or portion thereof) for a rear seat of a vehicle communication network. The network node module 878 includes the switching circuit module 786, a plurality of network interfaces (N/W I/F) 788, a plurality of ADCs 792, a plurality of DACs 790, a plurality of sensors, one or more rear seat entertainment input 880, one or more rear seat entertainment outputs 882, and a plurality of actuators.

The plurality of sensors may be used to sense occupants' movement, position, posture etc. The plurality of actuators may be used to adjust the seat position, heating the seat, cooling the seat, providing a massage function, etc. For example, the sensors may provide information to a seat electronic control unit the other network fabric, where the seat electronic control unit interprets the data to determine an occupant's movement posture, position etc. In this instance, the seat electronic control unit generates control signals that are transmitted via the network fabric to the seat network note module 878, which the actuators receive and adjust the seats position accordingly.

The rear seat entertainment inputs 880 and outputs 882 relate to a rear seat entertainment unit (e.g., DVD player, CD player, videogame console, etc.). The rear seat entertainment inputs 880 may relate to source selection (e.g., DVD, CD, video game, etc.), channel selection, volume control, video game controller, etc. The rear seat entertainment outputs 882 may be a display, headphone jack, speakers, a 3-D display, etc. Note that if the rear seat entertainment inputs 880 and/or outputs 882 are digital devices, the corresponding ADC 792 or DAC 790 may be omitted.

The rear seat network node module 878 may be implemented as one or more integrated circuits, may include more or less components than shown, and/or may be implemented as one or more network node modules. For example, the network node module 878 may be implemented using one integrated circuit to support the circuitry of the port 812, the switching circuit module 786, and the network interfaces 788, the digital to analog converters 790, and the analog digital converters 792. The other components are implemented on a common integrated circuit, separate integrated circuits, and/or as standalone components.

Figure 56:
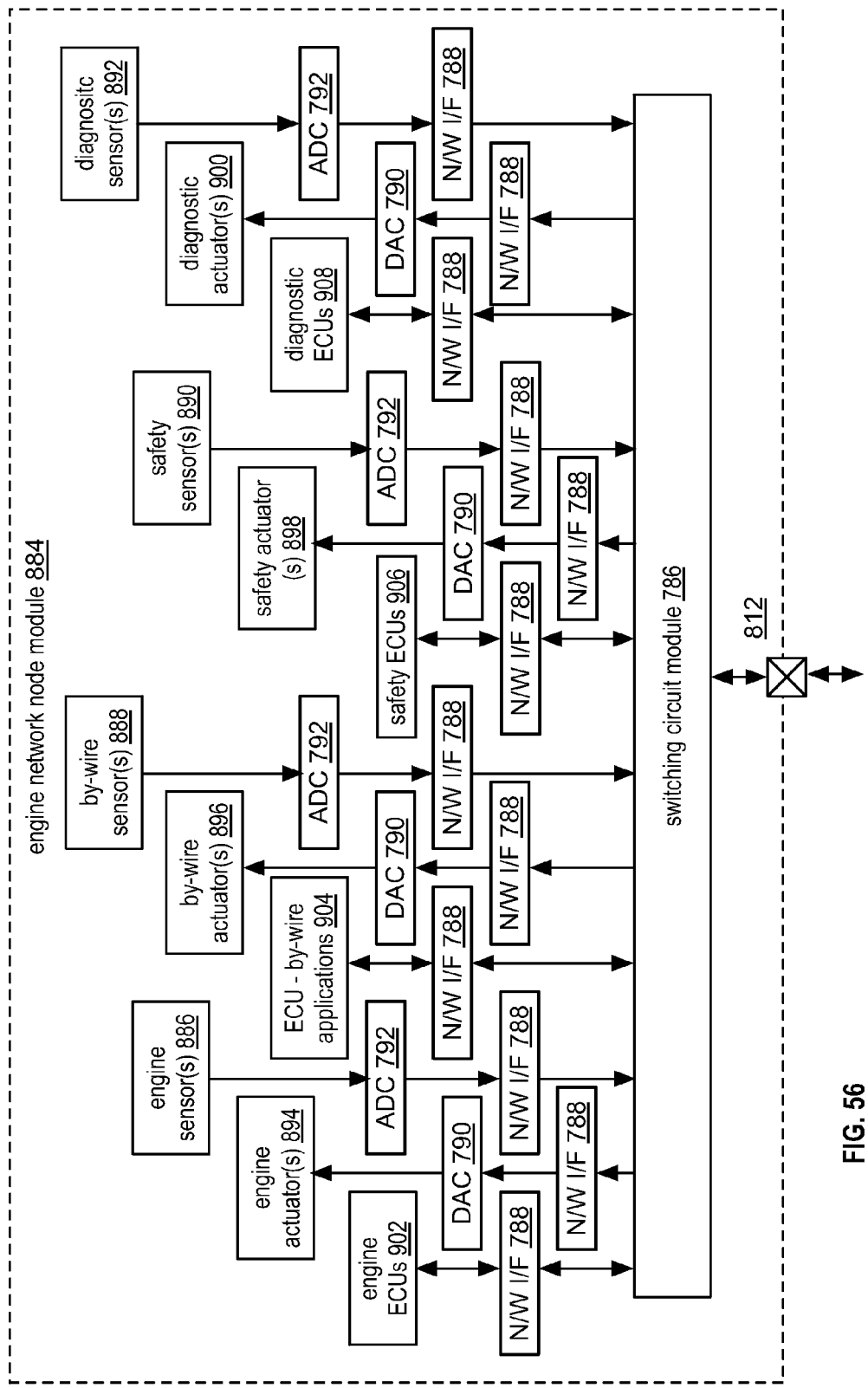
FIG. 56 is a schematic block diagram of another embodiment of a network node module in accordance with the present invention.

FIG. 56 is a schematic block diagram of another embodiment of a network node module that may be used as an assembly (or portion thereof) for an engine of a vehicle communication network. The network node module 884 includes the switching circuit module 786, a plurality of network interfaces (N/W I/F) 788, a plurality of ADCs 792, a plurality of DACs 790, a plurality of sensors 886-892, a plurality of actuators 894-900, and/or a plurality of electronic control units (ECU) 902-908.

The plurality of electronic control units 902-908 includes one or more engine control units 902, one or more by-wire applications 904 (e.g., drive by wire, steer by wire, brake by wire, etc.), safety related functions 906, and/or diagnostic functions 908. For each type of electronic control unit 902-908, the network node module 884 may include one or more sensors and/or one or more actuators. For example, if the network node module 884 includes an engine electronic control unit 902, the network node module 884 may also include one or more engine actuators 894 and/or one or more engine sensors 886. As another example, if the network node module 884 includes a by-wire electronic control unit 904, the network node module 884 may also include one or more by-wire actuators 896 and/or one or more by-wire sensors 888. As yet another example, if the network node module 884 includes one or more safety electronic control units 906, the network node module 884 may also include one or more safety actuators 989 and/or one or more safety sensors 890. As a further example, if the network node module 884 includes one or more diagnostic electronic control units 908, the network node module 884 may also include one or more diagnostic actuators 900 and/or one or more diagnostic sensors 892.

The engine network node module 884 may be implemented as one or more integrated circuits, may include more or less components than shown, and/or may be implemented as one or more network node modules. For example, the network node module 884 may be implemented using one integrated circuit to support the circuitry of the port 812, the switching circuit module 786, and the network interfaces 788, the digital to analog converters 790, and the analog digital converters 792. The other components are implemented on a common integrated circuit, separate integrated circuits, and/or as standalone components.

Figure 57:
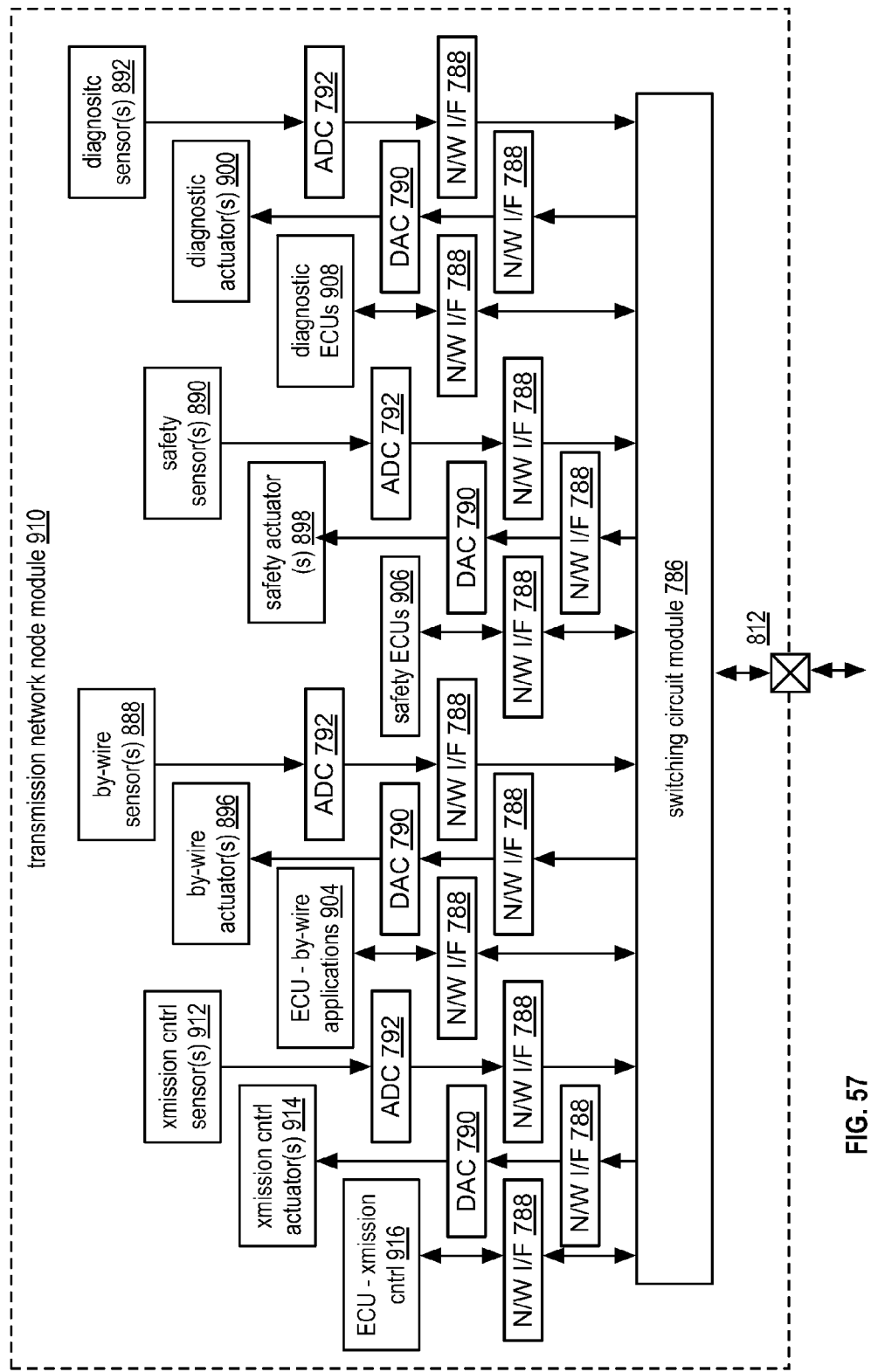
FIG. 57 is a schematic block diagram of another embodiment of a network node module in accordance with the present invention.

FIG. 57 is a schematic block diagram of another embodiment of a network node module that may be used as an assembly (or portion thereof) for a transmission of a vehicle communication network. The network node module 910 includes the switching circuit module 786, a plurality of network interfaces (N/W I/F) 788, a plurality of ADCs 792, a plurality of DACs 790, a plurality of sensors 888-892 and 912, a plurality of actuators 896-900 and 914, and/or a plurality of electronic control units (ECU) 904-908 and 916.

The plurality of electronic control units 904-908 and 916 includes one or more transmission control units 916, one or more by-wire applications 904 (e.g., drive by wire, steer by wire, brake by wire, etc.), safety related functions 906, and/or diagnostic functions 908. For each type of electronic control unit, the network node module 910 may include one or more sensors and/or one or more actuators. For example, if the network node module 910 includes a transmission electronic control unit 916, the network node module 910 may also include one or more transmission actuators 914 and/or one or more transmission sensors 912. As another example, if the network node module 910 includes a by-wire electronic control unit 904, the network node module 910 may also include one or more by-wire actuators 896 and/or one or more by-wire sensors 888. As yet another example, if the network node by includes one or more safety electronic control units 906, the network node module 910 may also include one or more safety actuators 898 and/or one or more safety sensors 890. As a further example, if the network node module 910 includes one or more diagnostic electronic control units 908, the network node module 910 may also include one or more diagnostic actuators 900 and/or one or more diagnostic sensors 892.

The transmission network node module 910 may be implemented as one or more integrated circuits, may include more or less components than shown, and/or may be implemented as one or more network node modules. For example, the network node module 910 may be implemented using one integrated circuit to support the circuitry of the port 812, the switching circuit module 786, and the network interfaces 788, the digital to analog converters 790, and the analog digital converters 792. The other components are implemented on a common integrated circuit, separate integrated circuits, and/or as standalone components.

Note that each of the network node modules of FIGS. 43-57 may be standalone network node module coupled to a switch module or to a bridge-routing module. Alternatively, or in addition to, each of the network node module of FIGS. 43-57 may be a device module coupled to a network node as shown in FIGS. 41 and 42.

Figure 58:
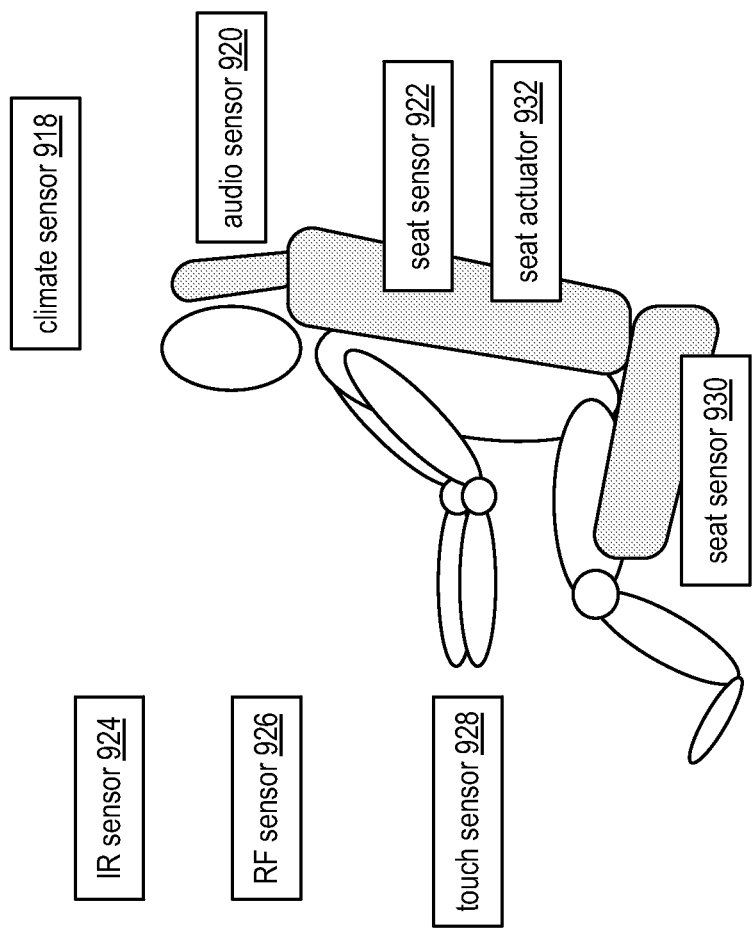
FIG. 58 is a schematic block diagram of an example of an occupant environment in accordance with the present invention.

FIG. 58 is a schematic block diagram of an example of an occupant environment within a vehicle. The occupant environment includes a seat, a plurality of sensors 918-930, and a plurality of actuators 932. The sensors 918-930 may be audio sensors 920, climate sensors 918, seat sensors 922, infrared sensors 924, radio frequency sensors 926, and/or touch sensors 928. The actuators 932 may be seat actuators 932. The sensors 918-930 and actuators 932 may be in a steering wheel network node module, within a seat network node module, within a door network node module, and/or within a dashboard network node module.

The touch sensor 928 may be used to detect whether the driver has one or more hands on the steering wheel. The touch sense data is communicated via the network fabric to a processing module that interprets the data. For example, the processing module may interpret the touch sensed data to determine whether the driver has one or more hands on the steering wheel, the position of the driver's hands, the force at which the driver is grabbing the steering wheel, etc. Based on this data, the processing module may generate one or more responses. For example, if the data indicates that the driver has his or her hands off the steering wheel for a predetermined period of time, the processing module may generate an audible and/or visual alarm. As another example, if the data indicates that the driver is grabbing the steering wheel with excessive force, the processing module may generate control signals that activate a chair massage to relax the driver.

The infrared sensors 924 and/or the RF sensors 926 may be used to track the eye movement of the driver, the driver's head position, the driver's hand and/or body movement, hand gestures, etc. The driver sensed data is communicated via the network fabric to a processing module that interprets the data. For example processing module may interpret the driver sensed data to determine whether the driver is focused on the road, is distracted, is falling asleep, is indicating a visual command, etc. Based on this data, the processing module may generate one or more responses. For example, if the driver is determined to be falling asleep, the processing module may generate an audible alarm, a visual alarm, may activate one or more seat actuators to shake the driver, etc.

The audio sensors 920 may be used to detect ambient noise, receive audible commands from a vehicle occupant, etc. The audio data is communicated via the fabric network to one or more processing modules that interpret the audio data. For example, if the sensor is detecting ambient noise, the processing module may utilize the ambient noise audio data for noise cancellation, surround sound balancing, in-cabin equalization, and/or other audio processing adjustments. As another example, if the audio relates to a voice command, a corresponding processing module interprets the voice command and generates a corresponding response. As a specific example, the voice command may be to adjust the seat position. In this specific example, the processing module generates one or more commands that it provides, via the network fabric, to one or more seat actuators, which process the commands to adjust the seat.

The climate sensors 918 may be used to detect ambient temperature, air movement, air quality, etc. The climate sensed data is provided to one or more processing modules via the network fabric. The processing modules interpret the climate sensed data and, based on this interpretation, the processing module may generate one or more responses. For example, if the climate sensed data indicates that the temperature is above a desired setting, the processing module may generate one or more commands to lower the terminal temperature, increase the fan rate, and/or other climate adjustment. Such commands are provided via the network fabric to the corresponding actuators. As another example, if the climate sensed data indicates that the air quality is below a desired setting, the processing module may generate a command to enable air filtering, switch to internal circulation of air to bringing in external air, the reverse, etc.

Figure 59:
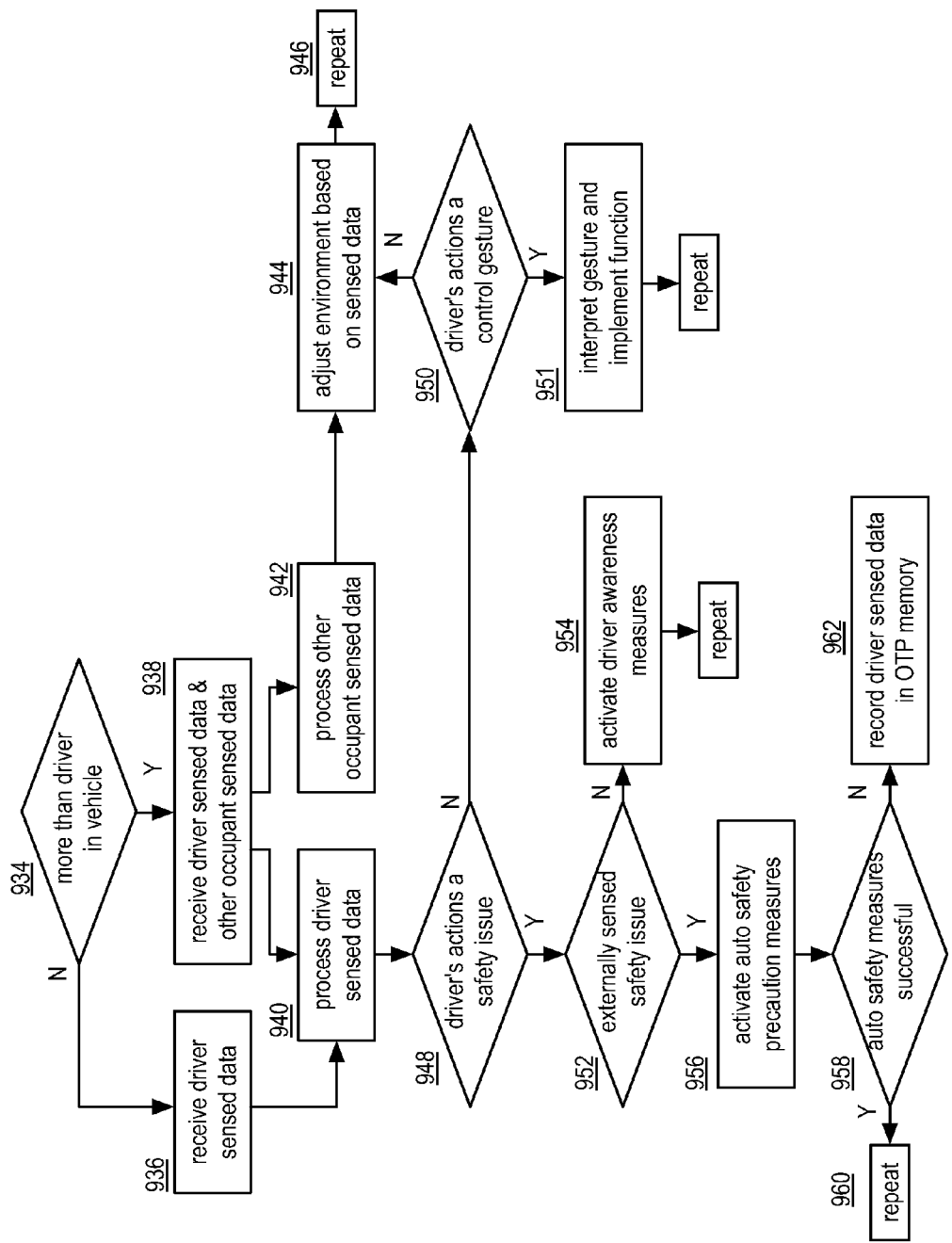
FIG. 59 is a logic diagram of an embodiment of a method for processing occupant sensed data in accordance with the present invention.

FIG. 59 is a logic diagram of an embodiment of a method for processing occupant sensed data that begins by determining whether one or more persons are in the vehicle 934. If only the driver is in the vehicle, the method proceeds by a receiving driver sentenced data 936. If, however, there are other occupants besides the driver in the vehicle, the method continues by receiving driver sensed data and other occupant sensed data 938.

The method continues by processing the driver sensed data 940 and, if any, the other occupant sensed data 942. For other occupant sensed data, the method continues by determining whether the occupant sensed data indicates whether an environmental adjustment should be made 944. For example, if the ambient temperature is above a desired setting, an adjustment may be made to the temperature setting and/or to the fan rate. As another example, if the occupant sensed data relates to a change in the occupants seat position, the processing module generates the corresponding commands, which are provided via the network fabric to the appropriate actuators. At this point, with respect to the occupant sensed data, the method repeats 946.

For driver sensitive data, the method continues by determining whether the driver's actions relate to a safety issue 948. If not, the method continues by determining whether the driver's actions relate to a control gesture 950. If not, the process continues by adjusting the environment based on the driver sensed data 944. Note that the adjustment to the environment may be based on both the driver sensed data and the other occupants sensed data.

If the driver's actions relate to a safety issue, the method continues by determining whether there is also an externally sensed safety issue 952 (e.g., a potential collision detection, icy road conditions detection, tire blowout detection, etc.). If not, the processing module generates one or more control signals to activate a driver awareness measure (e.g., an audible alarm, a visual alarm, shake the seat, etc.) in response to the driver's inattentiveness to driving 954.

If there is also an externally sensed safety issue, the method continues by activating auto safety precaution measures (e.g., auto braking, auto steering, auto transmission adjustment, etc.) 956. The method continues by determining whether the auto safety measures were successful in avoiding an accident 958. If yes, the method repeats 960. If not, the method continues by recording the driver sensed data in a one-time programmable (OTP) memory device 962.

Figure 60:
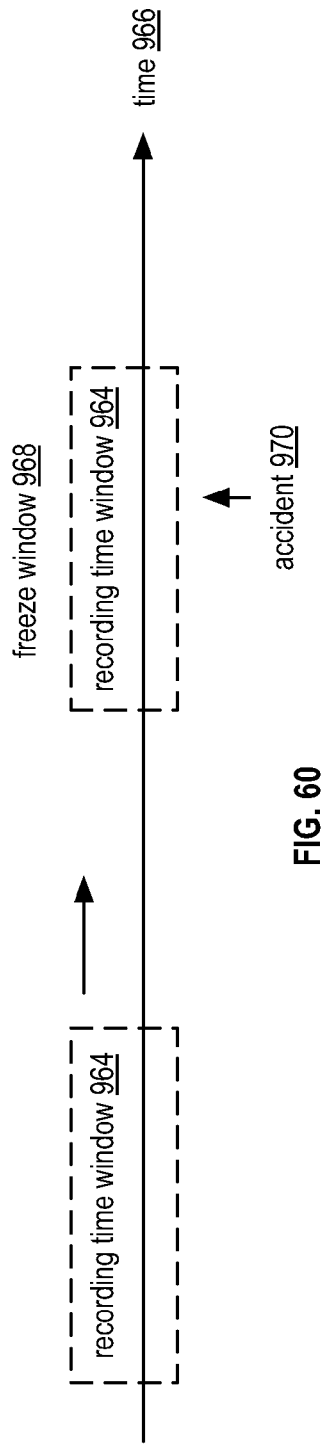
FIG. 60 is a diagram of an example of a moving recording time window in accordance with the present invention.

FIG. 60 is a diagram of an example of a moving recording time window 964 for recording real-time data, such as sensor data (e.g., driver sensed data and/or occupant sensed data) captured by one or more sensors within the vehicle. The recording time window 964 may have a fixed duration, such as a few minutes in length to one or more hours in length. Provided that the vehicle is not in an accident, older driver sensed data is overwritten with newer driver sensed data as the recording time window 964 moves forward in time 966.

When an accident 970 is detected, the recording time window 964 is frozen such that a sufficient amount of data preceding the accident 970 and following the accident 970 is stored in a one-time programmable memory device. For example, if the time window 964 is 45 minutes in duration, the 30 minutes preceding the accident 970 and the 15 minutes following the accident 970 may be frozen and provided to the one-time programmable memory device.

In addition to recording sensor data during vehicle operation, video data of the exterior and/or interior of the vehicle may be recorded in a one-time programmable memory device when an accident 970 is detected. The video data may further include audio data, if the camera is capable of capturing sound. In this instance, the exterior video data may be recorded in the same one-time programmable memory device or its own one-time programmable memory device. Note that each camera may have its own one-time programmable memory device, share a one-time programmable memory device, and/or a combination thereof.

In addition to recording data during vehicle operation, the system may be enabled to record proximity video data when the vehicle is in a parking lot and/or when the vehicle is not in operation. In this instance, if an accident 970 happens while the vehicle is not operating (e.g., is parked in a parking lot), the recording time window 964 will be frozen around the accident 970. In this manner, video evidence may be obtained of the vehicle or vehicles causing the accident, even if the driver of the other vehicle or vehicles leaves the scene of accident 970.

Figure 61:
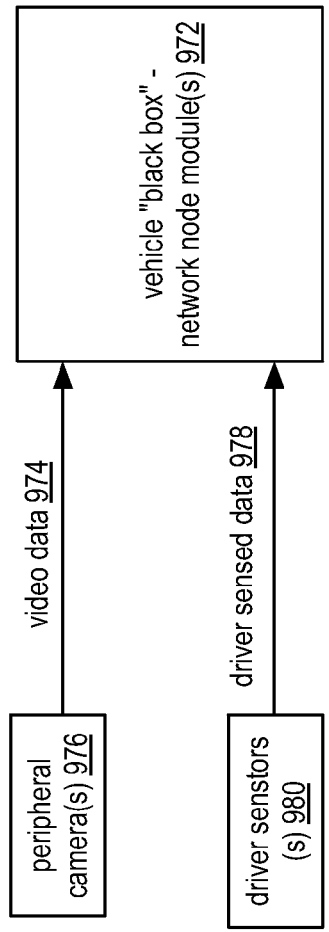
FIG. 61 is a schematic diagram of an embodiment of a vehicle black box in accordance with the present invention.

FIG. 61 is a schematic diagram of an embodiment of one or more vehicle black boxes 972. Each video black box 972 may receive video data 974 captured by one or more peripheral cameras 976 and sensor data 978 captured by one or more sensors 980. In general, the video black box 972 includes memory that stores the corresponding real-time data during the recording time window and includes circuitry that when an accident is sensed, freezes the recording time window, and downloads the real-time data within the frozen recording time window in a one-time programmable memory.

Figure 62:
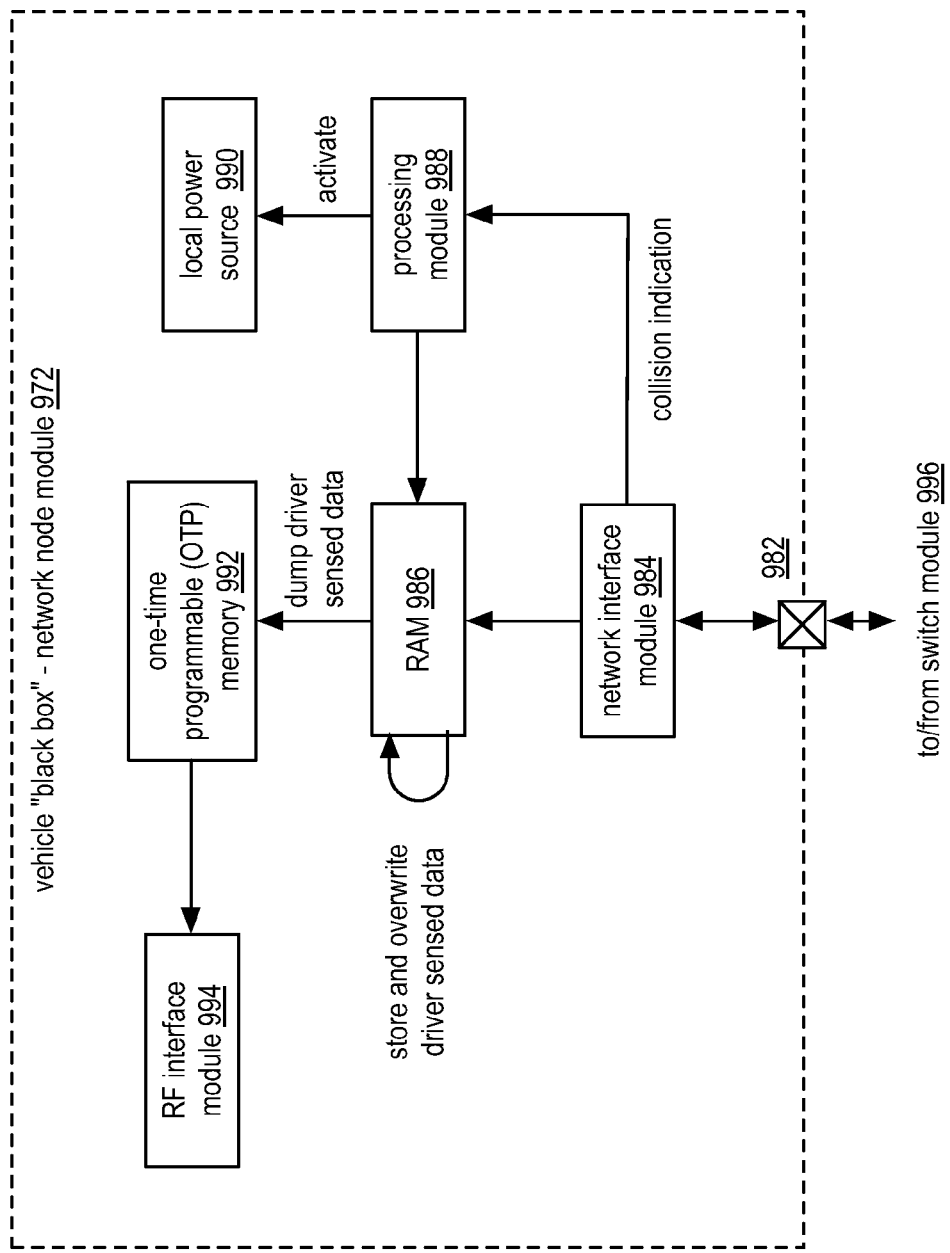
FIG. 62 is a schematic diagram of another embodiment of a vehicle black box in accordance with the present invention.
Figure 63:
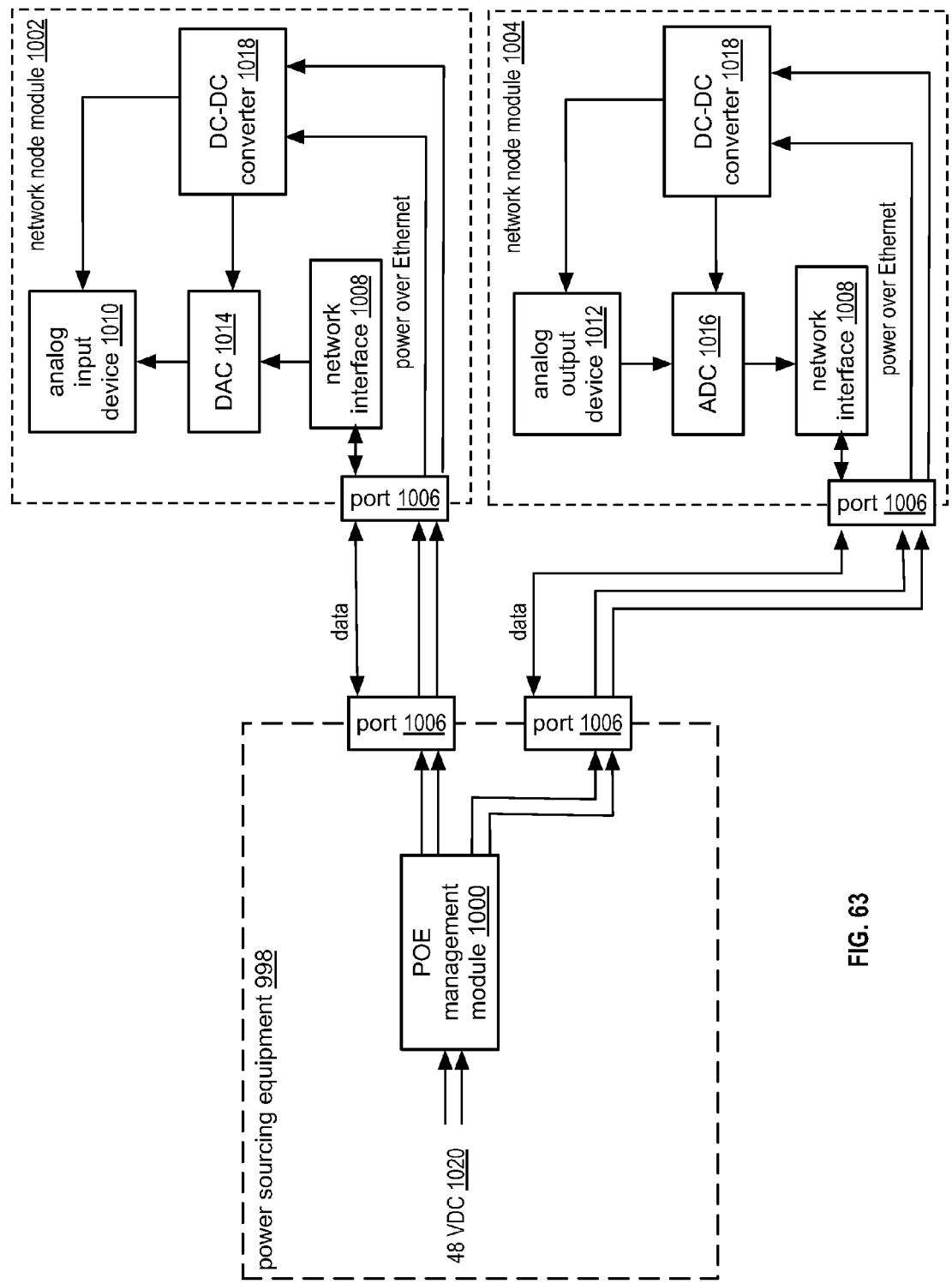
FIG. 63 is a schematic diagram of an embodiment of power distribution within a vehicular communication network in accordance with the present invention.
Figure 64:
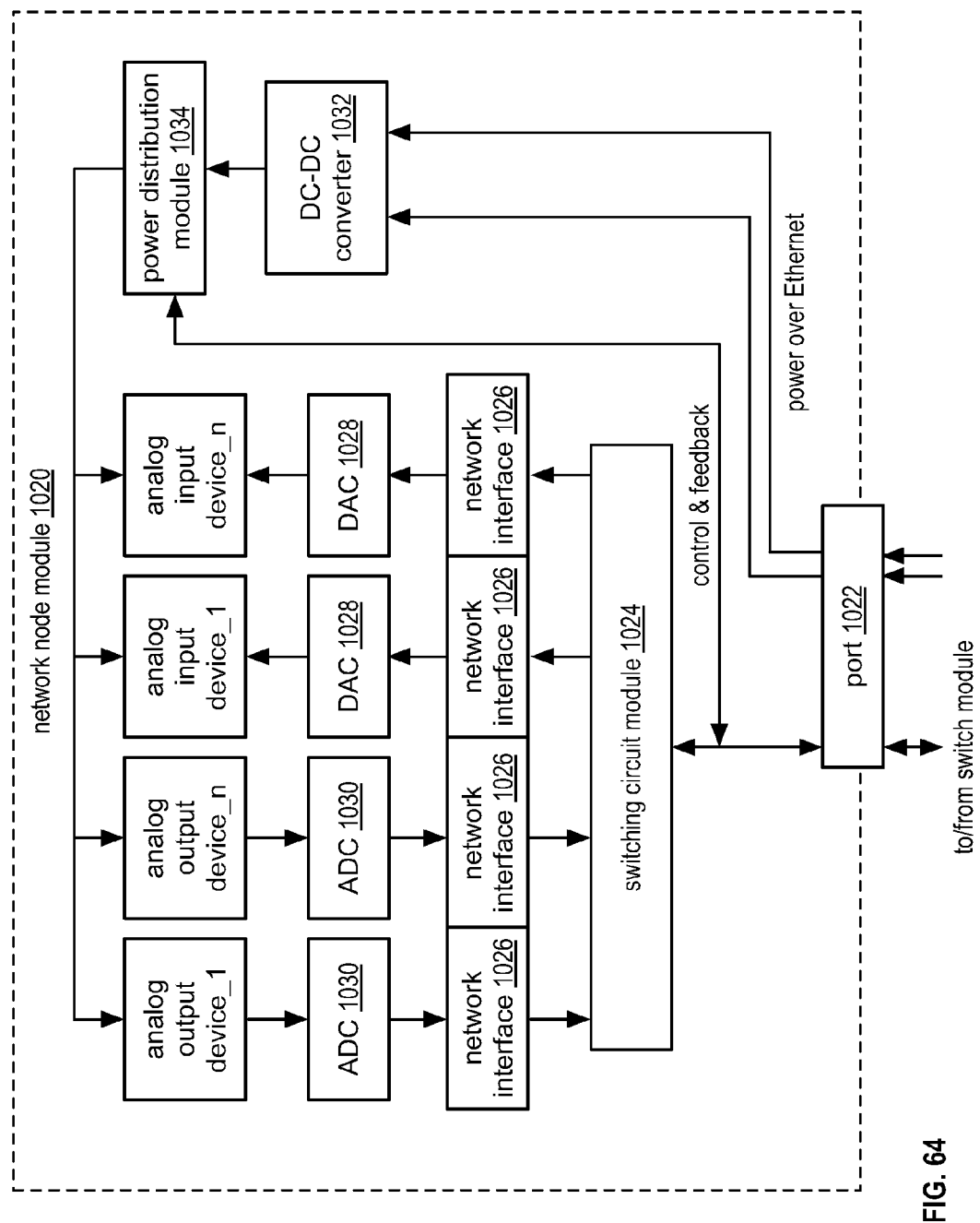
FIG. 64 is a schematic diagram of another embodiment of power distribution within a vehicular communication network in accordance with the present invention.
Figure 65:
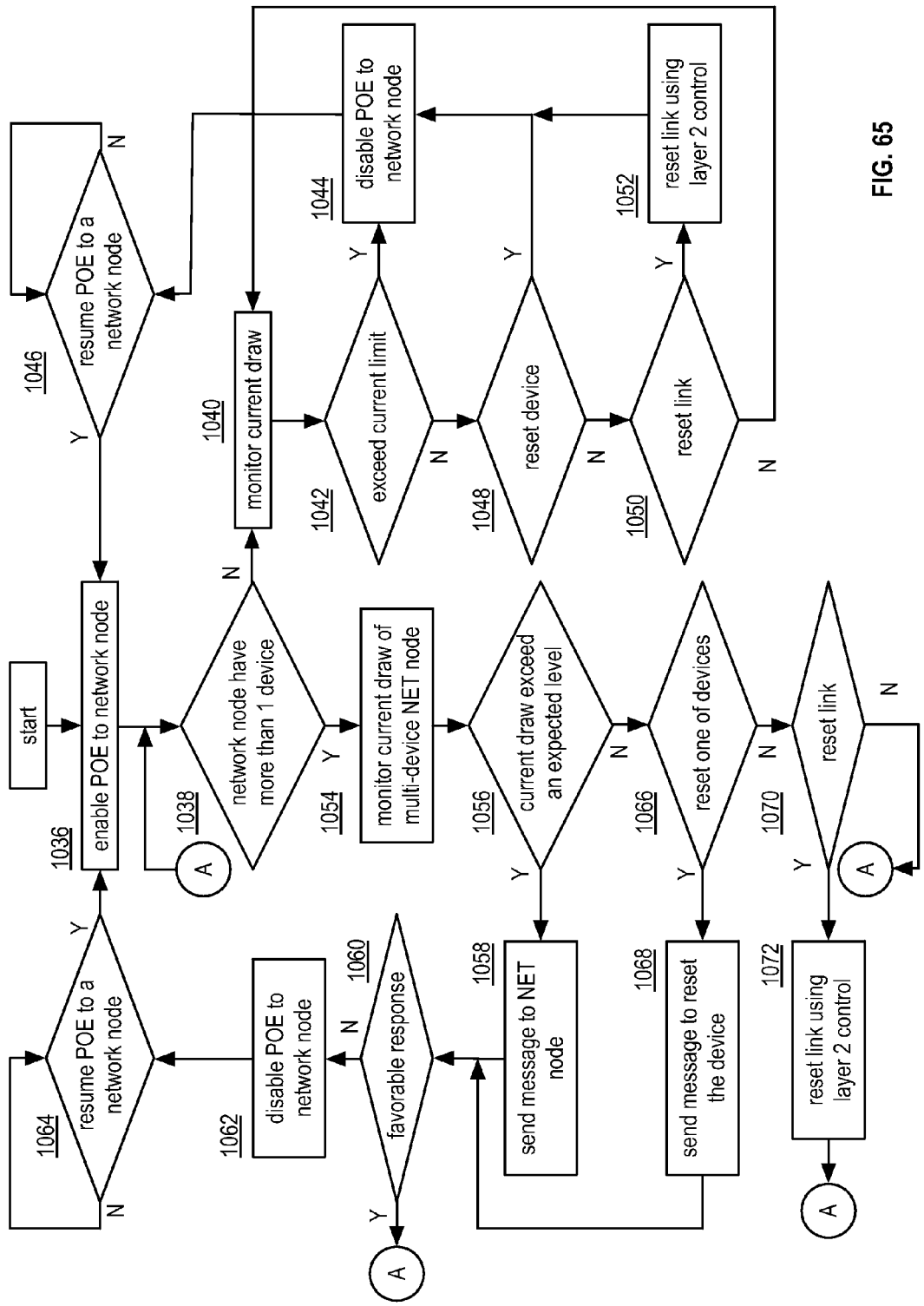
FIG. 65 is a logic diagram of an embodiment of a method for controlling power distribution within a vehicular communication network in accordance with the present invention.

FIG. 62 is a schematic diagram of another embodiment of a vehicle black box 972 that includes a port 982, a network interface module 984, random access memory 986, a processing module 988, a local power source 990, a one-time programmable memory 992, and a radio frequency interface module 994. The local power source 990 may be a battery, power harvesting circuit (e.g., generates a supply voltage from radio frequency signals, heat, solar energy, etc.), a battery charger, and/or a combination thereof.

In an example of operation, the vehicle black box 972 is coupled to a network switch module 996 and receives video data and/or sensor data therefrom. The network interface module 984 provides the real-time data (video and/or sensor data) to the RAM 986 and to the processing module 988. The processing module 988 facilitates the storage of the real-time data in the RAM 986. The amount of storage within the RAM 986 and the amount of data per second correspond to the recording time window. For example, if the RAM 986 has a storage capacity of 250 Gb, the data rate is 10 Mb per second, the RAM 986 can store 25,000 seconds of data (e.g., approximately 7 hours). Note that the recording time window may be shorter than the capacity of the memory and corresponding data rate (e.g., it may be an hour for a 7 hour capable memory/data rate combination).

As time passes without an accident, the older data stored in the RAM 986 is overwritten with newer data. When an accident is detected, a collision indication is provided to the processing module 988, which instructs the RAM 986 to download the real-time data within the RAM 988 to the one-time programmable memory 992. In one embodiment, the processing module 988 instructs the RAM 986 to begin downloading data to the OTP memory 992 with the data immediately preceding and immediately following the collision indication such that the most likely relevant data is stored first. Once this data is stored, the processing module 988 may instruct the RAM 986 to download additional data. In addition, the processing module 988 may activate the local power source 990, which provides power to the video black box 972 to enable the downloading of data to the one-time programmable memory 992. In other embodiments, the local power source 990 may further provide power to one or more external devices within the vehicle via the vehicular communication network through port 982.

The data stored in the one-time programmable memory 992 may be retrieved through the RF interface 994 in accordance with a one-time programmable memory 992 communication protocol. For instance, after an accident, emergency services may utilize a radio to communicate with the RF interface 994 to access the data in the one-time programmable memory 992. To protect the data, the communication protocol is proprietary to the auto manufacturer and the emergency services such that only emergency services may access the data.

In the alternative and depending on the severity of damage to the vehicle, the one-time programmable memory 992 may be accessed via the network fabric (vehicular communication network) through port 982. In this instance, a computer device coupled to the network fabric may access the data stored in the one-time programmable memory 992. In this manner, an entity that is authorized to access a vehicle network fabric may retrieve the data.

Figure 66:
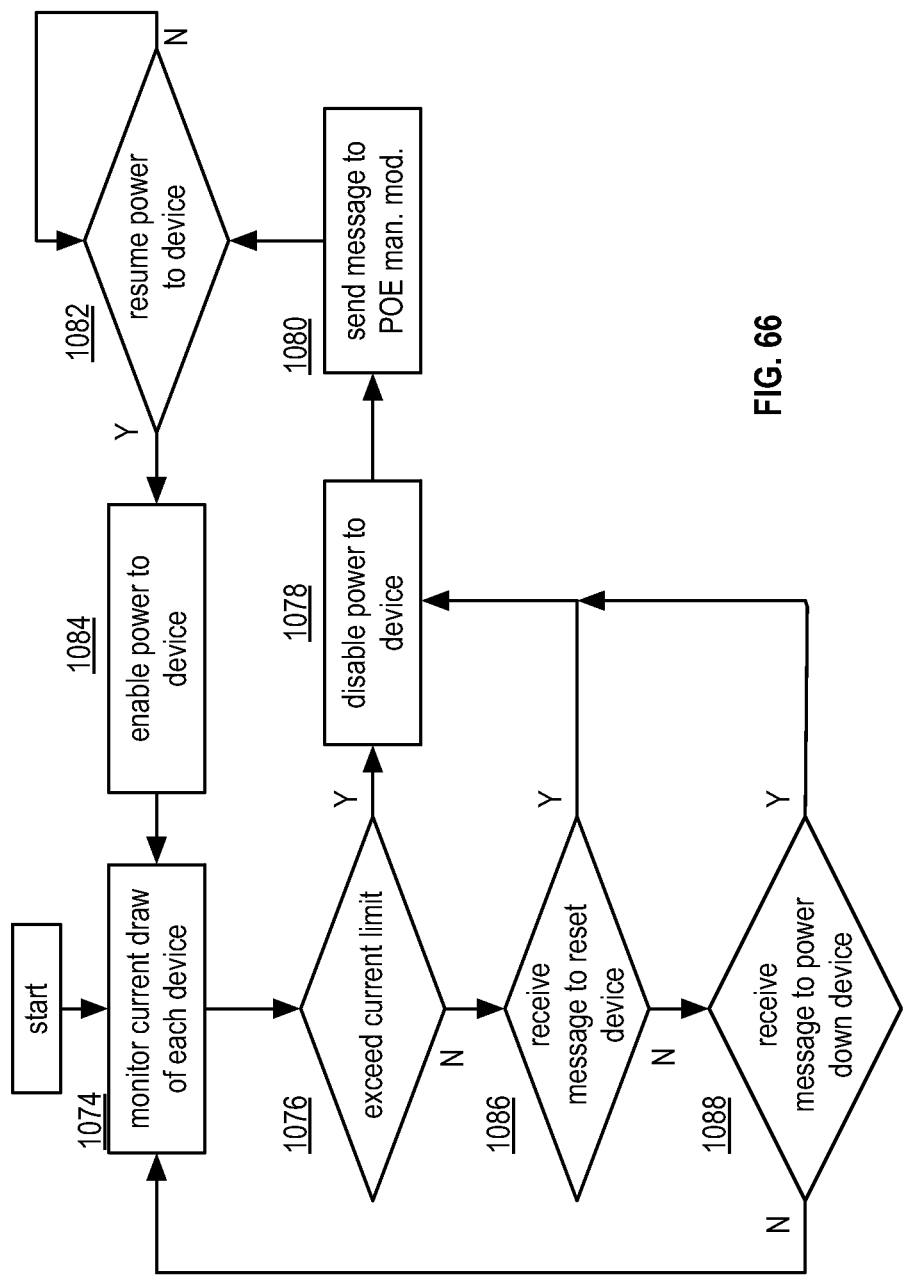
FIG. 66 is a logic diagram of another embodiment of a method for controlling power distribution within a vehicular communication network in accordance with the present invention.

FIG. 66 is a logic diagram of another embodiment of a method for controlling power distribution within a vehicular communication network that may be performed by a POE distribution module within a network node module. The method begins by monitoring current draw of each device of the network node module 1074. The method continues by determining whether the current draw for each device exceeds a current limit threshold 1076.

If the current draw of a device exceeds the current limit, the POE distribution module disables power to the device 1078 and sends a corresponding message to the POE management module 1080. The method then continues by determining whether to resume providing power to the device 1082. Such a determination may be based on receiving a signal from the POE management module, a retry mechanism, an indication that the device has been replaced, and/or another indication. If power to the device is to be resumed, the method continues by enabling power to the device 1084. Note that the monitoring of the current draw of a device and corresponding disabling power to the device is done on a device-by-device basis.

If the current draw of the devices does not exceed a current limit, the method continues by determining whether a message to reset a device is received 1086. If yes, the method continues by disabling power to the device 1078 and sending a corresponding message to the POE management module 1080. The POE distribution module will resume providing Power to the device upon receipt of a message from the POE management module to do so.

If a message to reset a device is not received, the message continues by determining whether a message to power down a device is received 1088. If not, the method repeats as shown. If so, the method continues by disabling power to the particular device 1078 and sending a message to the POE management module that the device has been powered down 1080. The POE distribution module will resume providing Power to the device upon receipt of a message from the POE management module to do so.

Figure 67:
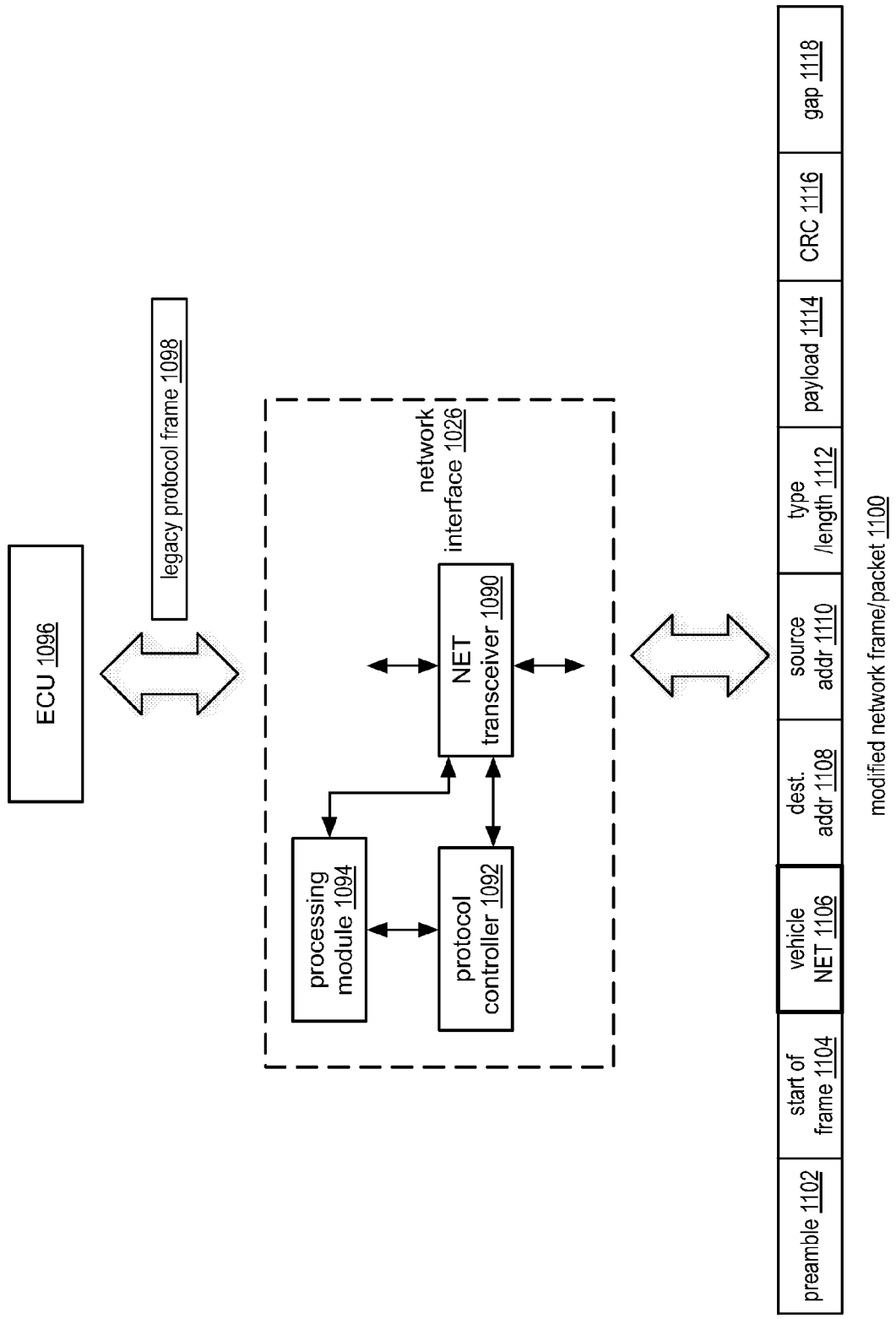
FIG. 67 is a schematic diagram of an embodiment of a network interface within a vehicular communication network in accordance with the present invention.

FIG. 67 is a schematic diagram of an embodiment of a network interface 1026 within a vehicular communication network. The network interface 1026 of a network node module includes a network transceiver 1090 and protocol processing unit that includes a protocol controller 1092 and/or a processing module 1094. The network transceiver 1090 provides the physical layer interface to the network fabric for the corresponding device. The controller functions to receive and store bits to/from the processing module 1094, which functions to interpret messages and generate messages corresponding to the data to/from the network fabric.

Figure 1:
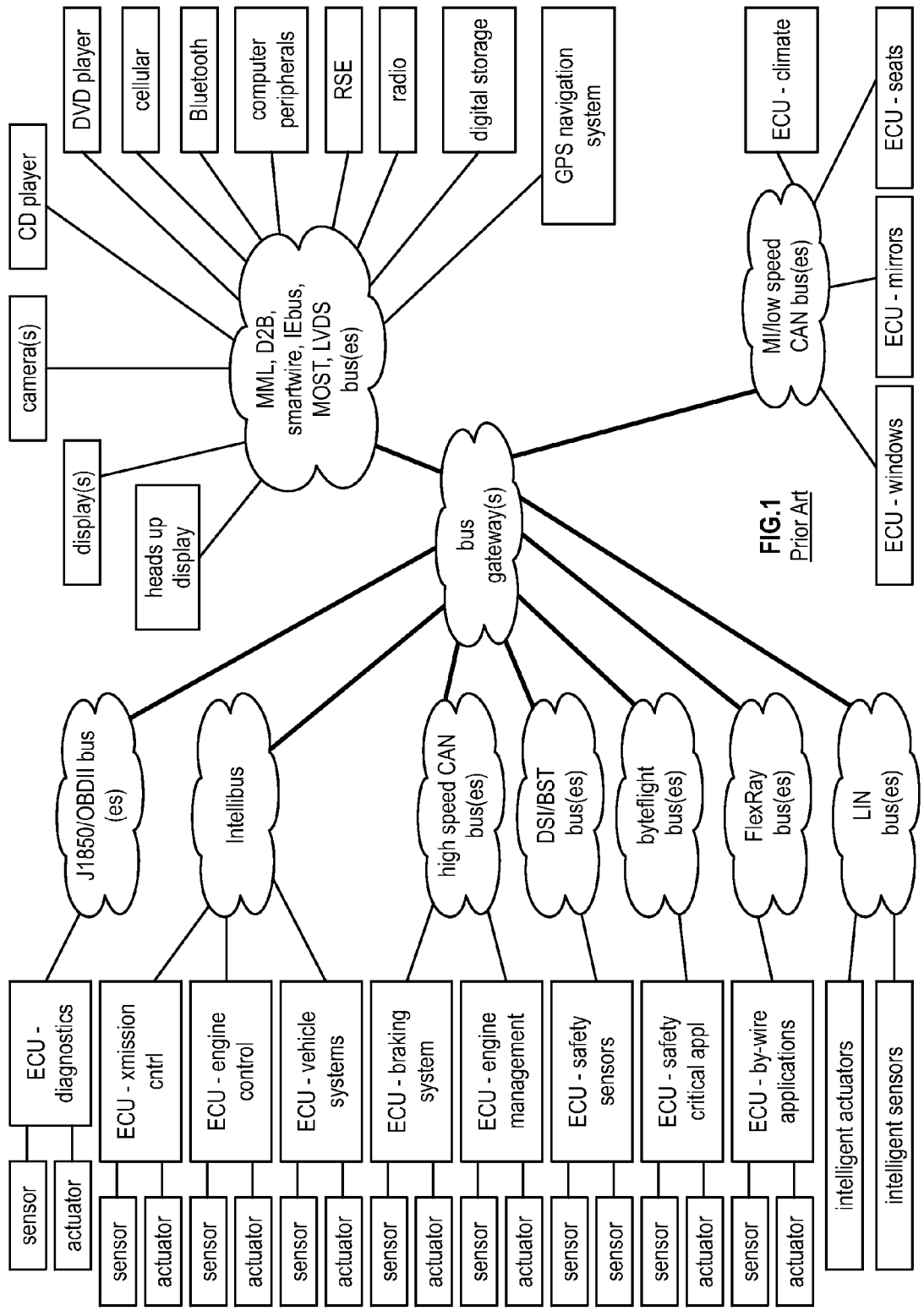
FIG. 1 is a schematic block diagram of a prior art vehicular communication network.

In an example of operation, the network transceiver 1090 receives data from a device. As shown, the device is an electronic control unit (ECU) 1096 that functions in accordance with an existing vehicle communication protocol (e.g., one of the protocols referenced in FIG. 1), but may be any vehicle device. In this example, the network transceiver 1090 receives a legacy protocol formatted frame 1098 from the ECU 1096. The processing module 1094 and/or protocol controller 1092 interpret the frame to determine that it is a legacy protocol frame 1098, includes raw data, or is formatted in accordance with the global vehicle network communication protocol.

For the legacy protocol, the processing module 1094 and/or controller 1092 then determines to re-packetize the frame or to encapsulate the legacy protocol frame 1098 in the payload section 1114 of a modified network frame/packet 1100. In addition, the processing module 1094 and/or controller 1092 generates the data for the vehicle network field 1106 of the modified network frames/packet 1100. For example, if the ECU 1096 relates to a mission-critical function, the appropriate data will be inserted into the vehicle network field 1106.

To re-packetize a frame, the processing module 1094 and/or protocol controller 1092 interprets the legacy protocol frame 1098 to extract a destination address, source address, type/length information, payload, cyclic redundancy check, and any other relevant information of the legacy protocol frame 1098. Having extracted this data, the processing module 1094 and/or protocol controller 1092 reconstructs the modified network packet 1100 to include a preamble 1102, start of frame 1104, vehicle network field 1106, the destination address 1108, the source address 1110, type/length 1112, the payload 1114, the cyclic redundancy check 1116, and a gap 1118 in accordance with the protocol of the vehicle network communication system.

To encapsulate the legacy protocol frame 1098 into a modified network frame 1100, the processing module 1094 and/or protocol controller 1092 interprets the legacy frame 1098 to extract the destination address and the source address. The processing module 1094 and/or protocol controller 1092 generates a preamble 1102, start of frame 1104, the vehicle network field 1106, the destination address 1108 based on the extracted destination address, a source address 1110 based on the extracted source address, a type/length 1112, a payload 1114 that includes at least a portion of the legacy protocol frame 1098, the CRC 1116, and a gap 1118. Depending on the length of the legacy protocol frame 1098, it may be completely encapsulated in the payload 1114 of the modified network frame 1100 or divided into sections, where each section is encapsulated in the payload 1114 of a modified network frame 1100.

For raw data (i.e., a signal stream not formatted in accordance with a legacy protocol or with the global vehicle network communication protocol), the protocol processing module converts the data into one or more packets (or frames) in accordance with the global vehicle network communication protocol. For global vehicle network communication protocol frames (or packets), the protocol processing module provides the frames (or packets) to the network transceiver in accordance with the locally managed prioritization scheme.

For an incoming packet from the network fabric, the processing module 1094 and/or protocol controller 1092 interprets the vehicle network field 1106 to determine the type of frame or packet (and its priority level). Based on this information, the processing module 1094 and/or protocol controller 1092 facilitates prioritize processing of the packet/frame 1100 as previously discussed or as may be subsequently discussed. In addition, the processing module 1094 and/or protocol controller 1092 may packetize the incoming packet 1100 into the legacy protocol frame 1098 (or multiple legacy protocol frames) or convert the incoming packet into raw data.

FIG. 68A is a logic diagram of an embodiment of a method for managing devices coupled to the vehicular communication network that may be performed by a network node module, such as a multiple device network node module, a switching module and/or a bridge/routing module. The method begins by configuring the network node module in accordance with a particular use mode of a set of use modes 1101. Each use mode defines the rights and privileges for devices to operate in the vehicular communication network. Each use mode may be implemented, for example, by an access control matrix or other type of access rules table that enables the network access rights to be enforced. For example, the access control matrix may indicate the rules for device detection, device authentication, identifying damaged devices and disabling damaged devices, as will be described in more detail below in connection with FIGS. 69-71.

Upon being configured in accordance with a particular use mode of the set of use modes, the method continues by identifying a device coupled to the vehicular communication network 1103. The device may be a newly added device or an existing device. For example, the device may be a device within a multiple device network node module or another network node module. The method continues by managing the device in accordance with the use mode (e.g., enabling the device to operate within the vehicular communication network in accordance with the use mode) 1105. For example, the network node module can authenticate a new device based on the use mode (i.e., the use mode may indicate whether or not a particular new device is allowed and the contact information for authenticating the new device). As another example, the network node module can monitor an existing device (i.e., by comparing stored expected data and/or power consumption information to the actual consumption of an existing device) to determine whether that existing device is damaged and/or disable a damaged device based on the use mode.

The method continues by determining whether the use mode has been changed 1107. In one embodiment, the network node module is securely reconfigurable to any use mode in the set of use modes. For example, an authorized agent may access the network node module via a direct (wireline) connection or a wireless connection to the network node module and/or the vehicular communication network to select a particular use mode. The use mode may be selected, for example, based on the make/model of the vehicle, the country to which the vehicle is destined and any other factor(s). If the use mode has changed, the method continues by reconfiguring the network node in accordance with the new use mode 1101. If not, the method continues by managing the same or another device(s) in accordance with the current use mode 1103.

FIG. 68B is a schematic diagram of an embodiment of a network node module 1109 that includes a port 1111, a network interface 1113, a device 1115 (which may be a new device or an existing device), a memory 1117 and a processing module 1119. The memory 1115 maintains a set of use modes 1121, which may include, for example, a respective access control matrix for each use mode. The memory 1115 may further maintain separately or as part of the access control matrix authentication information for one or more new devices, such as contact information for a remote source to authenticate a new device, and expected data and/or power consumption information for an existing device.

In an example of operation, the network node module 1109 is coupled to the vehicular communication network via port 1111 and network interface 1113 to receive input from an authorized agent selecting a particular use mode 1121. In another embodiment, the use mode selection may be input directly to the network node module via a direct (wired) connection or a wireless connection. Upon receiving the selected use mode, the processing module 1119 accesses the memory 1117 to retrieve the selected use mode 1121 and configures the network node module 1109 in accordance with the selected use mode 1121. Based on the selected use mode 1121, the processing module 1119 manages the device 1115 by enabling the device to operate within the vehicular communication network in accordance with the selected use mode 1121.

Figure 69:
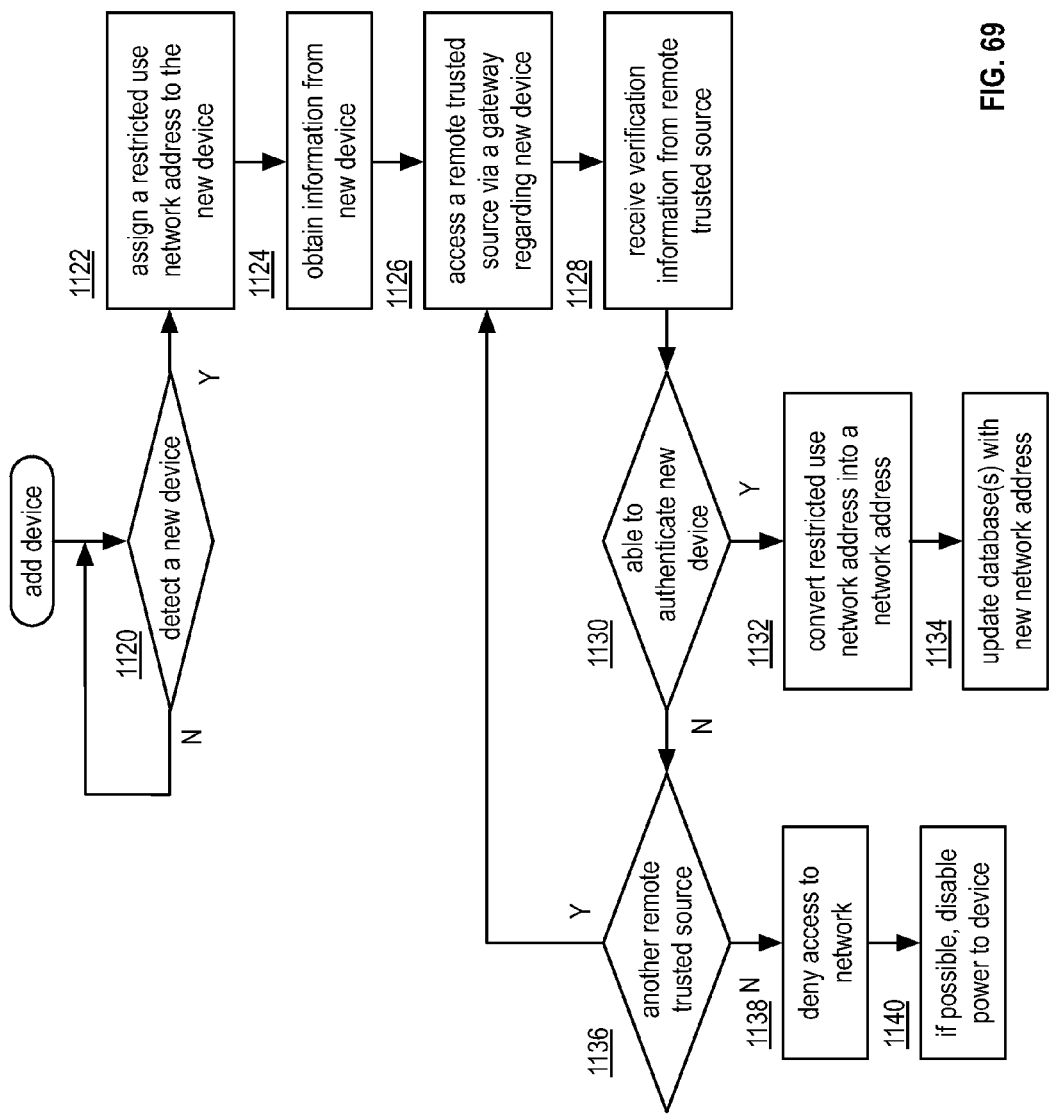
FIG. 69 is a logic diagram of an embodiment of a method for adding a device to a vehicular communication network in accordance with the present invention.

FIG. 69 is a logic diagram of an embodiment of a method for adding a device to a vehicular communication network in accordance with a particular use mode that may be performed by a network node module, such as a multiple device network node module, a switching module and/or a bridge-routing module. The method begins by a detecting the connection of a new device, which may be a new network node module or a new device on a network node module 1120. The method continues by assigning a restricted use network address to the new device 1122. The restricted use network address allows the new device to communicate via the network fabric of the vehicular communication network for communication setup information only. As such, the new device is prohibited from accessing the network fabric for any other purpose until the restricted use address is replaced with a network address. To enforce this restriction, the network fabric module interprets the packets from a new device to determine whether its contents are related to communications set up. If not, the packet is discarded and not placed on the network fabric.

The method continues by obtaining authentication information (e.g., serial number, manufacturer ID code, etc.) from the new device using the restricted use network address 1124. The method continues by accessing a remote source via the gateway (e.g., a wireless connection through the gateway) to authenticate the new device 1126. For example, if the new device is a replacement device, the remote source may be the automobile manufacturer, an authorized service provider, etc. As another example, the new device may be a new component (e.g., a new control unit, a new interface, etc.) being added to the vehicular communication network and the remote source may be an authorized supplier or the automobile manufacturer. The network fabric module retrieves contact information for the remote source, accesses the remote source using the contact information and provides the authentication information regarding the new device to the remote source for verification of the device. The contact information for the remote source may be, for example, maintained within the internal memory of the network fabric module, stored within a memory of the vehicular communication network and retrieved into the internal memory of the network fabric module or downloaded into the internal memory of the network fabric module from another external (remote) source.

The method continues by receiving verification information from the remote source 1128. The verification information may indicate that the new device is a device that can be reliably added to the network or may indicate that the device could not be authenticated with instructions to either not add the device to the network or allow the installer to override the verification information (e.g., using a password or other override code).

The method continues by determining whether the new device was authenticated by the remote source 1130 (or authenticated by override of the installer). If yes, the process continues by converting the restricted use network address into a network address 1132 and updating the various databases of the vehicular communication network with the new network address of the new device 1134.

If the new device was not authenticated, the process continues by determining whether there is another source that may be accessed 1136. If yes, the process repeats as shown. If not, the method continues by denying the new device access to the network 1138 and, if possible, disabling power to the new device 1140. The disabling of the power may be done as previously discussed with reference to one or more of FIGS. 63-66 or as may be discussed with reference to one or more of FIGS. 70A and 70B.

Figure 70B:
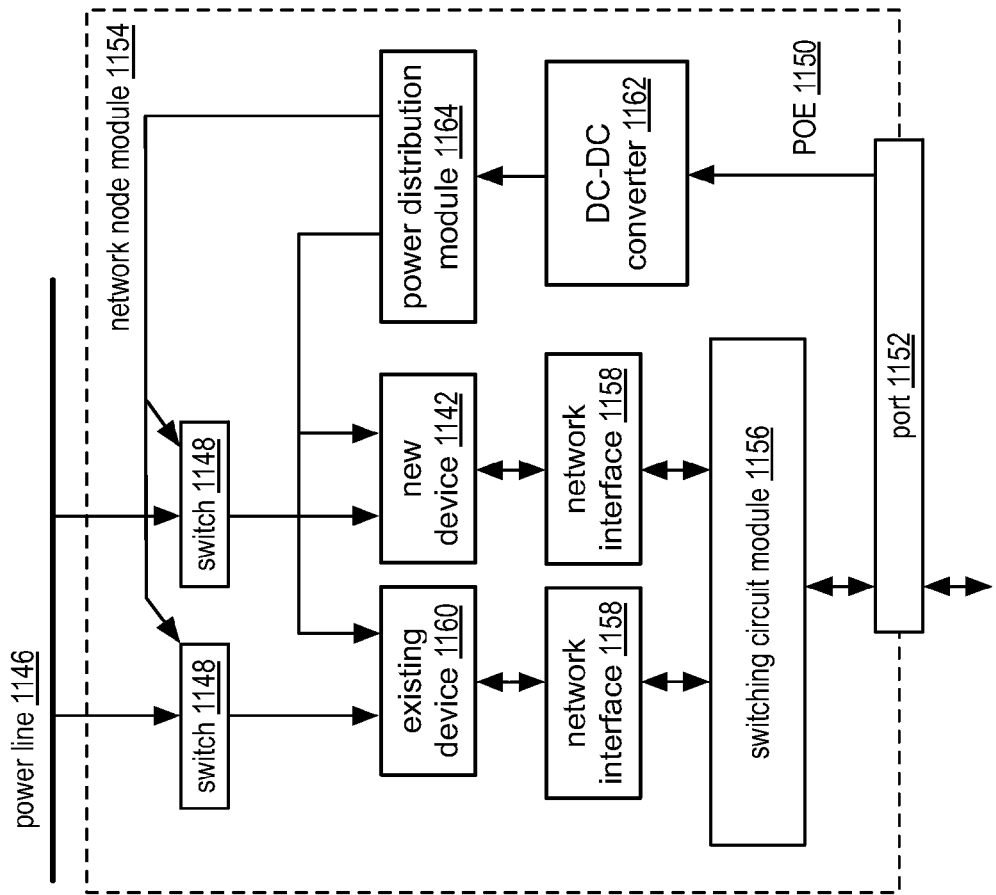
FIG. 70B is a schematic diagram of an embodiment of a new device added to a network node module in accordance with the present invention.
Figure 70A:
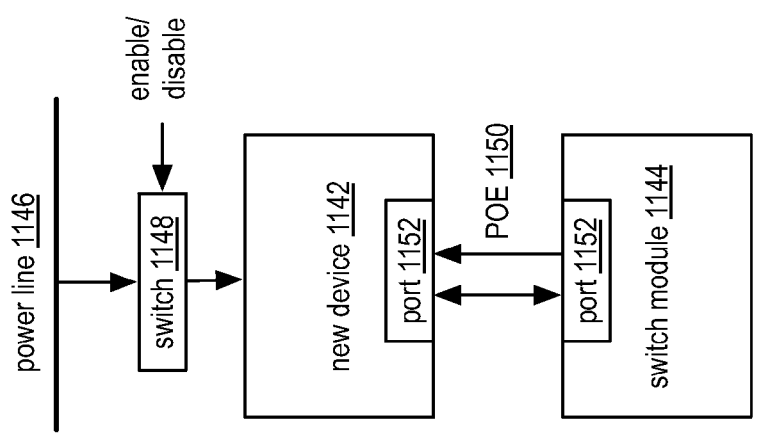
FIG. 70A is a schematic diagram of an embodiment of a new device coupled to a switch module within a vehicular communication network in accordance with the present invention.

FIG. 70A is a schematic diagram of an embodiment of a new device 1142 coupled to a switch module 1144 within a vehicular communication network. In this diagram, a new device 1142 (e.g., a network node with a single device or a network node with a plurality of devices where one of the devices is new or all of devices are new) receives its power from a power over Ethernet (POE) connection 1150 from a switch module 1148 and/or from a power line 1146 via a switch 1148.

If, as discussed with reference to FIG. 69, the new device 1142 is not authenticated, the switch module 1148 may disable the POE 1150 to the new device thereby disabling it. Alternatively, or in addition to, if the new device 1142 receives power from the power line 1146, a processing module of the network manager may disable the switch 1148 that couples the new device 1142 to the power line 1146 thereby disabling the new device 1142. In either configuration, a new device 1142 that is not authenticated may readily have the power removed from it thereby effectively disabling it.

FIG. 70B is a schematic diagram of an embodiment of a new device 1142 added to a network node module 1154 that includes a port 1152, a switching circuit module 1056, a plurality of network interfaces 1158, at least one existing device 1160, at least one new device 1142, one or more switches 1148, a DC-DC converter 1162, and a power distribution module 1164. Upon detection of the new device 1142, the power distribution module 1164 enables power to be provided to the new device 1142 either via the power line 1146 or the power over Ethernet (POE) 1150.

If the new device 1142 is not authenticated as discussed with reference to FIG. 69, the power distribution module 1164 removes power from the new device 1142. This may be done by disabling the switch 1148 that couples the new device 1142 to the power line 1146 or by disabling the POE connection 1150. In either event, the new device 1142 is powered down and thus disabled. Note that the power distribution module 1164 may receive a control signal from the switching module 1156, or other network fabric module, to remove power from the new device 1142.

Figure 71:
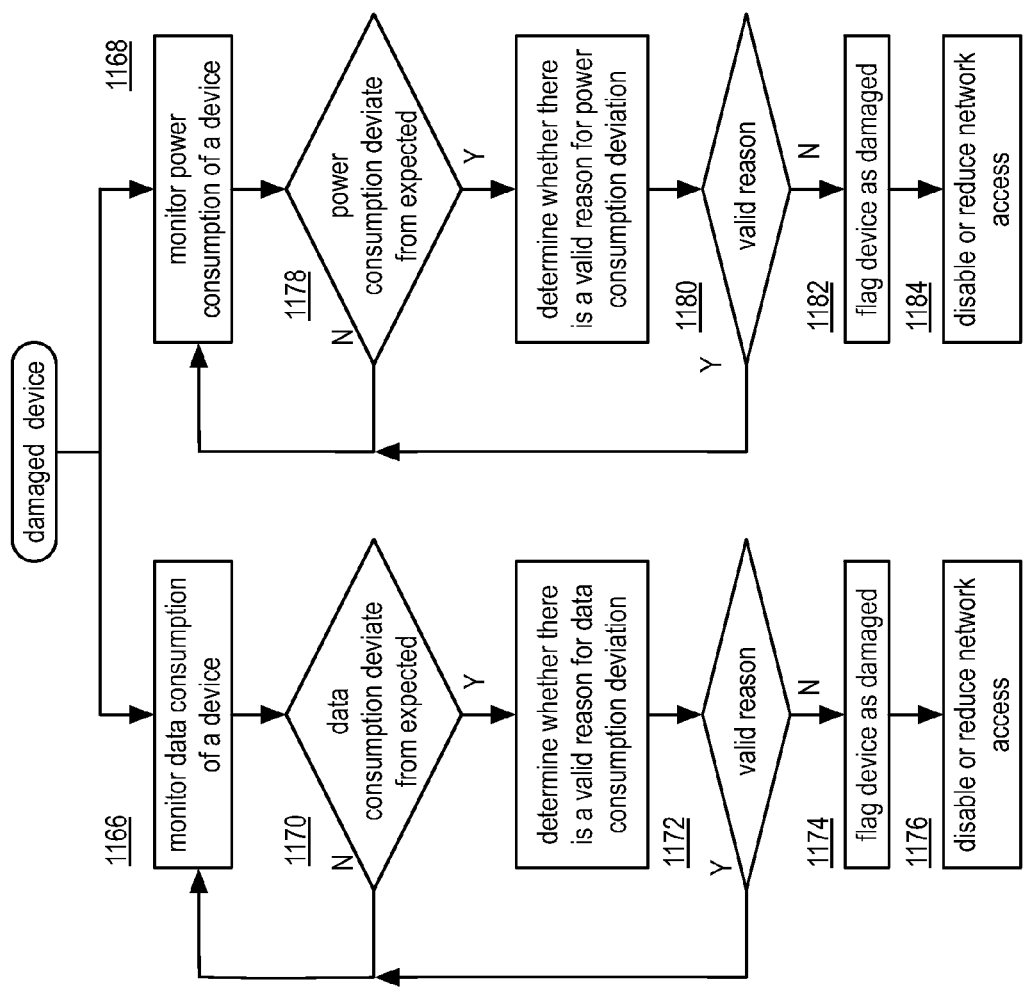
FIG. 71 is a logic diagram of an embodiment of a method for processing a damaged device of a vehicular communication network in accordance with the present invention.

FIG. 71 is a logic diagram of an embodiment of a method for monitoring an existing device in accordance with a particular use mode to determine whether the existing device is a damaged device within a vehicular communication network. The method of FIG. 71 may be performed by a network fabric module, such as a network node module, a switch module, and/or a bridge-routing module. The method begins with monitoring actual consumption of the existing device, where the actual consumption includes at least one of data consumption of the existing device 1166 (on one path) and power consumption of the existing device 1168 (on another path). Note that the existing device may be a network node module with one or more devices or a device of a network node module.

For the data consumption path, the method continues by determining whether the data consumption of the existing device deviates from an expected level of data consumption 1170. Such expected consumption information (expected level of data consumption and standard deviation therefrom) may be, for example, maintained within the internal memory of the network fabric module, stored within a memory of the vehicular communication network and retrieved into the internal memory of the network fabric module or downloaded into the internal memory of the network fabric module from an external (remote) source. The expected level of data consumption and standard deviation therefrom is based on the type of device (e.g., a display, an electronic control unit, a sensor, an actuator, etc.). For example, a display that is enabled to receive a video file will consume a certain amount of data per time interval (e.g., 2 Mb per second for standard television formatting).

If an existing device is consuming data a rate that is outside of the standard deviation, the method continues by determining whether there is a valid reason for the data consumption deviation 1172. For example, a valid reason may include a busy sensor due to driving conditions (e.g., a car on a racetrack) or a rarely used sensor due to driving conditions (e.g., stuck in traffic). If the reason is valid, the method repeats as shown.

If, however, the reason is not valid, the method continues by flagging the device is damaged 1174. The method continues by disabling the damaged device (e.g., remove power) or reducing the damaged device's access to the network fabric 1176. For example, the network fabric module may use a sliding scale based on type of device to reduce access to the vehicular communication network, such that mission critical devices are not prevented from accessing the vehicular communication network for mission critical operations. In addition, a service indication may be generated regarding the damaged device.

For the power consumption path, the method continues by determining whether the power consumption of the device deviates from an expected level of power consumption 1178. Again, such expected consumption information (expected level of power consumption and standard deviation therefrom) may be, for example, maintained within the internal memory of the network fabric module, stored within a memory of the vehicular communication network and retrieved into the internal memory of the network fabric module or downloaded into the internal memory of the network fabric module from an external (remote) source. The expected level of power consumption and standard deviation therefrom is based on the type of device (e.g., a display, an electronic control unit, a sensor, an actuator, relay, etc.). For example, a display that is enabled to receive a video file will consume a certain amount of power (e.g., 2 Watts).

If an existing device is consuming power at a level that is outside of the standard deviation, the method continues by determining whether there is a valid reason for the data consumption deviation 1180. For example, driving conditions dictate a much higher or lower rate of use and thus a much higher or lower power consumption.

If, however, the reason is not valid, the method continues by flagging the device is damaged 1182 (e.g., is shorting or is an open circuit). The method continues by disabling the damaged device (e.g., remove power) or reducing the damaged device's access to the network fabric 1184. In addition, a service indication may be generated regarding the damaged device.

Figure 72:
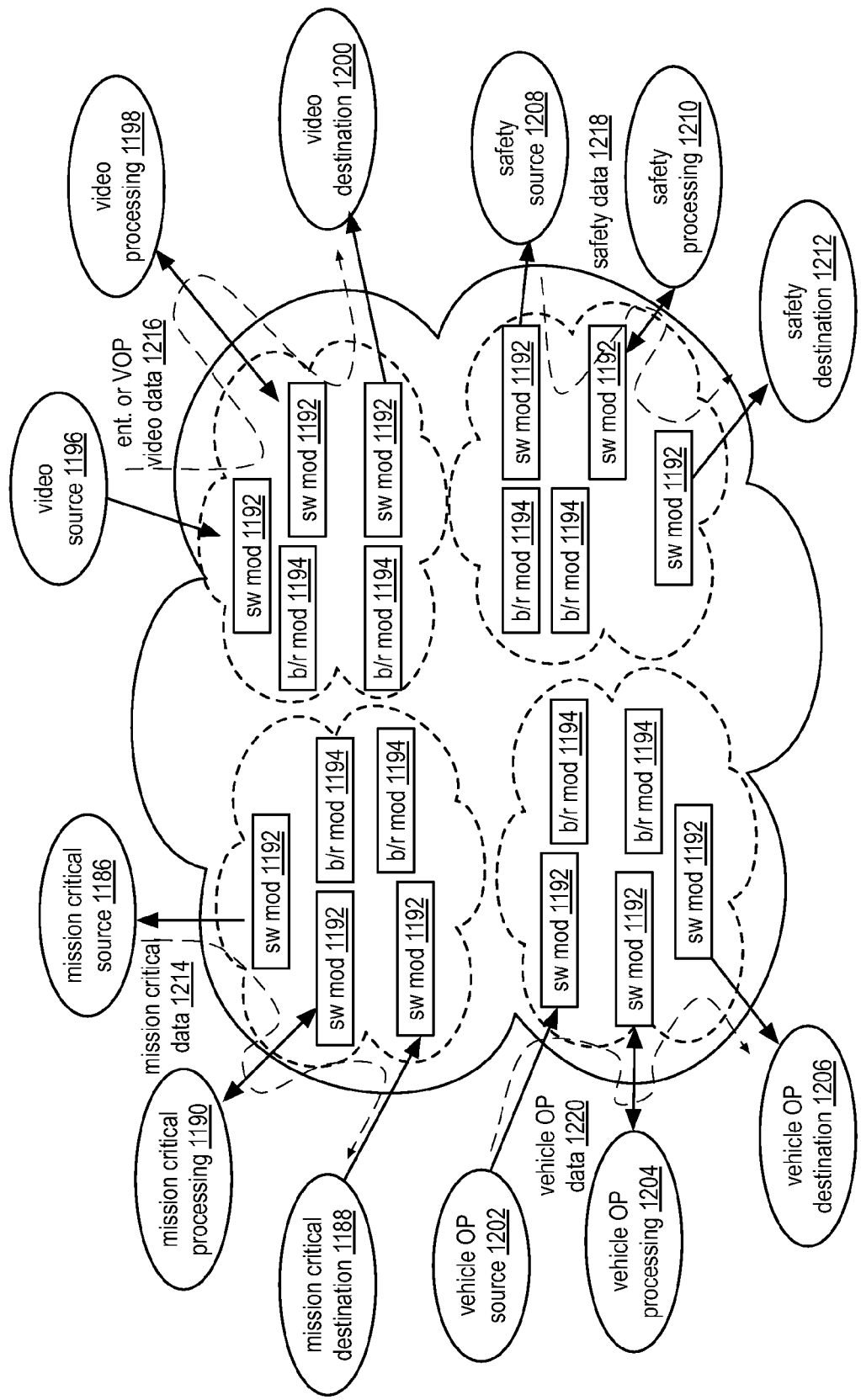
FIG. 72 is an example diagram of an embodiment of network and/or resource planning within a vehicular communication network in accordance with the present invention.

FIG. 72 is an example diagram of an embodiment of network and/or resource planning within a vehicular communication network. In this example, where possible, like devices are logically grouped together and coupled to a grouped set of network modules (e.g., switch modules, bridge-routing modules, etc.). For example, mission critical sources (e.g., safety sensors) 1186, mission critical destinations 1188 (e.g., safety actuators), and mission critical processing modules 1190 (e.g., safety ECUs) are coupled to a set of switch modules 1192 and bridge-routing modules 1194. Similarly, video sources 1196 (e.g., cameras, GPS navigation system, video game consoles, etc.), video processing modules 1198 (e.g., graphics engine, video decoder, video encoder, etc.), and video destinations 1200 (e.g., displays, etc.) are coupled to a set of switch modules 1192 and bridge-routing modules 1194. The same type of grouping may be done for vehicle operation sources 1202, destinations 1206, and processing resources 1204 and for safety sources 1208, safety destinations 1210, and safety processing resources 1212.

By grouping the network node devices of the vehicle network communications system, the network fabric is capable of supporting multiple simultaneous packet communications. For example, vehicle operation data 1220 may be routed from a vehicle operation source 1202 to a vehicle operation processing resource 1204 concurrently with routing entertainment video data 1216 from a video processing resource 1198 to a video destination 1200 as long as the routings of the respective data do not use common resources of the network fabric.

Figure 73:
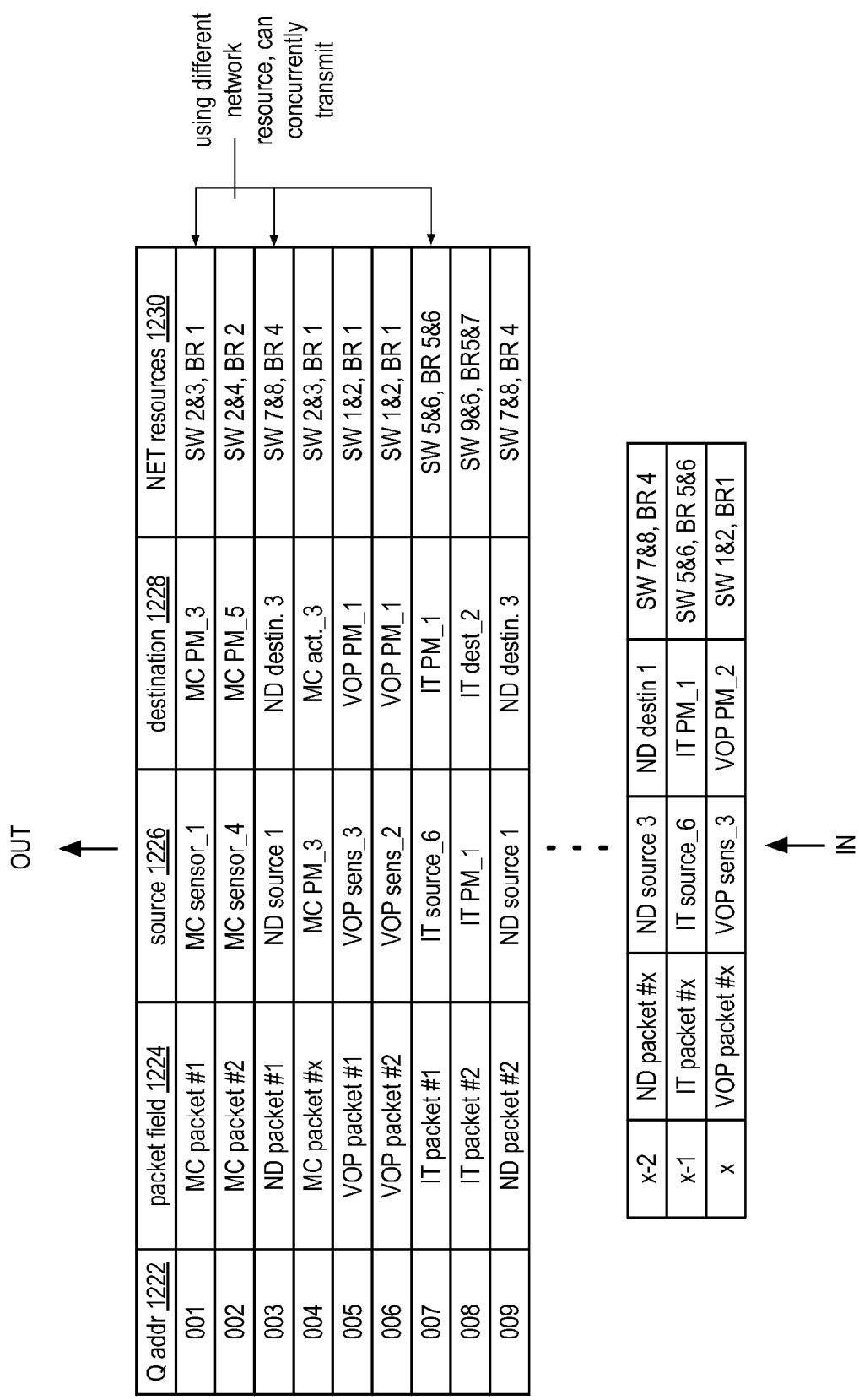
FIG. 73 is an example diagram of an embodiment of a packet queue for concurrent packet transmissions within a vehicular communication network in accordance with the present invention.

FIG. 73 is an example diagram of an embodiment of a packet queue for concurrent packet transmissions within a vehicular communication network. The queue includes a queue address 1222, a packet field identifier 1224, a source identifier 1226, a destination identifier 1228, and network resources 1230. From this data, a network manager (centralized or distributed) may identify packets that may be concurrently transmitted.

For example the first entry in the queue has a queue address of 001 and identifies mission-critical packet number one, which has a source of mission-critical sensor one, a destination of mission-critical processing module three and uses switching modules 2 and 3 and bridge-routing module 1 as the network resources. Since this is the first packet in the queue, it has priority for transmission. That being said, other packets that use different network resources may be concurrently transmitted without interfering with the priority of the first packet.

In this example the packet at queue address 003 and the packet at queue address 007 used different network resources that the packet at queue address 001 and used different network resources and each other. As such, these packets may be simultaneously transmitted via the network fabric with acceptably negligible interference on each other.

Figure 74:
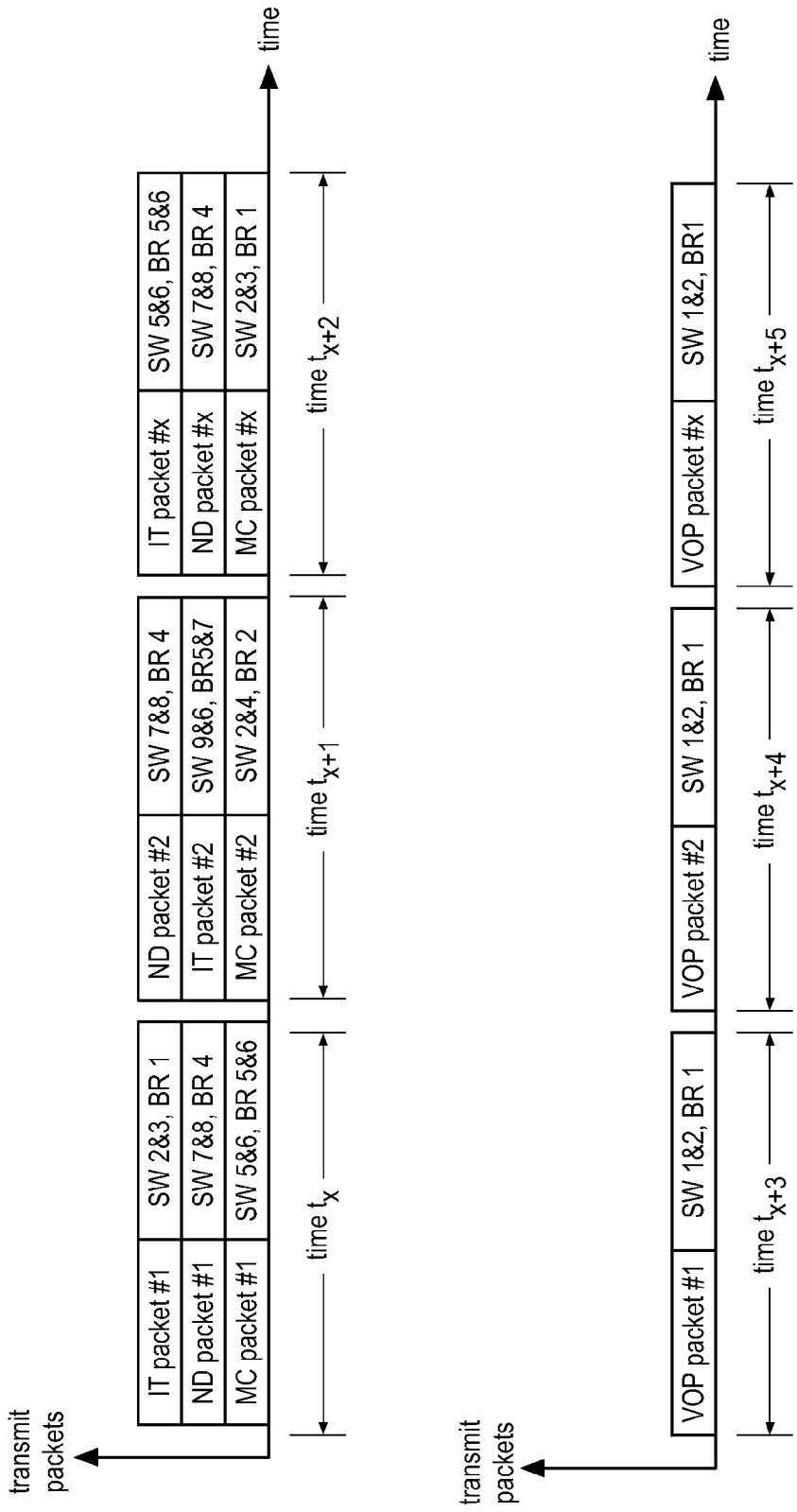
FIG. 74 is an example diagram of concurrent packet transmissions within a vehicular communication network in accordance with the present invention.

FIG. 74 is an example diagram of concurrent packet transmissions within a vehicular communication network based on the packets of the queue in FIG. 73. As shown, at a given time tx, three packets can be concurrently transmitted since they use non-overlapping network fabric resources. At time tx+1, another three packets may be concurrently transmitted since they do not use overlapping network fabric resources. Similarly at time tx+2, three packets may be concurrently transmitted. For the remaining time intervals, based upon the remaining packets in the queue, each packet is singularly transmitted in a corresponding time interval to avoid the use of overlapping resources within the network fabric.

Figure 75:
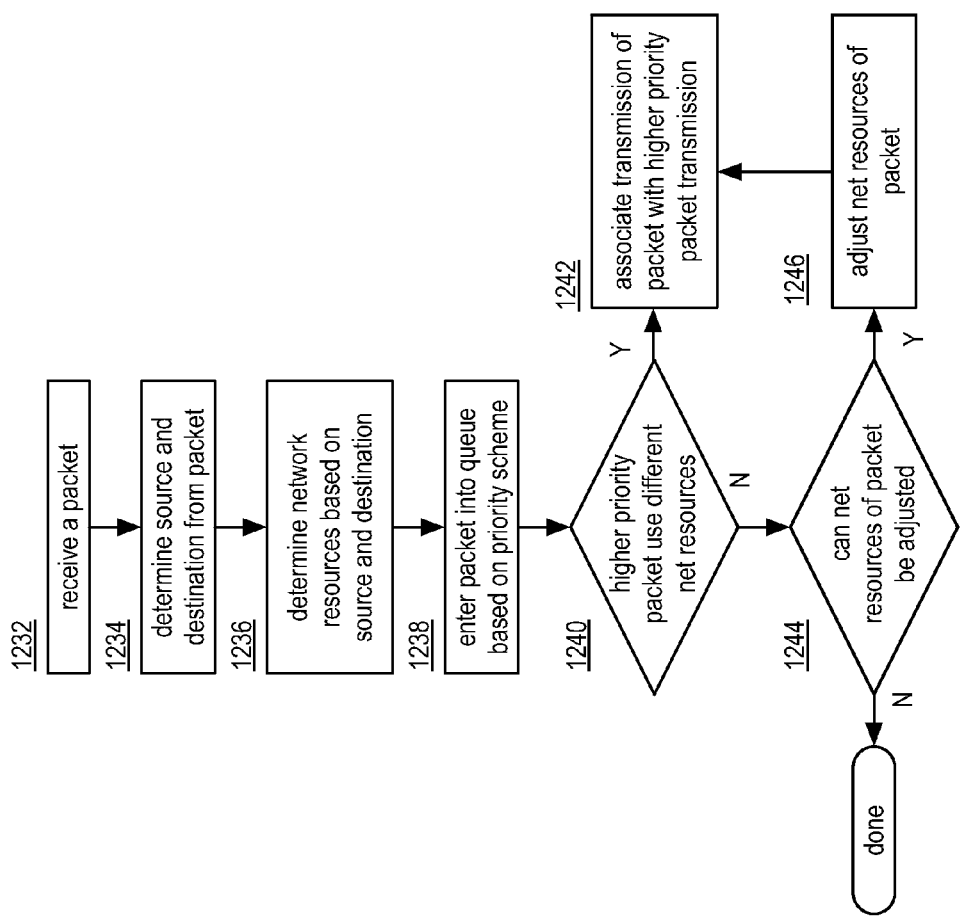
FIG. 75 is a logic diagram of an embodiment of a method for concurrent packet transmissions within a vehicular communication network in accordance with the present invention.

FIG. 75 is a logic diagram of an embodiment of a method for concurrent packet transmissions within a vehicular communication network that may be performed by a network manager, a switch module, a bridge-routing module, and/or a network node module. The method begins by receiving a packet from a device, network node module, a switching module, and/or a bridge-routing module 1232. The method continues by determining the source and destination of the packet, which may be done by interpreting the respective fields of the packet 1234. Network resources are determined based on a packet's source and destination at block 1236.

The method continues by entering the packet into a queue based on a prioritization scheme 1238. Various types of prioritization schemes have been discussed with reference to one or more preceding figures and may be further discussed with reference to one or more subsequent figures. In addition to prioritizing the packet within the queue based on the prioritization scheme, the network resources are recorded in the queue. The network resources may be determined from a network topographical map (or database) that includes known sources, known destinations, known redundant paths, known device states, and known network connections there between.

The method continues by determining whether a higher priority packet that uses different network resources is in the queue 1240. If yes, the method continues by associating transmission of the present packet with the higher priority packet for concurrent transmission 1242. The higher priority packet may be the next packet to be transmitted or it may be further down in the queue.

If there are no higher priority packets within the queue that use different network resources, the method continues by determining whether the network resources of the present packet may be adjusted 1244. For example, there may be multiple routes between a source and destination, where one route is the primary route. If the primary route has a network resource conflict with other packets higher in the queue, then a determination is made as to whether the other potential routes may be used that avoid a network resource conflict. If not, the packet is placed in the queue and is transmitted in accordance with its priority in the queue.

If the network resources for the current packet can be adjusted, the method continues by adjusting the network resources to avoid the conflict 1246. In this instance, the adjustment of the network resources may be a temporary adjustment for this packet and recorded within the databases as such. Alternatively, this may be a permanent adjustment in network resources, which is recorded in the appropriate network databases.

Within the network fabric, each switch module, bridge-routing module, and network node module contains one or more queues. Each of the queues may be dedicated to a particular type of packet, to a particular port, or ports, etc. Connecting modules (e.g., a switch module & bridge-routing module; two bridge-routing modules; a network node module & switch module; a network node module & a bridge-routing module) coordinate the transmission of packets there between utilizing the method of FIG. 75 and/or any other method described herein.

Figure 76:
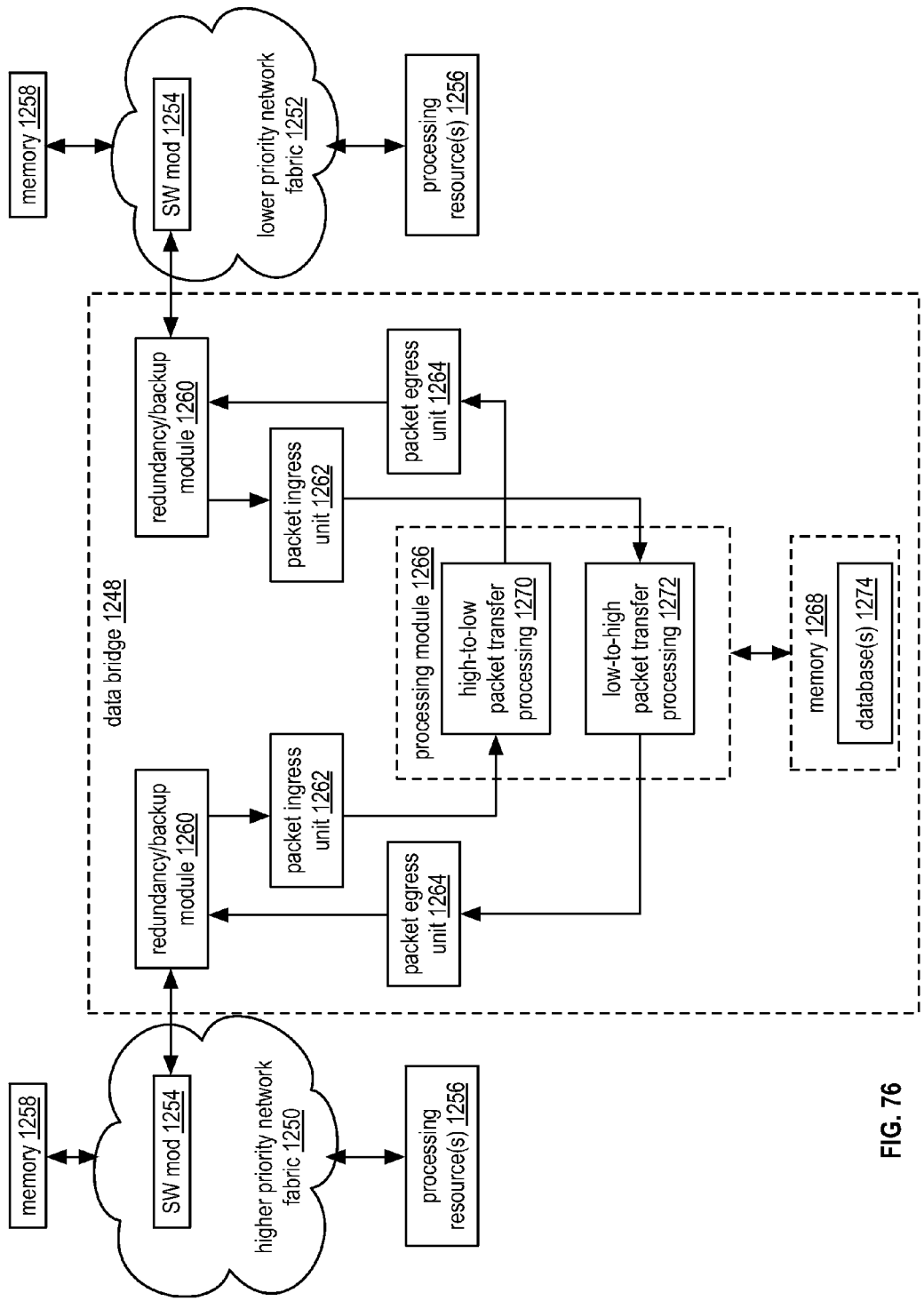
FIG. 76 is a schematic diagram of an embodiment of a data bridge within a vehicular communication network in accordance with the present invention.

FIG. 76 is a schematic diagram of an embodiment of a data bridge 1248 coupling a higher priority network fabric 1250 to a lower priority network fabric 1252 within a vehicular communication network. The high-priority network fabric 1250, which typically supports higher priority packets than the lower priority network fabric, includes a plurality of switch modules (SW mod) 1254, a plurality of bridge-routing modules, and a plurality of network node modules, which support a plurality of resources (e.g., processing module resources 1256 and memory resources 1258). The lower priority network fabric 1252 includes a plurality of switch modules 1254, a plurality of bridge-routing modules, and a plurality of network node modules, which support a plurality of resources. The details of the network fabrics have been discussed in detail with reference to FIGS. 13-57 and will be discussed in greater detail with reference to FIGS. 87-99.

The data bridge 1248 includes a plurality of redundancy/backup modules 1260 (as discussed in detail with reference to FIG. 17), a plurality of packet ingress units 1262, a plurality of packet egress units 1264, a processing module 1266, and memory 1268. Each of the redundancy/backup modules 1260 is coupled to a switch module 1254 of a network fabric 1250-1252, a packet egress unit 1264, and a packet ingress unit 1262. As an alternative, a redundancy/backup module 1260 may be coupled to a bridge-routing module within the corresponding network fabric 1250-1252. The processing module 1266 is configured to implement a high-to-low priority transfer process 1270 and a low-to-high packet transfer process 1272. The memory 1268 stores one or more of the databases 1274, which include a forwarding database, a filtering database, a routing table, a network protocol database, an information/entertainment database, a vehicle operation database, a mission-critical database, and/or a network topology database.

In an example of operation, the redundancy/backup module 1260 receives a packet from the higher priority network fabric 1250. The packet may contain data in its payload having one or more destinations coupled to the lower priority network fabric 1252 or the packet may contain a request for resources within its payload. In either case, the redundancy/backup module 1260 provides the packet to the packet ingress unit 1262. The packet ingress unit 1262 temporarily stores and filters the packet. For example, the packet ingress unit 1262 accesses a source and/or destination filter that contains network addresses of sources of the high-priority network fabric 1250 and/or destinations of the lower priority network fabric 1252 that are currently prohibited from transmitting or receiving packets from the other network fabric. If the packet is not filtered, it is placed in an ingress queue for subsequent processing by the processing module 1266.

The processing module 1266 performs a high-to-low packet transfer function 1270 upon the packet to determine whether the packet should be passed to the lower priority network fabric 1252 and at what priority. The high-to-low packet transfer function 1270 will be described in greater detail with reference to FIG. 79. If the packet is to be transferred to the lower priority network fabric 1252, it is outputted to the lower priority packet egress unit 1264. The packet egress unit 1264 provides the packet to the redundancy/backup module 1260 in accordance with the priority of the packet for routing to the lower priority network fabric 1252.

In another example of operation, the lower priority redundancy/backup module 1260 receives a packet from the lower priority network fabric 1252. The packet may contain data in its payload having one or more destinations coupled to the higher priority network fabric 1250 or the packet may contain a request for resources within its payload. In either case, the lower priority redundancy/backup module 1260 provides the packet to the lower priority packet ingress unit 1262, which temporarily stores and filters the packet. For example, the lower priority packet ingress unit 1262 accesses a source and/or destination filter that contains network addresses of sources of the lower-priority network fabric 1252 and/or destinations of the higher priority network fabric 1250 that are currently prohibited from transmitting or receiving packets from the other network fabric. If the packet is not filtered, it is placed in an ingress queue for subsequent processing by the processing module 1266.

The processing module 1266 performs a low-to-high packet transfer function 1272 upon the packet to determine whether the packet should be passed to the higher priority network fabric 1250 and at what priority. The low-to-high packet transfer function 1272 will be described in greater detail with reference to FIG. 80. If the packet is to be transferred to the higher priority network fabric 1250, it is outputted to the higher priority packet egress unit 1264. The higher priority packet egress unit 1264 provides the packet to the redundancy/backup module 1260 in accordance with the priority of the packet for routing to the higher priority network fabric 1250.

Figure 77:
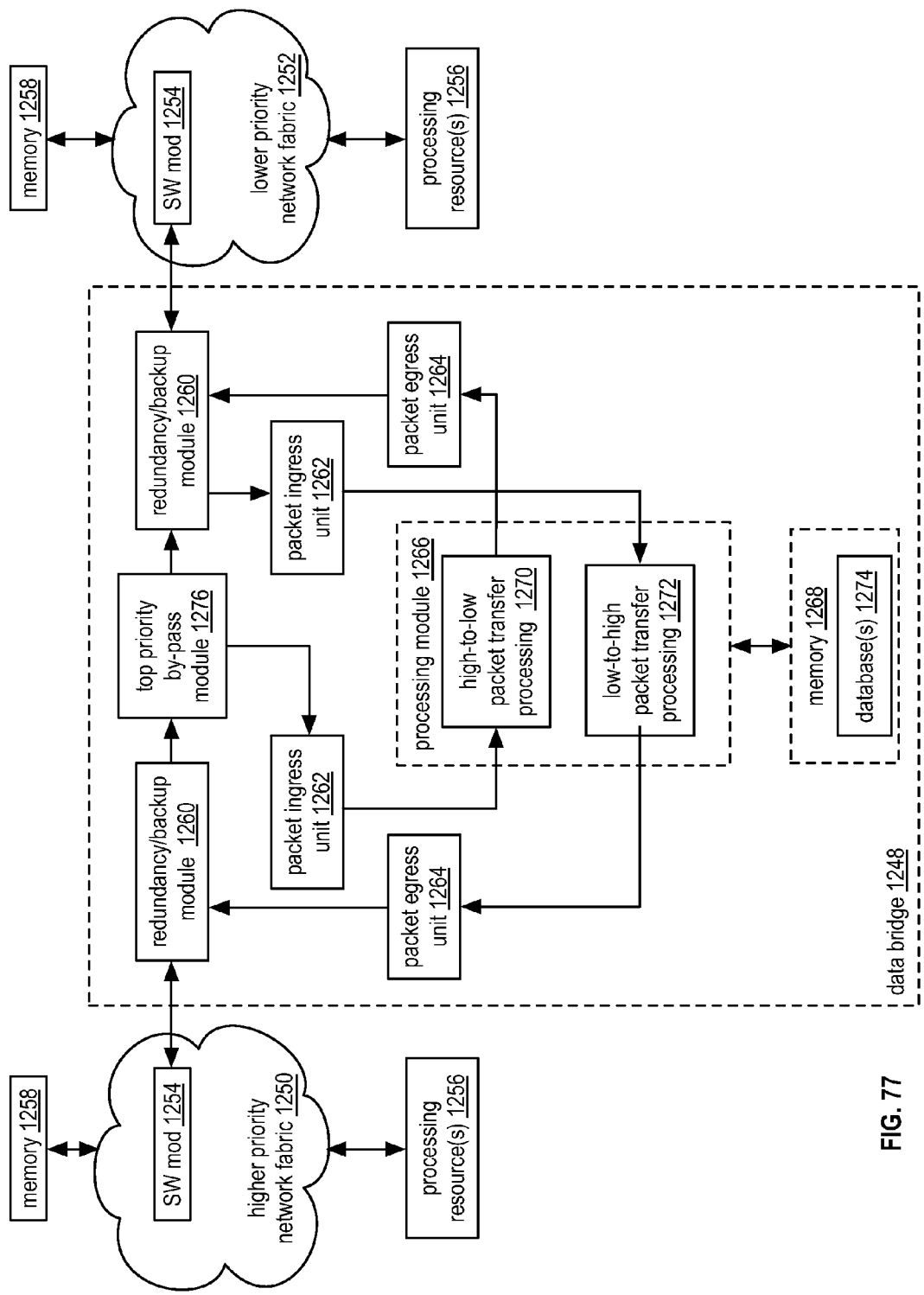
FIG. 77 is a schematic diagram of another embodiment of a data bridge within a vehicular communication network in accordance with the present invention.

FIG. 77 is a schematic diagram of another embodiment of a data bridge 1248 coupling a higher priority network fabric 1250 to a lower priority network fabric 1252 within a vehicular communication network. The high-priority network fabric 1250 and the lower priority network fabric 1252 are as discussed with reference to FIG. 76.

The data bridge 1248 includes a plurality of redundancy/backup modules 1260 (as discussed in detail with reference to FIG. 17), a plurality of packet ingress units 1262, a plurality of packet egress units 1264, a processing module 1266, a top priority by-pass module 1276, and memory 1268. Each of the redundancy/backup modules 1260 is coupled a switch module 1254 of a network fabric 1250-1252, the top priority by-pass module 1276, a packet egress unit 1264, and a packet ingress unit 1262. As an alternative, a redundancy/backup module 1260 may be coupled to a bridge-routing module within the corresponding network fabric. The processing module 1266 is configured to implement the high-to-low priority transfer process 1270 and the low-to-high packet transfer process 1272. The memory 1268 stores one or more of the databases 1274, which include a forwarding database, a filtering database, a routing table, a network protocol database, an information/entertainment database, a vehicle operation database, a mission-critical database, and/or a network topology database.

In an example of operation, the redundancy/backup module 1260 receives a packet from the higher priority network fabric 1250. The packet may contain data in its payload having one or more destinations coupled to the lower priority network fabric 1252 or the packet may contain a request for resources within its payload. In either case, the redundancy/backup module 1260 provides the packet to the top priority bypass module 1276. The top priority bypass module 1276 interprets the packet to determine whether it has a top priority, and determines priority routing based on the determination. If so, the packet is provided to the lower priority redundancy/backup module 1260 for immediate transmission (e.g., if needed, interrupt a current packet transmission) to the lower priority network fabric 1252. If the packet is not a top priority packet, the priority routing information may indicate that the packet is to be processed as previously discussed with reference to FIG. 76. Note that the top priority bypass module 1276 may perform the method illustrated in FIG. 35. Further note that packets from the lower priority network fabric 1252 to the higher priority network fabric 1250 a process as previously discussed with reference to FIG. 76.

Figure 78:
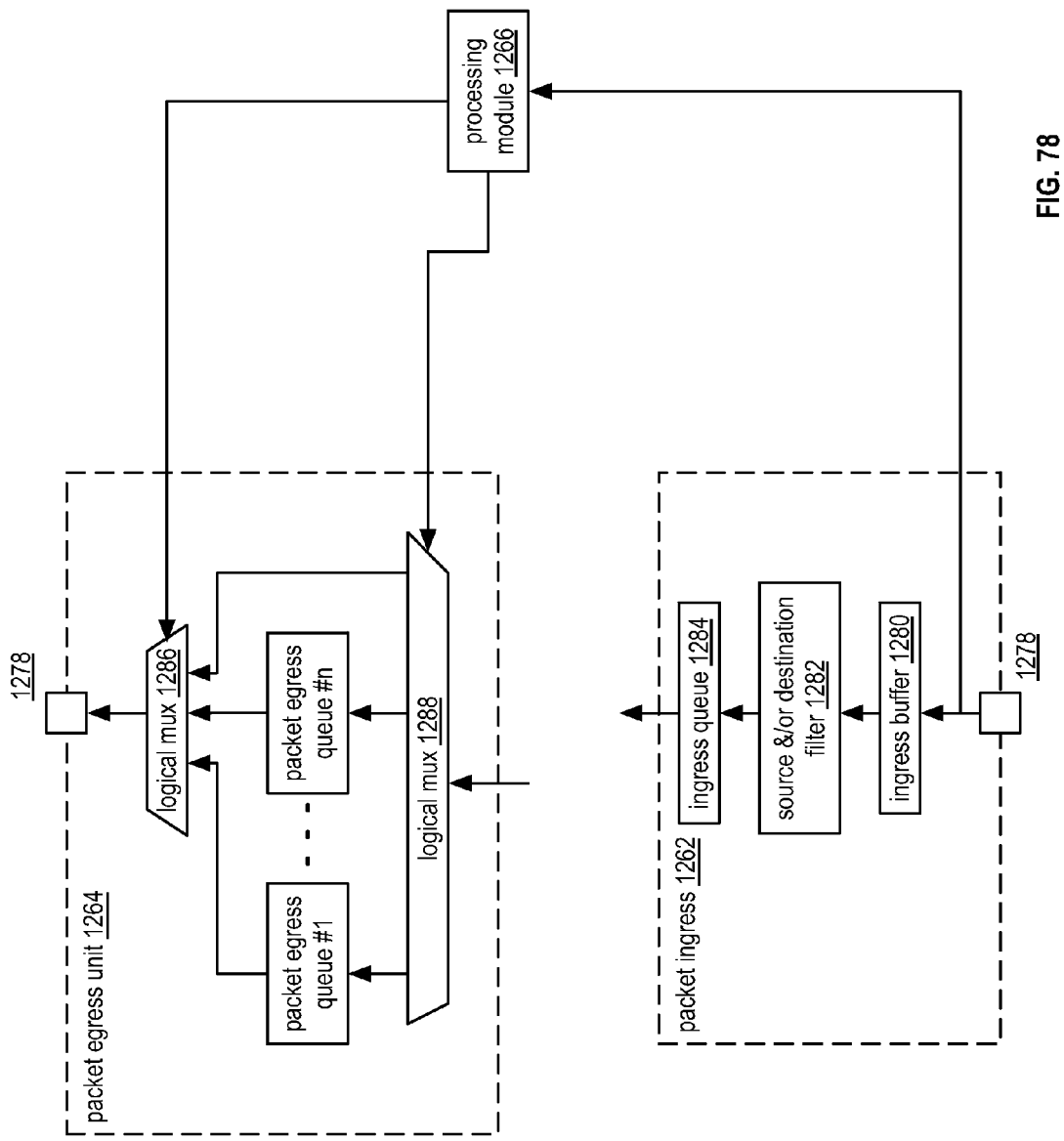
FIG. 78 is a schematic diagram of an embodiment of a packet egress unit and a packet ingress unit of a data bridge in accordance with the present invention.

FIG. 78 is a schematic diagram of an embodiment of a packet egress unit 1264 and a packet ingress unit 1262 of the data bridge of FIG. 76 or 77. The packet ingress unit 1262 includes a port 1278, an ingress buffer 1280, a source and/or destination filter 1282 and an ingress queue 1284. The packet egress unit 1264 includes a logical multiplexer 1286, one or more packet egress queues, a second logical multiplexer 1288, and a port 1278.

In an example of operation, the packet ingress unit 1264 receives a packet, temporally stores it in an ingress buffer 1280, and provides it to the processing module 1266. The processing module 1266 interprets the packet to determine its priority level for storage within the ingress queue 1284 and for subsequent processing by the packet egress unit 1264. In addition, the processing module 1266 may perform the source and/or destination filtering. In particular, the processing module 1266 accesses a database of sources and/or destinations that are prohibited from transmitting or receiving packets to/from another network fabric. The source and/or destination filter 1282 within the packet ingress unit 1262 uses control information from the processing module 1266 to prevent prohibited packets from being entered into the ingress queue 1284 and to pass allowed packets to the ingress queue 1284.

The packet egress unit 1264 receives a packet and, under the control of the processing module 1266, provides it to one of the packet egress queues or provides it directly to the output logical multiplexer 1286. If the package is provided to one of the packet egress queues, it is placed within the queue based on a prioritization scheme. The prioritization scheme for storing a packet in a queue may be done as described with reference to one or more of the preceding figures and/or as may be described with reference to one or more of the following figures.

Figure 79:
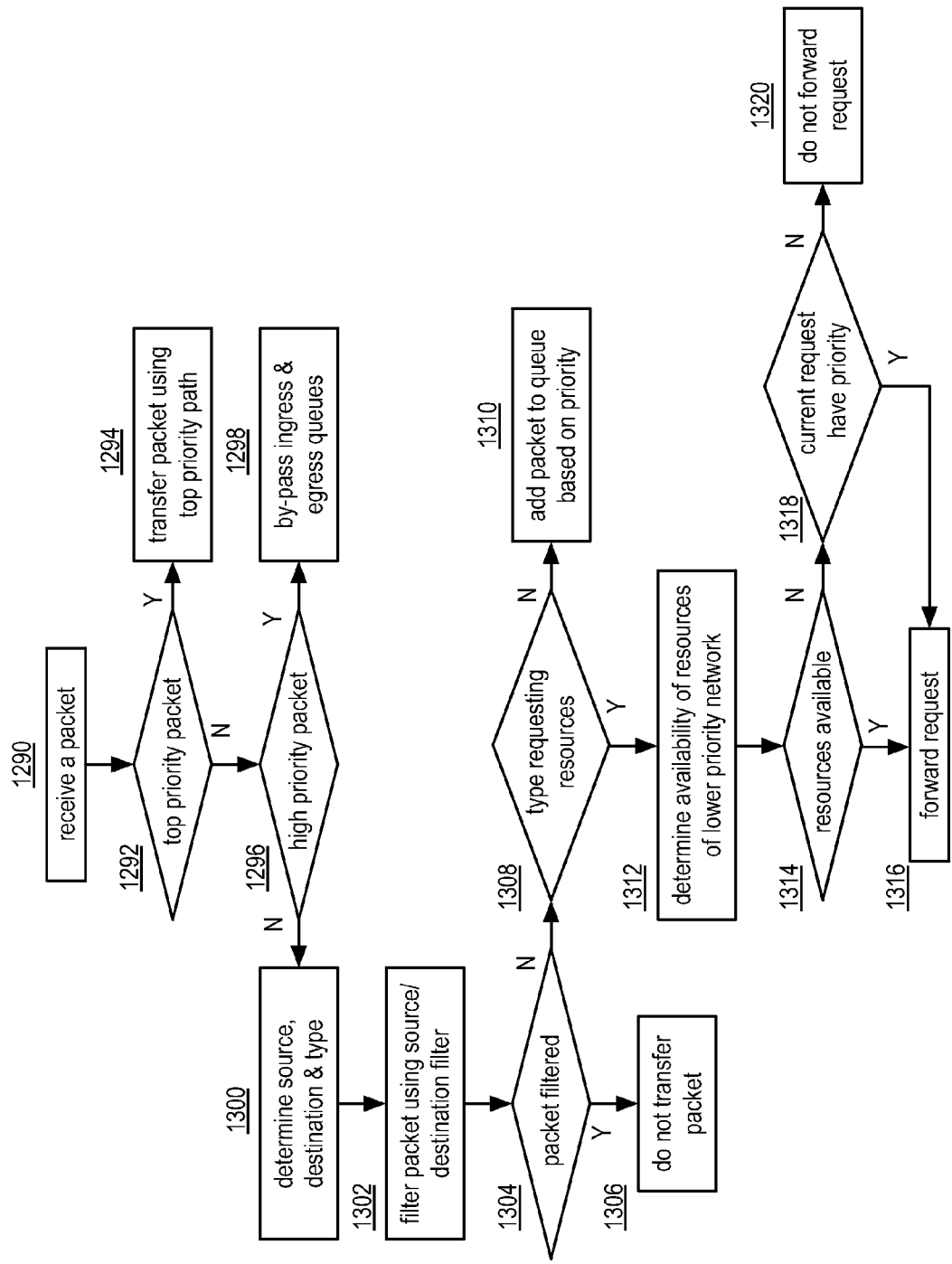
FIG. 79 is a logic diagram of an embodiment of a method for transferring packets between network fabrics within a vehicular communication network in accordance with the present invention.

FIG. 79 is a logic diagram of an embodiment of a method for transferring packets from a high priority network fabric to a lower priority network fabric, which may be performed by the processing module within the data bridge of FIG. 76 or 77. The method begins by receiving a packet from a higher priority network fabric 1290. The method continues by determining whether the packet is a top priority packet 1292. If yes and the data bridge includes a top priority bypass module, the method continues by transferring the packet using the top priority path 1294. When a packet is transmitted via a top priority path, it is recorded in a database or table. Further, if the top priority bypass interrupts the transmission of a current packet, the data bridge records the interruption of the current packet such that it may be retransmitted at a later time.

If the packet is not a top priority packet or the data bridge does not include a top priority bypass module, the method continues by determining whether the packet is a high-priority packet (e.g., a mission-critical packet, a near top priority packets, etc.) 1296. If yes, the method continues by bypassing the egress queues within the packet egress module and may also include bypassing the ingress queues within the packet ingress unit 1298. Alternatively, the high-priority packet may be placed at the front of the egress queue within the packet egress unit and/or may be placed at the front of the ingress queue within the packet ingress unit.

If the packet is not a high priority packet, the method continues by determining the source, the destination, and the packet type, or packet content type, of the packet, which may be done by interpreting the vehicle network field, the source field, and the destination field of the packet 1300. The method continues by filtering the packet using a source-destination filter, which identifies sources of the higher priority network fabric and/or destinations of the lower priority network fabric that are prohibited from receiving and/or transmitting packets between the network fabrics 1302.

The method continues by determining whether the packet is filtered 1304. If yes, the method continues by not transferring the packet to the other network fabric 1306. If, however, the packet is not filtered, the process continues by determining whether the packet is requesting resources (e.g., processing resources and/or memory resources) from the other network for a co-processing function and/or storage functions

1308. If not, the packet is deemed to contain data and is added to the queue of the packet ingress unit and/or queue of the packet egress unit based on its priority 1310.

If the packet is requesting resources from the other network fabric, the method continues by determining the availability of the requested resources of the lower priority network 1312. The method continues by determining whether the resources are available 1314. If yes, the data bridge forwards request to the network fabric, where the network manager coordinates the allocation of the network resources to the requesting entity 1316. In addition, the network manager may establish a virtual private network, allocate a certain amount of bandwidth, etc. to support the use of resources of the other network fabric.

If the resources are not available, the method continues by determining whether the current request has a priority level over certain activities within the lower priority network fabric 1318. If not, the request is discarded 1320. If yes, the method continues by forwarding the request to the network fabric 1316.

Figure 80:
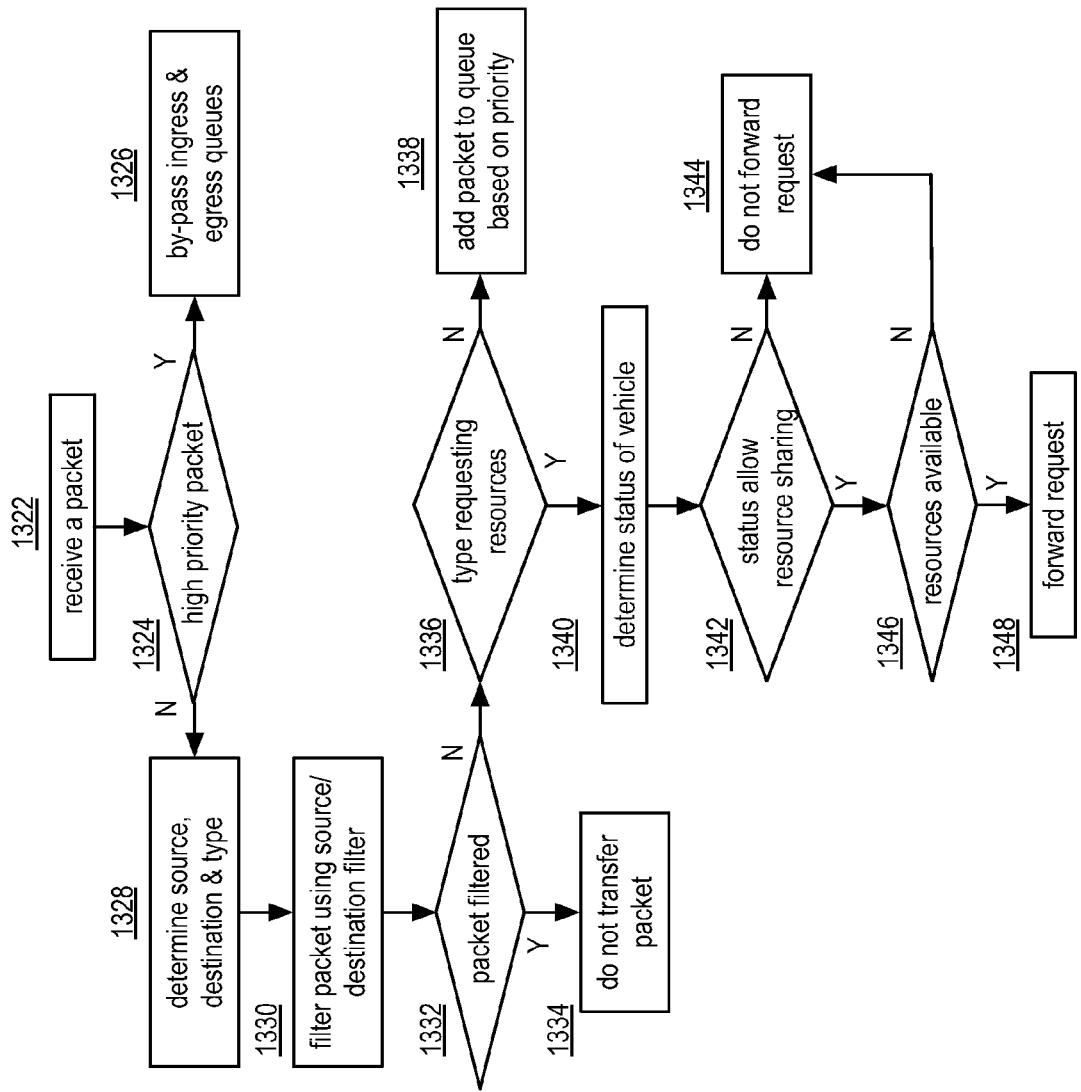
FIG. 80 is a logic diagram of another embodiment of a method for transferring packets between network fabrics within a vehicular communication network in accordance with the present invention.

FIG. 80 is a logic diagram of another embodiment of a method for transferring packets from a lower priority network fabric to a higher priority network fabric, which may be performed the processing module within the data bridge of FIG. 76 or 77. The method begins by receiving a packet from a lower priority network fabric 1322. The method continues by determining whether the packet is a high priority packet (e.g., a mission-critical packet, etc.) 1324. If yes, the method continues by bypassing the egress queues within the packet egress module and may also include bypassing the ingress queues within the packet ingress unit 1326. Alternatively, the high-priority packet may be placed at the front of the egress queue within the packet egress unit and/or may be placed at the front of the ingress queue within the packet ingress unit.

If the packet is not a high priority packet, the method continues by determining the source, the destination, and the packet content type of the packet 1328. The method continues by filtering the packet using a source-destination filter, which identifies sources of the lower priority network fabric and/or destinations of the higher priority network fabric that are prohibited from receiving and/or transmitting packets between the network fabrics 1330.

The method continues by determining whether the packet is filtered 1332. If yes, the method continues by not transferring the packet to the higher priority network fabric 1334. If, however, the packet is not filtered, the process continues by determining whether the packet is requesting resources (e.g., processing resources and/or memory resources) from the other network for a co-processing function and/or storage functions 1336. If not, the packet is deemed to contain data and is added to the queue of the packet ingress unit and/or queue of the packet egress unit based on its priority 1338.

If the packet is requesting resources from the other network fabric, the method continues by determining the status of the vehicle (e.g., driving, parked, higher priority network fabric resources being used, etc.) 1340. The method continues by determining whether the status allows sharing (e.g., the vehicle is parked) 1342. If not, the packet is not forwarded and is discarded 1344. The packet may be stored for subsequent system analysis regarding sharing of resources between the network fabrics.

If the status allows resources sharing, the method continues by determining whether resources of the higher priority network are available 1346. If not, the packet is not forwarded 1344. If, however, resources are available, the method continues with the data bridge forwarding the request to the higher network fabric, where the network manager coordinates the allocation of the network resources to the requesting entity 1348. In addition, the network manager may establish a virtual private network, allocate a certain amount of bandwidth, etc. to support the use of resources of the other network fabric.

As an example, when a car is parked and one or more persons are watching a video in the rear seat(s), resources of the higher priority network may be used to improve the video quality, to add 3D graphics, etc. In this example, since the vehicle is not operating, typical higher priority functions are not being processed. As such, those resources may be temporarily allocated for lower priority functions.

Figure 81:
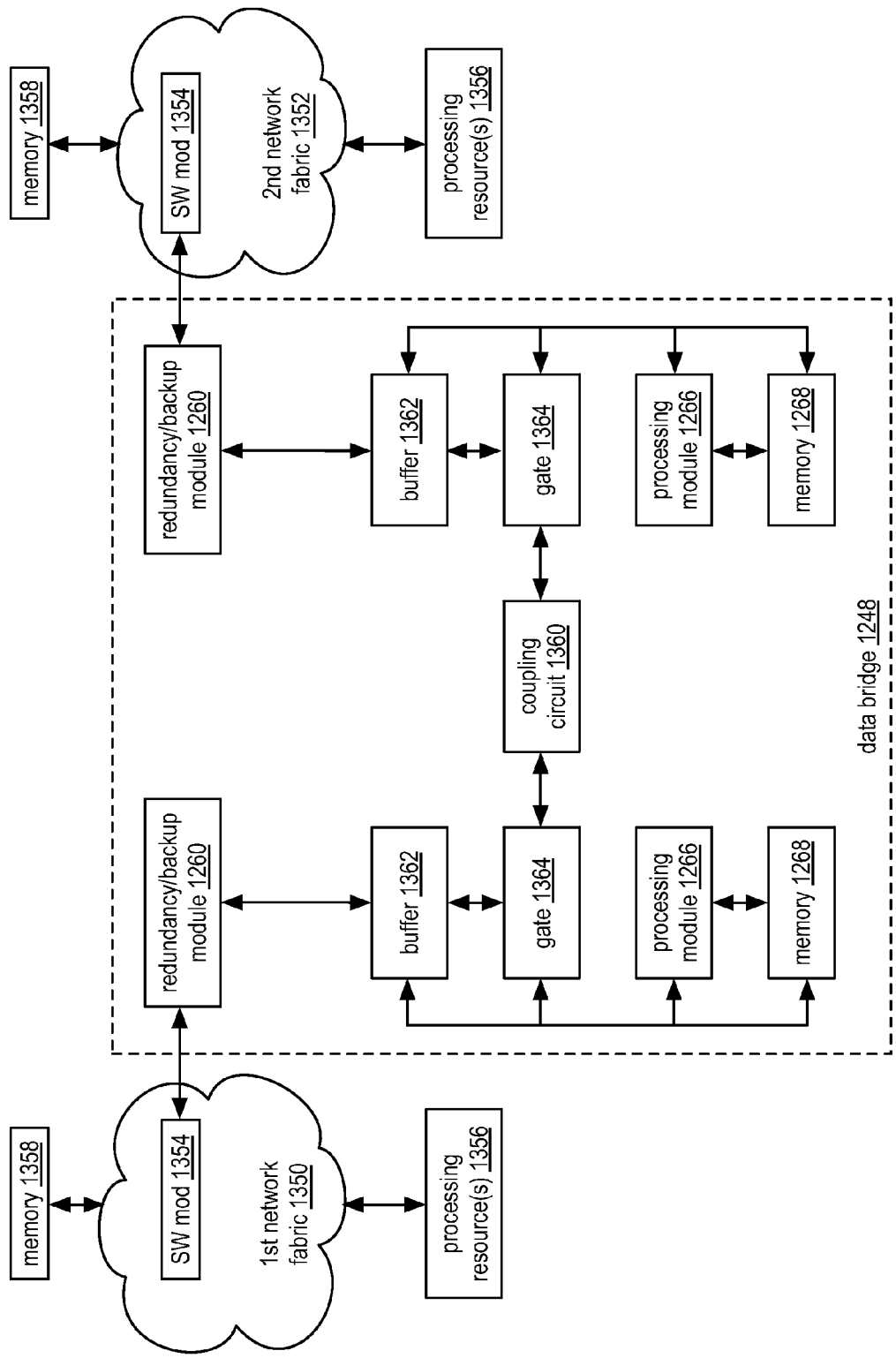
FIG. 81 is a schematic diagram of another embodiment of a data bridge within a vehicular communication network in accordance with the present invention.

FIG. 81 is a schematic diagram of another embodiment of a data bridge 1248 coupling a $1^{st}$ network fabric 1350 to a $2^{nd}$ network fabric 1352 within a vehicular communication network. The $1^{st}$ network fabric 1350 includes a plurality of switch modules (SW mod) 1354, a plurality of bridge-routing modules, and a plurality of network node modules, which support a plurality of resources (e.g., processing module resources 1356 and memory resources 1358). The $2^{nd}$ network fabric 1352 includes a plurality of switch modules 1354, a plurality of bridge-routing modules, and a plurality of network node modules, which support a plurality of resources. The first and second network fabrics 1350-1352 may support devices of equal priority and/or devices of differing priorities. As such, from packet to packet, the network fabrics may have equal priority or differing priorities. The details of a network fabric have been discussed in detail with reference to FIGS. 13-57 and will be discussed in greater detail with reference to FIGS. 87-99.

The data bridge 1248 includes a first set of modules for interfacing with the first network fabric, a second set of modules for interfacing with the second network fabric, and a coupling circuit 1360. Each of the first and second set of modules includes a redundancy/backup module 1260 (as discussed in detail with reference to FIG. 17), a buffer 1362, a gate module 1364, a processing module 1266, and memory 1268.

In an example of operation, the redundancy/backup module 1260 of the first set of modules receives a packet from the first network fabric 1350. The packet is provided to the buffer 1362, which may include one or more queues. In addition, the processing module 1266 interprets the packet to determine its priority as well as to determine whether it can be forwarded to the second network fabric 1352. The processing module 1266 determines whether the packet can be forwarded based on a source and/or destination filter of sources and/or destinations of the first network fabric. The source and/or destination filtering may further include a packet type filter such a source or destination may transmit or receive one type of packet but not another, may prohibited from any cross network packet traffic, or may be allowed to transmit or receive any type of packet with another network fabric. If the packet is to be forwarded, it is transferred from the buffer 1362 to the gate module 1364 in accordance with its priority.

The gate module 1364 may be a memory device, a switching circuit, or a combination thereof that transmits packets to the coupling circuit and receives packets from the coupling circuit. In this example, when a packet is ready for transmission, the gate module 1364 provides it to the coupling circuit 1360. The coupling circuit 1360 may be a switch, a forwarding unit, a bus between the gate modules 1364, a combination thereof, etc.

The coupling circuit 1364 provides the packet from the gate module 1364 of the first set of modules to the gate module 1364 of the second set of modules. The processing module 1266 of the second set of modules interprets the packet to determine its priority and whether it should be discarded or passed to the second network fabric 1352. The processing module 1266 uses a source and/or destination filter of sources, destinations, and packet content types of the second network fabric to determine whether the packet should be discarded or passed. In this manner, each of the processing modules 1266 is rendering an independent decision on filtering the packet. Alternatively, the processing modules 1266 share a source and/or destination filter database such that a single filter step may be performed by one of the processing modules 1266.

If the packet is to be passed to the second network fabric 1352, it is provided to the buffer 1362 of the second set of modules and stored in one of its queues based on its prioritization and a prioritization scheme. When the packet is at the front of its queue, it is provided to the redundancy/backup module 1260 for routing to the second network fabric 1352. Note that packets from the second network fabric 1352 to the first network fabric 1350 are processed in a similar manner but in a reverse order.

In another example of operation, a device of the first network fabric 1350 may desire to store data within the memory 1268 of the data bridge 1248. In this instance, the data is provided in one or more packets that are received via the redundancy backup module 1260, interpreted by the processing module 1266, and subsequently stored in the memory 1268. In this manner, the memory 1268 may be used for backup, history tracking etc. Note that a device of the second network fabric 1352 may store data in the memory 1268 of the second set of modules in a similar manner.

Figure 82:
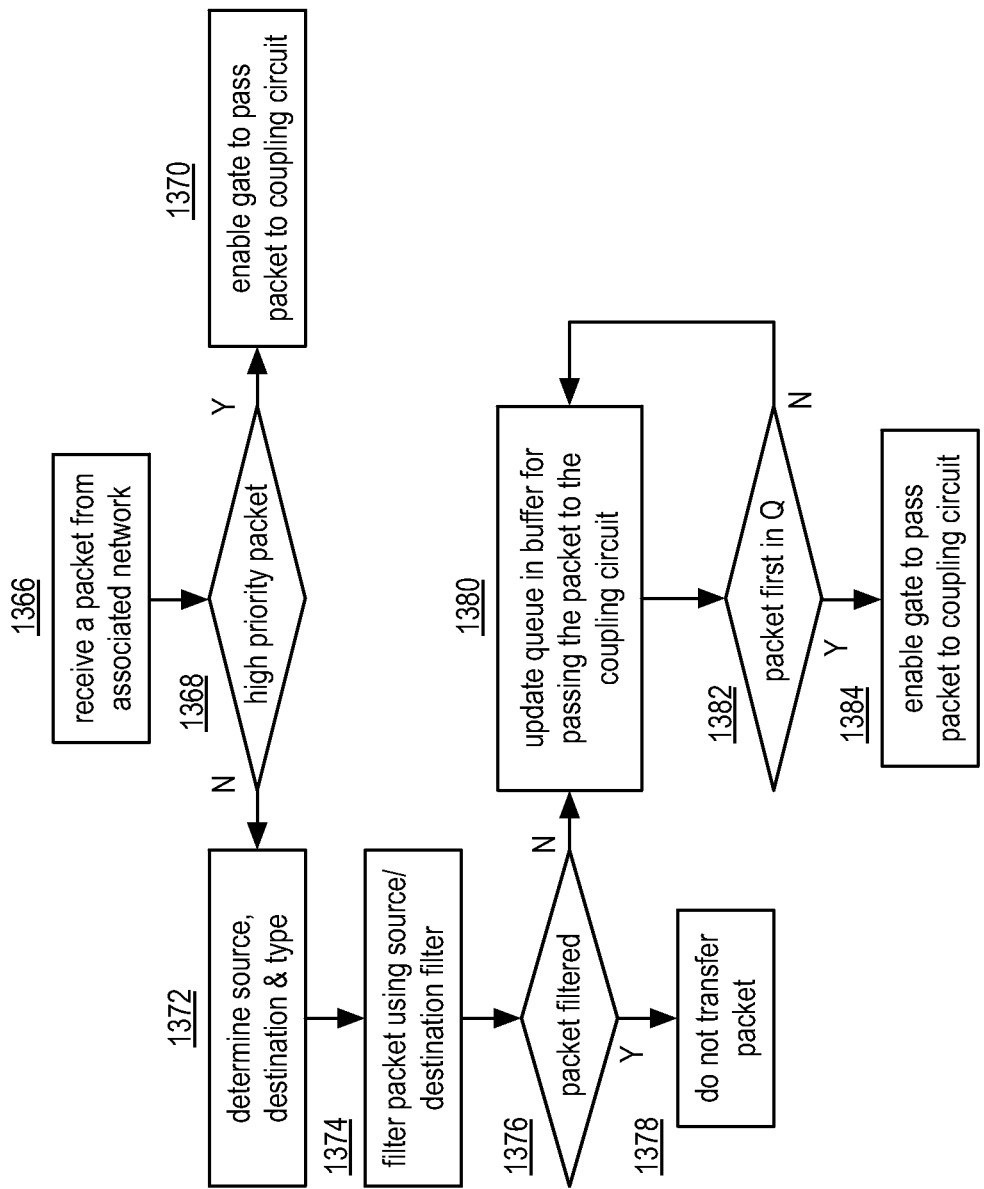
FIG. 82 is a logic diagram of another embodiment of a method for transferring packets between network fabrics within a vehicular communication network in accordance with the present invention.

FIG. 82 is a logic diagram of another embodiment of a method for transferring packets between network fabrics by the data bridge of FIG. 81. The method begins by receiving a packet from the associated network fabric 1366. The packet may be temporarily stored in a buffer. The method continues by determining whether the packet is a high priority packet 1368. If so, the method continues by enabling the gate module to pass the packet to the coupling circuit immediately (e.g., interrupt a current transmission of a packet) or near immediately (e.g., wait until the transmission of the current packet is complete and then transmit the high priority packet) 1370.

If the packet, or packet content, is not a high-priority packet, the method continues by determining the source, destination, and packet type 1372. The method continues by filtering the packet using a source and/or destination filter 1374. As previous mentioned, the source and/or destination filter may include a list of sources and/or destinations of the associated network that are prohibited from packet transfers to/from another network fabric and/or may include, for each source or destination, a list of packet types, or patent content types, that are allowed and/or a list of packet types, or packet content types, that are prohibited.

The method continues by determining whether the packet is filtered (e.g., prohibited from transmission to another network fabric) 1376. In some embodiments this filtering is based on the type of content in a packet, e.g. the packet content type. If yes, the packet is not transferred 1378. If the packet is not filtered, the method continues by updating a queue in the buffer for subsequent passing of the packet to the coupling circuit 1380. The method continues by determining whether the packet is first in the queue 1382. If not, the method repeats as shown. If the packet is first in the queue, the method continues by enabling the gate module to pass the packet to the coupling circuit 1384.

Figure 83:
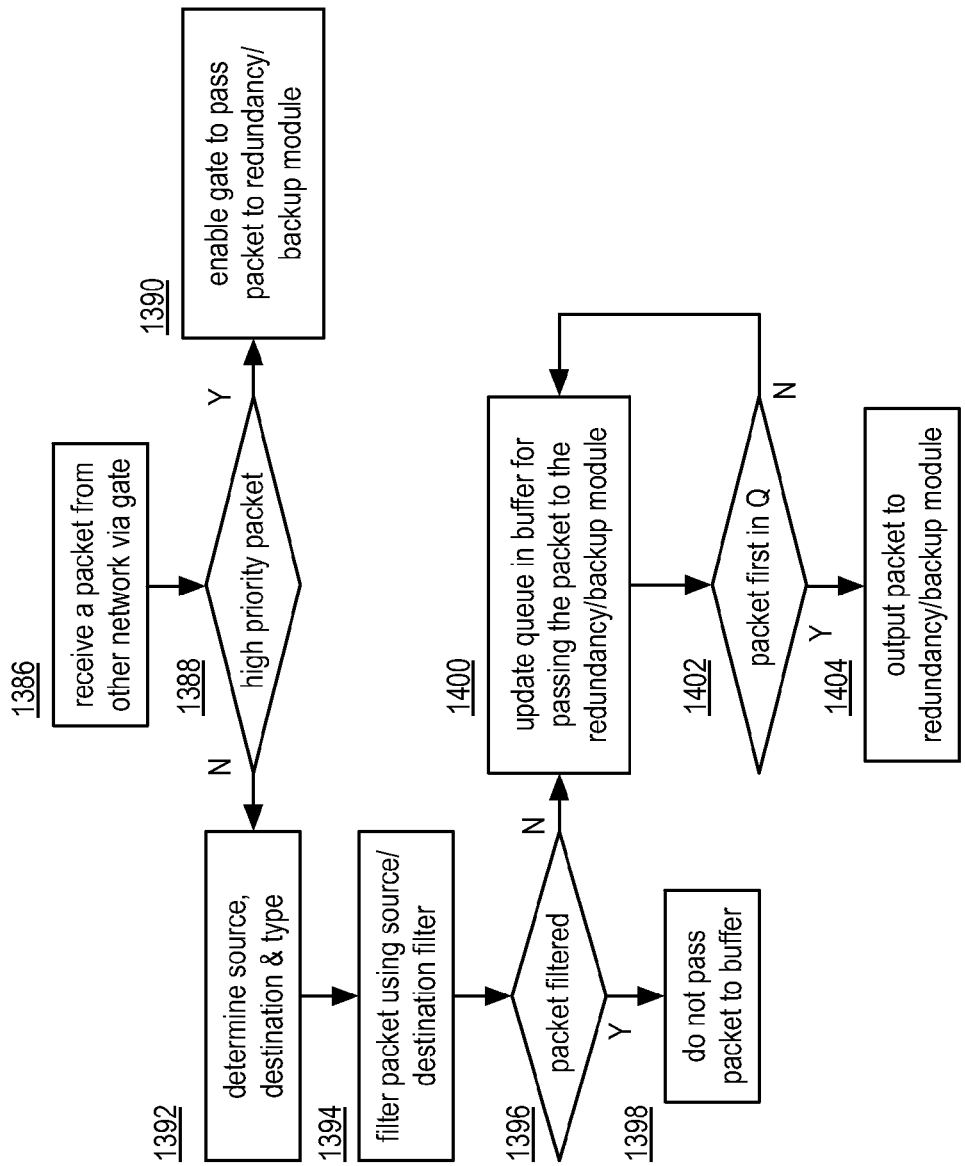
FIG. 83 is a logic diagram of another embodiment of a method for transferring packets between network fabrics within a vehicular communication network in accordance with the present invention.

FIG. 83 is a logic diagram of another embodiment of a method for transferring packets between network fabrics by the data bridge of FIG. 81. The method begins by receiving a packet from another network fabric via the coupling circuit 1386. The gate module may temporarily store the packet in its own buffer or in the buffer of the associated set of modules. The method continues by determining whether the packet is a high priority packet 1388. If the packet is a high priority packet, the method continues by enabling the gate module to pass the packet to the redundancy/backup module for immediate or near immediate transmission to the associated network fabric 1390.

If the packet is not a high-priority packet, the method continues by determining the source, destination, and packet type, or packet content type 1392. The method continues by filtering the packet using an associated source and/or destination filter 1394. The method continues by determining whether the packet is filtered 1396. If so, the packet is discarded and not passed to the redundancy/backup module 1398. If the packet is not filtered, the method continues by updating a queue in the buffer for subsequent passing the packet to the redundancy/backup module 1400. Once the packet is first in the queue 1402, it is outputted to the redundancy/backup module for forwarding to the associated network fabric 1404.

Figure 84:
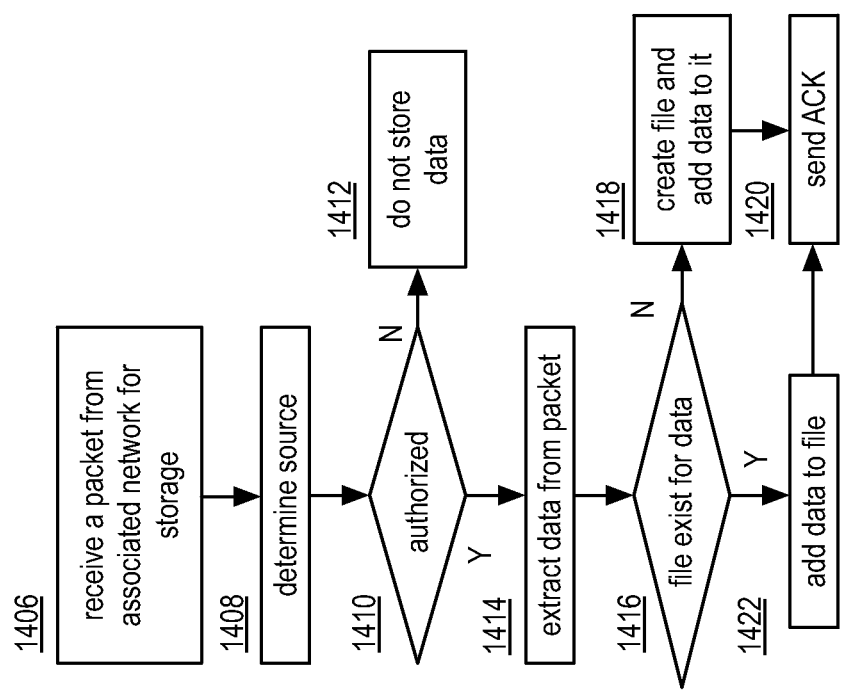
FIG. 84 is a logic diagram of an embodiment of a method for storing data by a data bridge within a vehicular communication network in accordance with the present invention.

FIG. 84 is a logic diagram of an embodiment of a method for storing data by a data bridge of FIG. 76, 77, and/or 81. The method begins by receiving a packet from an associated network fabric for storage 1406. The packet may be temporarily stored in a buffer. The method continues by determining the source of the packet 1408 and subsequently determining whether the source is authorized to store data in the memory of the data bridge 1410. If not, the packet is discarded and the data bridge may generate a message indicating that the source is not authorized to store data 1412.

If the source is authorized, the method continues by extracting the data from the payload of the packet 1414. The method continues by determining whether a file in the memory already exists for storing the data 1416. If not, the data bridge creates a file in memory and stores the data in the file 1418. The method continues by sending an acknowledgment of data storage to the source 1420. If the file already exists, the data is added to the existing file and an acknowledgment of data storage is sent to the source 1422.

Figure 85:
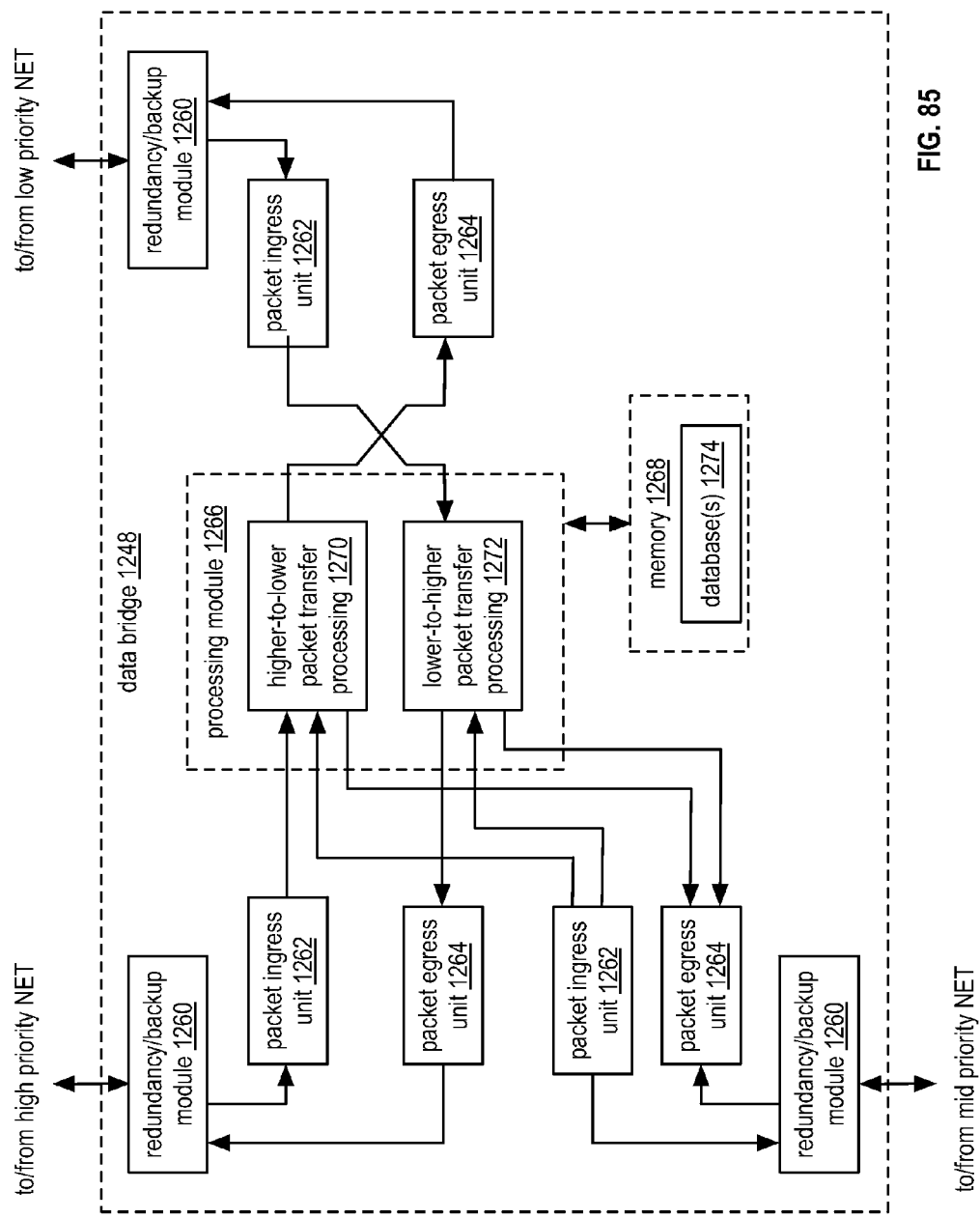
FIG. 85 is a schematic diagram of another embodiment of a data bridge within a vehicular communication network in accordance with the present invention.

FIG. 85 is a schematic diagram of another embodiment of a data bridge 1248 coupling a higher priority network fabric, a middle priority network fabric, and a lower priority network fabric together within a vehicular communication network. The high-priority network fabric, which typically supports higher priority packets than the middle and lower priority network fabric, includes a plurality of switch modules (SW mod), a plurality of bridge-routing modules, and a plurality of network node modules, which support a plurality of resources (e.g., processing module resources and memory resources). The middle priority network fabric, which typically supports higher priority packets than the lower priority network fabric but lower priority packets than the higher priority network fabric, includes a plurality of switch modules, a plurality of bridge-routing modules, and a plurality of network node modules, which support a plurality of resources. The lower priority network fabric includes a plurality of switch modules, a plurality of bridge-routing modules, and a plurality of network node modules, which support a plurality of resources. The details of the network fabrics have been discussed in detail with reference to FIGS. 13-57 and will be discussed in greater detail with reference to FIGS. 87-99.

The data bridge 1248 includes a plurality of redundancy/backup modules 1260 (as discussed in detail with reference to FIG. 17), a plurality of packet ingress units 1262, a plurality of packet egress units 1264, a processing module 1266, and memory 1268. Each of the redundancy/backup modules 1260 is coupled to a switch module of an associated network fabric, a packet egress unit 1264, and a packet ingress unit 1262. As an alternative, a redundancy/backup module 1260 may be coupled to a bridge-routing module within the associated network fabric. The processing module 1266 is configured to implement a higher-to-lower priority transfer process 1270 and a lower-to-higher packet transfer process 1272. The memory stores one or more of the databases 1274, which include a forwarding database, a filtering database, a routing table, a network protocol database, an information/entertainment database, a vehicle operation database, a mission-critical database, and/or a network topology database.

In an example of operation, the redundancy/backup module 1260 receives a packet from the higher priority network fabric. The packet may contain data in its payload having one or more destinations coupled to the middle and/or lower priority network fabric or the packet may contain a request for resources within its payload. In either case, the redundancy/backup module 1260 provides the packet to the packet ingress unit 1264. The packet ingress unit 1264 temporarily stores and filters the packet. For example, the packet ingress unit 1264 accesses a source and/or destination filter that contains network addresses of sources of the high-priority network fabric and/or destinations of the middle and lower priority network fabrics that are currently prohibited from transmitting or receiving packets from the network fabrics of the current packet transaction. If the packet is not filtered, it is placed in an ingress queue for subsequent processing by the processing module 1266.

The processing module 1266 performs a higher-to-lower packet transfer function 1270 upon the packet to determine whether the packet should be passed to the middle and/or lower priority network fabric and at what priority. The higher-to-lower packet transfer function 1270 was described with reference to FIG. 79. If the packet is to be transferred to the middle and/or lower priority network fabric, it is outputted to the middle and/or lower priority packet egress unit. The middle and/or lower priority packet egress unit 1264 provides the packet to its associated redundancy/backup module 1260 in accordance with the priority of the packet for routing to the middle and/or lower priority network fabric.

In another example of operation, the lower priority redundancy/backup module 1260 receives a packet from the lower priority network fabric. The packet may contain data in its payload having one or more destinations coupled to the higher priority network fabric or the packet may contain a request for resources within its payload. In either case, the lower priority redundancy/backup module 1260 provides the packet to the lower priority packet ingress unit 1264, which temporarily stores and filters the packet. For example, the lower priority packet ingress unit accesses a source and/or destination filter that contains network addresses of sources of the lower-priority network fabric and/or destinations of the middle and/or higher priority network fabric that are currently prohibited from transmitting or receiving packets from other network fabrics. If the packet is not filtered, it is placed in an ingress queue for subsequent processing by the processing module 1266.

The processing module 1266 performs a lower-to-higher packet transfer function 1272 upon the packet to determine priority routing of the packet, e.g. whether the packet should be passed to the middle and/or higher priority network fabrics and at what priority. The lower-to-higher packet transfer function 1272 was described with reference to FIG. 80. If the packet is to be transferred to the middle and/or higher priority network fabric, it is outputted to the middle and/or higher priority packet egress units 1264. Each of the middle and/or higher priority packet egress units 1264 provides the packet to its associated redundancy/backup module 1260 in accordance with the priority of the packet for routing to the middle and/or higher priority network fabric.

In yet another example of operation, the middle priority redundancy/backup module 1260 receives a packet from the middle priority network fabric. The packet may contain data in its payload having one or more destinations coupled to the lower and/or higher priority network fabric or the packet may contain a request for resources within its payload. In either case, the middle priority redundancy/backup module 1260 provides the packet to the middle priority packet ingress unit 1262, which temporarily stores and filters the packet. For example, the middle priority packet ingress unit accesses a source and/or destination filter that contains network addresses of sources of the middle-priority network fabric and/or destinations of the lower and/or higher priority network fabric that are currently prohibited from transmitting or receiving packets from other network fabrics. If the packet is not filtered, it is placed in an ingress queue for subsequent processing by the processing module 1266.

If the packet has a destination in the higher priority network fabric, the processing module 1266 performs a lower-to-higher packet transfer function 1272 upon the packet to determine whether the packet should be passed to the higher priority network fabrics and at what priority. If the packet is to be transferred to the higher priority network fabric, it is outputted to the higher priority packet egress unit 1264. The higher priority packet egress unit 1264 provides the packet to its associated redundancy/backup module 1260 in accordance with the priority of the packet for routing to the higher priority network fabric.

If the packet has a destination in the lower priority network fabric, the processing module 1266 performs a higher-to-lower packet transfer function 1270 upon the packet to determine whether the packet should be passed to the lower priority network fabrics and at what priority. If the packet is to be transferred to the lower priority network fabric, it is outputted to the lower priority packet egress unit 1264. The lower priority packet egress 1264 unit provides the packet to its associated redundancy/backup module 1260 in accordance with the priority of the packet for routing to the lower priority network fabric.

Figure 86:
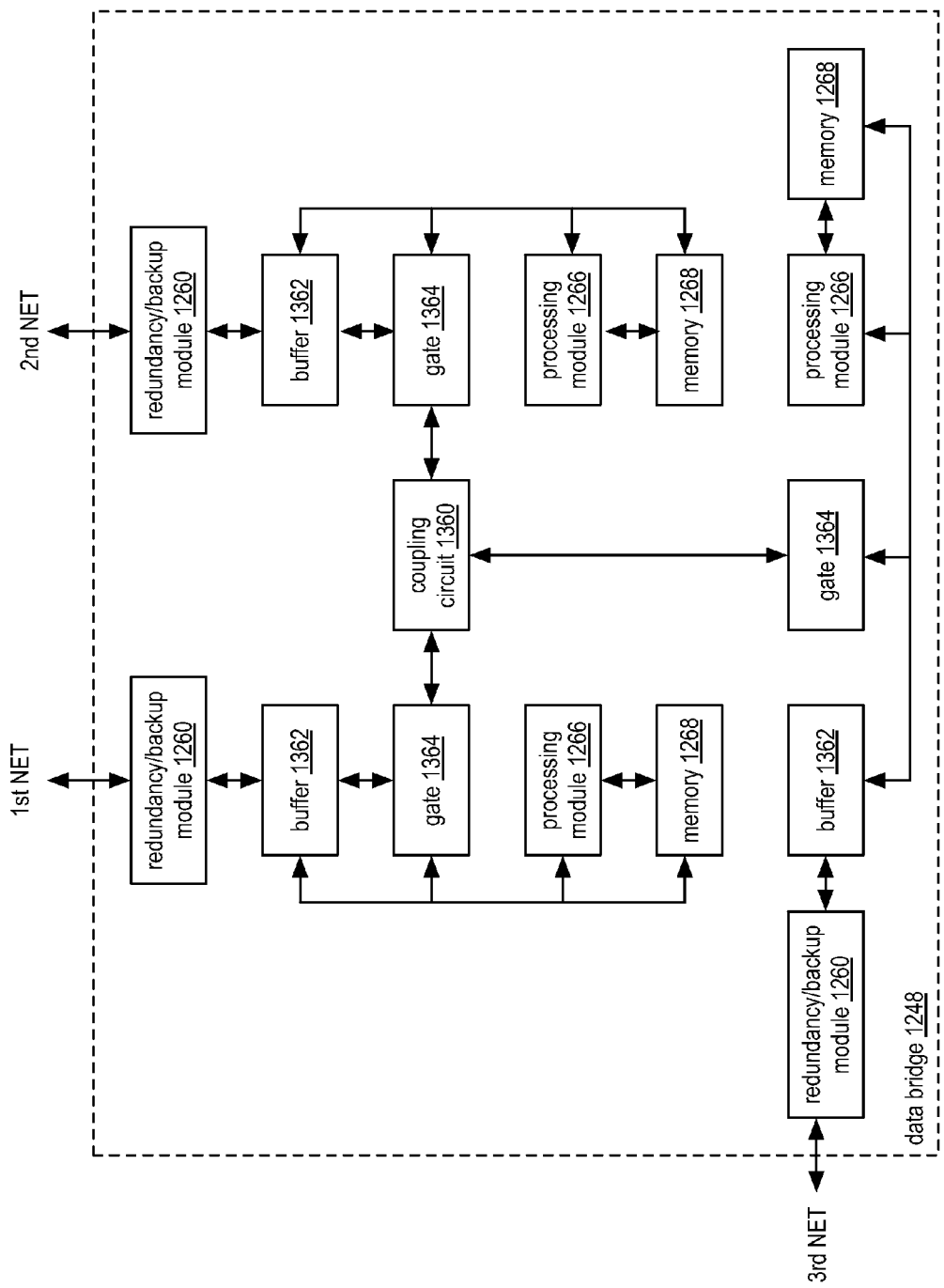
FIG. 86 is a schematic diagram of another embodiment of a data bridge within a vehicular communication network in accordance with the present invention.

FIG. 86 is a schematic diagram of another embodiment of a data bridge 1248 coupling a $1^{st}$ network fabric, a $2^{nd}$ network fabric, and a $3^{rd}$ network fabric together within a vehicular communication network. Each of the $1^{st}$, $2^{nd}$, and $3^{rd}$ network fabrics includes a plurality of switch modules, a plurality of bridge-routing modules, and a plurality of network node modules, which support a plurality of resources (e.g., processing module resources and memory resources). In addition, each of the first, second, and third network fabrics may support devices of equal priority and/or devices of differing priorities. As such, from packet to packet, the network fabrics may have equal priority or differing priorities. The details of a network fabric have been discussed in detail with reference to FIGS. 13-57 and will be discussed in greater detail with reference to FIGS. 87-99.

The data bridge 1248 includes a first set of modules for interfacing with the first network fabric, a second set of modules for interfacing with the second network fabric, a third set of modules for interfacing with the third network fabric, and a coupling circuit. Each of the first, second, and third set of modules includes a redundancy/backup module 1260 (as discussed in detail with reference to FIG. 17), a buffer 1362, a gate module 1364, a processing module 1266, and memory 1268.

In an example of operation, the redundancy/backup module 1260 of the first set of modules receives a packet from the first network fabric. The packet is provided to the buffer 1362, which may include one or more queues. In addition, the processing module 1266 interprets the packet to determine its priority as well as to determine whether it can be forwarded to the second and/or third network fabrics. The processing module 1266 determines whether the packet can be forwarded based on a source and/or destination filter of sources and/or destinations of the first network fabric. The source and/or destination filtering may further include a packet type filter indicating that a source or destination may transmit or receive one type of packet but not another or may be allowed to transmit or receive packets (type specific or all types) with one network fabric but not with another. If the packet is to be forwarded to a particular network fabric, it is transferred from the buffer 1362 to the gate module 1364 in accordance with its priority.

The gate module 1364 may be a memory device, a switching circuit, or a combination thereof that transmits packets to the coupling circuit 1360 and receives packets from the coupling circuit 1360. In this example, when a packet is ready for transmission, the gate module 1364 provides it to the coupling circuit 1360. The coupling circuit 1360 may be a switch, a forwarding unit, a bus between the gate modules 1364, a combination thereof, etc.

The coupling circuit 1360 provides the packet from the gate module 1364 of the first set of modules to the gate module 1364 of the second set of modules and/or to the gate module 1364 of the third set of modules. The processing module 1266 of the second and/or third set of modules interprets the packet to determine its priority and whether it should be discarded or passed to the second network fabric. The processing module 1266 uses a source and/or destination filter of sources, destinations, and packet types of the second and/or third network fabric, respectively, to determine whether the packet should be discarded or passed. In this manner, each of the processing modules 1266 is rendering an independent decision on filtering the packet. Alternatively, the processing modules 1266 share a source and/or destination filter database such that a single filter step may be performed by one of the processing modules 1266.

If the packet is to be passed to the second and/or third network fabric, it is provided to the buffer 1362 of the second and/or third set of modules and stored in one of its queues based on its prioritization and a prioritization scheme. When the packet is at the front of its queue, it is provided to the associated redundancy/backup module 1260 for routing to the second and/or third network fabric. Note that packets from the other network fabrics are processed in a similar manner but in a reverse order.

In another example of operation, a device of the first network fabric may desire to store data within the memory of the data bridge 1248. In this instance, the data is provided in one or more packets that are received via the redundancy backup module 1260, interpreted by the processing module 1266, and subsequently stored in the memory 1268. In this manner, the memory may be used for backup, history tracking etc. Note that a device of the second and/or third network fabric may store data in the memory 1268 of the second and/or third set of modules in a similar manner.

FIG. 87 is a schematic diagram of an embodiment of a wired and wireless network fabric 1424 that includes vehicle network modules (e.g., a plurality of bridge-routing modules 1426 and a plurality of switch modules 1428) and is coupled to a network manager 40. The switch modules 1428 are coupled to one or more network node modules 1430 and to at least one bridge-routing module 1426. Each of the bridge-routing modules 1426 are coupled to at least one switching module 1428 and at least one other bridge-routing module 1426. Each of the network node modules 1430, the switch modules 1428, and the bridge-routing modules 1426 includes a wired network connection and a wireless network connection. The wired coupling between bridge-routing modules 1426, between bridge-routing modules 1426 and switch modules 1428, and between switch modules 1428 and network node modules 1430 includes multiple cables (e.g., twisted pair, coaxial cable, category 5 cables, fiber optics, etc.).

The wireless coupling between the same modules may be in accordance with one or more standardized wireless communication protocols in the 2.4 GHz frequency band, the 5 GHz frequency band, the 60 GHz frequency band, etc. or a may be a proprietary wireless communication protocol. Standardized wireless communication protocols includes, but are not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), Enhanced Data rates for GSM Evolution (EDGE), General Packet Radio Service (GPRS), WCDMA, LTE (Long Term Evolution), WiMAX (worldwide interoperability for microwave access), and/or variations thereof.

In an example of operation, the network manager 40 determines a wired packet communication mode and/or a wireless packet communication mode for the vehicle communication network. When the network is in the wireless packet communication mode, the network manager 40 coordinate wireless communication of packets among the plurality of network node modules, the plurality of switch modules, and the plurality of bridge-routing modules based on individual content of the packets (e.g., mission critical, network data, vehicle operation, and/or infotainment) and wireless channel mapping.

In one instance of the present example, the wireless channel mapping includes allocating a channel of a set of channels within a frequency band for at least a portion of conveyance of a wireless packet from a source to a destination via a wireless network node module(s), a wireless switch module(s), and/or a wireless bridge-routing module(s). As a more specific example, the channel may be allocated to wirelessly transmit the packet from the source to the destination via one or more network node modules, one or more switch modules, and/or one or more bridge-routing modules. As another more specific example, the channel may be allocated to convey the packet from the first network module, to a switch module, and to a bridge-routing module and a second channel may be allocated to convey the packet from the bridge-routing module, to a second switch module, to a second network node module.

The allocation of a channel to convey a packet may be done in a variety of ways. For example, the channel may be permanently allocated for packets of a first content type (e.g., mission critical packets, network data packets, etc.); for packets from a source of first type of device (e.g., a safety critical sensor); and/or for packets to a destination of a particular type (e.g. safety critical processor, safety critical actuator, etc.). As another example, the channel may be semi-permanent allocated (e.g., for a set time, for a number of packets, as instructed by the network manager, etc.) for packets of a second content type (e.g., network data, vehicle operation, etc.); for packets from a source of second type of device (e.g., a network manager); and/or for packets to a destination of a particular type (e.g. non-critical vehicle operation devices, etc.). As yet another example, the channel may be dynamically allocated when the packet is of a third type (e.g., infotainment, non-critical vehicle operation, etc.); for packets from a source of third type of device (e.g., window up/down sensor, a multimedia processing, memory, etc.); and/or for packets to a destination of a particular type (e.g. window up/down actuator, multimedia display devices, etc.).

As another example of allocating channels per the wireless channel mapping, the channels within a frequency band may be allocated in cellular pattern among a plurality of regions within the wireless vehicle communication network to reduce channel interference from overlapping channel use in different ones of the plurality of regions. For example, a set of switching modules and/or bridge-routing modules in one section of the network fabric may use the same channels (or subset thereof) as another set of switching modules and/or bridge-routing modules in a different section of the network fabric.

When the network is in the wired packet communication mode, the network manager 40 coordinates wired communication of packets among the network node modules, the switch modules, and/or the bridge-routing modules based on the individual content of the packets and in accordance with a global vehicle network communication protocol. The global vehicle network communication protocol information regarding a network fabric formatting of the packets, information regarding packet transmission prioritization schemes, information regarding network management processing and/ or information regarding vehicle network operation parameters.

Within the network fabric, the wired and wireless connections may be used in a variety of ways. For example, the wireless connections may be used for backup and/or redundancy transmissions to provide a fast fail over if a wired connection fails. As another example, the wireless connections may be used for network configuration and system level data, while the wired connections are used for mission critical data, vehicle operation data, and/or information-entertainment data. As a further example, the wireless connections and wired connections may be used independently to support concurrent packet transmissions.

The network fabric may be used within the unified network fabric or the multiple network fabric communication networks of the preceding figures. Note that more or less switching modules 1428 and bridge-routing modules 1426 may be included in the network fabric. Further note that the multiple wired connections between switching modules 1428 and bridge-routing modules 1426 may include two or more cables where one of the cables is active and the other is used for fail over or redundancy. Still further note that a network node module may be directly connected to a bridge-routing module 1426.

FIG. 87A is a schematic diagram of an embodiment of wireless vehicle communication network that includes a wireless network fabric 1425, a network manager 40, and network node modules 1431. The wireless network fabric 1425 includes bridge-routing modules 1427 and switch modules 1429. Each of the switch modules 1429 is wirelessly (e.g., RF, infrared, optical, etc.) coupled to one or more network node modules 1431 and to at least one bridge-routing module 1427. Each of the bridge-routing modules 1427 is wirelessly coupled to at least one switch module 1429 and to at least one other bridge-routing module 1427. Each of the network node modules 1431, the switch modules 1429, and the bridge-routing modules 1427 includes at least one wireless network connection (e.g., an RF transceiver, a MMW transceiver, an IR transceiver, etc.).

The network manager 40 coordinates wireless communication of packets among the wireless network node modules 1431, the wireless switch modules 1429, and/or the wireless bridge-routing modules 1427 based on individual content of the packets (e.g., mission critical, network data, vehicle operation, infotainment, etc.) and wireless channel mapping. In an example, the wireless channel mapping includes allocating a channel of a set of channels within a frequency band for at least a portion of conveyance of a packet from a source to a destination via a wireless network node module(s), a wireless switch module(s), and/or a wireless bridge-routing module(s).

As a more specific example, the channel may be allocated to wirelessly transmit the packet from the source to the destination via one or more network node modules, one or more switch modules, and/or one or more bridge-routing modules. As another more specific example, the channel may be allocated to convey the packet from a first network module, to a first switch module, and to a bridge-routing module and a second channel may be allocated to convey the packet from the bridge-routing module, to a second switch module, to a second network node module.

The allocation of a channel to convey a packet may be done in a variety of ways. For example, the channel may be permanently allocated for packets of a first content type (e.g., mission critical packets, network data packets, etc.); for packets from a source of first type of device (e.g., a safety critical sensor); and/or for packets to a destination of a particular type (e.g. safety critical processor, safety critical actuator, etc.). As another example, the channel may be semi-permanent allocated (e.g., for a set time, for a number of packets, as instructed by the network manager, etc.) for packets of a second content type (e.g., network data, vehicle operation, etc.); for packets from a source of second type of device (e.g., a network manager); and/or for packets to a destination of a particular type (e.g. non-critical vehicle operation devices, etc.). As yet another example, the channel may be dynamically allocated when the packet is of a third type (e.g., infotainment, non-critical vehicle operation, etc.); for packets from a source of third type of device (e.g., window up/down sensor, a multimedia processing, memory, etc.); and/or for packets to a destination of a particular type (e.g. window up/down actuator, multimedia display devices, etc.).

As another example of allocating channels per the wireless channel mapping, the channels within a frequency band may be allocated in cellular pattern among a plurality of regions within the wireless vehicle communication network to reduce channel interference from overlapping channel use in different ones of the plurality of regions. For example, a set of switching modules and/or bridge-routing modules in one section of the network fabric may use the same channels (or subset thereof) as another set of switching modules and/or bridge-routing modules in a different section of the network fabric.

The network fabric has been presented in a variety of embodiments as shown in FIGS. 13, 87, and 87A. Other embodiments of the network fabric may be implemented by using combinations of the embodiments of FIGS. 13, 87, and 87A. For example, some of the switch modules and/or bridge-routing modules may be wired only (as shown in FIG. 13), some may be wireless only (as shown in FIG. 87A), and/or some may be wired and wireless (as shown in FIG. 87). Similarly, some of the network node modules may be wired only (as shown in FIG. 13), some may be wireless only (as shown in FIG. 87A), and/or some may be wired and wireless (as shown in FIG. 87).

FIG. 87 is a schematic diagram of an embodiment of a wired and wireless network fabric 1424 that includes a plurality of bridge-routing modules 1426 and a plurality of switch modules 1428. The switch modules 1428 are coupled to one or more network node modules 1430 and to at least one bridge-routing module 1426. Each of the bridge-routing modules 1426 are coupled to at least one switching module 1428 and at least one other bridge-routing module 1426. Each of the network node modules 1430, the switch modules 1428, and the bridge-routing modules 1426 includes a wired network connection and a wireless network connection. The wired coupling between bridge-routing modules 1426, between bridge-routing modules 1426 and switch modules 1428, and between switch modules 1428 and network node modules 1430 includes multiple cables (e.g., twisted pair, coaxial cable, category 5 cables, fiber optics, etc.).

The wireless coupling between the same modules may be in accordance with one or more standardized wireless communication protocols in the 2.4 GHz frequency band, the 5 GHz frequency band, the 60 GHz frequency band, etc. or a may be a proprietary wireless communication protocol. Standardized wireless communication protocols includes, but are not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), Enhanced Data rates for GSM Evolution (EDGE), General Packet Radio Service (GPRS), WCDMA, LTE (Long Term Evolution), WiMAX (worldwide interoperability for microwave access), and/or variations thereof.

Within the network fabric, the wired and wireless connections may be used in a variety of ways. For example, the wireless connections may be used for backup and/or redundancy transmissions to provide a fast fail over if a wired connection fails. As another example, the wireless connections may be used for network configuration and system level data, while the wired connections are used for mission critical data, vehicle operation data, and/or information-entertainment data. As a further example, the wireless connections and wired connections may be used independently to support concurrent packet transmissions.

The network fabric may be used within the unified network fabric or the multiple network fabric communication networks of the preceding figures. Note that more or less switching modules 1428 and bridge-routing modules 1426 may be included in the network fabric. Further note that the multiple wired connections between switching modules 1428 and bridge-routing modules 1426 may include two or more cables where one of the cables is active and the other is used for fail over or redundancy. Still further note that a network node module may be directly connected to a bridge-routing module 1426.

Figure 88:
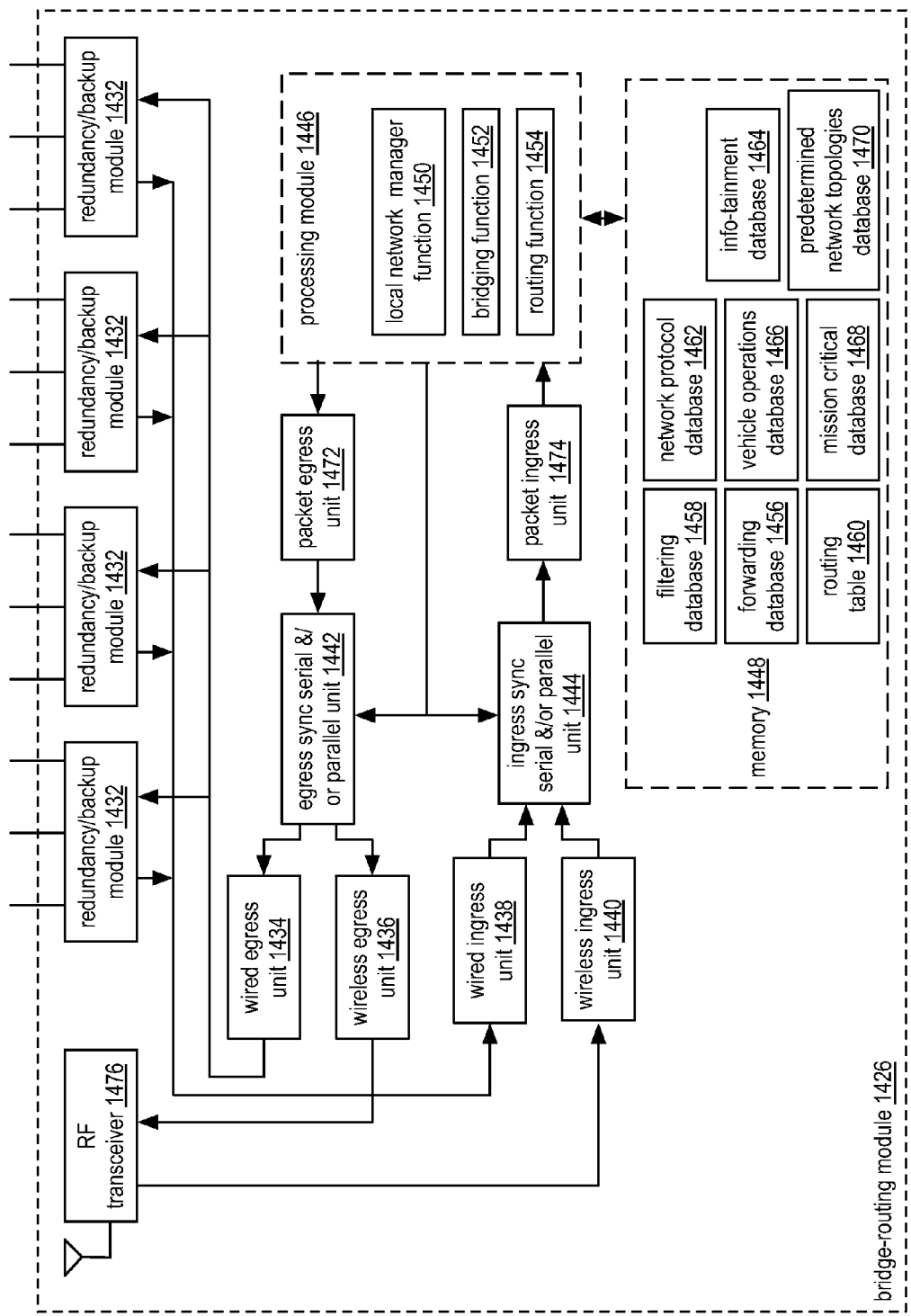
FIG. 88 is a schematic diagram of another embodiment of a bridge/routing module within a vehicular communication network in accordance with the present invention.

FIG. 88 is a schematic diagram of another embodiment of a bridge/routing module 1426 that includes a plurality of redundancy/backup modules 1432, a wired packet egress unit 1434, a wireless packet egress unit 1436, a wired packet ingress unit 1438, a wireless packet ingress unit 1440, an egress sync serial and/or parallel unit 1442, an ingress sync serial and/or parallel unit 1444, a processing module 1446, and memory 1448. The processing module 1446 is configured to implement a local network management function 1450, a bridging function 1452, and or a routing function 1454. The memory 1448 stores one or more tables and/or databases. For instance, the memory 1448 may store a forwarding database 1456, a filtering database 1458, a routing table 1460, a network protocol database 1462, and information/entertainment database 1464, a vehicle operations database 1466, a mission-critical database 1468, and a predetermined network topology database 1470.

In an example of wired operation only, one of the redundancy/backup modules 1432 receives a packet. The packet is routed to the packet ingress unit 1474 via the wired packet ingress unit 1438 and the ingress sync serial and/or parallel unit 1444, where the local network management function 1450 interprets the packet. Such an interpretation includes determining the type of packet, or packet content type (e.g., mission critical, network data, info-entertainment, vehicle operation, etc.). Having identified the packet, the local network management function 1450 determines the processing for the packet and then processes the packet accordingly. Specific examples of this were discussed with reference to FIG. 14.

After the processing module 1446 has processed the packet, the packet egress unit 1472 received the processed packet. Based on information received from the processing module 1446, the packet egress unit 1472 places the packet in a queue for subsequent transmission to one of the redundancy-backup modules 1432 via the egress sync serial and/or parallel unit 1442 and the wired egress unit 1434.

In an example of wireless operation only, the RF transceiver 1476 receives a wireless packet that it provides to the wireless ingress unit 1438. The wireless ingress unit 1438 temporarily stores the packet and subsequently forwards it to the packet ingress unit 1474 via the ingress sync serial and/or parallel units 1444. The processing module 1446 interprets packet as discussed above and subsequently places a process packet in the packet egress unit 1472. The packet egress unit 1472 provides the process packet to the wireless egress unit 1436 via the egress sync serial and/or parallel unit 1442. The wireless egress unit 1436 provides the processed packet to the RF transceiver 1476 for wireless transmission to another bridge-routing module, to a switch module, and/or to a network node module.

In an example of concurrent wired and wireless operation, the wireless communication path is used for redundancy transmissions. In this situation, the RF transceiver 1476 receives a wireless version of the packet and one of the redundancy/backup modules 1432 receives a wired version of the packet. The RF transceiver 1476 provides the wireless version of the packet to the wireless ingress unit 1440 and the redundancy/backup module 1432 provides the wired version of the packet to a wired ingress unit 1438.

The ingress sync serial and/or parallel unit 1444 retrieves the wired and wireless versions of the packet from the respective ingress units. The ingress sync serial and/or parallel unit 1444 synchronizes the versions of the packet, analyzes the packets, and packet content, and selects one of them for outputting to the packet ingress unit 1474. The ingress sync serial and/or parallel unit 1444 may perform error correction on one or both of the packets based on the packets, a matched filtering function, a convergence function, etc. The processing module 1446 retrieves the packet from the packet ingress unit 1474 in accordance with its priority and processes it as previously discussed.

The processing module 1446 places the processed packet into the packet egress unit in accordance with its priority level. When the process packet has reached the top of a queue within the packet egress unit 1472, the egress sync serial and/or parallel unit 1442 retrieves the packet and provides copies of the packet to the wired egress unit 1434 and the wireless egress unit 1436. The wireless egress unit 1426 provides the processed packet to the RF transceiver 1476 for wireless transmission of the packet and the wired egress unit 1434 provides the processed packet to one of the redundancy/backup modules 1432 for wired transmission of the packet. Note that the egress sync serial and/or parallel unit 1442 accounts for processing differences, latency differences, etc. when it provides the process packet to the wired and wireless egress units 1434-1436 such that the wired and wireless transmitted packets reach the destination at approximately the same time.

In another example of concurrent wired and wireless operation, the wireless communication path is used for separate packet transmissions (e.g., network configuration data, system level data, etc.). In this situation, the RF transceiver 1476 receives a wireless packet and one of the redundancy/backup modules 1432 receives a wired packet. The RF transceiver 1476 provides the wireless packet to the wireless ingress unit 1440 and the redundancy/backup module 1432 provides the wired packet to a wired ingress unit 1438.

The ingress sync serial and/or parallel unit 1444 retrieves the wired and wireless packets from the respective ingress units. The ingress sync serial and/or parallel unit 1444 synchronizes the packets, analyzes the packets, and serially outputs the packets to the packet ingress unit 1474. The processing module 1446 retrieves the packets from the packet ingress unit 1474 in accordance with their priority and processes the packets as previously discussed.

The processing module 1446 places the processed packets into the packet egress unit 1472 in accordance with their priority level. When one of the processed packets reaches the top of a queue within the packet egress unit 1472, the egress sync serial and/or parallel unit 1442 retrieves the packet and provides it to the wired egress unit 1434 or to the wireless egress unit 1436. If the wireless egress unit 1436 receives the processed packet, it subsequently provides it to the RF transceiver 1476 for wireless transmission. If the wired egress unit 1436 receives the processed packet, it subsequently provides it to one of the redundancy/backup modules 1432 for wired transmission.

In yet another example of concurrent wired and wireless operation, the wireless and wired communication paths are used for packet aggregation. In this situation, the RF transceiver 1476 receives one packet and one of the redundancy/backup modules 1432 receives another packet. The RF transceiver 1476 provides the wireless packet to the wireless ingress unit 1440 and the redundancy/backup module 1432 provides the wired packet to a wired ingress unit 1438.

The ingress sync serial and/or parallel unit 1444 retrieves the wired and wireless packets from the respective ingress units. The ingress sync serial and/or parallel unit 1444 synchronizes the packets, analyzes the packets, and serially outputs them to the packet ingress unit 1474. The processing module 1446 retrieves the packets from the packet ingress unit 1474 in accordance with their priority and processes them as previously discussed.

The processing module 1446 places the processed packets into the packet egress unit 1472 in accordance with their priority level. When the process packets reach the top of a queue within the packet egress unit 1472, the egress sync serial and/or parallel unit 1442 retrieves the packets and provides a wired processed packet to the wired egress unit 1434 and a wireless processed packet to the wireless egress unit 1436. The wireless egress unit 1436 provides the wireless processed packet to the RF transceiver 1476 for wireless transmission and the wired egress unit 1434 provides the wired processed packet to one of the redundancy/backup modules 1432 for wired transmission. Note that the egress sync serial and/or parallel unit 1442 accounts for processing differences, latency differences, etc. when it provides the processed packets to the wired and wireless egress units such that the wired and wireless transmitted packets reach their respective destinations at approximately the same time.

Figure 89:
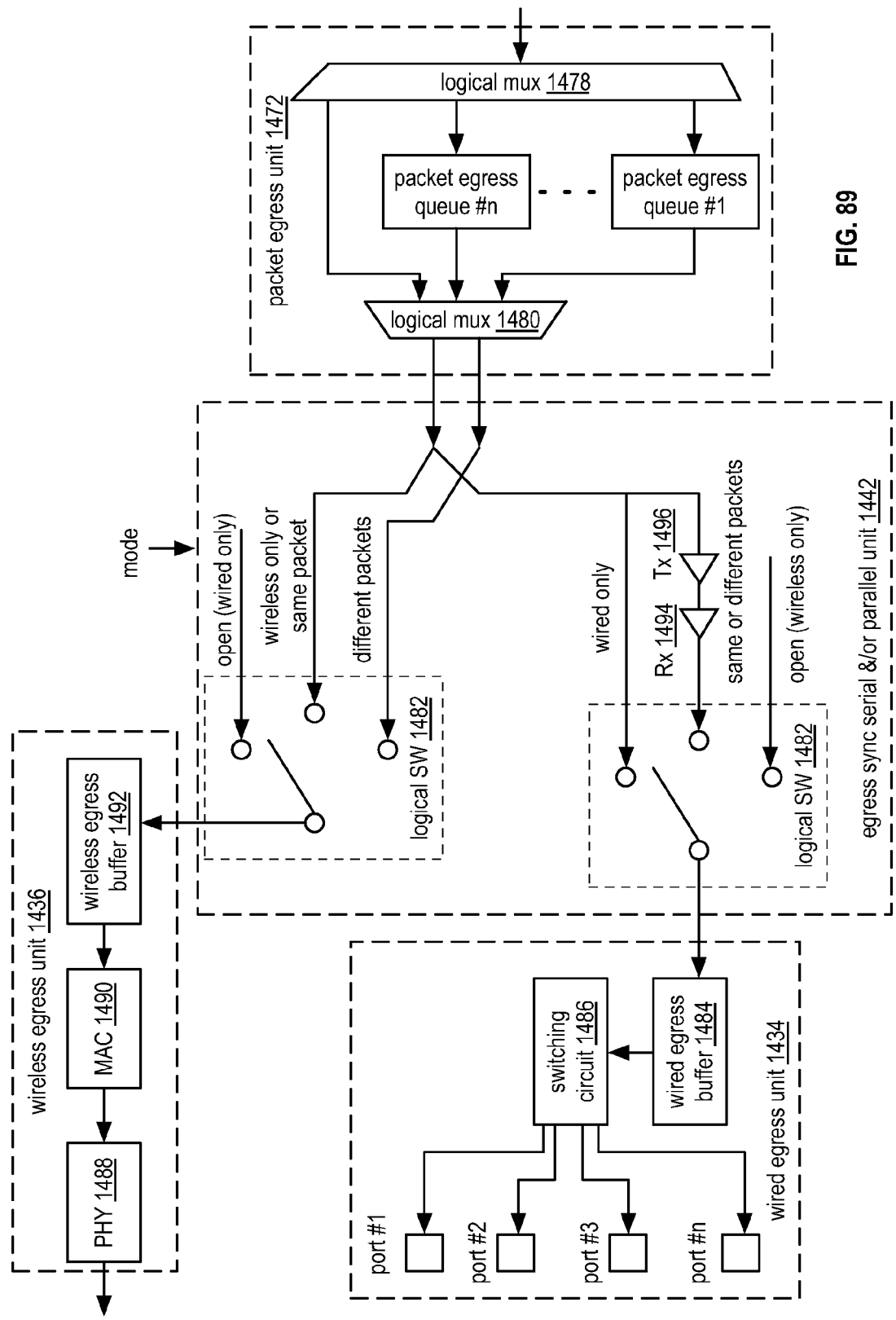
FIG. 89 is a schematic diagram of an embodiment of egress units, an egress sync module, and a packet egress unit of a bridge/routing module in accordance with the present invention.

FIG. 89 is a schematic diagram of an embodiment of egress units, an egress sync serial and/or parallel module 1442, and a packet egress unit 1472 of a bridge/routing module. The packet egress unit 1472 includes a first logical multiplexer 1478, one or more packet egress queues, and a second logical multiplexer 1480. The egress sync serial and/or parallel unit 1442 includes logical switches 1482 and delay units. The wired egress unit 1434 includes a wired egress buffer 1484, a switching circuit 1486, and a plurality of ports, which are coupled to the plurality of redundancy/backup modules. The wireless egress unit 1436 includes a wireless egress buffer 1492, a media access control (MAC) layer module 1490, and a physical layer (PHY) module 1488. The logical switches 1482 and/or the logical multiplexers 1478-1480 may each be constructed of physical switches, gates, multiplexers, sample and hold circuits, programmable logic circuits, and or a combination thereof.

In an example of operation, the first logical multiplexer 1478 of the packet egress unit 1472 receives a packet and, based on a control signal from a processing module, provides the packet to one of the packet egress queues or to the second logical multiplexer 1480. When the packet reaches the second logical multiplexer 1480 (e.g., directly from the first logical multiplexer 1478 or from one of the packet egress queues), it is outputted to the egress sync serial and/or parallel unit 1442.

Depending on the mode of the bridge-routing module, the egress sync serial and/or parallel module 1442 provides the packet to the wireless egress unit 1436 and/or to the wired egress unit 1434. The modes of the bridge-router module include wired only, wireless only, concurrent transmission of the same packet (e.g., for redundancy, backup, fast failover, etc.), and concurrent transmission of different packets (e.g., packet aggregation, data segregation, etc.).

When the bridge-routing module is in a wired only mode, the egress sync serial and/or parallel unit 1442 configures the logical switches 1482 to provide the packet to the wired egress unit 1434 only. In this mode, the wireless logical switch 1482 is opened such that the wireless egress unit 1436 does not receive the wired only packet. The wired egress buffer 1484 receives the packet and stores it in one of its queues (may only have one queue) in accordance with the priority of the packet. When the packet reaches the front of the queue, the switching circuit 1486 routes the packet to the appropriate port.

When the bridge-routing module is in a wireless only mode, the egress sync serial and/or parallel unit 1442 configures the logical switches 1482 to provide the packet to the wireless egress unit 1436 only. In this mode, the wired logical switch 1482 is opened such that the wired egress unit 1434 does not receive the wireless only packet. The wireless egress buffer 1436 receives the packet and stores it in one of its queues (may only have one queue) in accordance with the priority of the packet. When the packet reaches the front of the queue, the MAC module 1490 performs MAC layer functions and the physical layer module 1488 performs PHY functions on the packet in accordance with the one or more wireless communication protocols to produce one or more outbound symbol streams.

For example, the MAC 1490 and/or PHY modules 1488 convert outbound data (e.g., voice, text, audio, video, graphics, etc.) into one or more outbound symbol streams in accordance with one or more wireless communication standards (e.g., GSM, CDMA, WCDMA, HSUPA, HSDPA, WiMAX, EDGE, GPRS, IEEE 802.11, Bluetooth, ZigBee, universal mobile telecommunications system (UMTS), long term evolution (LTE), IEEE 802.16, evolution data optimized (EV-DO), etc.) and/or a proprietary communication protocol. Such a conversion includes one or more of: scrambling, puncturing, encoding, interleaving, constellation mapping, modulation, frequency spreading, frequency hopping, beamforming, space-time-block encoding, space-frequency-block encoding, frequency to time domain conversion, and/or digital baseband to intermediate frequency conversion. Note that the module(s) converts the outbound data into a single outbound symbol stream for Single Input Single Output (SISO) communications and/or for Multiple Input Single Output (MISO) communications and converts the outbound data into multiple outbound symbol streams for Single Input Multiple Output (SIMO) and Multiple Input Multiple Output (MIMO) communications.

A transmitter section 1496 of the RF transceiver 1494 converts the outbound symbol stream(s) into one or more outbound wireless communications signals in accordance with the one or more wireless communication protocols. For example, the transmitter section 1496 may mix the one or more outbound symbol streams with a local oscillation(s) to produce one or more up-converted signals. One or more power amplifiers and/or power amplifier drivers amplifies the one or more up-converted signals, which may be RF bandpass filtered, to produce the one or more outbound RF signals. In another embodiment, the transmitter section 1496 includes an oscillator that produces an oscillation. The outbound symbol stream(s) provides phase information (e.g., $+/-\Delta\theta$ [phase shift] and/or $\theta(t)$ [phase modulation]) that adjusts the phase of the oscillation to produce a phase adjusted RF signal(s), which is transmitted as the outbound RF signal(s). In another embodiment, the outbound symbol stream(s) includes amplitude information (e.g., A(t) [amplitude modulation]), which is used to adjust the amplitude of the phase adjusted RF signal(s) to produce the outbound RF signal(s).

In yet another embodiment, the transmitter section 1496 includes an oscillator that produces an oscillation(s). The outbound symbol stream(s) provides frequency information (e.g., $+/-\Delta f$ [frequency shift] and/or f(t) [frequency modulation]) that adjusts the frequency of the oscillation to produce a frequency adjusted RF signal(s), which is transmitted as the outbound RF signal(s). In another embodiment, the outbound symbol stream(s) includes amplitude information, which is used to adjust the amplitude of the frequency adjusted RF signal(s) to produce the outbound RF signal(s). In a further embodiment, the transmitter section 1496 includes an oscillator that produces an oscillation(s). The outbound symbol stream(s) provides amplitude information (e.g., $+/-\Delta A$ [amplitude shift] and/or A(t) [amplitude modulation]) that adjusts the amplitude of the oscillation(s) to produce the outbound RF signal(s).

When the bridge-routing module is in a concurrent transmission of the same packet mode, the egress sync serial and/or parallel unit 1442 configures the logical switches 1482 as shown. In this instance, the center tap of the wireless logical switch 1482 is active as is the center tap of the wired logical switch. The center tap of the wired logical switch 1482 is coupled to one or more delay modules. For example, one delay module may be used to account for latency differences, processing differences, transmission speed differences, etc. between transmitting a packet wirelessly and transmitting the packet via wired means. Another delay may be used to account for the latency differences, processing differences, reception differences, etc. between receiving a packet wirelessly and receiving a packet via wired means.

The delay modules may be dynamically calibrated during concurrent transmission of packets and feedback from modules receiving the packets. Alternatively, the delay modules may be statically calibrated at the boot-up of the network fabric, at reset of the network fabric, and/or as the network manager may determine.

The egress sync serial and/or parallel unit 1442 provides the redundant packets to the wired egress buffer 1434 and to the wireless egress buffer 1436 in a synchronized manner such that the wired packet and the wireless packet are transmitted at substantially the same time. The wireless egress unit 1436 and the wired egress unit 1434 process their respective packets as previously discussed.

When the bridge-routing module is in a concurrent transmission of different packets mode, the second logical multiplexer 1480 of the packet egress unit 1472 outputs two packets concurrently. The egress sync serial and/or parallel unit 1442 provides one of the packets to the wireless logical switch 1482 as shown and the other packet to the wired logical switch 1482 as shown. The respective packets are provided to the wireless egress unit 1482 and wired egress unit 1434 for substantially concurrent transmission.

Figure 90:
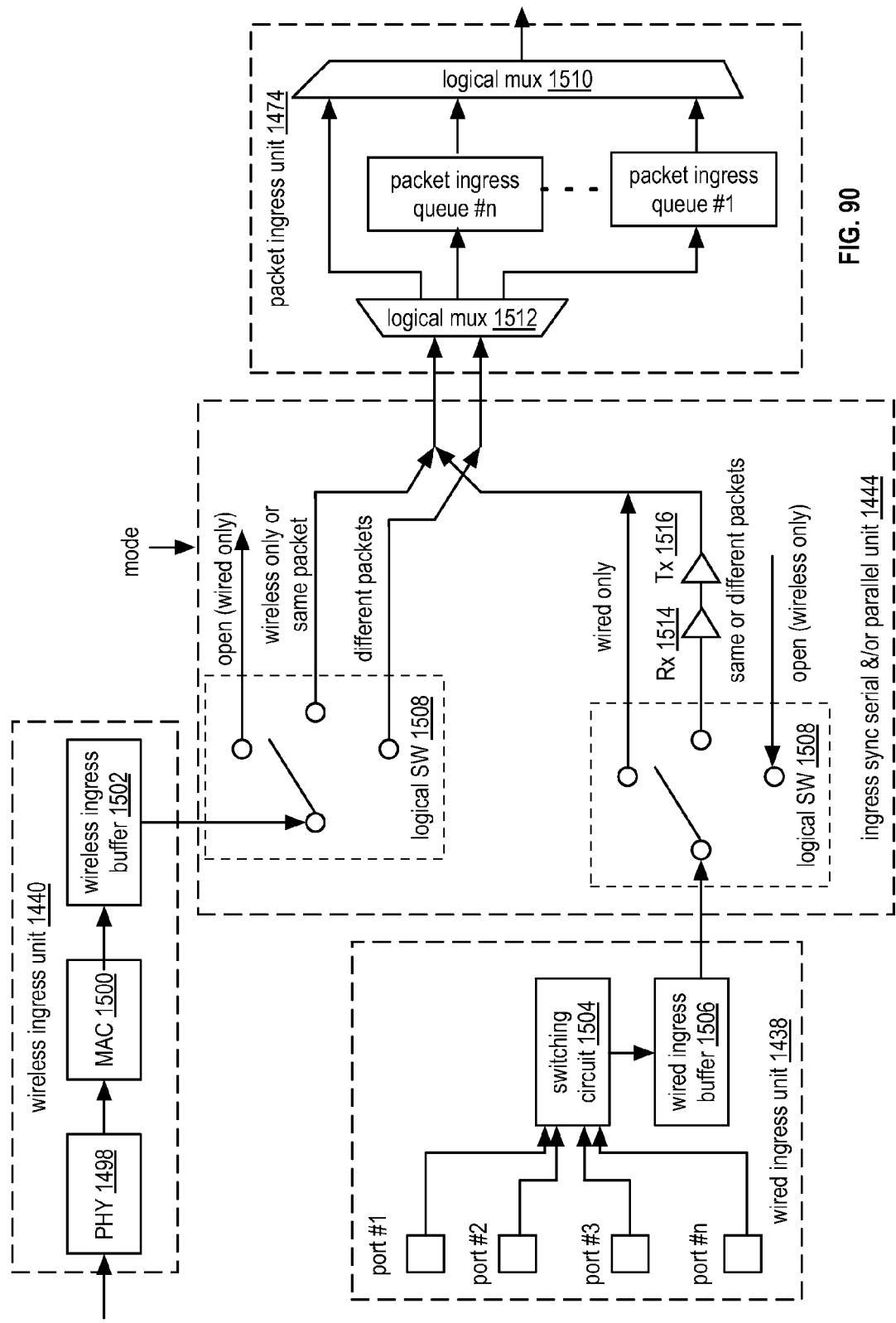
FIG. 90 is a schematic diagram of an embodiment of ingress units, an ingress sync module, and a packet ingress unit of a bridge/routing module in accordance with the present invention.

FIG. 90 is a schematic diagram of an embodiment of ingress units, an ingress sync module 1444, and a packet ingress unit 1474 of a bridge/routing module. The wireless ingress unit 1440 includes a physical layer module (PHY) 1498, a media access control layer module (MAC) 1500, and a wireless ingress buffer 1502. The wired ingress unit 1440 includes a plurality of ports, a switching circuit 1504, and a wired ingress buffer 1506. The ingress sync serial and/or parallel unit 1444 includes logical switches 1508 and one or more delay modules. The packet ingress unit 1474 includes a first logical multiplexer 1512, one or more packet ingress queues, and a second logical multiplexer 1510.

Depending on the mode of the bridge-routing module, the wireless ingress unit 1440 and/or to the wired ingress unit 1438 will receive one or more incoming packets. The modes of the bridge-router module includes wired only, wireless only, concurrent transmission of the same packet (e.g., for redundancy, backup, fast failover, etc.), and concurrent transmission of different packets (e.g., packet aggregation, data segregation, etc.).

When the bridge-routing module is in a wired only mode, the wired ingress unit 1438 receives an incoming packet via one of its ports and the wireless ingress unit 1440 is inactive (which may result from being disabled or from not receiving a wireless incoming packet). The switching circuit 1508 provides the incoming packet to the wired ingress buffer 1506, which stores the packet in a queue based on the packet's priority and a prioritization scheme.

The ingress sync serial and/or parallel unit 1444 configures the logical switches such that the wireless logical switch 1508 is open and the wired logical switch 1508 is closed to the wired only tap. In this configuration, the first logical multiplexer 1512 of the packet ingress unit 1474 receives the wired only incoming packet and provides it to one of the packet ingress queues. The packet ingress queue stores the incoming packet based on its priority and a prioritization scheme. When the packet reaches the front of the queue, it is provided to the second logical multiplexer 1510, which transmits the packet to the processing module or to another module within the bridge-routing module.

When the bridge-routing module is in a wireless only mode, the wireless ingress unit 1440 is active and the wired ingress unit 1438 is in active (e.g., disable or just not receiving a packet). In this mode, a receiver section 1514 of the RF transceiver converts one or more inbound RF signals into one or more inbound wireless symbol streams. For example, the receiver section 1514 amplifies the one or more inbound RF signals to produce one or more amplified inbound RF signals. The receiver section 1514 then mix in-phase (I) and quadrature (Q) components of the amplified inbound RF signal(s) with in-phase and quadrature components of a local oscillation(s) to produce one or more sets of a mixed I signal and a mixed Q signal. Each of the mixed I and Q signals are combined to produce one or more inbound symbol streams. In one example, each of the one or more inbound symbol streams may include phase information (e.g., $+/-\Delta\theta$ [phase shift] and/or $\theta(t)$ [phase modulation]) and/or frequency information (e.g., $+/-\Delta f$ [frequency shift] and/or $f(t)$ [frequency modulation]). In another example and/or in furtherance of the preceding example, the inbound RF signal(s) includes amplitude information (e.g., $+/-\Delta A$ [amplitude shift] and/or $A(t)$ [amplitude modulation]). To recover the amplitude information, the receiver section 1514 includes an amplitude detector such as an envelope detector, a low pass filter, etc.

The wireless ingress buffer 1440 receives the one or more inbound symbol streams. The physical layer module performs 1498 PHY functions and the MAC module 1500 performs MAC layer functions on the one or more outbound symbol streams in accordance one or more wireless communication protocols to produce one or more inbound wireless packets. For example, one or more of the MAC 1500 and PHY modules 1498 convert the one or more inbound symbol streams into inbound data (e.g., voice, text, audio, video, graphics, etc.) in accordance with one or more wireless communication standards (e.g., GSM, CDMA, WCDMA, HSUPA, HSDPA, WiMAX, EDGE, GPRS, IEEE 802.11, Bluetooth, ZigBee, universal mobile telecommunications system (UMTS), long term evolution (LTE), IEEE 802.16, evolution data optimized (EV-DO), etc.). Such a conversion may include one or more of: digital intermediate frequency to baseband conversion, time to frequency domain conversion, space-time-block decoding, space-frequency-block decoding, demodulation, frequency spread decoding, frequency hopping decoding, beamforming decoding, constellation demapping, deinterleaving, decoding, depuncturing, and/or descrambling. Note that the processing module converts a single inbound symbol stream into the inbound data for Single Input Single Output (SISO) communications and/or for Multiple Input Single Output (MISO) communications and converts the multiple inbound symbol streams into the inbound data for Single Input Multiple Output (SIMO) and Multiple Input Multiple Output (MIMO) communications.

The packet(s) are provided to the wireless ingress buffer 1502 for temporary storage in one of its queues (may only have one queue) in accordance with the priority of the packet and a prioritization scheme. When the packet reaches the front of the queue, it is provided to the ingress sync serial and/or parallel unit 1444, which provides the packet to the first logical multiplexer 1512 of the packet ingress unit 1474.

When the bridge-routing module is in a concurrent transmit of the same packet mode, the wireless ingress unit 1440 receives a wireless version of the packet and the wired ingress unit 1438 receives a wired version of the packet. Each of the wireless and wired ingress units 1440-1438 processes the incoming packet as previously discussed and provides them to the ingress sync serial and/or parallel unit 1444.

In this mode, the ingress sync serial and/or parallel unit 1444 configures the logical switches 1508 to receive the wired and wireless version of the incoming packet. The ingress sync serial and/or parallel unit 1444 may provide the wired and wireless versions of the incoming packet to the packet ingress unit 1474 such that the processing module may select which packet will be further processed. Alternatively, the ingress serial and parallel unit 1444 may include processing to analyze the wired and wireless versions of the packet to determine which packet to provide to the packet ingress unit 1474. In addition, processing within the ingress serial and/or processing unit 1444 may further perform error correction, etc. Note that the wired version of the packet may traverse one or more delay modules such as that the wired and wireless versions of the packet are substantially in sync.

When the bridge-routing module is in a concurrent transmit of the different packets mode, the wireless ingress unit 1440 receives a wireless packet and the wired ingress unit 1438 receives a wired packet. Each of the wireless and wired ingress units 1440-1438 processes their respective incoming packet as previously discussed and provides them to the ingress sync serial and/or parallel unit 1444.

In this mode, the ingress sync serial and/or parallel unit 1444 configures the logical switches 1508 to receive the wired and wireless packets. The ingress sync serial and/or parallel unit 1444 provides the wired and wireless packets to the packet ingress. The first logical multiplexer 1512 provides the wired and wireless packets serially or in parallel to one or more of the packet ingress queues. Once the packets are in an ingress queue, they are processed as previously discussed. Note that the wired packet may traverse one or more delay modules such as that the wired and wireless packets are substantially in sync.

Figure 91:
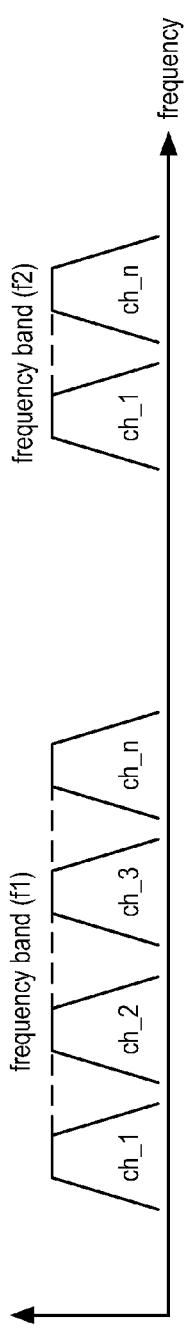
FIG. 91 is a diagram of an example of frequency bands and channels of a vehicular communication network in accordance with the present invention.

FIG. 91 is a diagram of an example of frequency bands and channels of a vehicular communication network. As shown, a frequency band may include multiple channels and may be a 2.4 GHz frequency band, a 5 GHz, frequency band, 60 GHz frequency, or some other frequency band. Each of the channels of a frequency band may be used to support transmission of a wireless packet and may be allocated in a cellular pattern to avoid overlapping frequencies. For example, different channels may be used to concurrently transmit multiple wireless packets. As another example, channels may be temporarily or permanently allocated for particular types of packets (e.g., mission critical, network data, vehicle operation, information-entertainment, etc.). As yet another example, channels may be temporarily or permanently allocated to a particular device (e.g., engine control unit, etc.).

Figure 92:
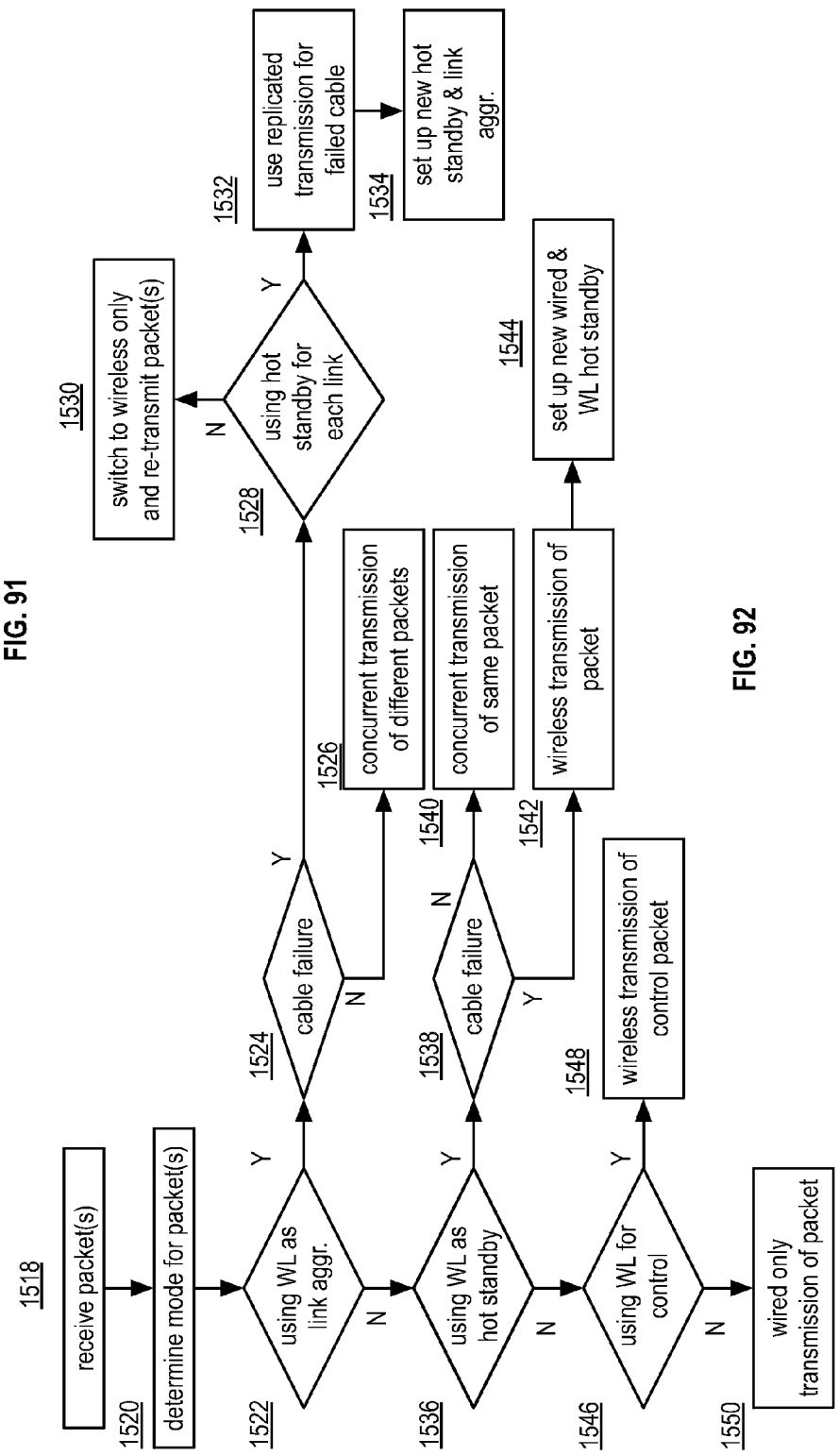
FIG. 92 is a logic diagram of an embodiment of a method for wired and wireless packet processing within a vehicular communication network in accordance with the present invention.

FIG. 92 is a logic diagram of an embodiment of a method for wired and wireless packet processing within a vehicular communication network that may be performed by bridge-routing module. The method begins by receiving one or more packets via the wireless egress unit and/or the wired egress unit 1518. The method continues by determining the mode for the packet, or packets (i.e., the mode of the bridge-routing module) 1520. The mode may be wireless only, wired only, concurrent transmission of the same packet, or concurrent transmission of different packets.

The method continues by determining whether the wireless link is being used in a link aggregation mode (i.e., for concurrent transmission of different packets) 1522. If yes, the method continues by determining whether there is a cable failure of a wired link 1524. If not, the method continues by a preparing the different packets for concurrent transmission on the wired link and on the wireless link 1526.

If a cable failure has occurred, the method continues by determining whether a wired hot standby is used for the wired link 1528. If not, the method continues by switching to a wireless only mode and retransmitting any packets that were lost due to the cable failure 1530. If wired hot standby is being used, the method continues by using replicated wired transmission for the failed cable such that a packet is not lost 1532. The method continues by setting up a new hot standby for an active wired link and reestablishing a link aggregation between the wireless link and the wired link 1534.

If the wireless link is not being used for link aggregation, the method continues by determining whether the wireless link is being used as wireless hot standby 1536. If so, the method continues by determining whether a cable failure has occurred 1538. If not, the method continues by concurrent transmission of the same packet via the wired link and the wireless link 1540. If, however, a cable failure has occurred, the method continues by transmitting the packet wirelessly 1542. The method continues by setting up a new wired link and resuming the wireless hot standby for the new wired link 1544. In this manner, the wireless link is used for hot standby and the wired link is used as the primary communication path.

If the wireless link is not being used for wireless hot standby, the method continues by determining whether the wireless link is being used for network data, system data, and/or network control data 1546. If yes, the method continues by wirelessly transmitting packets of control data, network data, and or system data 1548. If not, the method continues by transmitting packets in a wired manner only 1550.

Figure 93:
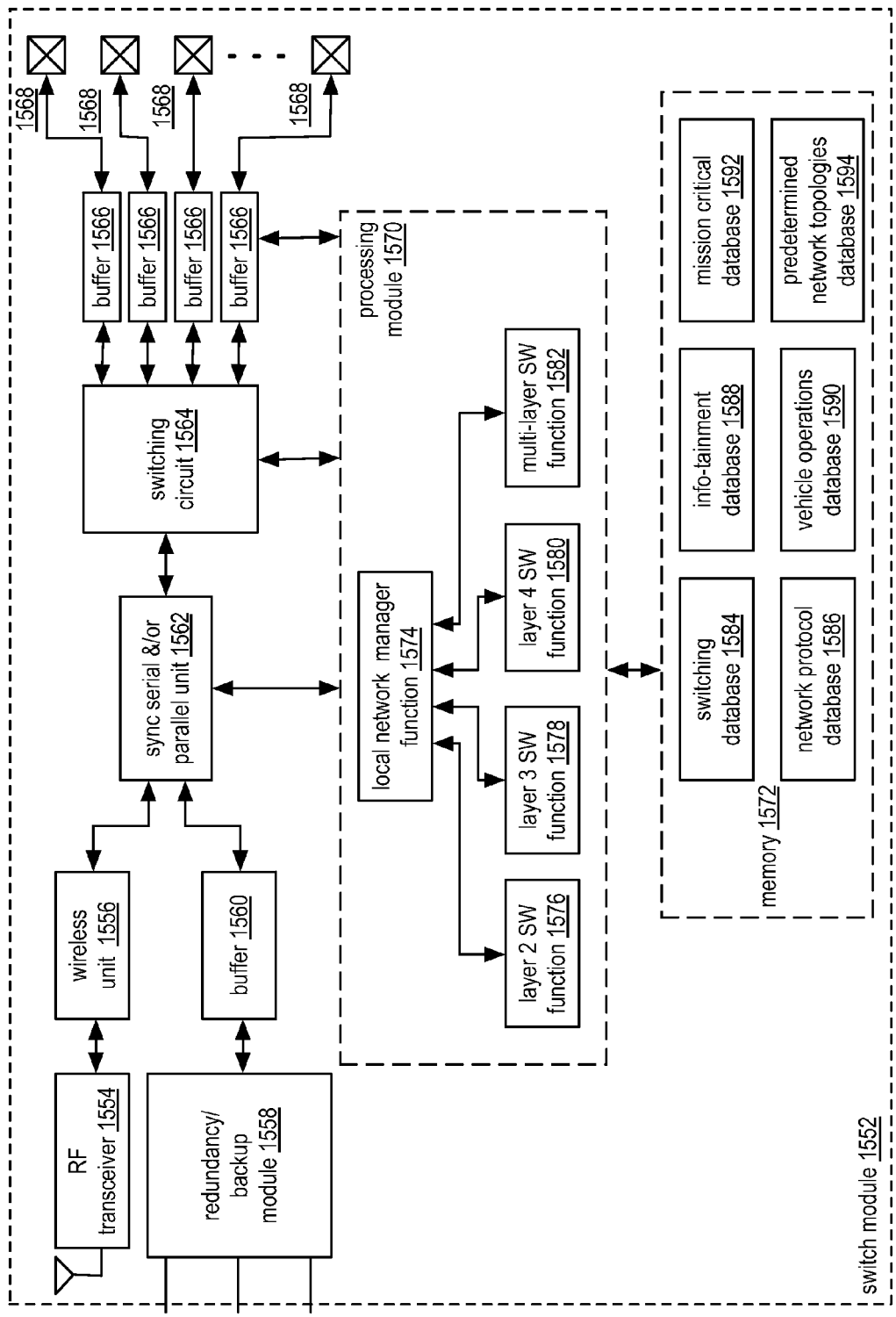
FIG. 93 is a schematic diagram of another embodiment of a switch module within a vehicular communication network in accordance with the present invention.

FIG. 93 is a schematic diagram of another embodiment of a switch module 1552 that includes an RF transceiver 1554, a wireless unit 1556, a redundancy/backup module 1558, a buffer 1560, a sink serial and/or parallel unit 1562, a switching circuit 1564, a plurality of port buffers 1566, a plurality of ports 1568, a processing module 1570, and memory 1572. The processing module 1570 may be configured to implement a local network management function 1574, a layer 2 switching function 1576, a layer 3 switching function 1578, a layer 4 switching function 1580, and or a multilayer switching function 1582. The memory 1572 may store one or more databases, such as a switching database 1584, network protocol database 1586, information-entertainment database 1588, vehicle operations database 1590, mission-critical database 1592, and a predetermined network topologies database 1594. Each of the ports 1568 is coupled to a corresponding network node module, the redundancy/backup module 1558 is coupled to a bridge-routing module 1558, and the RF transceiver 1554 is operable to communicate with a bridge-routing module 1558 and/or a network node module.

The switch module 1552 operates in one of four modes: wired only, wireless only, concurrent transmission of the same packet, and concurrent transmission of different packets. When the switch module 1552 is in a wired only mode, the RF transceiver 1554 and wireless units are in active. In this mode, the switch module 1552 functions as previously described with reference to FIGS. 33-36.

When the switch module 1552 is in a wireless only mode, the RF transceiver 1554 and a wireless unit are active and of the redundancy/backup module 1558 and buffer are inactive. In a first version of the wireless only mode, the ports 1568 and buffers 1566 are active to transceive packets with the corresponding network node modules. In a second version of the wireless only mode, the ports 1568 and buffers 1566 are in active such that the switch module 1552 communicates with the network node modules via the RF transceiver 1554.

When the switch module 1552 is in the concurrent transmission of the same packet mode or is in the concurrent transmission of different packets mode, the RF transceiver 1554, the wireless unit 1556, the redundancy/backup module 1558, and the buffer 1566 are active. In these modes, the sync serial and/or parallel unit 1562 synchronizes transmission and reception of concurrent packets and coordinates the concurrent transmission of the same packet and concurrent transmission of different packets.

Figure 94:
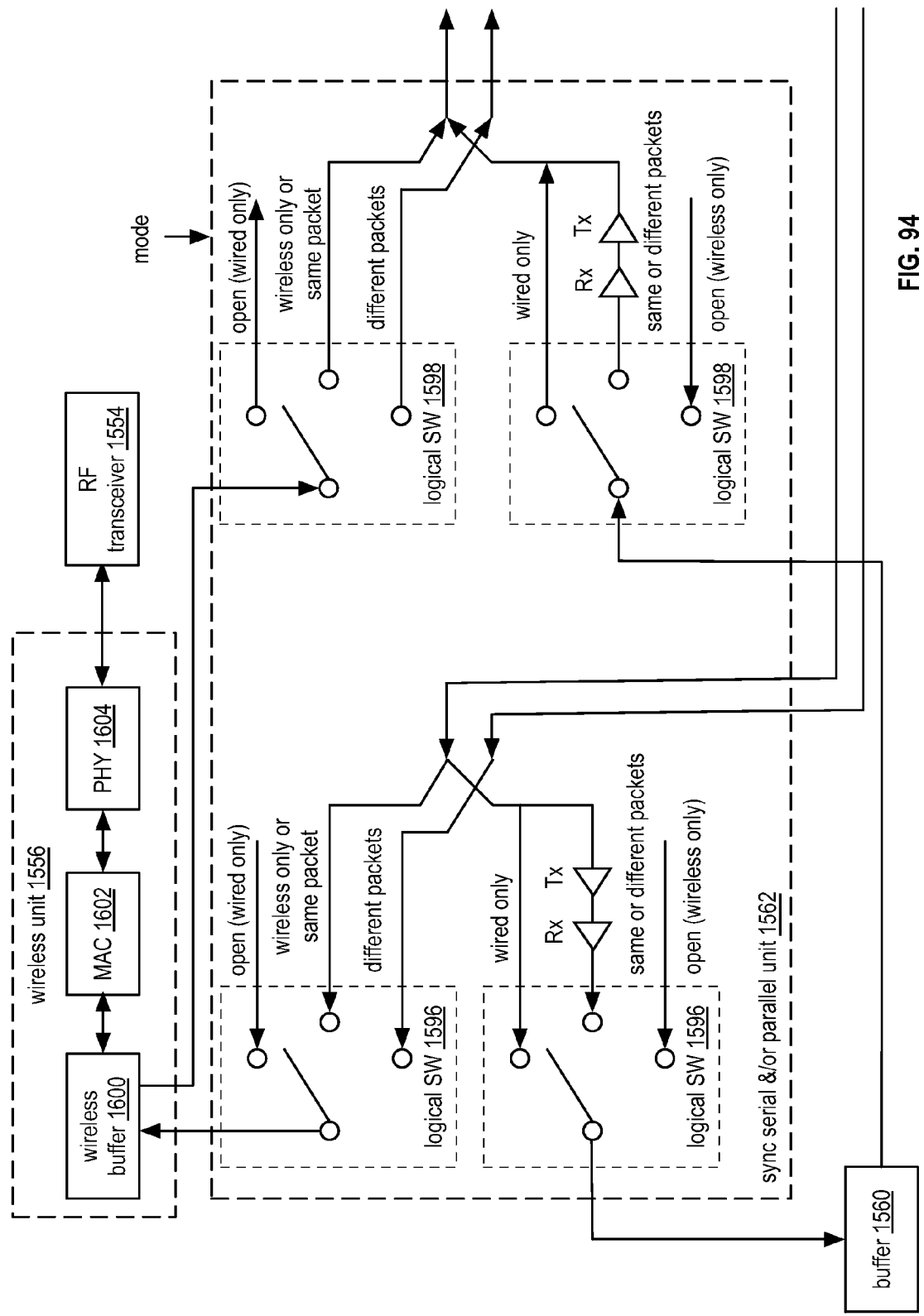
FIG. 94 is a schematic diagram of another embodiment of a switch module within a vehicular communication network in accordance with the present invention.

FIG. 94 is a schematic diagram of the RF transceiver 1554, the wireless unit 1556, the buffer 1560, and the sync serial and/or parallel unit 1562 of a switch module. The sync serial and/or parallel unit 1562 includes ingress logical switches 1598, egress logical switches 1596, ingress delay units, and egress delay units. The wireless unit 1556 includes a wireless buffer 1600, a MAC layer module 1602, and a PHY layer module 1604.

For an outbound packet when the switch module is in a wired only mode, the sync serial and/or parallel unit 1562 configures the logical switches 1596 to provide the packet it received from the switching circuit to the buffer 1560 only. In this mode, the wireless logical switch is open such that the wireless unit 1556 does not receive the wired only packet. The buffer 1560 receives the packet and stores it in one of its queues (may only have one queue) in accordance with the priority of the packet. When the packet reaches the front of the queue, the buffer 1560 routes the packet to the redundancy/backup module.

For an inbound packet when the switch module is in a wired only mode, the buffer 1560 receives an incoming packet from the redundancy/backup module and the wireless unit 1556 is inactive (which may result from being disabled or from not receiving a wireless incoming packet). The sync serial and/or parallel unit 1562 configures the logical switches 1598 such that the wireless logical switch is open and the wired logical switch is closed to the wired only tap. In this configuration, when the packet reaches the front of the queue of the buffer 1560, it is provided to the switching circuit for routing to the appropriate port.

For an outbound packet when the switch module is in a wireless only mode, the sync serial and/or parallel unit 1562 configures the logical switches 1596 to provide the packet to the wireless unit 1556 only. In this mode, the wired logical switch is opened such that the buffer 1560 does not receive the wireless only packet. The wireless buffer 1600 of the wireless unit 1556 receives the packet and stores it in one of its queues (may only have one queue) in accordance with the priority of the packet. When the packet reaches the front of the queue, the MAC module 1602 performs MAC layer functions and the physical layer module 1604 performs PHY functions on the packet in accordance with the one or more wireless communication protocols to produce one or more outbound symbol streams, which are provided to the RF transceiver 1554.

For an inbound packet when the switch module is in a wireless only mode, the wireless unit 1556 is active and the buffer 1560 is inactive (e.g., disable or just not receiving a packet). In this mode, a receiver section of the RF transceiver 1554 converts one or more inbound RF signals into one or more inbound wireless symbol streams, which are provided to the wireless unit 1556. The physical layer module 1604 performs PHY functions and the MAC module 1602 performs MAC layer functions on the one or more outbound symbol streams in accordance one or more wireless communication protocols to produce one or more inbound wireless packets.

The inbound wireless packet(s) are provided to the wireless buffer 1600 for temporary storage in one of its queues (may only have one queue) in accordance with the priority of the packet and a prioritization scheme. When the packet reaches the front of the queue, it is provided to the sync serial and/or parallel unit 1562, which provides the packet to the switching circuit for routing to an appropriate port.

For an outbound packet when the switch module is in a concurrent transmission of the same packet mode, the sync serial and/or parallel unit 1562 configures the logical switches 1596 as shown. In this instance, the center tap of the outbound wireless logical switch is active as is the center tap of the outbound wired logical switch. The center tap of the wired logical switch is coupled to one or more delay modules. For example, one delay module may be used to account for latency differences, processing differences, transmission speed differences, etc. between transmitting a packet wirelessly and transmitting the packet via wired means. Another delay may be used to account for the latency differences, processing differences, reception differences, etc. between receiving a packet wirelessly and receiving a packet via wired means.

The sync serial and/or parallel unit 1562 provides the redundant packets to the buffer 1560 and to the wireless buffer 1600 of the wireless unit 1556 in a synchronized manner such that the wired packet and the wireless packet are transmitted at substantially the same time. The wireless unit 1556 and the buffer 1560 process their respective packets as previously discussed.

For an inbound packet when the switch module is in a concurrent transmit of the same packet mode, the wireless unit 1556 receives a wireless version of the packet and the buffer 1560 receives a wired version of the packet. Each processes the incoming packet as previously discussed and provides them to the sync serial and/or parallel unit 1562.

In this mode, the sync serial and/or parallel unit 1562 configures the logical switches 1598 to receive the wired and wireless version of the incoming packet. The sync serial and/or parallel unit 1562 may provide the wired and wireless versions of the incoming packet to processing module to select which packet will be further processed. Alternatively, the sync serial and/or parallel unit 1562 may include processing to analyze the wired and wireless versions of the packet to determine which packet to provide to the switching circuit. In addition, processing within the serial and/or processing unit 1562 may further perform error correction, etc. Note that the wired version of the packet may traverse one or more delay modules such that the wired and wireless versions of the packet are substantially in sync.

For an outbound packet when the switch module is in a concurrent transmission of different packets mode, the sync serial and/or parallel unit 1562 receives two packets from the switching circuit and provides one of the packets to the wireless logical switch 1596 as shown and the other packet to the wired logical switch as shown. The respective packets are provided to the wireless unit 1556 and buffer 1560 for substantially concurrent transmission.

For an inbound packet when the switch module is in a concurrent transmit of the different packets mode, the wireless unit 1556 receives a wireless packet and the buffer 1560 receives a wired packet. Each processes their respective incoming packet as previously discussed and provides them to the sync serial and/or parallel unit 1562.

In this mode, the sync serial and/or parallel unit 1562 configures the logical switches 1598 to receive the wired and wireless packets. The sync serial and/or parallel unit 1562 provides the wired and wireless packets to the switching circuit, which provides the packets to the appropriate ports. Note that the wired packet may traverse one or more delay modules such as that the wired and wireless packets are substantially in sync.

Figure 95:
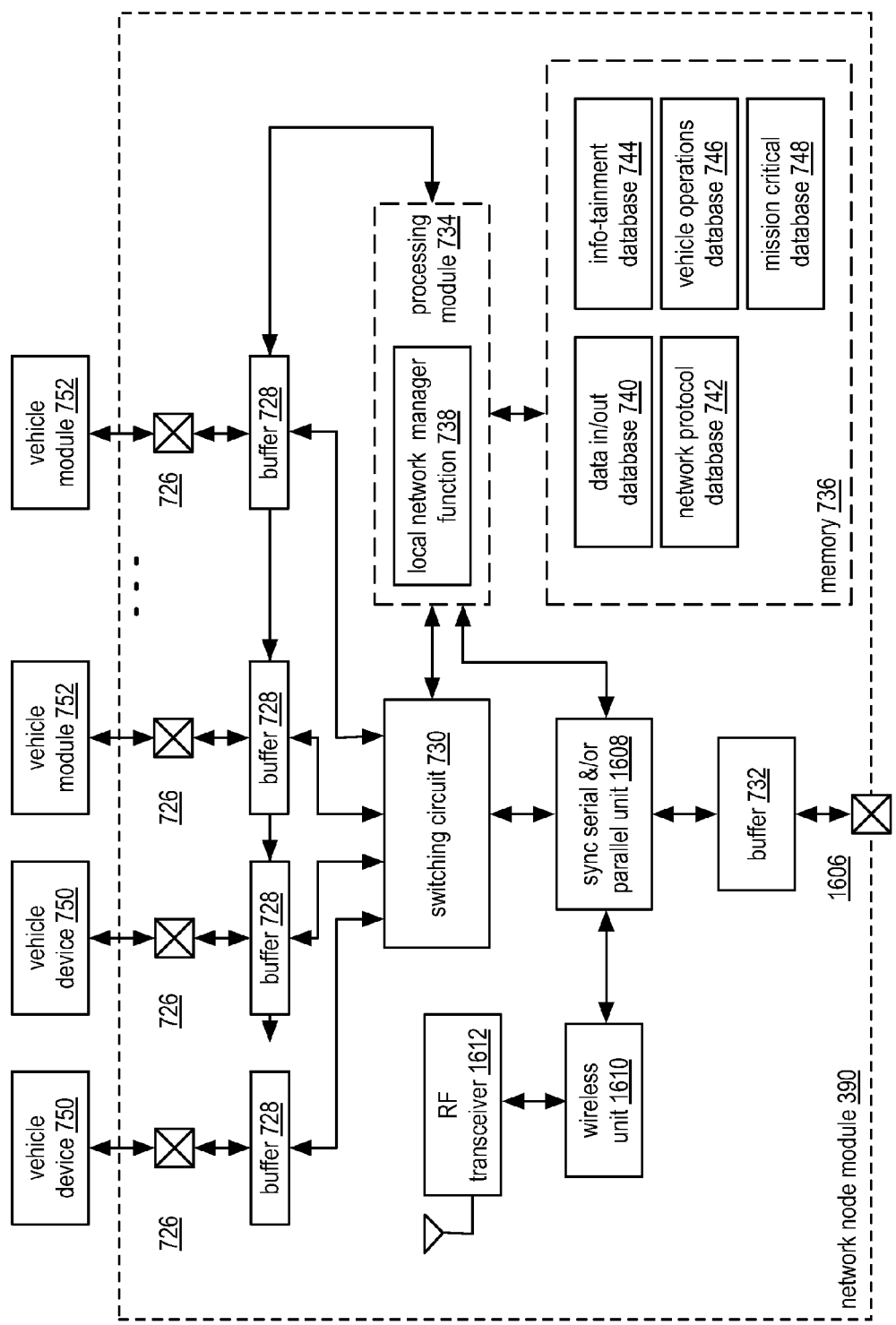
FIG. 95 is a schematic diagram of another embodiment of a network node module within a vehicular communication network in accordance with the present invention.

FIG. 95 is a schematic diagram of another embodiment of a network node module 390 that includes a network port 1606, a network buffer 732, a sync serial and/or parallel unit (i.e., a wired-wireless module) 1608, a wireless communication module (which includes a wireless unit 1610 and an RF transceiver 1612), a switching circuit 730, a processing module 734, a plurality of device buffers 728, and a plurality of ports 726 that is each coupled to a vehicle device 750 or a vehicle module 752. The processing module 734 is configured to perform a local network management function 738. The memory 736 stores one or more databases including a data input/output database 740, network protocol database 742, an information-entertainment database 744, a vehicle operations database 746, and a mission-critical database 748.

The network node module 390 operates in one of four modes: wired only, wireless only, concurrent transmission of the same packet, and concurrent transmission of different packets. When the network node module 390 is in a wired only mode, the RF transceiver 1612 and wireless units 1610 are inactive. In this mode, the network node module 390 functions as previously described with reference to one or more of FIGS. 41-57.

When the network node module 390 is in a wireless only mode, the RF transceiver 1612 and a wireless unit 1610 are active and of the network port 1606 and buffer 732 are inactive. In a first version of the wireless only mode, the ports 726 and buffers 728 are active to transceive packets with the corresponding vehicle devices 750 and/or vehicle modules 752. In a second version of the wireless only mode, the ports 726 and buffers 728 are inactive such that the network node module 390 communicates with the vehicle devices 750 and/or vehicle modules 752 via the RF transceiver 1612.

When the network node module 390 is in the concurrent transmission of the same packet mode or is in the concurrent transmission of different packets mode, the RF transceiver 1612, the wireless unit 1610, the network port 1606, and the buffer 732 are active. In these modes, the sync serial and/or parallel unit 1608 synchronizes transmission and reception of concurrent packets and coordinates the concurrent transmission of the same packet and concurrent transmission of different packets.

In the various modes of the network node module 390, the sync serial and/or parallel module 1608, the buffer 732, the wireless unit 1610, the RF transceiver 1612, the switching circuit 730, the processing module 734, the port buffers 728, and the ports 726 function similarly to like-named components of the switch module and/or bridge-routing module.

Figure 96:
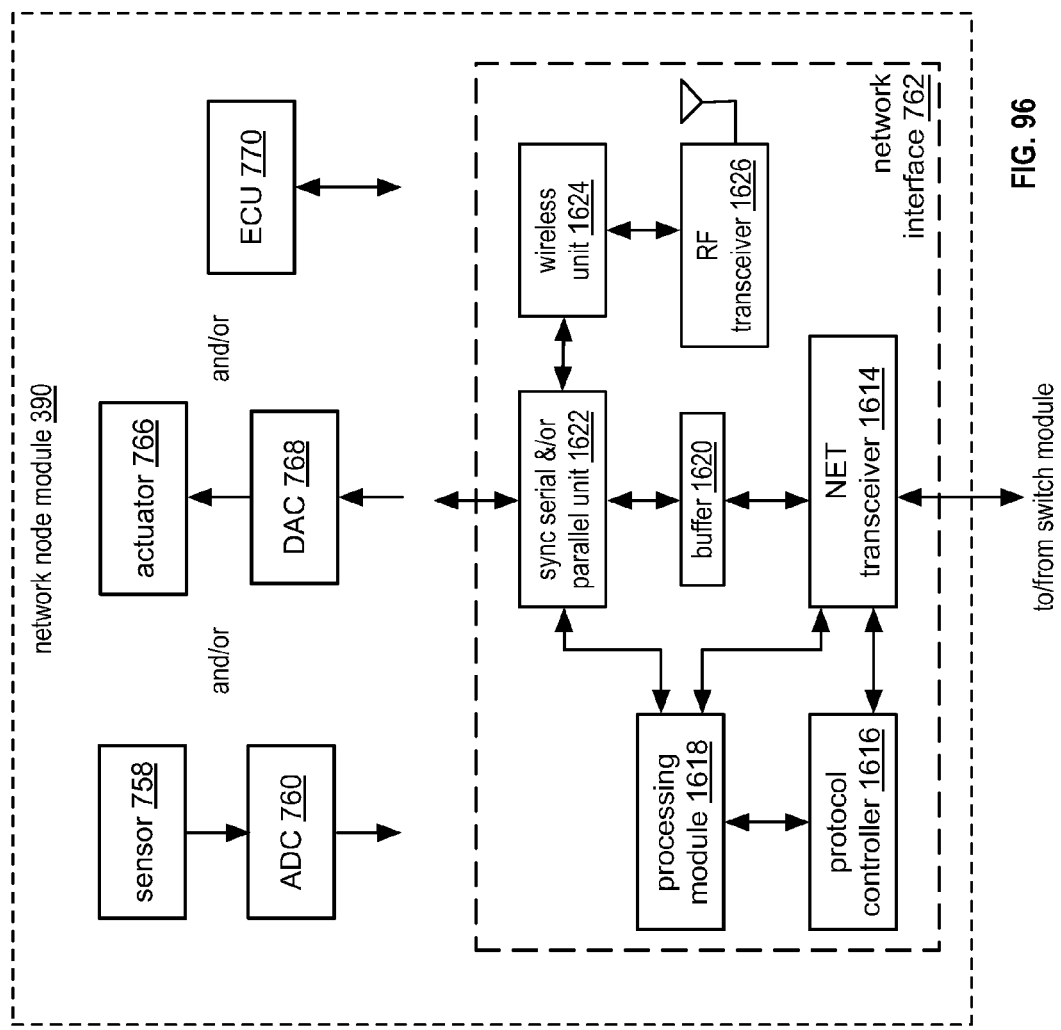
FIG. 96 is a schematic diagram of another embodiment of a network node module within a vehicular communication network in accordance with the present invention.

FIG. 96 is a schematic diagram of another embodiment of a network node module 390 that includes a network interface 762 and may further include one or more of: a sensor 758 & an ADC 760; an actuator 766 & a DAC 768; and an electronic control unit (ECU) 770. The network interface 762 includes a network transceiver 1614, protocol controller 1616, processing module 1618, buffer 1620, sync serial and/or parallel unit 1622, wireless unit 1624, and an RF transceiver 1626.

The network interface 762 of the network node module 390 operates in one of four modes: wired only, wireless only, concurrent transmission of the same packet, and concurrent transmission of different packets. When the network interface 762 is in a wired only mode, the RF transceiver 1626 and wireless units 1624 are inactive. In this mode, the network interface 762 functions as previously described with reference to one or more of FIGS. 43-45 and 67.

When the network interface 762 is in a wireless only mode, the RF transceiver 1626 and a wireless unit 1624 are active and the network transceiver 1614 and buffer 1620 are inactive. In this mode, the sync serial and/or parallel unit 1622 provides packets between the wireless unit 1624 and the one or more devices.

When the network interface 762 is in the concurrent transmission of the same packet mode or is in the concurrent transmission of different packets mode, the RF transceiver 1626, the wireless unit 1624, the network transceiver 1614, and the buffer 1620 are active. In these modes, the sync serial and/or parallel unit 1622 synchronizes transmission and reception of concurrent packets and coordinates the concurrent transmission of the same packet and concurrent transmission of different packets.

In the various modes of the network interface 762, the sync serial and/or parallel module 1622, the buffer 1620, the wireless unit 1624, the RF transceiver 1626, the switching circuit, and the processing module 1618 function similarly to like-named components of the switch module and/or bridge-routing module.

Figure 97:
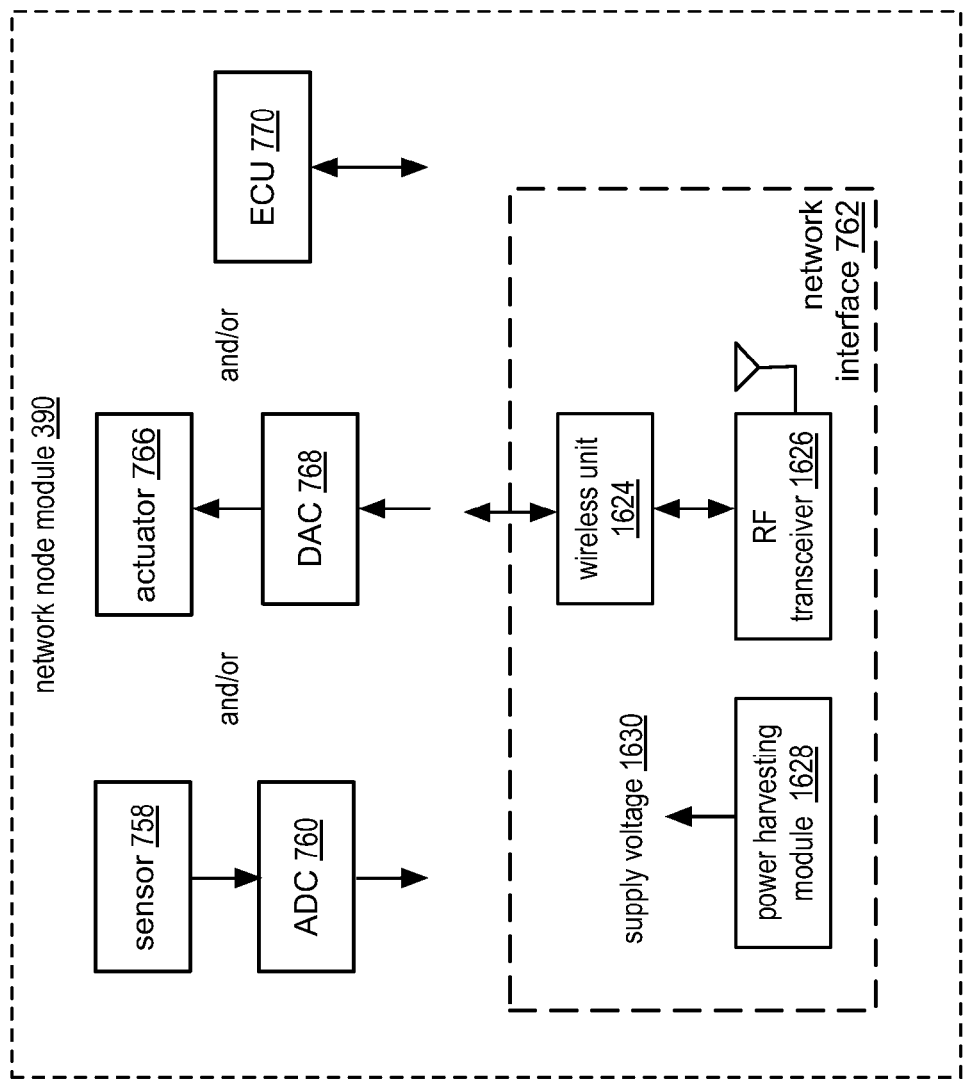
FIG. 97 is a schematic diagram of another embodiment of a network node module within a vehicular communication network in accordance with the present invention.

FIG. 97 is a schematic diagram of another embodiment of a network node module 390 that includes a network interface 762 and may further include one or more of: a sensor 758 & an ADC 760; an actuator 766 & a DAC 768; and an electronic control unit (ECU) 770. The network interface 762 includes a power harvesting module 1628, a wireless unit 1624, and an RF transceiver 1626.

The power harvesting module 1628 may include a power source (e.g., battery, solar panel, etc.) and circuitry to harvest power from light, heat, radio frequency signals, motion, etc. The circuitry of the power harvesting module 1628 generates one or more supply voltages 1630 that powers the other components of the network node module 390 and may be used to recharge the power source. With such a power harvesting module 1628, the network node module 390 does not require an external power source. As such, the network node module 390 may be placed within the vehicle where it is difficult, impractical, or impossible to route wires. For example, the network node module 390 they be placed on a blade of a fan, on gears of the transmission, etc.

The wireless unit 1624 and the RF transceiver 1626 function as previously described to transmit outbound packets and to receive inbound packets. Note that if the network node module 390 only includes a sensor 758, the RF transceiver 1626 may be replaced with an RF receiver. Further note that if a network node module 390 only includes an actuator 766, the RF transceiver 1626 may be replaced with an RF transmitter.

Figure 98:
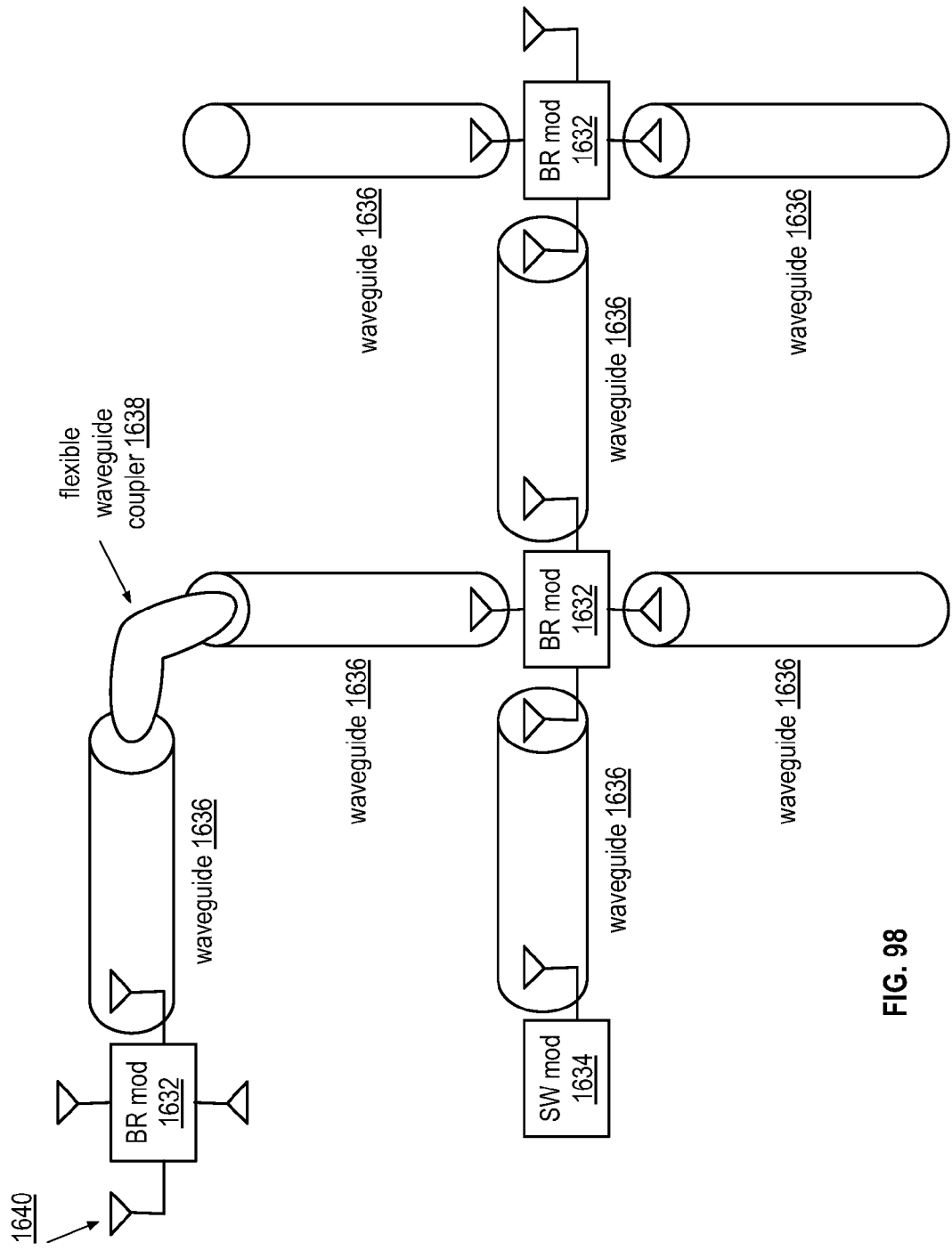
FIG. 98 is a schematic diagram of an embodiment of a wireless waveguide network fabric of a vehicular communication network in accordance with the present invention.

FIG. 98 is a schematic diagram of an embodiment of a wireless network fabric of a vehicular communication network that includes a plurality of bridge-routing modules 1632, a plurality of switch modules 1634, a plurality of waveguides 1636, and may further include one or more flexible waveguide couplers 1638. Each of the switch modules 1634 and bridge-routing modules 1632 includes one or more antennas 1640. Each of the antennas 1640 may be physically located proximal to a waveguide 1636.

A waveguide 1636 may be composed of a conductive metal (e.g., copper, aluminum, gold, etc.) and have a geometric shape (e.g., circular tube, square tube, rectangular tube, oval tube, etc.). Alternatively, a waveguide 1636 may be composed of a non-conductive material (e.g., plastic, etc.) having an internal metal coating. Note that the waveguide 1636 is shown to be substantially linear, but may include a slight bend (e.g., up to 45°) to accommodate physical constraints of the vehicle. Further note that the waveguide 1636 may include multiple waveguide sections coupled together.

The flexible waveguide coupler 1638 may be a flexible microstrip fabricated on a flexible substrate (e.g., Kapton substrate). Alternatively, or in addition, the flexible microstrip includes a coplanar waveguide fabricated on a flexible substrate.

In an example of operation, the RF transceivers within the various modules utilize carrier frequencies in the 60 GHz frequency band. Accordingly, the waveguides 1636 are tuned up for 60 GHz operation. The waveguides 1636 may be positioned throughout the vehicle to support wireless communications between the various modules of the vehicle communication network. For example, a waveguide 1636 may run the length of the floor of the vehicle (and may include repeaters to boost signal strength), may be in a door, may be in the roof, may be in a fender, may be in the hood, may be in the trunk, etc.

Figure 99:
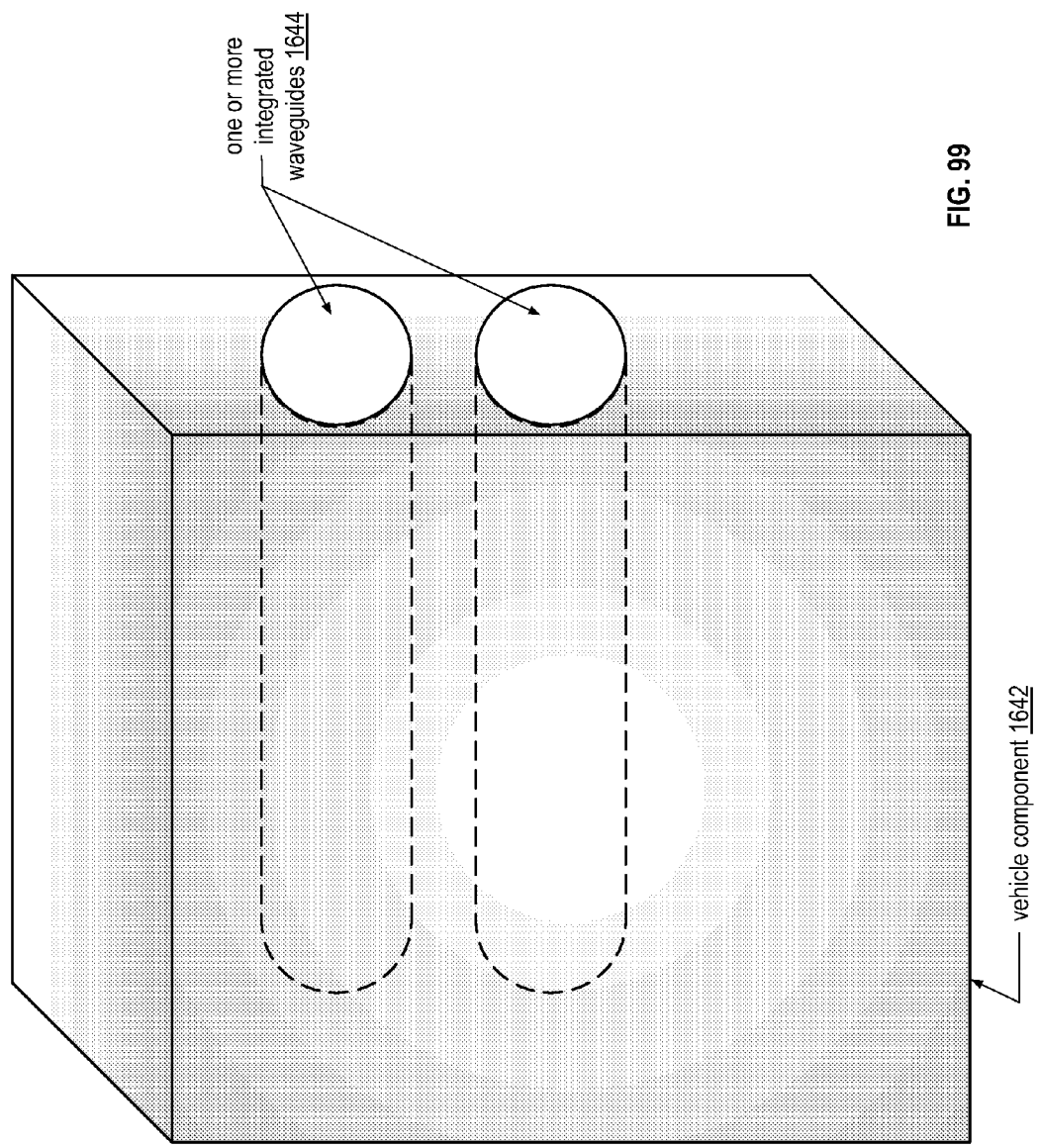
FIG. 99 is a schematic diagram of an embodiment of a vehicle component having an integrated waveguide of a wireless network fabric of a vehicular communication network in accordance with the present invention.

FIG. 99 is a schematic diagram of an embodiment of a vehicle component 1642 having one or more integrated waveguides 1644. For example, the vehicle components 1642 may be a door, a hood, a roof, a fender, a bumper, a floorboard, a dashboard, etc. The one or more integrated waveguides 1644 has a particular geometry based on the frequency band of operation as discussed with reference to FIG. 99.

Figure 100:
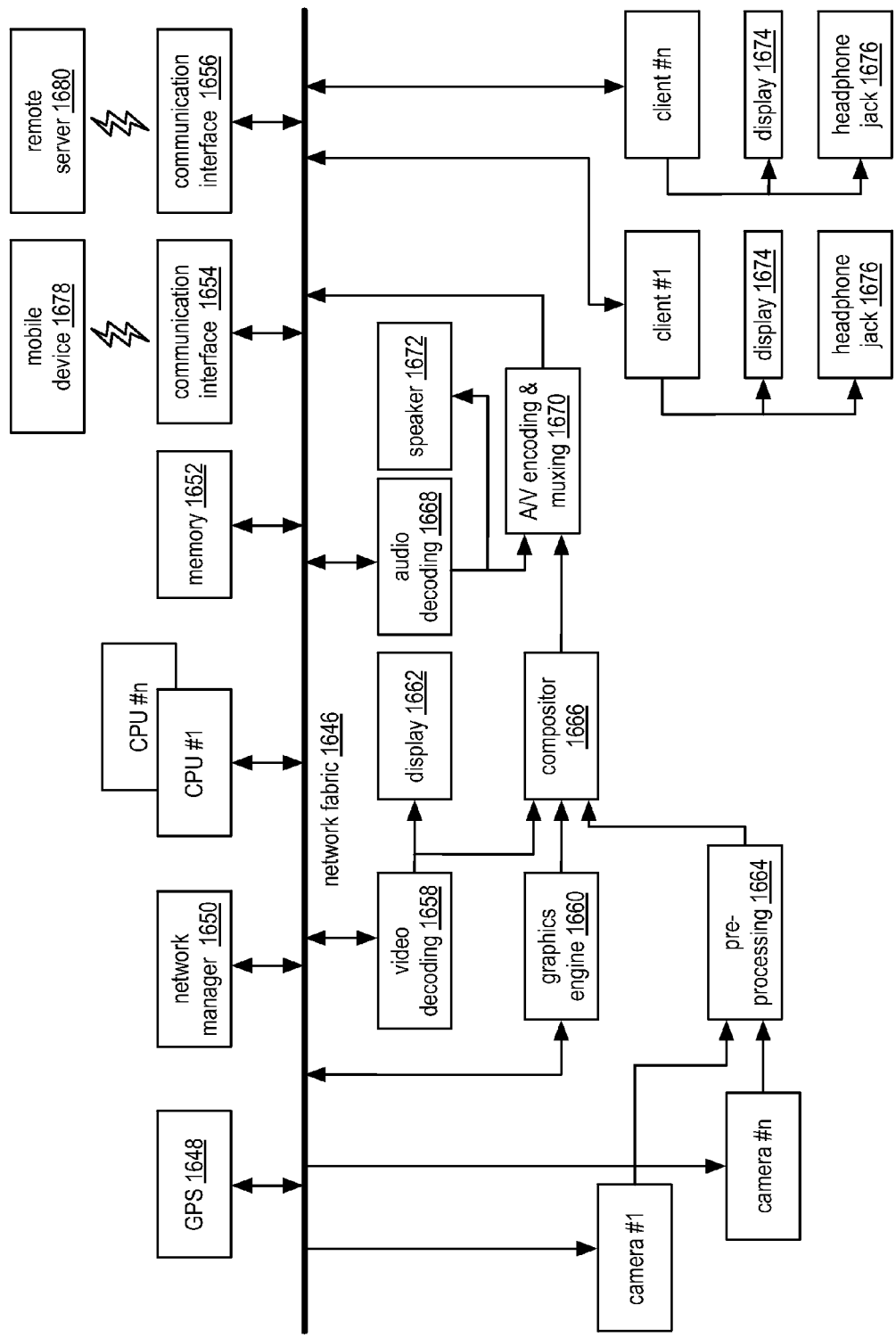
FIG. 100 is a schematic diagram of an embodiment of infotainment modules coupled to a network fabric of a vehicular communication network in accordance with the present invention.

FIG. 100 is a schematic diagram of an embodiment of a multimedia processing system within a vehicle. The multimedia processing system includes, in part, the network fabric (vehicular communication network) 1646, a GPS processing unit 1648, the network manager 1650, one or more processing modules (e.g., processing modules 44 from FIG. 3, processing modules 274 from FIGS. 10 and 11 and/or multimedia processing modules 134 from FIGS. 6, 10 and 11), a first communication interface 1654 that provides a wireless (or wireline) connection to a mobile device 1678, memory device 1652, a second communication interface 1656 that provides a wireless (or wireline) connection to a remote server 1680, a video decoder 1658, a graphics engine 1660, one or more displays 1662, one or more cameras (camera #1 . . . camera #n), a pre-processing module 1664, a compositor 1666, an audio decoder 1668, an audio-video encoder and multiplexer 1670, one or more audio devices (e.g., speakers) 1672, and one or more rear seat entertainment units that each include a respective client processing unit (client #1 . . . client #n), a respective rear seat display 1674, and a respective headphone jack 1676. The video decoding module 1658, the graphics engine 1660, the preprocessing module 1664, the compositor 1666, the audio decoding module 1668, and the audio/video encoding module 1670 constitute a head end unit within the vehicle.

At any given time within a vehicle, one or more displays 1662 and 1674 may be displaying video data produced from one or more video sources. Examples of video sources include, but are not limited to, the GPS processing unit 1684, the memory device 1652, a remote device (e.g., mobile device 1678 or remote server 1680), one or more cameras and one or more rear seat entertainment units. For example, one or more displays 1662 and 1674 may be displaying video produced by the GPS processing unit 1648, video captured by one or more of the cameras, playback of an audio/video file, playback of a videogame, etc. Because of this diverse and almost constant display of video, the vehicle communication system allocates a certain amount of bandwidth to support displaying video.

For example, if the network fabric 1646 is constructed in a manner as discussed with reference to FIGS. 13-57 (e.g., wired connections only), the processing of packets ensures that a video display is not starved for video data (e.g., does not have to repeat a frame) unless the vehicle is in a critical safety state. As another example, if the network fabric 1646 is constructed in a manner as discussed with reference to FIGS. 87-99, a combination of wired and wireless connections may be used to provide video data to one or more of the video displays 1662 and 1674. As a specific example, the head end unit may communicate video data for playback using a wired connection to the display 1662 and a wireless connection to the rear seat entertainment units. As another specific example, the head end unit may retrieve video data for processing using a wired connection from the cameras, memory 1652, rear seat entertainment units, and/or GPS processing unit 1648 and a wireless connection from the mobile device 1678 and remote server 1680. It should be noted that a wireless connection could also be used to enable the head end unit to retrieve video data for processing from the cameras and rear seat entertainment units. In addition, it should be noted that a wireline connection could also be used to enable the head end unit to retrieve video data for processing from the mobile device 1678 and remote server 1680. Furthermore, it should be noted that the head end unit could communicate video data for playback to the rear seat entertainment units using a wireline connection and to the display 1662 using a wireless connection.

In an example of operation, when or more of the cameras provides a video stream to the pre-processing module 1664, the pre-processing module 1664 may perform one or more of the following video functions: video signal format conversion between standard definition, high-definition Blu-Ray, component video, composite video, interlaced video, progressive video, and/or the number of lines (e.g., 1080i, or 1080p, etc.); digital video processing that includes rounding considerations (e.g., truncation, conventional rounding, error feedback rounding, dynamic rounding), standard definition and high-definition transformations, display enhancements (e.g., hue, contrast, brightness, saturation, color transient improvement, sharpness), video mixing, graphic overlay processing, luma and chroma keying, video scaling (e.g., pixel dropping and/or duplication, linear interpolation, anti-aliasing resampling), scan rate conversion (e.g., frame or field dropping and/or duplication, temporal interpolation, motion compression), non-interlaced to interlaced conversion (e.g., scan line decimation, vertical filtering), interlaced to non-interlaced conversion (e.g., intra-field processing, inter-field processing, frequency response consideration), video compression (e.g., DCT, quantization, zig zag scanning, run length coding, variable length coding, etc.); NTSC, PAL, and/or SECAM processing; H.261 processing; H.263 processing; H.264 processing; MPEG encoding, decoding, compression, and decompression.

The pre-processing module 1664 provides the pre-processed video stream of one or more cameras to the compositor 1666. The compositor 1666 combines the preprocessed video stream(s) with video graphics provided by the graphics engine 1660 or GPS navigation video and/or other video provided by the video decoder 1658 under the control of a multimedia function being performed by one or more of the processing modules. For example, the graphics engine 1660 may generate a video graphics overlay that is multiplexed with the pre-processed video stream of one or more of the cameras. The compositor 1666 provides its output to the audio/video (A/V) encoder 1670.

The A/V encoder 1670 may perform one or more of the above mentioned video functions to render an encoded video file of the video stream of one or more of the cameras (with or without a graphic overlay and/or with or without mixing with video from the video decoding module 1658). The video file may be stored in memory 1652, sent to one or more of the rear seat entertainment units for playback on the corresponding display 1674 and headphone jacks 1676, and/or provided to the video decoder 1658 and audio decoder 1668 for playback on the vehicle display 1662 and speakers 1672.

In another example of operation, the GPS processing module 1648 provides navigation video data to the video decoder 1658. The video decoder 1658 performs one or more of the above mentioned video functions to produce a decoded version of the GPS navigation video data. The video decoder 1658 provides the decoded GPS navigation video data to the display 1662 for presentation to occupants of the vehicle and may further provide the decoded GPS navigation video data to the compositor 1666 for combining with a video graphics overlay from the graphics engine 1660 and/or pre-processing video from the pre-processing module 1664 to produce an enhanced GPS video stream. Note that the enhanced GPS video stream may be processed by the A/V encoder 1670 to produce a corresponding video file that may be stored in memory 1652, decoded via the video decoder 1658 for presentation on the display 1662 and/or provided to one or more of the client modules of the rear entertainment units.

In yet another example of operation, the video decoder 1658 and audio decoder 1668 may retrieve an audio-video file from memory 1652 and/or from the mobile device 1678, remote server 1680 or one of the rear seat entertainment units. The video decoder 1658 performs one or more of the above mentioned video functions to decode the video portion of the audio-video file and the audio decoder 1668 performs one or more of format conversion, decompression, etc. to decode the audio portion of the audio-video file. In one embodiment, the video decoder 1658 may further provide the decoded video portion to the compositor 1666 for combining with a video graphics overlay from the graphics engine 1660 and/or pre-processing video from the pre-processing module 1664 to produce an enhanced video stream. The A/V encoder and multiplexer 1670 receives the enhanced video stream and decoded audio portion and produces an encoded A/V stream therefrom that can be stored in memory 1652, decoded via the video decoder 1658 and audio decoder 1658 for presentation on the display 1662 and speakers 1672 and/or provided to one or more of the client modules of the rear entertainment units. In another embodiment, the video decoder 1658 provides the decoded video portion of the audio-video file directly to the display 1662 without enhancement for playback thereon, and the audio decoder 1668 provides the decoded audio portion of the audio-video file to the speakers 1672 for playback thereon.

In a further example of operation, the client processing unit of a rear seat entertainment (RSE) unit may retrieve an audio-video file from memory 1652, from an internal or externally-coupled memory and/or from the mobile device 1678 or remote server 1680. The client processing unit may include its own video decoding module and audio decoding module, where the video decoding module performs one or more of the above mentioned video functions to decode the video portion of the audio-video file and the audio decoding module performs one or more of format conversion, decompression, etc. to decode the audio portion of the audio-video file. The RSE display 1674 presents the decoded video portion of the audio-video file and the headphone jack 1676 presents the decoded audio portion of the audio-video file.

Figure 101:
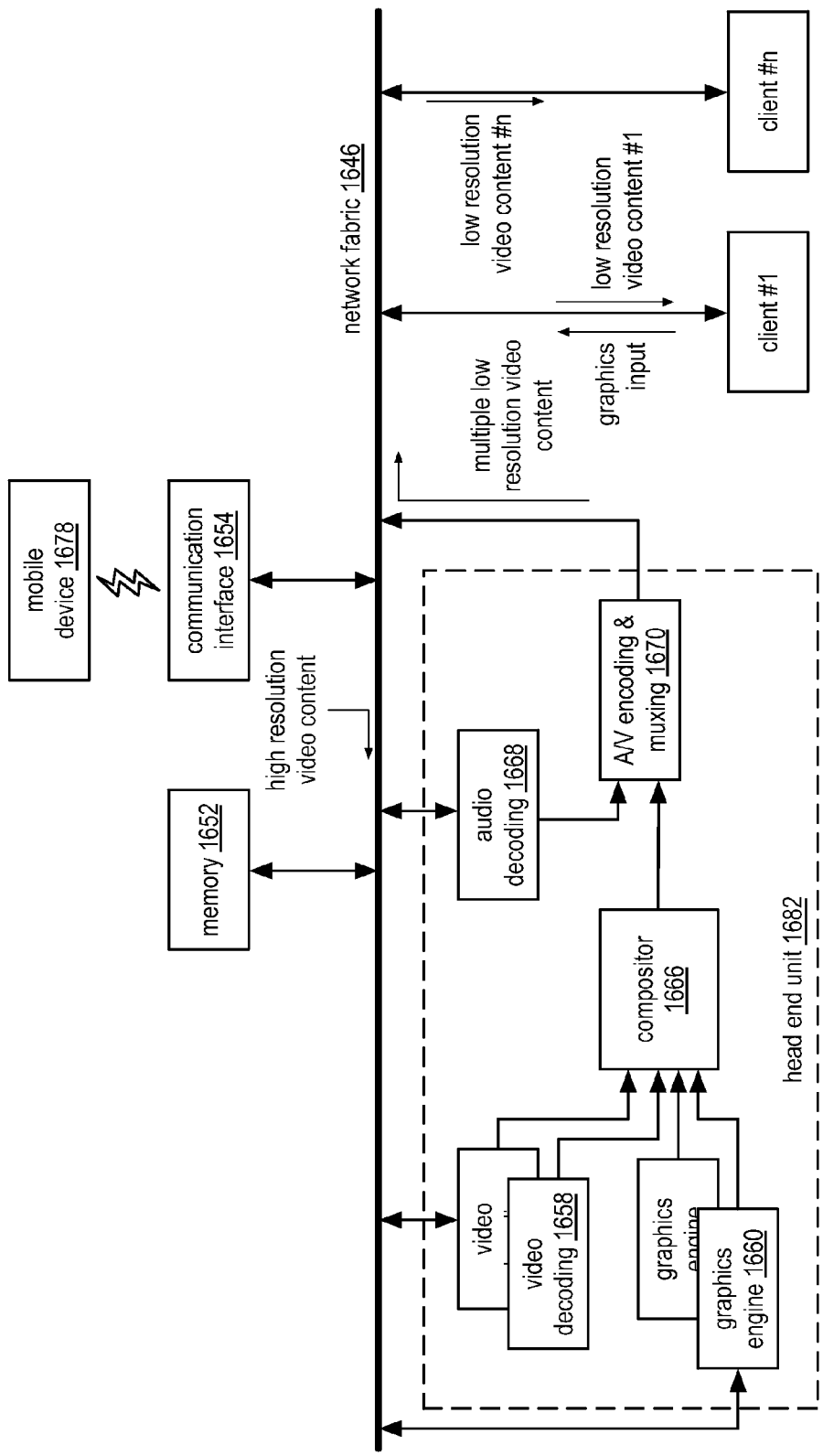
FIG. 101 is a schematic diagram of another embodiment of an infotainment modules coupled to a network fabric of a vehicular communication network in accordance with the present invention.

FIG. 101 is a schematic diagram of another embodiment of a multimedia processing system within a vehicle. The multimedia processing system includes, in part, the network fabric (vehicular communication network) 1646, the head end unit 1682, the network manager (shown in FIG. 100), one or more central processing units and/or processing modules (described in more detail in FIG. 100), a first communication interface 1654 for providing a wireless (or wireline) connection to mobile device 1678, memory 1652, and one or more client processing units (client #1 . . . client #n) of rear seat entertainment units. The head end unit 1682 includes one or more video decoders 1658, one or more graphics engines

1660, the compositor 1666, the audio decoder 1668, and the audio/video encoder and multiplexer 1670.

In this embodiment, the client processing units have lower processing capabilities, video decoding capabilities, video graphics processing capabilities, and/or audio decoding capabilities than those of the head end unit 1682. As such, when a client processing unit desires to play back a high-resolution audio-video file (e.g., a 3D video or HD video), it is first processed by the head end unit 1682 to produce a lower resolution audio-video file (e.g., standard definition) for the particular client. If multiple clients are requesting playback of the same high-resolution audio-video file, the head end unit 1682 generates a lower resolution audio-video file for each of the requesting clients.

In an example of operation, a client processing unit (e.g., client #1) includes a graphics engine, a video decoder, and an audio decoder. In response to a request for playback of a high-resolution audio-video file, the graphics engine of client #1 generates a graphics input that is transmitted via the network fabric 1646 to a processing module and/or central processing unit (CPU) performing a multimedia function. The processing module interprets the graphics input as a request for playback of the high-resolution audio-video file and retrieves the file from memory 1652 and/or from the mobile device 1678 (or other remote device) via the communication interface 1654.

The processing module then controls the head end unit 1682 to convert the high-resolution audio-video file into a lower resolution audio-video file. In particular, the video decoding module 1658 decodes the high-resolution audio-video file and provides it to the audio/video encoding module 1670 via the compositor 1666. The audio-video encoding module 1670 performs one or more of the video functions (e.g., video scaling, video compression, format conversion, etc.) discussed with reference to FIG. 100 to produce the lower resolution audio-video file. In addition to providing the lower resolution audio-video file to the requesting client, the lower resolution audio-video file may be stored in memory 1652 for subsequent playback by a client without head end unit intervention. Note that the processing module coordinates with the network manager to manage data flow between the head end unit 1682 and the clients utilizing techniques discussed with reference to FIGS. 28-32 and 35.

In another example of operation, one or more of the graphics engines 1660 of the head end unit 1682 may process 3-D video graphics that are subsequently encoded by the audio/video encoding module 1670 to render a 2-D video file of the 3-D video graphics. The audio-video encoding module 1670 may provide the 2-D video file to memory 1652 for storage and/or to one or more of the client processing modules for display on an RSE display. In this manner, an RSE that does not include sufficient graphic engine resources to process high-resolution 3-D video graphics may nonetheless display high-resolution 3-D video graphics.

Figure 102:
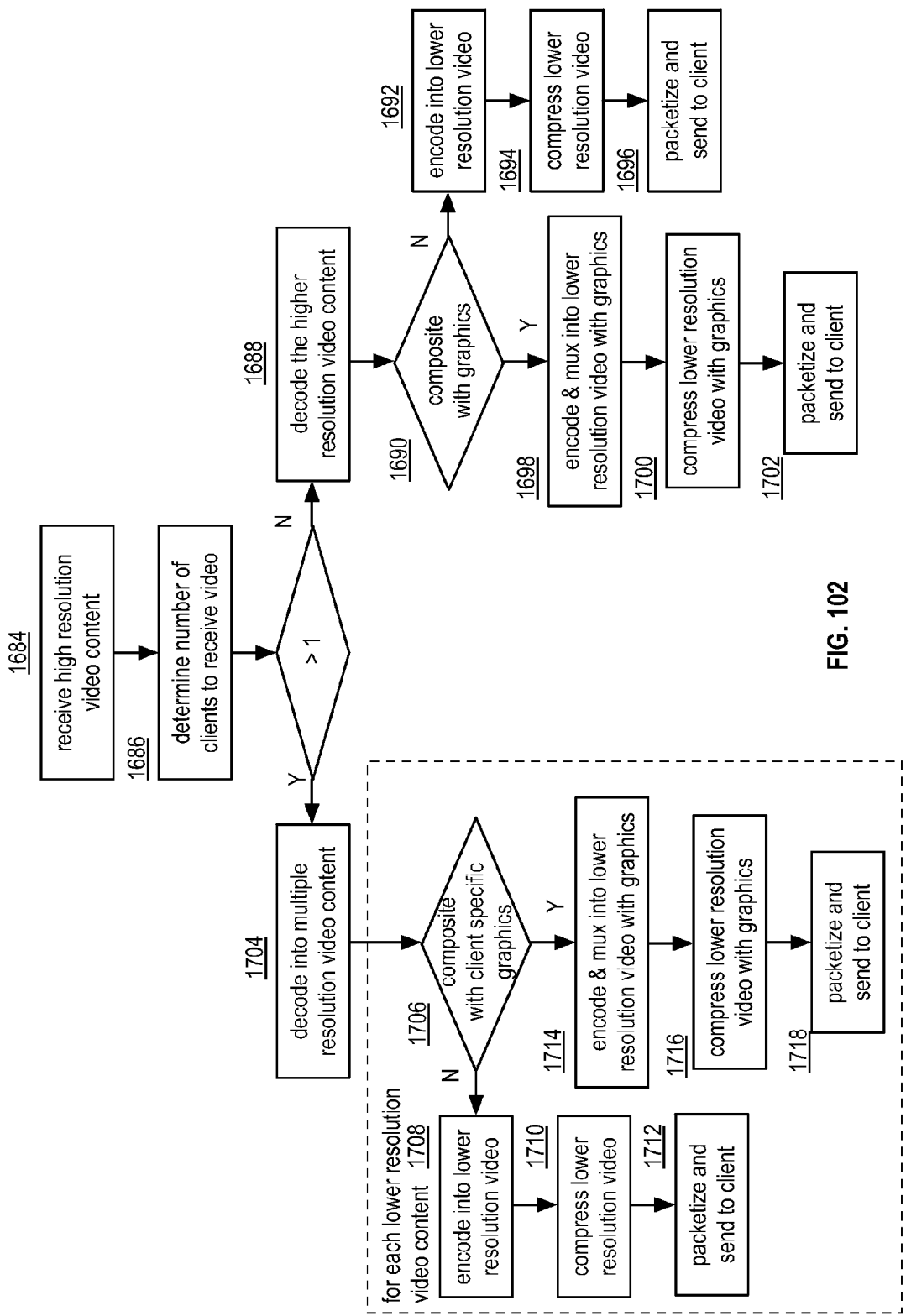
FIG. 102 is a logic diagram of an embodiment of a method for processing high resolution video content of a vehicular communication network in accordance with the present invention.

FIG. 102 is a logic diagram of an embodiment of a method for processing high-resolution video content within a vehicular communication network. The method begins after receiving a request for playback of high-resolution video content (e.g., 3D audio-video file, HD video file, Blu-Ray video file, etc.) from one or more clients 1684. Upon receiving the request, the high-resolution video content is received (e.g., retrieved from memory, received from a communication interface, etc.).

The method continues by determining the number of clients requesting playback of the high resolution video content 1686. If there is only one client requesting playback of the high-resolution video content the method continues by decoding the high-resolution video content to produce decoded video content 1688. The method continues by determining whether the decoded video content will be combined with video graphics 1690.

If not, the method continues by encoding 1692 and compressing the decoded video content to produce a lower resolution video file 1694. The particular encoding and compression (and other processing) may be based on audio/video processing capabilities of the client, display size, display resolution, available bandwidth of the network fabric, etc. For example, the conversion of the high-resolution video content to a lower resolution video content may include converting a HD file to an SD file, scaling the SD file, and compressing the scaled SD file. The method continues by packetizing and segmenting the video file and sending the packets via the network fabric to the client 1696.

If the decoded video content is to be combined with graphics, the method continues by combining the decoded video content with the video graphics and then encoding 1698 and compressing the combined video data to produce a lower resolution video file with graphics 1700. The method continues by packetizing and segmenting the lower resolution video file with graphics and sending the packets via the network fabric to the client 1702.

If more than one client has requested playback of the high-resolution video content, the method continues by decoding the high-resolution video content to produce one or more decoded video content streams 1704. For each client, the method continues by determining whether or the decoded video content will be combined with video graphics 1706. If not, the method continues by encoding 1708 and compressing the decoded video content to produce a lower resolution video file 1710. The method continues by packetizing and segmenting the video file and sending the packets via the network fabric to the client 1712.

If the decoded video content is to be mixed with graphics, the method continues by combining the decoded video content with the video graphics and then encoding 1714 and compressing the combined video data to produce a lower resolution video file with graphics 1716. The method continues by packetizing and segmenting the lower resolution video file with graphics and sending the packets via the network fabric to the client 1718.

Figure 103:
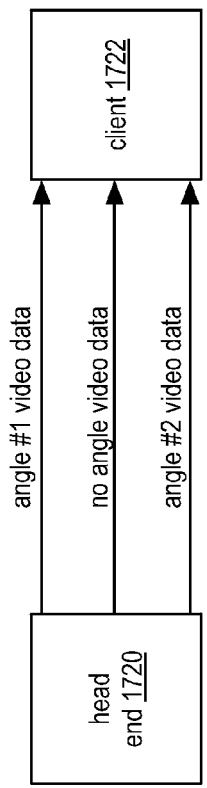
FIGS. 103-105 are example diagrams of an embodiment of processing 3D video within a vehicular communication network in accordance with the present invention.
Figure 104:
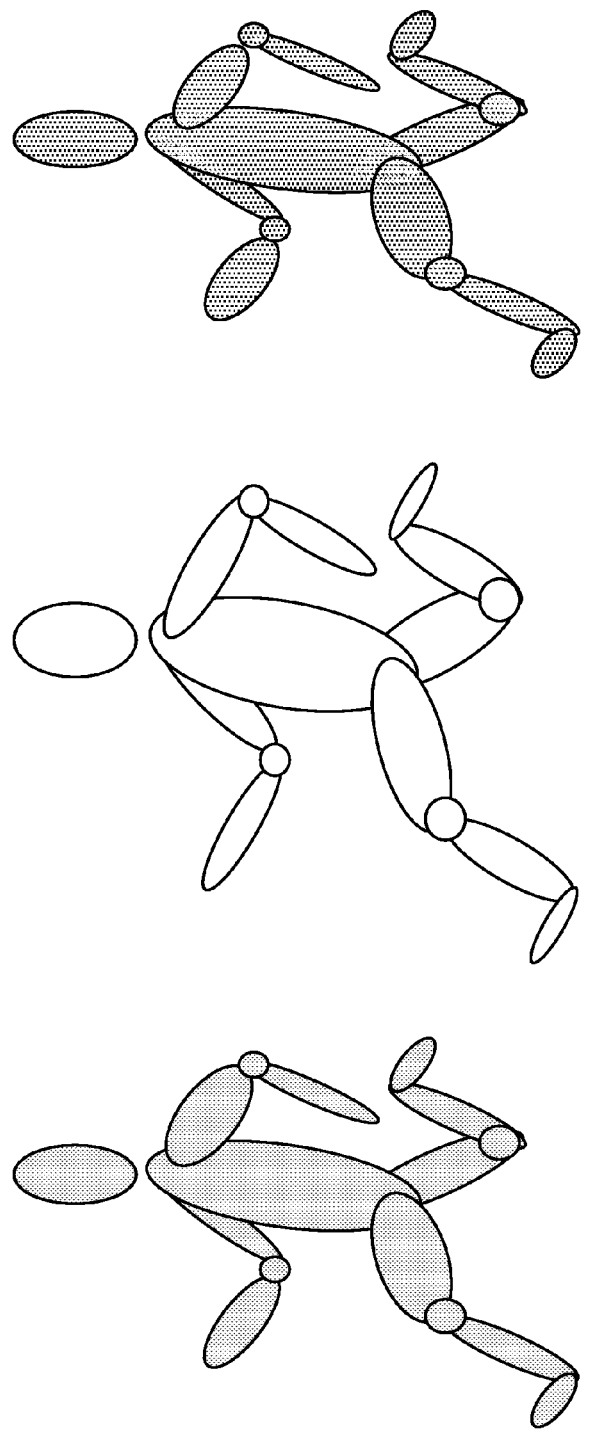
Figure 105:
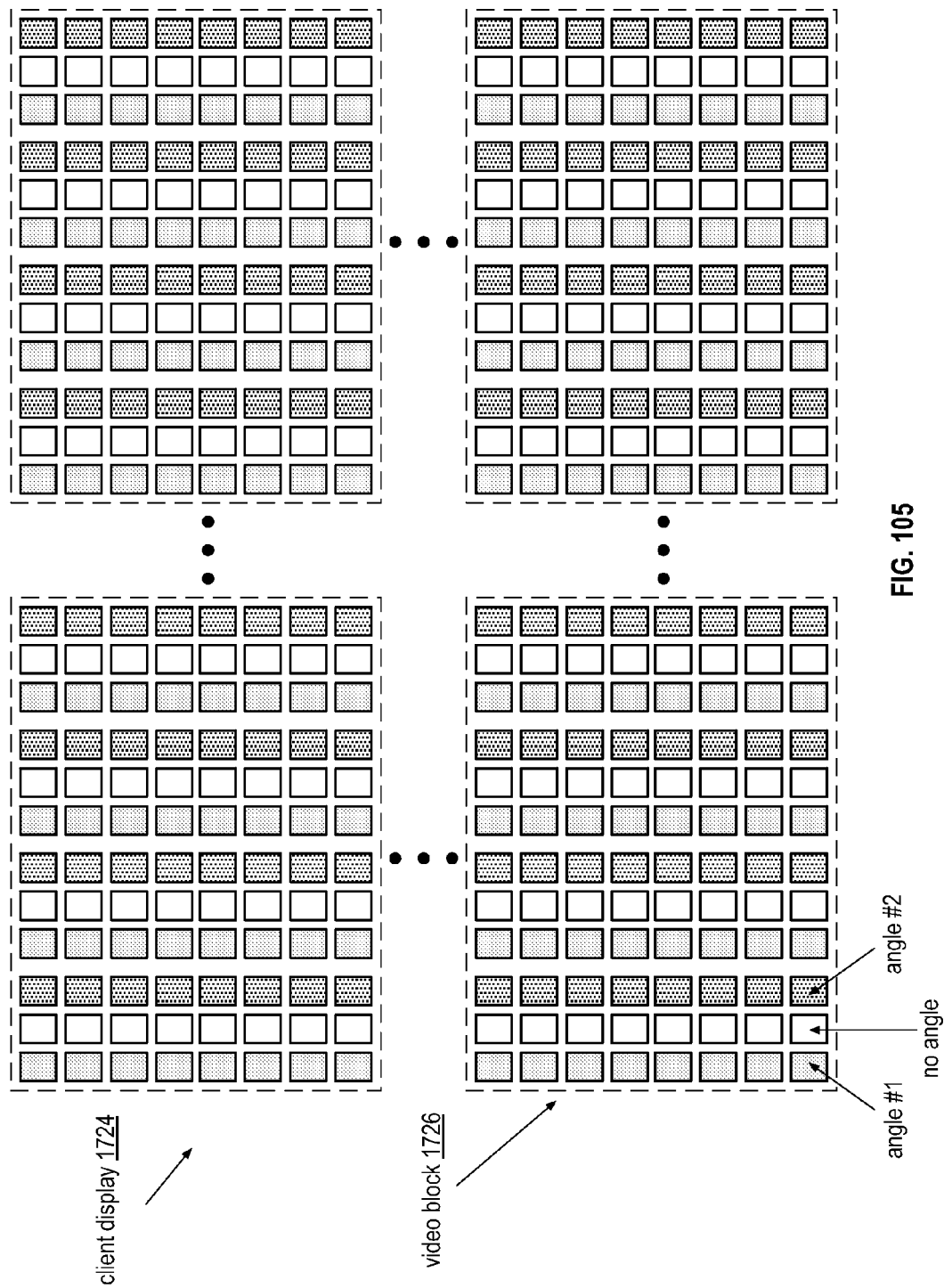

FIGS. 103-105 are example diagrams of an embodiment of processing 3D video within a vehicular communication network. FIG. 103 illustrates the head end unit 1720 generating three video streams of a 3-D video file. The first stream corresponds to angle one of the three-dimensional video file; the second video stream corresponds to no angle of the three-dimensional video file; and the third video stream corresponds to a second angle of the three-dimensional video file. The head end unit 1720 provides the three video streams sequentially to the client to reduce processing burdens on the client 1722.

FIG. 104 illustrates an example of the various angles for a given frame of the three-dimensional video file. In this example, a person is running where the no angle video data is shown in the middle, the first angle video data is shown on the left, and the second angle video data is shown on the right. When the three angles of video data are presented on a screen, glasses-less 3-D imaging is obtained.

FIG. 105 illustrates an example of a frame of 3D video data presented on a client's screen. The screen includes a plurality of pixels, where a box represents one or more pixels, and the pixels may be arranged in video blocks 1726 of 4×4 pixels, 8×8 pixels, 16×16 pixels etc. As shown, angle one video data is provided in a first column, no angle video data is provided in a second column, and second to video data is provided in a third column. The pattern repeats across the screen of the client display 1724.

Figure 106:
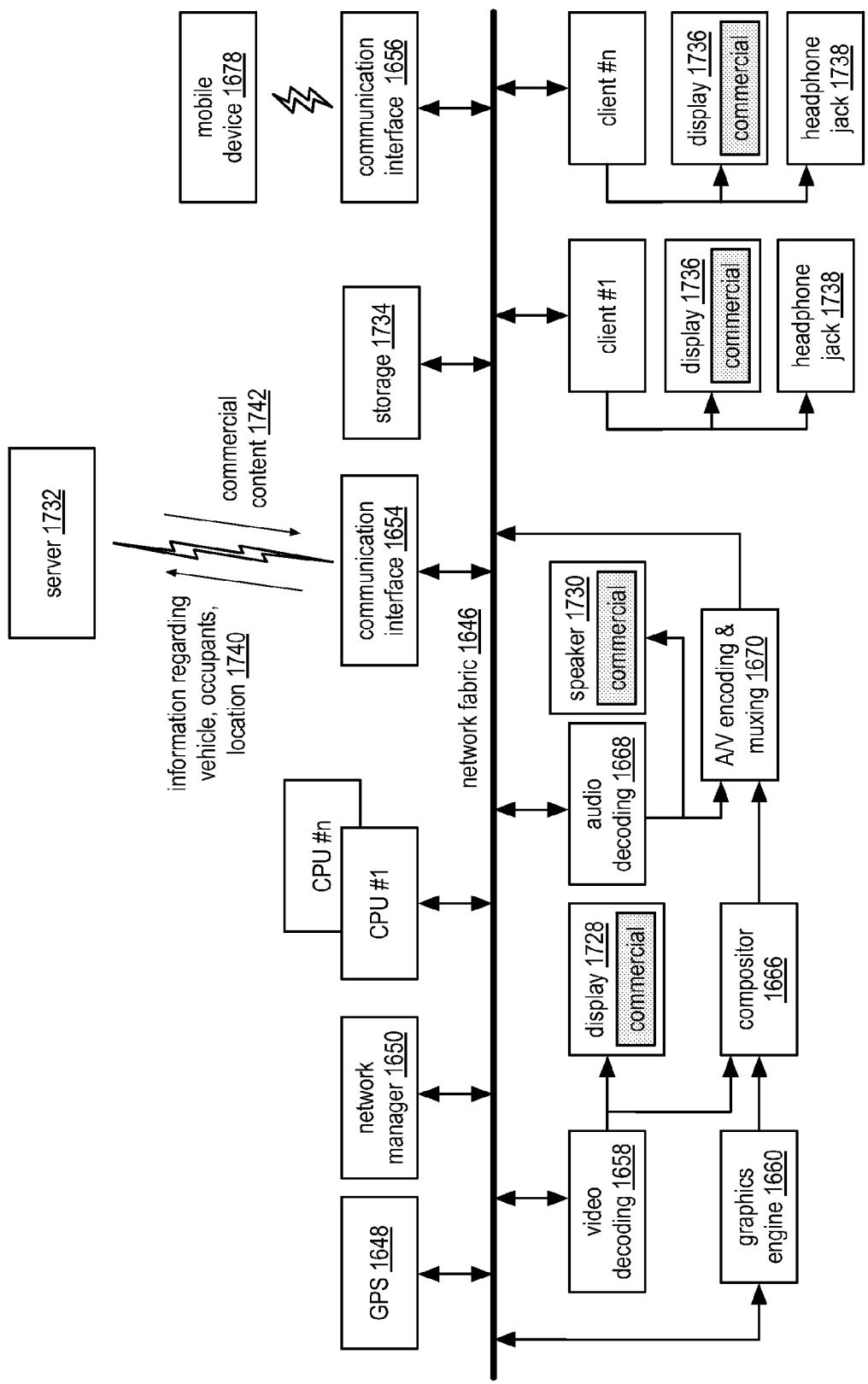
FIG. 106 is a schematic diagram of an embodiment of commercial insertion within a vehicular communication network in accordance with the present invention.

FIG. 106 is a schematic diagram of an embodiment of commercial insertion within a vehicular communication network. The vehicle communication system includes, in part, the network fabric 1646, a GPS processing unit 1648, the network manager 1650, one or more central processing units, a communication interface 1654, digital storage 1734, a second communication interface 1656, a video decoding module 1658, a graphics engine 1660, one of more displays 1728, a compositor 1666, an audio decoding module 1668, an audio-video encoding module 1670, one or more speakers 1730, and one or more rear seat entertainment units that includes a client processing unit, a rear seat display 1736, and a headphone jack 1738.

In an example of operation, the vehicle may upload to a server via a communication interface 1654 information regarding the vehicle (e.g., performance data, fuel level, diagnostic information, etc.), information regarding the occupants of the vehicle, location of the vehicle, a driver profile, etc. 1740. The server 1732 processes this information and generates targeted commercial content 1742. For example, if the vehicle is low on gas, the server 1732 may generate commercial content 1742 regarding the location of several gas stations. As another example, if the drivers profile indicates a preference for a certain type of hobby, the server 1732 may generate commercial content 1742 regarding the hobby.

The server 1732 provides the commercial content 1742 to the vehicle via the communication interface 1654 (e.g., cellular communication interface, satellite communication interface, etc.). Upon receiving the commercial content 1742, it may be stored in the digital storage 1734 for subsequent playback or provided to the video decoding module 1658 and/or the audio decoding module 1668 for immediate playback. If the commercial content 1742 is to be immediately played-back, the video decoding module 1658 decodes the commercial content 1742 in accordance with a video processing protocol (e.g., MPEG, JPEG, HTML, etc.) and provides the decoded commercial content 1742 to the display 1728 and/or to the compositor 1666.

If provided to the compositor 1666, the decoded commercial content 1742 may be combined with video graphics provided by the graphics engine 1660. While the video decoding module 1658 is decoding the video portion of the commercial content 1742, the audio decoding module 1668 is decoding the audio portion of the commercial content 1742. The resulting decoded audio data may be provided to the speaker 1730 and/or to the A/V encoding module 1670.

The A/V encoding module 1670 combines the decoded audio and the decoded video and encodes the combined A/V data to produce an encoded A/V file. The encoded A/V file may be stored in the digital storage 1734 and/or provided to the one or more of the rear seat entertainment units for display to a rear seat passenger.

Figure 107:
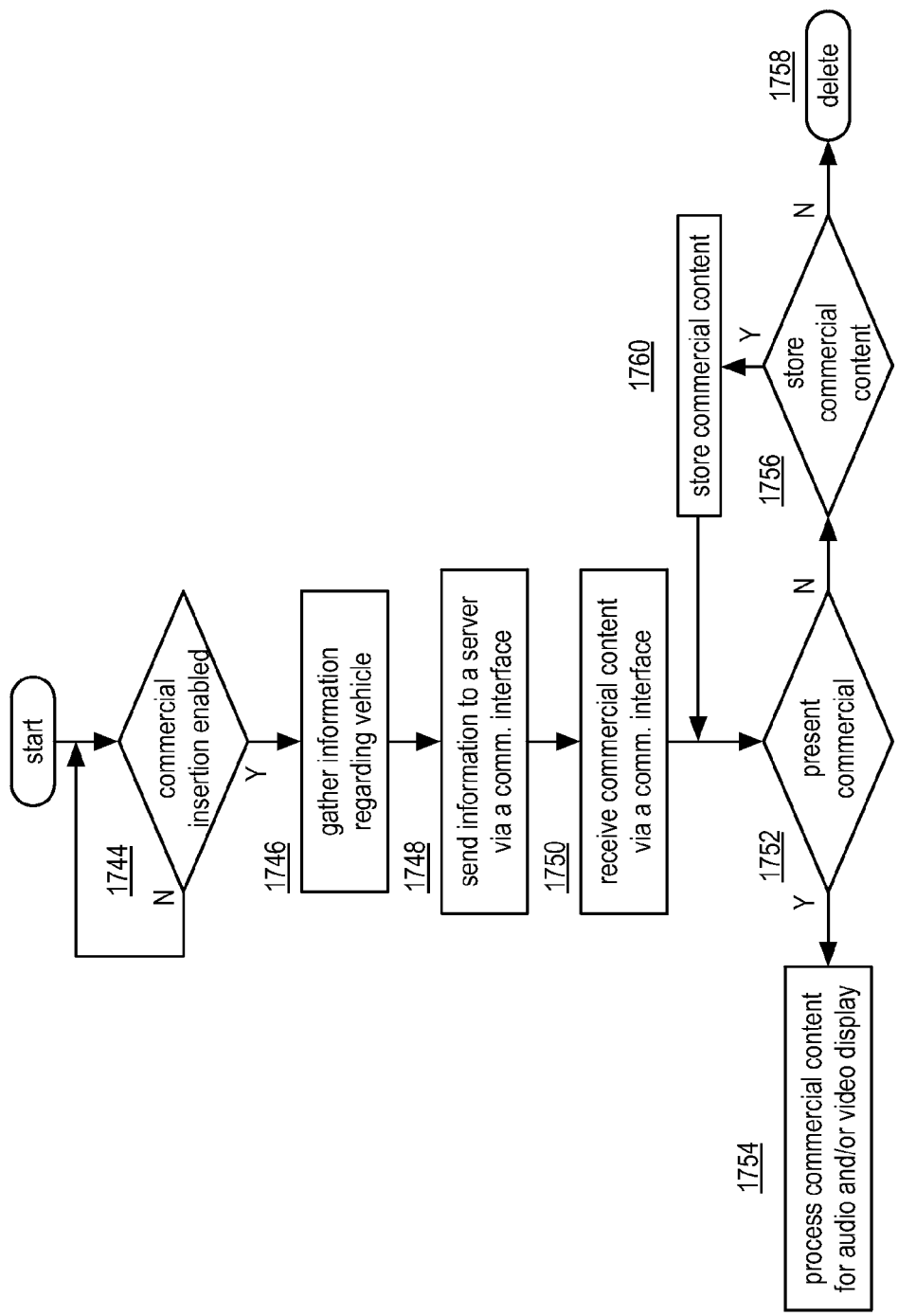
FIG. 107 is a logic diagram of an embodiment of a method for commercial insertion within a vehicular communication network in accordance with the present invention.

FIG. 107 is a logic diagram of an embodiment of a method for commercial insertion within a vehicular communication network. The method begins by determining whether a commercial insertion feature is enabled 1744. This may be enabled as a default setting by an automobile manufacturer, may be part of a satellite service or other wireless service, and/or may be a pay to disable feature of the vehicle. If the commercial insertion feature is enabled, the method continues by gathering information regarding the vehicle 1746. Such information may include information regarding the occupants, the location of the vehicle, a GPS destination, recent searches, stored multimedia content, recent playback of multimedia content, video games, etc.

The method continues by sending the information to a server via a communication interface 1748. The communication interface may provide communication with a satellite, another vehicle, a cellular network via a mobile phone interface, a highway wireless network, etc. The method continues by receiving commercial content via the commercial interface 1750. The method continues by determining whether the commercial should be presented 1752. Such a determination may be based on the nature of the commercial content, user preference settings, availability of the audio/video resources of the vehicle, etc.

If the commercial content is to be presented, the method continues by processing the commercial content for audio and or video display 1754. Such processing may include audio decoding, video decoding, video graphic insertion, audio/video encoding and/or compression, etc. If the commercial content is not to be presented, the method continues by determining whether the commercial content should be stored 1756. Such a determination may be based on the nature of the commercial content, user defined settings, etc. If the commercial content is not to be stored, it is discarded 1758. If the commercial content is to be stored, it is stored in the digital storage unit 1760.

Figure 108:
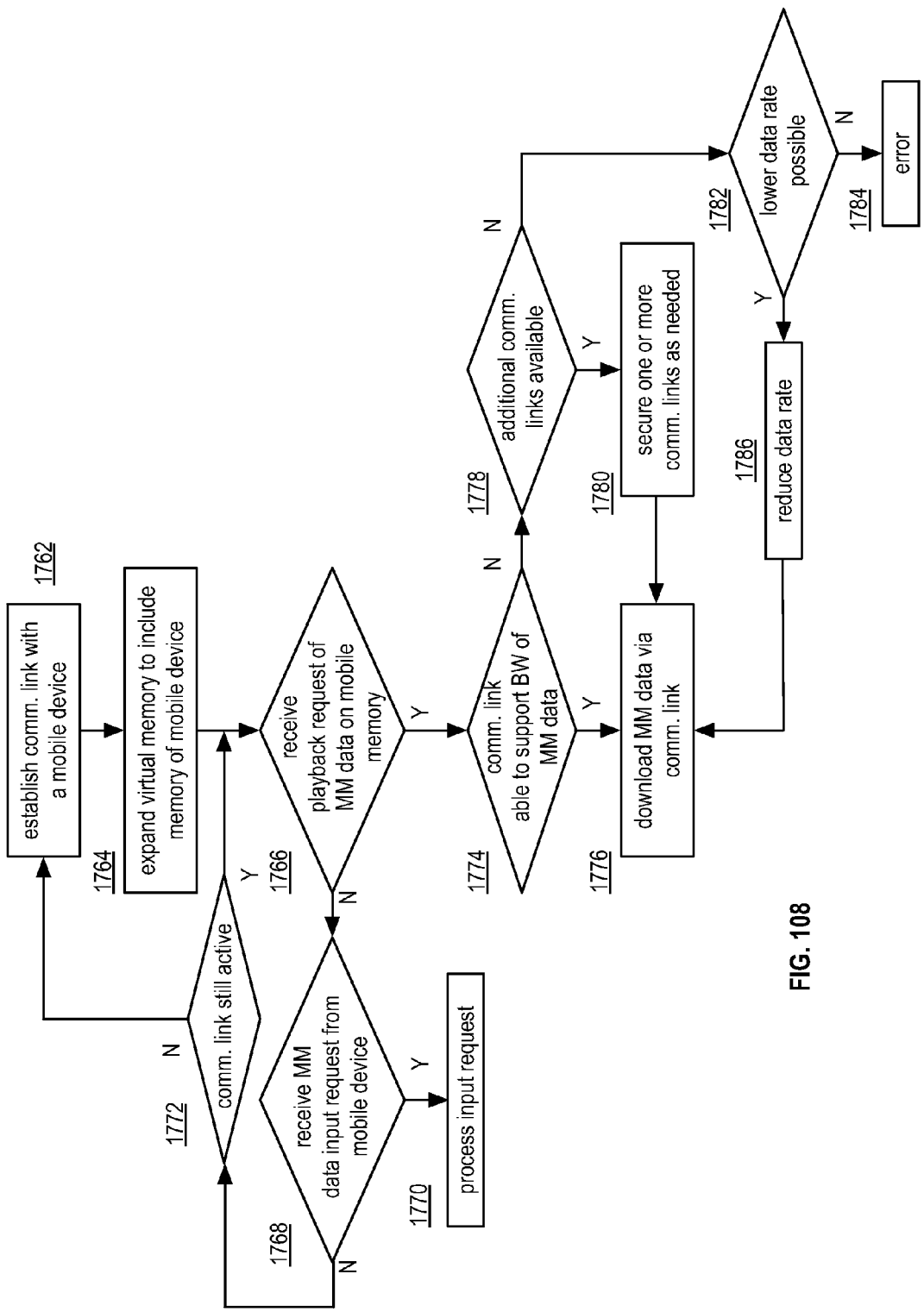
FIG. 108 is a logic diagram of an embodiment of a method for expanding memory of a vehicular communication network in accordance with the present invention.

FIG. 108 is a logic diagram of an embodiment of a method for expanding memory of a vehicular communication network. The method begins by establishing a communication link with a mobile device 1762. The mobile device may be a cellular telephone, tablet computer, laptop computer, etc. The communication link may be a Bluetooth link, a wireless local area network link, a femto-cellular telephone mutation link, a proprietary vehicle wireless link, etc. The method continues by expanding the virtual memory of the vehicle communication system to include the memory of the mobile device 1764.

The method continues by determining whether a playback request of multimedia data that is stored on the memory of the mobile device is received 1766. If not, the method continues by determining whether a request to store multimedia data on the memory of the mobile device is received 1768. If yes, the method continues by processing the request to forward data to the mobile device via the communication link for storage therein 1770. If a request to store data in the memory of the mobile device is not received, the method continues by determining whether the communication link is still active 1772. If the link is still active, the method repeats as shown. If the link is not active, the method repeats by attempting to reestablish the communication link 1762.

If a playback request of multimedia data stored in the memory of the mobile device is received, the method continues by determining whether the communication link has sufficient bandwidth to support the multimedia data 1774. If yes, the method continues by downloading the multimedia data in a communication link and processing it for display 1776. If, however, the communication link does not have sufficient bandwidth to support the multimedia data, the method continues by determining whether additional communication links to the mobile device are available 1778. If yes, the method continues by securing one or more of the available communication links to support the bandwidth requirements of the multimedia data 1780.

If additional communication links are not available, the method continues by determining whether a lower data rate is possible for the multimedia data 1782. If not, an error results and the multimedia data may not be played back at this time

1784. If the rate of the multimedia data may be lowered, it is and subsequently downloaded via the communication link at the lower rate 1786.

Figure 109:
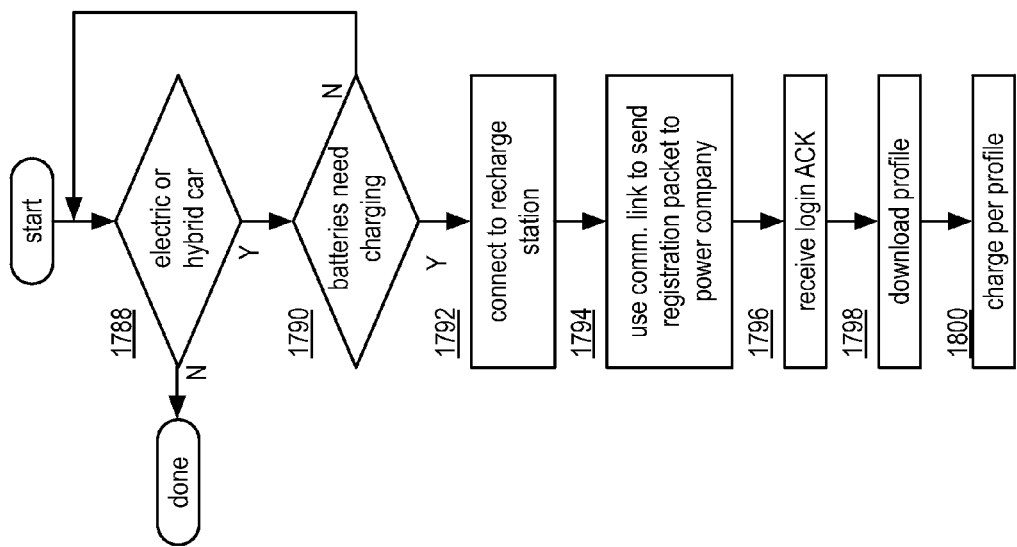
FIG. 109 is a logic diagram of an embodiment of a method for vehicular charging in accordance with the present invention.

FIG. 109 is a logic diagram of an embodiment of a method for charging of an electric vehicle. The method begins by determining whether the vehicle is electric vehicle or a hybrid vehicle 1788. If neither, the method is not performed. If the vehicle is an electric or hybrid car, the method continues by determining whether the batteries need charging 1790. If yes, the method continues by connecting to a recharge station, which is typically not at the home of the owner of the vehicle 1792. For example, the recharge station may be a service station that offers recharging of an electrical vehicle.

The method continues by utilizing a communication link of the vehicle communication network to send a registration packet to a power company and/or recharge service organization 1794. The method continues by receiving a login acknowledgment 1796. In response thereto, the method continues by downloading a recharge profile of the user and/or of the vehicle 1798. The recharge profile may indicate a pre-negotiated rate for recharging the vehicle, accessing a particular account, utilizing a prepaid credit card, etc. The method continues by charging the vehicle in accordance with the downloaded profile 1800.

FIG. 110 is a logic diagram of an embodiment of a method for fuel consumption optimization of a vehicle. The method begins by determining whether fuel optimization information is received via a communication link 1802. The fuel optimization information is generated by a server that receives information regarding the car's performance, use profile, make of the car, type of gasoline used, general information regarding the vehicle, etc. Based on this information, the server generates information that may optimize fuel consumption while the vehicle is in use.

When fuel optimization information is received, the method continues by presenting a message to the driver regarding fuel optimization 1804. The method continues by determining whether the driver has acknowledged the fuel optimization method and desires to adjust the performance of the car 1806. If not, the method is complete for this particular fuel optimization message. If, however, the driver has provided an acknowledgment, the method continues by adjusting performance of the vehicle based on the fuel optimization information 1808. For example, the fuel optimization information may regulate the speed at which the car is traveling, may regulate the acceleration of the vehicle, may adjust fuel mixtures, air intake, etc. to reduce fuel consumption while still maintaining an acceptable level of performance.

FIG. 111 is a logic diagram of another embodiment of a method for fuel consumption optimization of a vehicle. The method begins by requesting traffic information and/or road conditions for a known route that the vehicle will be traveling 1810. The request may be to a remote source via one of the communication links of the vehicle communication network. The method continues by determining current driving characteristics of the vehicle (e.g., speed, acceleration, braking, and/or other driving traits) 1812.

The method continues by determining whether fuel optimization is possible based on a comparison of the traffic information, road condition information, and the current driving characteristics 1814. For example, by lowering the speed of the vehicle, a traffic slowdown ahead in the vehicle's route may clear prior to the vehicle arriving thereby reducing fuel consumption and improving the quality of the trip. If fuel optimization is not possible, the method repeats as shown.

If, however, fuel optimization is possible, the method continues by presenting a message to the driver regarding fuel optimization options 1816. The method continues by determining whether the driver has acknowledged a fuel optimization option 1818. If not, the method repeats as shown. If yes, the method continues by adjusting performance of the vehicle to optimize fuel consumption 1820.

Figure 112:
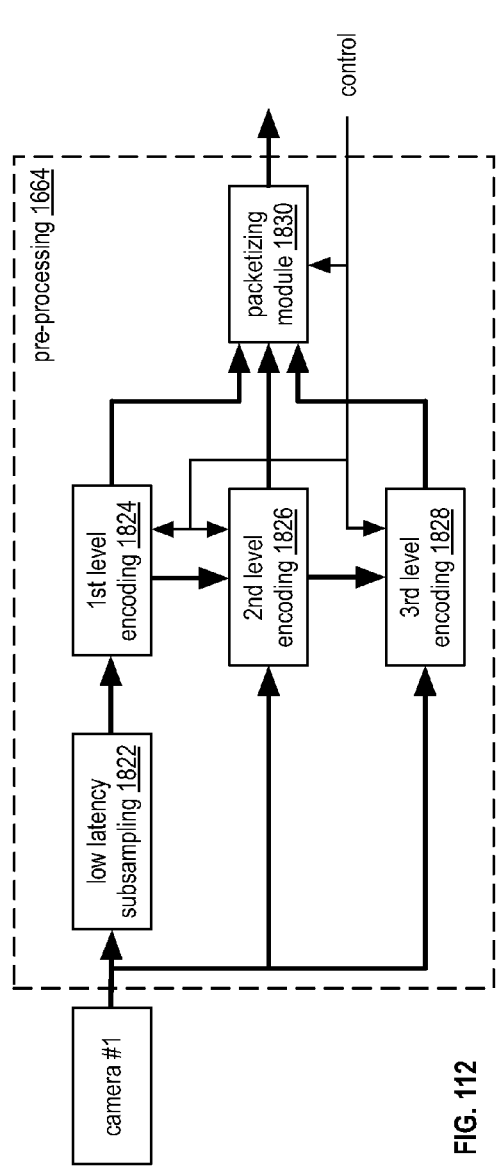
FIG. 112 is a schematic diagram of an embodiment of a multi-level pre-processing module of a vehicular communication network in accordance with the present invention.

FIG. 112 is a schematic diagram of an embodiment of a multi-level pre-processing module 1664 of FIG. 100. The preprocessing module 1664 includes a low latency subsampling module 1822, a first level encoding module 1824, a second level encoding module 1826, a third level encoding module 1828, and a packetizing module 1830.

In an example of operation, one or more cameras (which can be of any type, including but not limited to, an IP camera, optical camera or IR camera) provide one or more video streams to the pre-processing module 1664. For example, one video stream may be from one camera and/or one camera type, while another video stream may be from another camera and/or camera type. The low latency sub-sampling module 1822 samples the video stream(s) at a particular rate (e.g., 2N, where N=>1) to produce one or more sub-sampled video streams. For example, if the sampling rate is two, then every other pixel is sampled thereby reducing the size of a frame of the video stream(s). The first level encoding module 1824 performs a base layer encoding of one of the sub-sampled video streams to produce a first level encoded video stream that has low latency and low quality. In one embodiment, the low latency subsampling module 1822 is not included or by-passed to provide a video stream captured in low resolution from a camera directly to the first level encoding module 1824.

The second level encoding module 1826 performs spatial scaling encoding on the same video stream or a different video stream based on the base layer encoding of the first level encoding module 1824 to produce a second level encoded video stream. The third level encoding module 1828 performs quality scaling encoding on the same video stream or a different video stream from the first and/or second level encoding modules 1824 and 1826 based on the encoding performed by the second level encoding module 1826 to produce a third level encoded video stream. Note that a second subsampling module may be included prior to the second level encoding module 1826 to reduce latency of producing the second encoded video stream.

The packetizing module 1830 receives the three levels of encoded video streams and packetizes them to produce a single packet stream output. A processing module (not shown) generates a control signal to indicate an encoding mode to the pre-processing module 1664. The pre-processing module 1164 enables one or more of the levels of encoding based on the encoding mode. For example, the pre-processing module 1164 may enable one or more of the levels of encoding based on a mode of operation (e.g., a mode of operation of the vehicle, camera(s) and/or pre-processing module 1664), a vehicle status, an availability of network resources of the vehicular communication network and/or packet content. The control signal may further control (e.g., adjust encoded characteristics, etc.) the first, second, and/or third level of encoding as well as control (e.g., enable, adjust packetizing characteristics, etc.) the packetizing module 1830. Note that the preprocessing module 1664 may include more or less levels of encoding. Further note that one or more of the layers of encoding may further include compression.

Figure 113:
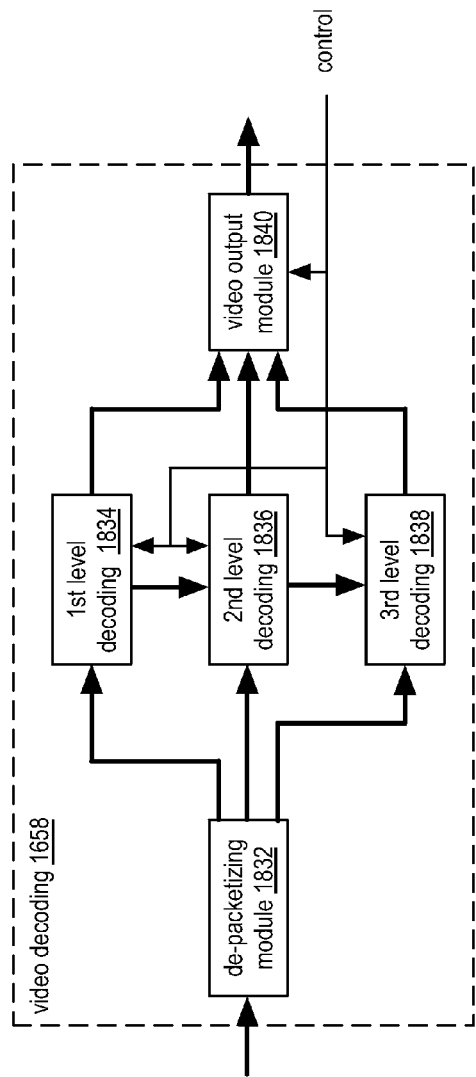
FIG. 113 is a schematic diagram of an embodiment of a multi-level video decoding module of a vehicular communication network in accordance with the present invention.

FIG. 113 is a schematic diagram of an embodiment of a multi-level video decoder 1658 of a vehicular communication network. The video decoder 1658 includes a de-packetizing module 1832, a first level decoding module 1834, a second level decoding module 1836, a third level decoding module

1838, and a video output module 1840. The first, second, and third level video decoding modules perform the corresponding video decoding of the video encoding performed by the first, second, and third level video encoding modules of the preprocessing module.

As an example of operation, the de-packetizing module 1832 receives the single packet stream output of the preprocessing module 1664. The de-packetizing module 1832 provides first level encoded packets to the first level decoding module 1834, provides second level encoded packets to the second level decoding module 1836, and provides third level encoded packets to the third level decoding module 1838. Each of the decoding modules decodes their respective packets to produce respective first, second and third level decoded video signals.

The video output module 1840 may output one, two, or all three of the decoded video signals to produce a decoded video output based on a control signal produced by the processing module (as in FIG. 112). In addition to indicating the encoding mode, the control signal may further indicate particular one(s) of the levels of decoding to output. Such a control signal (encoding mode) may be generated, for example, based on the packet content. For example, safety related video functions require low latency video inputs, which can be of low quality, to perform the corresponding safety-related operations; thus the video output module 1840 may only need to output the first level decoded video signal. As another example, the vehicle display and/or one or more of the RSE displays can tolerate latency but require a higher quality video input, so the video output module 1840 may output only the second or third level of decoding. Note that the video provided to an RSE display is first processed by the audio/video processing module. Further note that the encoding performed by the preprocessing module and the decoding performed by the video decoder 1658 may include one or more of the video functions discussed with reference to FIG. 100. In addition, the control signal (encoding mode) may also be generated, for example, based on a mode of operation, such that different operation mode(s) may use video from different coding layer(s).

Figure 114:
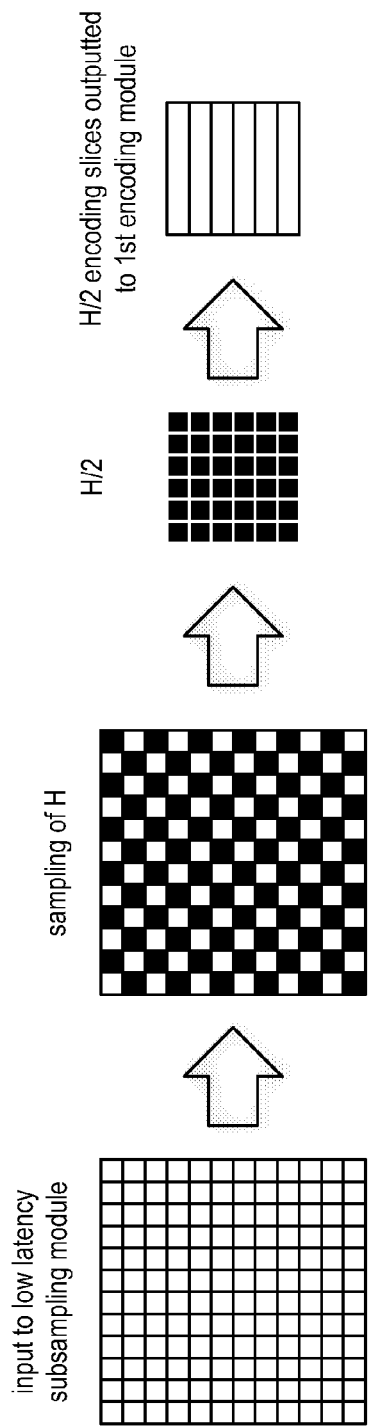
FIG. 114 is a diagram of an example of a pre-processing video in accordance with the present invention.

FIG. 114 is a diagram of an example of the pre-processing module of FIG. 112 performing first level encoding. In this example, a frame of video data is received, where a square represents a pixel, a block of pixels etc. The low latencies subsampling module samples the video input (H) to produce a sub sampled video frame. The darkened squares represent pixels, pixel blocks, etc. that were sampled and the white squares represent pixels, pixel blocks etc. that were not sampled. The low latency subsampling module provides an H/2 sub-sampled frame of video to the first level encoding module. The first level encoding module encodes slices of the H/2 frame of video to produce the first level encoded video data.

Figure 115:
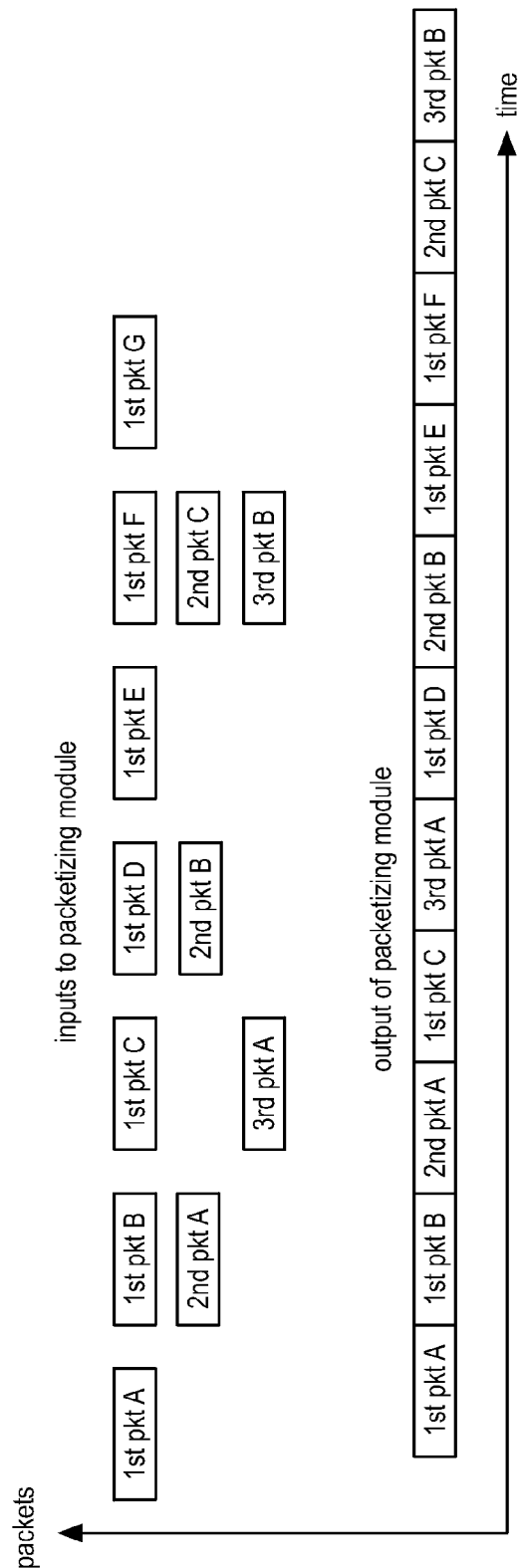
FIG. 115 is a diagram of an example of a low latency video packet organization in accordance with the present invention.

FIG. 115 is a diagram of an example of a low latency video packet organization as may be outputted by the packetizing module of the pre-processing module. In this example, the packetizing module receives packets during time intervals over a period of time. During a first time interval of the example a first level 1 packet A is received from the first level encoding module. At a second time interval, a second level 1 packet B is received from the first level encoding module and a first level 2 packet A is received from the second level encoding module. At a third time interval, a third level 1 packet C is received from the first level encoding module and a first level 3 packet A is received from the third level encoding module. In this example, the first level encoding module provides a packet at every time interval, the second level encoding module provides a packet every other time interval, and the third level encoding module provides a packet every third time.

The packetizing module outputs the packets in a serial manner with packets from the first level encoding module having priority over the other encoding modules. As such, in response to the packets received during the first time interval, the packetizing module outputs the first level one packet A (the only one it received). In response to the packets received during the second time interval, the packetizing module outputs the second level 1 packet B prior to the first level 2 packet A. In response to the packets received during the third time interval, the packetizing module outputs the third level 1 packet C prior to the first level 3 packet A; and so on.

Figure 116:
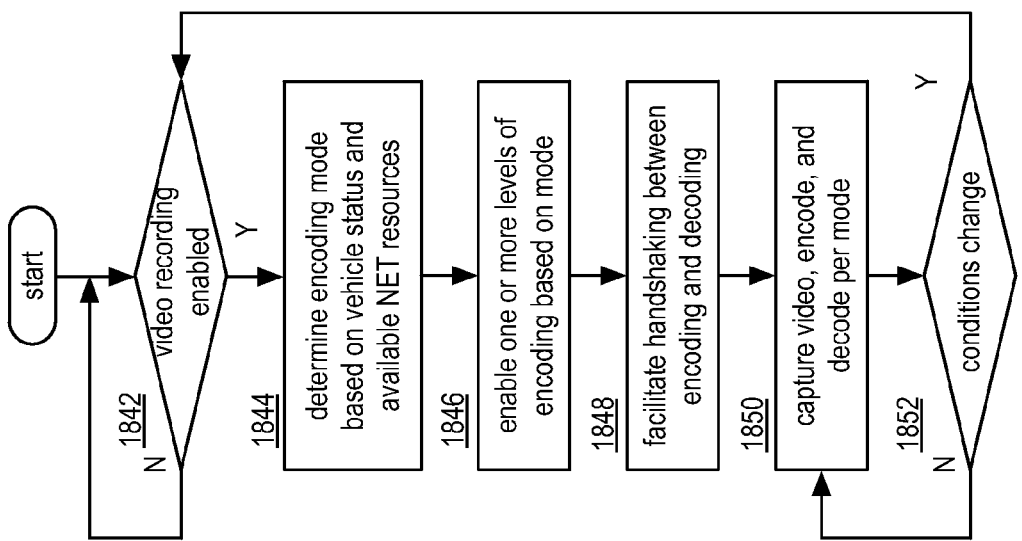
FIG. 116 is a logic diagram of an embodiment of a method for multi-level video processing in accordance with the present invention.

FIG. 116 is a logic diagram of an embodiment of a method for multi-level video processing. The method begins by determining whether video recording is enabled 1842. The video recording may be enabled based on a user input, based on sensing a trigger event (putting the car in reverse), etc. If the video recording is enabled, the method continues by determining an encoding mode based on vehicle status and availability of network resources (e.g., bandwidth of the network fabric, availability of processing modules, availability of memory, availability of video encoding, availability of video decoding, etc.) 1844.

The method continues by enabling one or more levels of video encoding in the preprocessing module based on the determined encoding mode 1846. The method continues by facilitating handshaking between the video encoding and video decoding in accordance with the enabled encoding mode 1848. The method continues by capturing video, encoding it in accordance with the encoding mode, and decoding it in accordance with the encoding mode 1850. The method continues by determining whether encoding conditions had changed 1852. If not, the method repeats as shown. If yes, the method repeats by determining whether video recording is enabled 1850.

Figure 117:
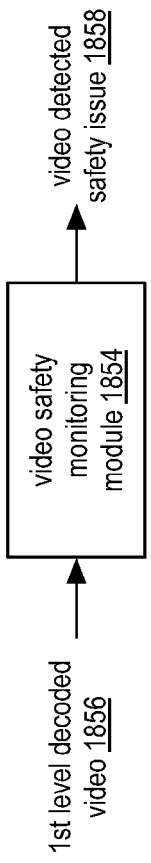
FIG. 117 is a diagram of an example of a using multi-level video in accordance with the present invention.

FIG. 117 is a diagram of an example of a video safety monitoring module 1854 using multi-level video. In this example, a video safety monitoring module 1854 receives first level decoded (or encoded) video data 1856 and processes it to determine whether criteria for detecting a safety issue have been met. If a safety issue is detected, the video safety monitor module 1854 generates and outputs a video detected safety issue (hereinafter referred to as a safety command) 1858. For example, the vehicle safety monitoring module 1854 may be programmed to detect the potential of a collision using video information and, if a collision seems imminent, the video safety monitor module 1854 generates one or more safety commands that may be used to enable automatic evasive maneuvers, trigger alarms, etc.

Figure 118:
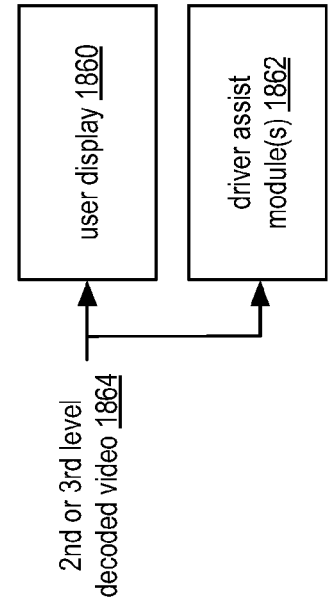
FIG. 118 is a diagram of another example of a using multi-level video in accordance with the present invention.

FIG. 118 is a diagram of another example of a user display 1860 and/or driver assist module 1862 using multi-level video. In this example, a user display 1860 and/or a driver assist module 1862 receives second and/or third level decoded (or encoded) video data 1864. For example, the video data may correspond to video captured by rear cameras of a vehicle, where the video data is used for parking assistance.

Figure 119:
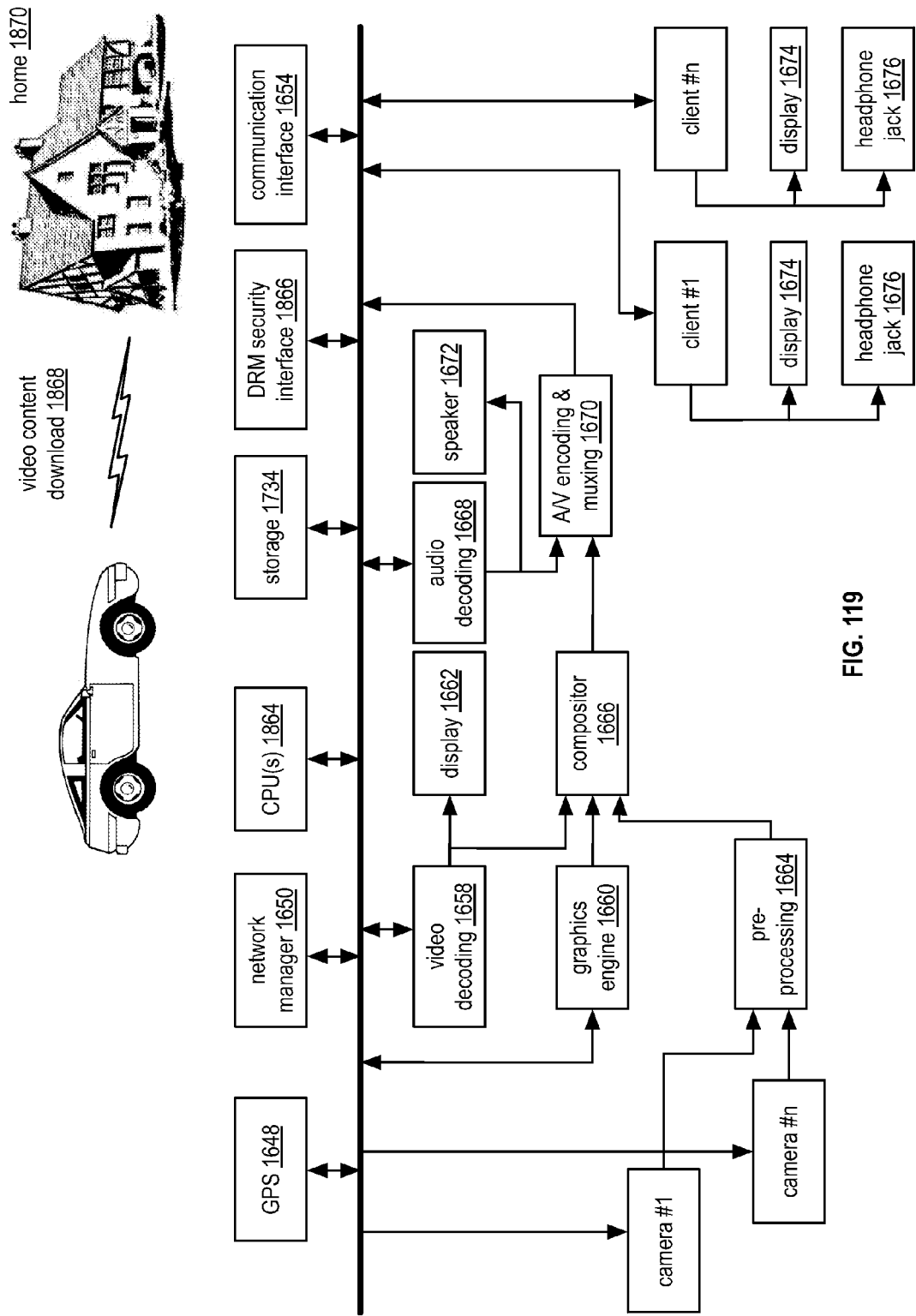
FIG. 119 is a diagram of an example of video content authorization in accordance with the present invention.

FIG. 119 is a diagram of an example of processing video content authorization in a vehicle network communication system. The vehicle communication system includes, in part, the network fabric, a GPS processing unit 1648, the network manager 1650, one or more central processing units 1864, a communication interface 1654, memory (storage) 1734, a digital rights management (DRM) interface 1866, a video decoding module 1658, a graphics engine 1660, one of more displays 1662, one or more cameras, a pre-processing module 1664, a compositor 1666, an audio decoding module 1668, an audio-video encoding module 1670, one or more speakers 1672, and one or more rear seat entertainment units that includes a client processing unit, a rear seat display 1674, and a headphone jack 1676. The video decoding module 1658, the graphics engine 1660, the preprocessing module 1664, the compositor 1666, the audio decoding module 1668, and the audio/video encoding module 1670 constitute a head end unit within the vehicle.

In an example of operation, the vehicle downloads video content 1868 from a home 1870, where the video content 1868 is copyright protected. In this instance, before playback of the video content 1868 within the vehicle occurs, the vehicle determines whether the occupant(s) of the vehicle are authorized to display the copyrighted video content 1868 within the vehicle. To accomplish this, an occupant of the vehicle provides digital rights management information to the DRM security interface 1866. This can be done by using a card that is inserted into a slot within the dashboard of the vehicle, via a wireless communication between a mobile device of an occupant and the DRM security interface 1866, etc.

A processing module or CPU 1864 interprets the DRM information received from the occupant to determine the occupant's rights for displaying copyrighted video content. When an occupant requests playback of a particular copyrighted video file, the processing module 1864 determines whether the copyrighted video file includes a watermark and or unique ID that corresponds to the DRM information of the occupant. If so, the playback of the particular copyrighted video file is allowed. If not, the playback is prohibited and a corresponding message may be provided to the occupant.

Figure 120:
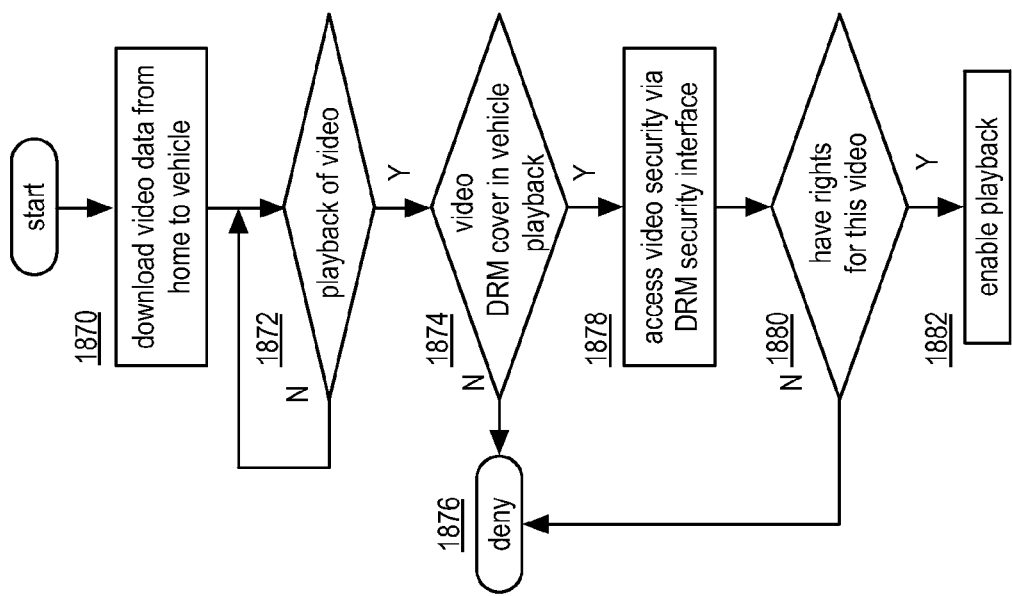
FIG. 120 is a logic diagram of an embodiment of a method for video content authorization in accordance with the present invention.

FIG. 120 is a logic diagram of an embodiment of a method for video content authorization processing within a vehicle communication network. The method begins by downloading video data from a home to vehicle 1870. The method continues by determining whether a playback request for the downloaded video is received 1872. If a playback request is received, the method continues by determining whether the video content includes DRM information that prevents its playback in a vehicle 1874. If the video content includes DRM information that prevents playback in the vehicle, the playback request is denied 1876.

If the video content does not include DRM information that prevents in vehicle playback, the method continues by accessing video security information of an occupant via a DRM security interface 1878. The video security information may include a watermark, a video ID, accessing a third party service to determine authorization and/or to obtain authorization, etc. The method continues by determining whether the occupant has the right to play back this video content 1880. If not, the request is denied 1876. If so, the playback is enabled 1882.

The method may further include checking DRM information prior to, or during, download of the video content to determine whether the video content may be downloaded to a vehicle. If not, the download request is denied. If so, the download is enabled.

Figure 121:
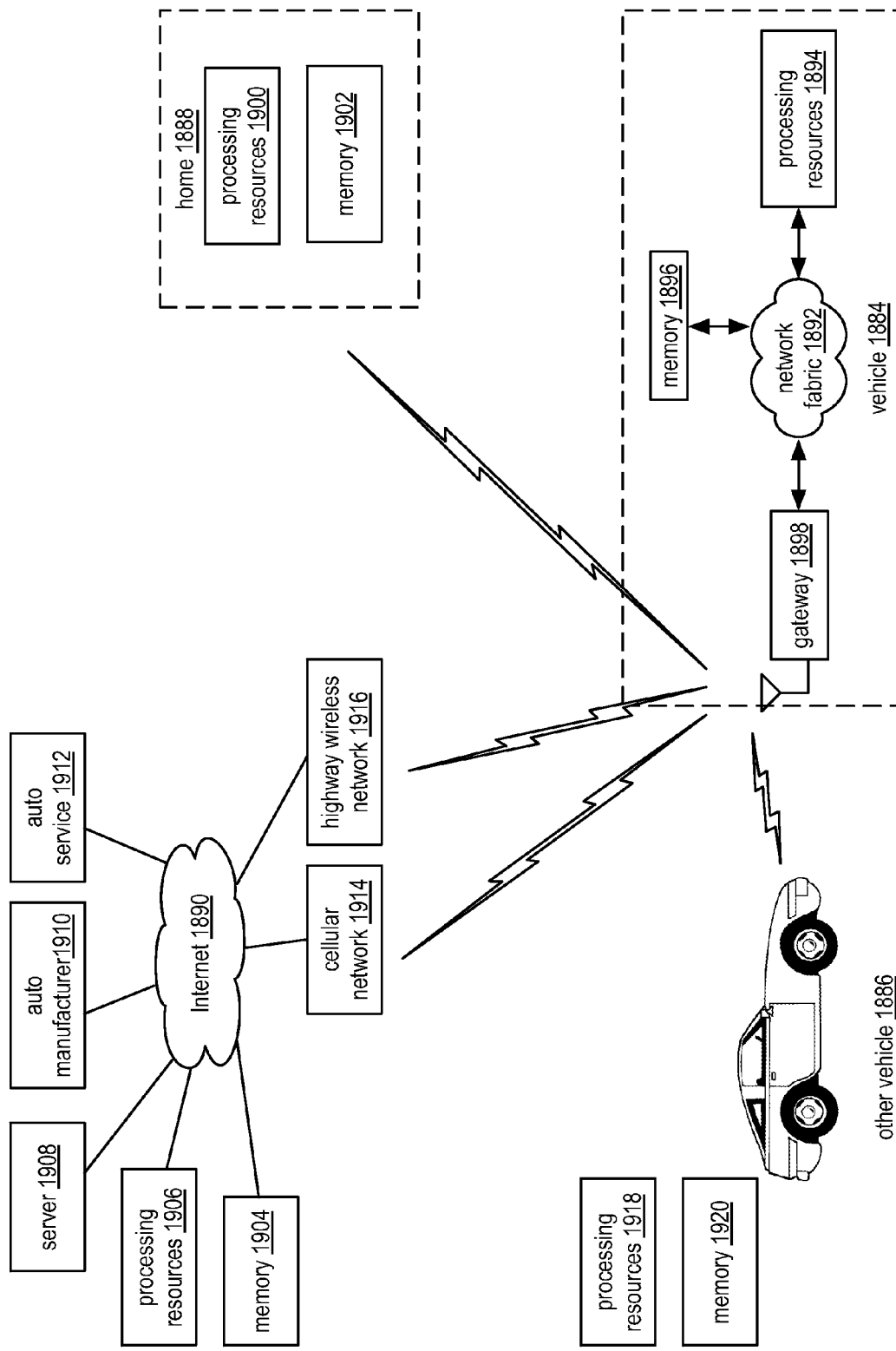
FIG. 121 is a diagram of an example of resource sharing in accordance with the present invention.

FIG. 121 is a diagram of an example of resource sharing in a vehicle communication network in a distributed system. The system includes a vehicle 1884, another vehicle 1886, home 1888, and Internet coupled devices. Each of the vehicle 1884 and other vehicle 1886 includes the network fabric 1892, processing resources 1894 and 1918 (e.g., processing modules, CPUs, ECUs, video decoding modules, video encoding modules, etc.), memory 1896 and 1920, and a gateway 1898. The home 1888 includes processing resources 1900 and memory 1902. The Internet coupled devices include memory 1904, processing resources 1906, servers 1908, automobile meta-factor 1910 or services, and/or automobile repair services 1912.

In an example of operation, the vehicle 1884 communicates with the home 1888, the other vehicle 1886, and/or the Internet 1890 to request processing resources and/or memory to augment, or off-load, processing within the vehicle 1884 and/or storage of vehicle data. As a more specific example, the vehicle 1884 may be in communication with the home 1888 and requests access to one or more processing resources 1900 to augment, or off-load, video processing within the vehicle 1884. In this specific example, if the home 1888 has available video processing resources 1900, and the vehicle 1884 is authorized to access them, the home 1888 may grant access to the processing resources 1900 for co-processing of video data for the vehicle 1884.

As another more specific example, the vehicle 1884 and other vehicle 1886 may be traveling on the same road and are within wireless communication range of each other. In this instance, the vehicle 1884 requests access to one or more processing resources 1918 of the other vehicle 1886 to augment, or off-load, a process being executed within the vehicle 1884 or needing to be executed. The other vehicle 1886 receives the request, determines whether the vehicle 1884 is authorized to access its processing resources 1918 and/or memory 1920, and, if so, determines whether to grant access to the processing resources 1918 and/or memory 1920. If access is granted, data is exchanged via a wireless communication link between the two vehicles. The health of the link is continually monitored to ensure that data and processing thereof is accurately communicated between vehicles.

As yet another more specific example, the vehicle 1884 may request access to Internet processing resources 1906 and/or memory 1904 for augmenting, or offloading, processes within the vehicle and/or storage of vehicle data. In this instance, the vehicle 1884 sends a request via the cellular network 1914 and/or the highway wireless network 1916 to a service provider 1912 coupled to the Internet 1890. The service provider 1912 receives a request, determines whether the vehicle 1884 is authorized to access processing resources 1906 and/or memory 1904, and, if so, determines whether to grant access to the processing resources 1906 and/or memory 1904. If access is granted, the vehicle 1884 utilizes the cellular network 1914 and/or highway wireless network 1916 to communicate with the allocated processing resources 1906 and/or allocated memory resources 1904.

Figure 122:
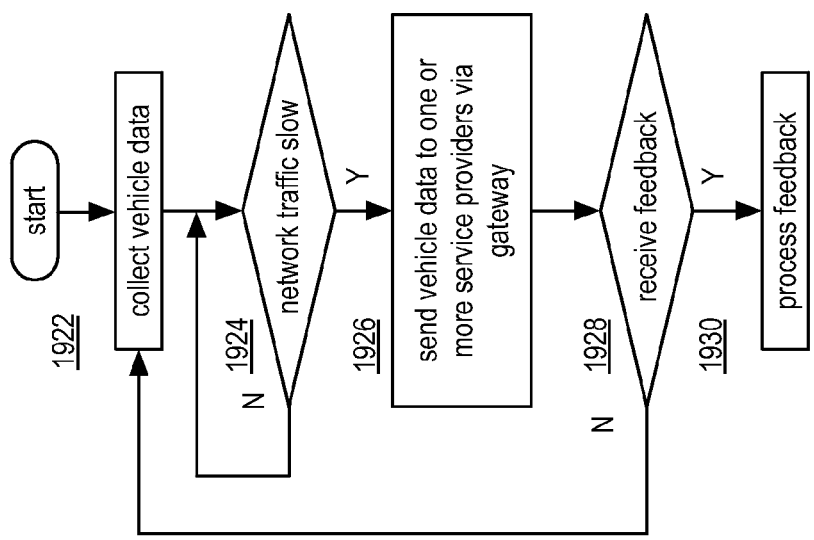
FIG. 122 is a logic diagram of an embodiment of a method for resource sharing in accordance with the present invention.

FIG. 122 is a logic diagram of an embodiment of a method for resource sharing within a distributed system. The method begins by collecting vehicle data, which may be data from one or more sensors of the vehicle, diagnostic data, performance data, occupant data, etc. 1922. The method continues by determining whether the vehicle network traffic is slow 1924. For example, the vehicle network traffic may be slow if the car is not in use, is in use but parked, and/or at a scheduled time when the car is typically not in use.

When the network traffic is slow, the method continues by sending the vehicle data to one or more of service providers via the gateway for storage and/or processing 1926. The method continues by determining whether feedback is received (e.g., receiving a message indicating needed service, a message regarding recommended service, a message acknowledging storage, etc.) 1928. If feedback is received, the method continues by processing the feedback (e.g., provide a message to a user, switch to a backup component, etc.) 1930.

Figure 123:
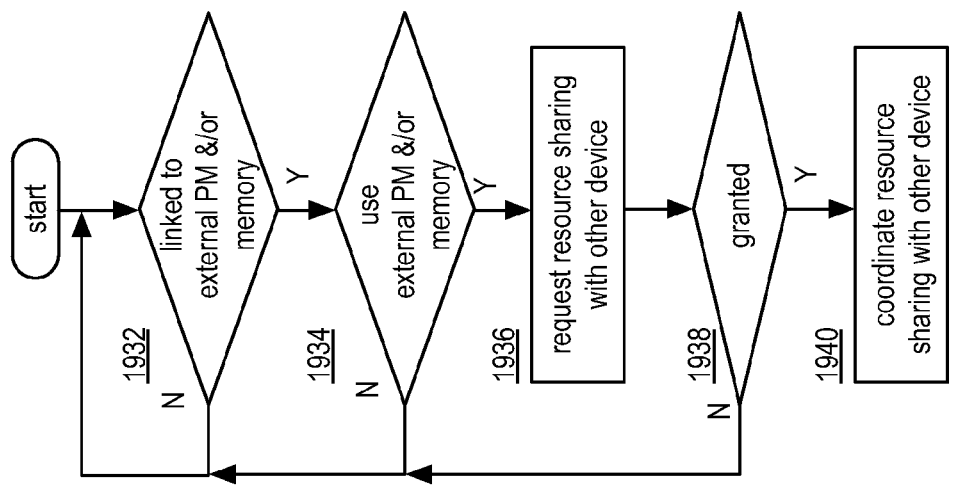
FIG. 123 is a logic diagram of another embodiment of a method for resource sharing in accordance with the present invention.

FIG. 123 is a logic diagram of another embodiment of a method for resource sharing within a distributed system. The method begins by determining whether the vehicle network is linked to an external processing module and/or memory for augmenting, and/or off-loading, processing and/or data storage 1932. If yes, the method continues by determining whether to use the external processing module and/or memory 1934. If yes, the method continues by requesting to access the resources 1936. The method continues by determining whether the request is granted 1938. If yes, the method continues by coordinating resource sharing 1940.

Figure 124:
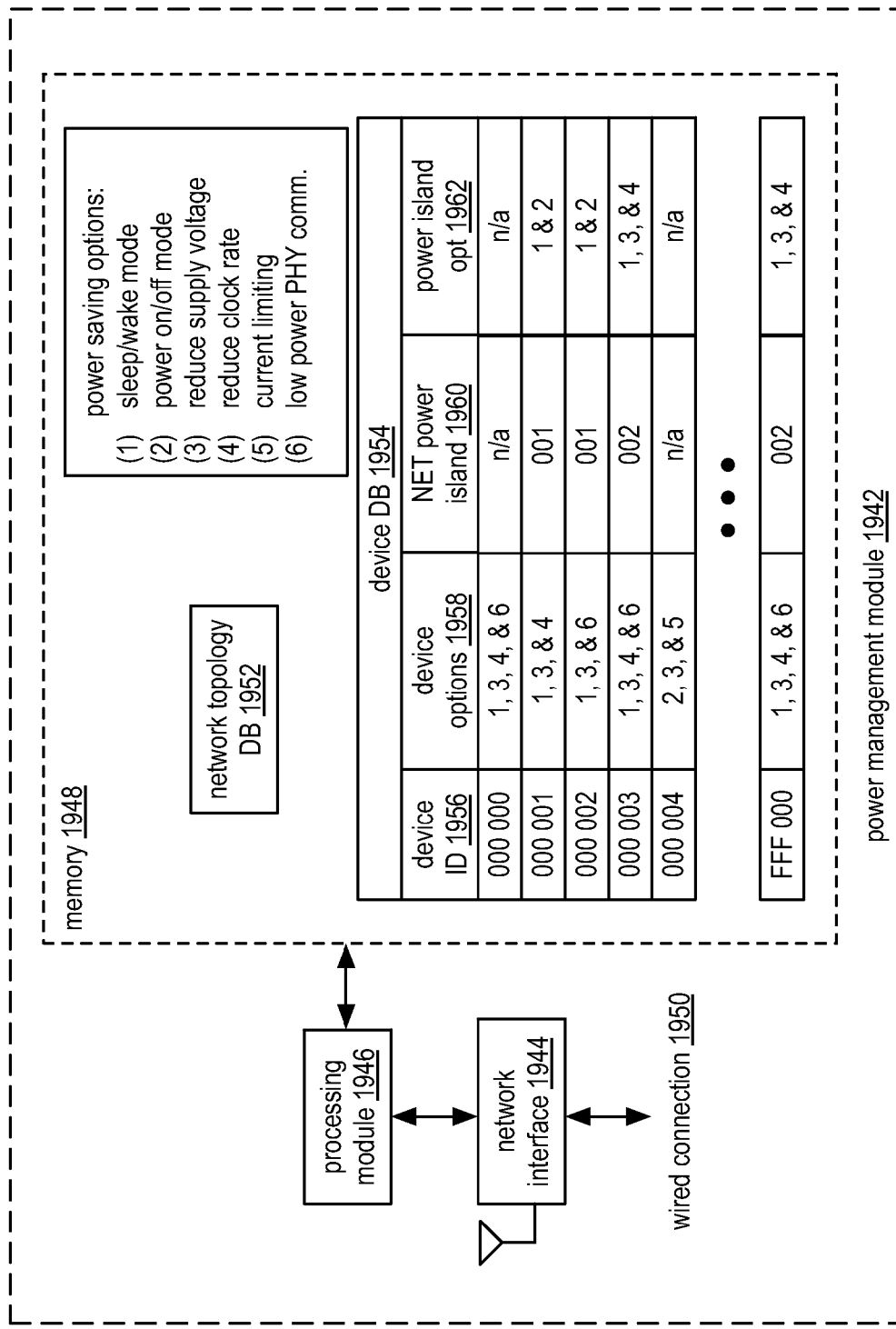
FIG. 124 is a schematic diagram of an embodiment of a power management module in accordance with the present invention.

FIG. 124 is a schematic diagram of an embodiment of a power management module 1942 that includes a network interface 1944, a processing module 1946, and memory 1948. The network interface 1944 may connect to the network fabric (vehicular communication network) via a wireless connection and/or a wired connection 1950. The memory 1948 stores a network topology database 1952, power saving options and corresponding applications, and a device database 1954.

The device database 1954 includes fields for a device ID 1956, device power saving options 1958, network power island ID 1960 (e.g., the power island in which the device resides), and power island power savings options 1962. Note that a power island may include two or more vehicle devices and/or vehicle modules. The devices and/or modules within a power island may be related by device type, device function and/or device location within the vehicular communication network. For example, as shown in FIG. 10, the left front assembly 286 may be a power island, which includes various devices, such as a left headlight, left blinker and left sensor.

The device power savings options 1958 for a particular device may include, for example, one or more of: placing the device in a sleep mode, reducing the supply voltage to the device, reducing the clock rate of the device, disabling power to the device, limiting the current to the device and using a lower power physical layer communication link for the device. The power island power savings options 1962 for a particular power island may include, for example, one or more of: placing each of the devices in the power island in a sleep mode, reducing the supply voltage to each of the devices in the power island, reducing the clock rate of each of the devices in the power island, disabling power to each of the devices in the power island, limiting the current to each of the devices of the power island and using a lower power physical layer communication link for each of the devices in the power island.

For example, device 000 000 is not in a power island and has power saving options one, three, four, and six. With reference to the power saving options table, power saving option one corresponds to a sleep/wake mode, power saving option two corresponds to a power on/off mode, power saving option three corresponds to reducing a supply voltage, power saving option four includes reducing a clock rate, power saving option five includes current limiting, power saving option six includes lowering power of a physical layer communication link, and may include other power saving techniques. As such, device 000 000 may have its power adjusted by placing it in a sleep mode when inactive (i.e., power saving option 1), have its supply voltage reduced (i.e., power saving option 3), have its clock rate reduced (i.e., power saving option 4), and/or use a lower power physical layer communication link (i.e., power saving option 6).

As another example, device 000 001 is in power island 001 and has individual power saving options of one, three and four. The power saving options for island 001 include power saving options one and two. As such, the device 000 001 may be individually controlled for power savings and/or controlled as part of the power island. Individually, the device 000 001 may be placed in a sleep mode when inactive (i.e., power saving option 1), have its supply voltage reduced (i.e., power saving option 3), and/or have its clock rate reduced (i.e., power saving option 4).

As yet another example, device 000 002 is in power island 001 and has individual power saving options of one, three and six. The power saving options for island 001 include power saving options one and two. As such, the device 000 002 may be individually controlled for power savings and/or controlled as part of the power island. Individually, the device 000 002 may be placed in a sleep mode when inactive (i.e., power saving option 1), have its supply voltage reduced (i.e., power saving option 3), and/or use a lower power physical layer communication link (i.e., power saving option 6).

Figure 125:
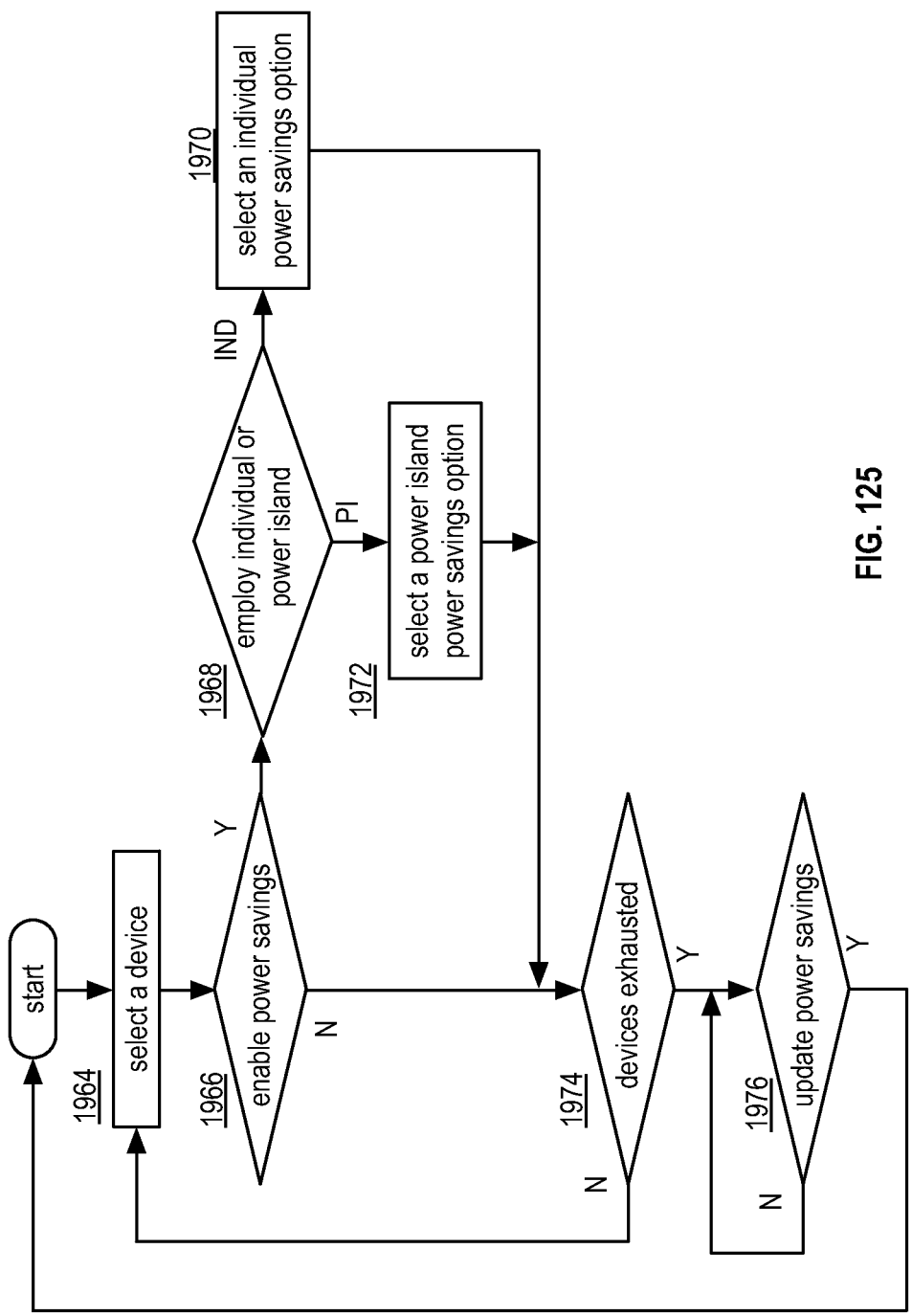
FIG. 125 is a logic diagram of an embodiment of method for power management in accordance with the present invention.

FIG. 125 is a logic diagram of an embodiment of method for power management in a vehicle network communication system that may be performed by the processing module of the power management module. The method begins by selecting a device coupled to the network fabric 1964. The selection may be based on a periodic checking of devices coupled to the network fabric, monitoring activity of the device, in response to a request, etc.

The method continues by determining whether to enable power savings for the particular device 1966. Such a determination may be based on the current state of the device. For example, the current state may be an active state or an idle state. If in an active state, the current state may further indicate a present or future operation of the device, such as the current task being performed by the device, the speed at which the task needs to be performed, whether the device is currently performing a task, whether the device will be performing a task imminently, etc.

If power savings is to be enabled, the method continues by determining whether to employ an individual power saving option or a power island power saving option 1968. For example, the method may determine whether the device belongs to a power island, and if so, determine whether to enable power savings for that power island. If the device does not belong to a power island, an individual power saving option can be applied to the device. Likewise, if the device belongs to a power island, but power savings do not need to be enabled for the power island, an individual power saving option can be applied to the device. For example, the determination of whether power savings need to be enabled for the power island can be based on the current state of one or more of the device and the power island. As mentioned above, the current state may indicate one or more of a present operation or a future operation of the device and/or power island. However, if the device belongs to a power island and a determination is made that power savings should be enabled for that power island, a power island power savings option can be applied to the power island.

If an individual power saving option is to be applied, the method continues by selecting and applying the individual power saving option 1970. The selection may be based on, for example, the type of device, the use of the device (i.e., one or more operations performed by the device), the location of the device in the network, etc. If a power island power saving option is to be used, the method continues by selecting and applying the power saving option to be applied 1972. The selection may be based, for example, on the type of devices within the power island, the use of the devices within the power island (i.e., one or more operations performed by one or more devices within the power island), the location of the power island in the network, etc. After applying the power saving option, the method continues by determining whether a list of devices has been exhausted 1974. If not, the method repeats by selecting another device 1964.

If the list of devices has been exhausted, the method continues by determining whether the power options for one or more devices should be updated 1976. If so, the process repeats from the beginning for the particular devices. In addition, or in the alternative, the method may be continually repeated to change the power saving options for one or more devices.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", It's and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A bridge-routing module comprising:
   interface circuitry configured for communication within an intra-vehicular network;
   packet ingress/egress circuitry configured to receive packets from and transmit packets to the interface circuitry;
   memory; and
   processing circuitry coupled to the packet ingress/egress circuitry and to the memory and configured to:
   analyze a packet to identify a packet content type to determine whether the packet is a vehicle safety packet;
   when the packet is a vehicle safety packet and the packet is received from a packet source, add an indication to a header of the packet to identify the packet as a vehicle safety packet;
   determine a packet routing parameter based on the packet content type; and
   control ingress/egress of the packet in accordance with the packet routing parameter.

2. The bridge-routing module of claim 1, wherein the interface circuitry is configured for communication with at least one of a switch module and another bridge-routing module via the intra-vehicular network.

3. The bridge-routing module of claim 1, the interface circuitry comprising:
   a plurality of ports;
   switching circuitry coupled to the plurality of ports; and
   link management circuitry coupled to the processing circuitry and to the switching circuitry and configured to control the switching circuitry to select an active port of the plurality of ports.

4. The bridge-routing module of claim 3, wherein the link management circuitry is further configured to:

deselect the active port when failing to meet performance criteria; and
control the switching circuitry to select a different port of the plurality of ports as the active port.

5. The bridge-routing module of claim 1, wherein:
the packet ingress/egress circuitry comprises an ingress buffer configured to store packets received from the interface circuitry; and
the processing circuitry is further configured to control placement of packets in the ingress buffer based, at least in part, on priority of the packets.

6. The bridge-routing module of claim 1, wherein:
the packet ingress/egress circuitry comprises a plurality of egress queues configured to store respective packet content types; and
the processing circuitry is further configured to:
control placement of packets in the plurality of egress queues based, at least in part, on a priority of the packets; and
select an egress queue from which a next packet is to be transmitted by the packet ingress/egress circuitry.

7. The bridge-routing module of claim 6, further comprising bypass circuitry coupled to bypass the plurality of egress queues when delivering priority packets.

8. The bridge-routing module of claim 7, wherein the processing circuitry is further configured to store a state of the egress queues prior to the bypass circuitry delivering the priority packets.

9. A method for intra-vehicular network communications comprising:
receiving a packet within an intra-vehicular network;
analyzing the packet to identify a packet content type to determine whether the packet is a vehicle safety packet;
when the packet is a vehicle safety packet and the packet is received from a packet source, adding an indication to a header of the packet to identify the packet as a vehicle safety packet;
determining a packet routing parameter based on the packet content type; and
controlling ingress/egress of the packet in accordance with the packet routing parameter.

10. The method of claim 9, further comprising selecting an active port of a plurality of ports available for packet ingress/egress.

11. The method of claim 10, further comprising:
deselecting the active port when failing to meet performance criteria; and
selecting a different port of the plurality of ports as the active port.

12. The method of claim 9, further comprising:
storing packets in an ingress buffer; and
controlling placement of the packets in the ingress buffer based, at least in part, on priority of the packets.

13. The method of claim 9, wherein:
controlling placement of packets in a plurality of egress queues based, at least in part, on a priority of the packets; and
selecting an egress queue from which a next packet is to be transmitted.

14. The method of claim 13, further comprising bypassing the plurality of egress queues when delivering priority packets.

15. A bridge-routing module comprising:
interface circuitry configured for communication within an intra-vehicular network and including both a wired interface and a wireless interface;
packet ingress/egress circuitry configured to receive packets from and transmit packets to the interface circuitry;
memory; and
processing circuitry coupled to the packet ingress/egress circuitry and to the memory and configured to:
analyze a packet to identify a packet content type to determine whether the packet is a mission critical packet;
when the packet is a mission critical packet and the packet is received from a packet source, add an indication to a header of the packet to identify the packet as a mission critical packet;
determine a packet routing parameter based, at least in part, on the packet content type;
determine whether to use at least one of a wired link and a wireless link to communicate the packet via the interface circuit; and
control ingress/egress of the packet in accordance with the packet routing parameter via at least one of the wired link and the wireless link.

16. The bridge-routing module of claim 15, wherein the interface circuitry is configured for communication with at least one of a switch module and another bridge-routing module via the intra-vehicular network.

17. The bridge-routing module of claim 15, the interface circuitry comprising:
a plurality of ports;
switching circuitry coupled to the plurality of ports; and
link management circuitry coupled to the processing circuitry and to the switching circuitry and configured to control the switching circuitry to select an active port of the plurality of ports.

18. The bridge-routing module of claim 17, wherein the link management circuitry is further configured to:
deselect the active port when failing to meet performance criteria; and
control the switching circuitry to select a different port of the plurality of ports as the active port.

19. The bridge-routing module of claim 17, wherein:
the packet ingress/egress circuitry comprises an ingress buffer configured to store packets received from the interface circuitry; and
the processing circuitry is further configured to control placement of packets in the ingress buffer based, at least in part, on priority of the packets.

20. The bridge-routing module of claim 17, wherein:
the packet ingress/egress circuitry comprises a plurality of egress queues configured to store respective packet content types; and
the processing circuitry is further configured to:
control placement of packets in the plurality of egress queues based, at least in part, on a priority of the packets; and
select an egress queue from which a next packet is to be transmitted by the packet ingress/egress circuitry.

* * * * *